US012767241B2

(12) United States Patent
Kubo et al.

(10) Patent No.: US 12,767,241 B2
(45) Date of Patent: Oct. 20, 2026

(54) AUTOMOBILE BODY

(71) Applicant: NIPPON STEEL CORPORATION, Tokyo (JP)

(72) Inventors: Masahiro Kubo, Tokyo (JP); Shunji Hiwatashi, Tokyo (JP); Yutaka Mikazuki, Tokyo (JP); Koichi Sato, Tokyo (JP); Takahiro Aitoh, Tokyo (JP); Kengo Takeda, Tokyo (JP); Katsuya Nakano, Tokyo (JP); Yuri Toda, Tokyo (JP); Shinichiro Tabata, Tokyo (JP); Kodai Murasawa, Tokyo (JP); Daisuke Maeda, Tokyo (JP); Kazuo Hikida, Tokyo (JP); Kazuhisa Kusumi, Tokyo (JP); Shingo Fujinaka, Tokyo (JP); Jun Haga, Tokyo (JP); Ryo Tabata, Tokyo (JP); Ryoma Kato, Tokyo (JP); Mitsuharu Yamagata, Tokyo (JP); Toshiyuki Niwa, Tokyo (JP); Hiromi Asama, Tokyo (JP); Junichiro Suzuki, Tokyo (JP); Yasunori Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 382 days.

(21) Appl. No.: 18/563,240

(22) PCT Filed: May 25, 2022

(86) PCT No.: PCT/JP2022/021440

§ 371 (c)(1),
(2) Date: Nov. 21, 2023

(87) PCT Pub. No.: WO2022/250091

PCT Pub. Date: Dec. 1, 2022

(65) Prior Publication Data

US 2024/0270325 A1 Aug. 15, 2024

(30) Foreign Application Priority Data

May 25, 2021 (JP) ................................ 2021-088012

(51) Int. Cl.
*B62D 29/00* (2006.01)
*B23K 11/11* (2006.01)
(Continued)

(52) U.S. Cl.
CPC ............ *B62D 29/007* (2013.01); *B23K 11/11* (2013.01); *C21D 7/13* (2013.01); *C21D 9/46* (2013.01);
(Continued)

(58) Field of Classification Search
CPC .. B62D 29/007; B23K 11/11; B23K 2103/04; C21D 7/13; C21D 9/46; C21D 2211/002; C21D 2211/008; C22C 38/60
(Continued)

(56) References Cited

U.S. PATENT DOCUMENTS

2022/0002830 A1 1/2022 Tabata et al.
2022/0063245 A1 3/2022 Nakano et al.
2024/0052464 A1 2/2024 Kawasaki et al.

FOREIGN PATENT DOCUMENTS

EP 3 584 344 A1 12/2019
EP 3 584 348 A1 12/2019
(Continued)

OTHER PUBLICATIONS

Nikkan Kogyo Shimbun, Oct. 12, 2017, articles, total 1 page, https://www.nikkan.co.jp/articles/view/00446307.

*Primary Examiner* — Steven O Douglas
(74) *Attorney, Agent, or Firm* — Birch, Stewart, Kolasch & Birch, LLP

(57) ABSTRACT

What is provided is an automobile body in which batteries, tires, and liquids containing water and oil are removed from
(Continued)

a public road vehicle with superior collision safety, the public road vehicle comprising at least a steel material containing a steel sheet with a tensile strength of 1180 MPa or higher, a non-ferrous metal material, and a resin material, wherein the ratio of a mass $m_h$ (kg) of the steel sheet having a tensile strength of 1180 MPa or higher to a mass m (kg) of the automobile body is 9% or higher, and a mass m (kg) of the automobile body and a projected area s ($m^2$) of the automobile body from an upper side satisfy a formula (1) and a formula (2)

$$6 < s < 11 \tag{1}$$

$$m < (272.37 \times s - 835) \times 0.98. \tag{2}$$

21 Claims, 56 Drawing Sheets

(51) Int. Cl.
*C21D 7/13* (2006.01)
*C21D 9/46* (2006.01)
*C22C 38/60* (2006.01)
*B23K 103/04* (2006.01)

(52) U.S. Cl.
CPC .......... *C22C 38/60* (2013.01); *B23K 2103/04* (2018.08); *C21D 2211/002* (2013.01); *C21D 2211/008* (2013.01)

(58) Field of Classification Search
USPC .......................................................... 296/205
See application file for complete search history.

(56) References Cited

FOREIGN PATENT DOCUMENTS

| | | | |
|---|---|---|---|
| JP | 2015-422 | A | 1/2015 |
| JP | 2020-171935 | A | 10/2020 |
| WO | WO 2020/196060 | A1 | 10/2020 |
| WO | WO 2020/203979 | A1 | 10/2020 |
| WO | WO 2021/001813 | A1 | 1/2021 |
| WO | WO 2021/070640 | A1 | 4/2021 |

AUTOMOBILE BODY

TECHNICAL FIELD

The present invention relates to an automobile body.

This application claims priority on May 25, 2021, based on Japanese Patent Application No. 2021-088012, the contents of which are hereby incorporated by reference.

BACKGROUND ART

In recent years, from the viewpoint of preventing global warming, it has become more important to reduce greenhouse gas emissions.

Against this backdrop, the emergence of electric vehicles and hybrid vehicles that reduce emissions of carbon dioxide ($CO_2$) and other greenhouse gases than conventional vehicles powered by internal combustion engines is expected to reduce the greenhouse gas emissions from vehicles while driving.

In addition, it is expected that the greenhouse gas emissions from automobiles will be reduced by adopting materials that are superior in weight reduction, such as aluminum and carbon, as components of automobiles.

Regarding automobile bodies, for example, Patent Document 1 below discloses a vehicle body structure with excellent productivity.

The following Non-Patent Document 1 discloses that the usage ratio of high strength steel sheets (high-tens) of the white body (BIW) of a current automobile is:

0% to 17% for the 1180 MPa-class steel sheets,

0% to 5% for the 1310 MPa-class steel sheets, and

6% for the 1470 MPa-class steel sheets.

In general, the weight ratio of BIW to vehicle weight is about 30%. When converted into the weight ratio of "high-tens" to vehicle weight, the ratio of steel sheets of 1180 MPa class or higher is less than 9%, and the ratio of steel sheets of 1470 MPa class to vehicle weight is less than 2%.

PRIOR ART DOCUMENTS

Patent Documents

[Patent Document 1] International Publication No. WO/2021/001813

Non-Patent Document

[Non-Patent Document 1] The Nikkan Kogyo Shimbun, Oct. 12, 2017, https://www.nikkan.co.jp/articles/view/00446307

DISCLOSURE OF THE INVENTION

Problem to be Solved by the Invention

However, in order to reduce the total greenhouse gas emissions into the global environment in light of the life-cycle of automobiles, it is not sufficient to reduce the greenhouse gases by focusing solely on the use (driving) of vehicles as described above.

Therefore, it is necessary to reduce the total greenhouse gas emissions, including "1. Greenhouse gases generated in the manufacture of materials for automobiles", "2. Greenhouse gases generated in the manufacture of automobiles", "3. Greenhouse gases generated in the use of automobiles", and "4. Greenhouse gases generated in the disposal of automobiles".

Accordingly, the present invention is intended to provide an automobile body capable of reducing the total greenhouse gas emissions generated during a series of life cycles, from the manufacture, use, and disposal of an automobile.

Means for Solving Problems

The summary of this disclosure is as follows.

(1) A first aspect of the present invention is an automobile body in which batteries, tires, and liquids containing water or oil are removed from a public road vehicle with superior collision safety, the public road vehicle including at least a steel material containing a steel sheet with a tensile strength of 1180 MPa or higher, a non-ferrous metal material, and a resin material, wherein a ratio of a mass $m_h$ (kg) of the steel sheet having a tensile strength of 1180 MPa or higher to a mass m (kg) of the automobile body is 9% or higher, and a mass m (kg) of the automobile body and a projected area s ($m^2$) of the automobile body from an upper side satisfy a formula (1) and a formula (2)

$$6 < s < 11 \tag{1}$$

$$m < (272.37 \times s - 835) \times 0.98. \tag{2}$$

(2) An automobile body in which batteries, tires, and liquids containing water or oil are removed from a public road vehicle with superior collision safety, the public road vehicle including at least a steel material containing a steel sheet with a tensile strength of 1180 MPa or higher, a non-ferrous metal material, and a resin material, wherein a ratio of a mass $m_h$ (kg) of the steel sheet having a tensile strength of 1180 MPa or higher to a mass m (kg) of the automobile body is 9% or higher, and a total mass M of the $CO_2$ emission amount at the time of manufacturing, using, and disposing, calculated from a material composition of the automobile body, a projected area s ($m^2$) of the automobile body from an upper side, and a height h (m) of the automobile body satisfy a formula (3) and a formula (4)

$$9 < s \times h < 19 \tag{3}$$

$$M < (1925.1 \times s \times h - 81.4) \times 0.98 \tag{4}$$

(3) In the automobile body according to (1) or (2), a ratio of a mass $m_s$ (kg) of the steel material to the mass m (kg) of the automobile body may be 64% or more, and a ratio of a total mass $m_{hs}$ (kg) of a sheet metal part made of the steel sheet having a tensile strength of 1.9 GPa or higher to the mass m (kg) of the automobile body may be 9% or more.

(4) In the automobile body according to (1) or (2), a ratio of a total mass $m_{ht}$ (kg) of the sheet metal part made of the steel sheet having a tensile strength of 1180 MPa or higher to a body weight $m_b$ (kg) composing the automobile body may be 24% or more.

(5) In the automobile body according to (1) or (2), a ratio of a total mass $m_{SC}$ (kg) of a sheet metal part containing Cu: 0.013% or more, Ni: 0.018% or more, and Sn: 0.002% or more, to a total mass $m_{sp}$ (kg) of the sheet metal part of the automobile body may be 20% or more.

(6) The automobile body according to (3), may include: a hot-stamping formed body including, as a chemical composition, by mass %: C: 0.30% to 0.50%; Si: 0.50% to 3.00%; Mn: 0.50% to 3.00%; Al: 0.0002% to 2.000%; P: 0.100% or less; S: 0.1000% or less; N: 0.0100% or less; Nb: 0% to 0.150%; Ti: 0% to 0.150%; Co: 0% to 2.00%; Mo: 0% to 1.00%; Cr: 0% to 1.00%; Cu: 0% to 1.00%; V: 0% to 1.00%; W: 0% to 1.00%; Ni: 0% to 3.00%; Mg: 0% to 1.00%; Zr: 0% to 1.00%; Sb: 0% to 1.00%; Ca: 0% to 0.10%; REM: 0% to 0.30%; B: 0% to 0.0100%; and a remainder consisting of Fe and impurities; and microstructure which includes residual austenite of which an area ratio is 5% or more and less than 10%, bainite and tempered martensite of which a total area ratio exceeds 90% and is 95% or less, and a remainder in microstructure of which an area ratio is less than 5%, among grain boundaries of crystal grains of the bainite and the tempered martensite, a ratio of a length of a grain boundary having a rotation angle in a range of 550 to 750 to a total length of a grain boundary having a rotation angle in a range of 4° to 12°, a grain boundary having a rotation angle in a range of 49° to 54°, and the grain boundary having a rotation angle in a range of 55° to 75° to the <011> direction as a rotation axis is 30% or more, wherein a tensile strength of the hot-stamping formed body is 1500 MPa or more, a frame member formed by hot-stamping a steel sheet, wherein the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is less than 1.0, and a hot-stamping formed body including, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3.

(7) The automobile body according to (3) may include: a hot-stamping formed body including, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3, and a frame member formed by hot-stamping a steel sheet, wherein the frame member has a closed cross section portion in which a cross section perpendicular to a longitudinal direction is a closed cross section, the closed cross section portion has at least two flat parts having a radius of curvature larger than a maximum external dimension of the cross section, and a recessed bead part formed between the two flat parts, the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section, a Vickers hardness of a thickness middle portion in the wall portion is 520 Hv or greater, a width of the wall portion is 0.5 times or greater and 2.5 times or less an effective width $W_e$ obtained from Karman's effective width formula, and a standard deviation ratio obtained by dividing a standard deviation of hardness frequency distribution in a surface layer portion in the wall portion by a standard deviation of hardness frequency distribution in the thickness middle portion in the wall portion is less than 1.0.

(8) The automobile body according to (3) may include a frame member formed by cold-pressing a steel sheet, wherein the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is greater than 1.0, a frame member formed by hot-stamping a steel sheet, wherein the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is less than 1.0, and a frame member formed by hot-stamping a steel sheet, wherein the frame member has a closed cross section portion in which a cross section perpendicular to a longitudinal direction is a closed cross section, the closed cross section portion has at least two flat parts having a radius of curvature larger than a maximum external dimension of the cross section, and a recessed bead part formed between the two flat parts, the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section, a Vickers hardness of a thickness middle portion in the wall portion is 520 Hv or greater, a width of the wall portion is 0.5 times or greater and 2.5 times or less an effective width $W_e$ obtained from Karman's effective width formula, and a standard deviation ratio obtained by dividing a standard deviation of hardness frequency distribution in a surface layer portion in the wall portion by a standard deviation of hardness frequency distribution in the thickness middle portion in the wall portion is less than 1.0.

(9) The automobile body described in (8) may have a structural member for an automobile body, the structural member being formed extending in a predetermined direction, the structural member having a top portion, a ridge portion continuous to the top portion, and a vertical wall portion continuous to the ridge portion, the structural member having a cross-section crossing the predetermined direction that forms a substantially groove-shaped cross-section, and the structural member being made of a press formed steel sheet, the structural member further having at least one groove portion formed at the top portion extending to the predetermined direction from an end portion in the predetermined direction, and an outward flange formed at least in the range of the ridge portion at the end portion, wherein a depth (h) of the groove portion; a width (w) of the groove portion; and a sheet thickness (t) of the steel sheet satisfy relations of $0.2\times H_0 \leq h \leq 3.0\times H_0$, and $H_0=(0.037\ t-0.25)\times w-5.7\ t+29.2$, and a high strength frame member having an L-shape and a T-shape.

(10) The automobile body according to (3) may include a hot-stamping formed body including, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3, and a frame member obtained by joining a first steel sheet member and a second steel sheet member at a spot-welding portion by spot welding, wherein a cross-sectional region in which a cross section perpendicular to a longitudinal direction of the frame member is a closed cross section is formed, the first steel sheet member has a tensile strength of 1,900 MPa or more, the spot-welding portion has a molten metal portion formed by the spot welding and a heat-affected portion adjacent to an outside of the molten metal portion, and in a cross section perpendicular to the longitudinal direction including a center point of the molten metal portion, in a case where a region corresponding to the molten metal portion is defined as a first region, a region corresponding to the heat-affected portion is defined as a second region, a region formed of a region from a boundary between the first region and the second region to a position 100 μm away from the boundary toward the first region and a region from the boundary to a position 100 μm away from the boundary toward the second region is defined as a third region, and Vickers hardness is measured at a pitch of 15 μm with a load of 10 gf along a virtual straight line extending from a center portion of the first region to the second region, average Vickers hardness $Hv_{Ave}$ at a measurement position corresponding to the first region on the virtual straight line and minimum Vickers hardness $Hv_{Min}$ at a measurement position corresponding to the third region on the virtual straight line satisfy $Hv_{Ave}-Hv_{Min}\leq 100$.

(11) The automobile body described in (10) may have a structural member for an automobile body, the structural member being formed extending in a predetermined direction, the structural member having a top portion, a ridge portion continuous to the top portion, and a vertical wall portion continuous to the ridge portion, the structural member having a cross-section crossing the predetermined direction that forms a substantially groove-shaped cross-section, and the structural member being made of a press formed steel sheet, the structural member further having at least one groove portion formed at the top portion extending to the predetermined direction from an end portion in the predetermined direction, and an outward flange formed at least in the range of the ridge portion at the end portion, wherein a depth (h) of the groove portion; a width (w) of the groove portion; and a sheet thickness (t) of the steel sheet satisfy relations of $0.2\times H_0 \leq h \leq 3.0\times H_0$, and $H_0=(0.037\ t-0.25)\times w-5.7\ t+29.2$, and a high strength frame member having an L-shape and a T-shape.

(12) In the automobile body according to (10) may include: a hot stamped product including a base steel sheet, wherein the base steel sheet includes, as a chemical composition, by mass %, C: more than 0.40% and 0.70% or less, Si: less than 2.00%, Mn: 0.01% or more and less than 0.50%, P: 0.200% or less, S: 0.0200% or less, sol. Al: 0.001% to 1.000%, N: 0.0200% or less, Mo: 0.01% or more and less than 0.50%, B: 0.0002% to 0.0200%, Ti: 0% to 0.200%, Nb: 0% to 0.200%, V: 0% to 0.200%, Zr: 0% to 0.200%, Cr: 0% to 2.00%, W: 0% to 2.00%, Cu: 0% to 2.00%, Ni: 0% to 2.00%, Ca: 0% to 0.0100%, Mg: 0% to 0.0100%, REM: 0% to 0.1000%, Bi: 0% to 0.0500%, and a remainder: Fe and impurities, when a Mo content of the base steel sheet is measured by line analysis using an EPMA in a range of 0.05 mm in a sheet thickness direction, in which a ¼ depth position of a sheet thickness of the base steel sheet from a surface of the base steel sheet is a center, a maximum value of the Mo content, a minimum value of the Mo content, and an average value of the Mo content satisfy $([MO]_{mMAX}-[MO]_{mMIN})/[Mo]_{mAVE}<0.50$, herein meaning of each symbol is, $[MO]_{mMAX}$: the maximum value of the Mo content of the base steel sheet (mass %), $[Mo]_{mMIN}$: the minimum value of the Mo content of the base steel sheet (mass %), and $[Mo]_{mAVE}$: the average value of the Mo content of the base steel sheet (mass %), a metallographic microstructure of the base steel sheet contains 90.0% or more of martensite, a standard deviation of a Vickers hardness in a region of 0.3 mm in the sheet thickness direction and 0.6 mm in a direction perpendicular to the sheet thickness direction, in which the ¼ depth position of the sheet thickness of the base steel sheet from the surface of the base steel sheet is a center, is 20 (Hv) or less, and a tensile strength of the base steel sheet is 2,300 MPa or more.

(13) In the automobile body according to (11) may include: a hot stamped product including a base steel sheet, wherein the base steel sheet includes, as a chemical composition, by mass %, C: more than 0.40% and 0.70% or less, Si: less than 2.00%, Mn: 0.01% or more and less than 0.50%, P: 0.200% or less, S: 0.0200% or less, sol. Al: 0.001% to 1.000%, N: 0.0200% or less, Mo: 0.01% or more and less than 0.50%, B: 0.0002% to 0.0200%, Ti: 0% to 0.200%, Nb: 0% to 0.200%, V: 0% to 0.200%, Zr: 0% to 0.200%, Cr: 0% to 2.00%, W: 0% to 2.00%, Cu: 0% to 2.00%, Ni: 0% to 2.00%, Ca: 0% to 0.0100%, Mg: 0% to 0.0100%, REM: 0% to 0.1000%, Bi: 0% to 0.0500%, and a remainder: Fe and impurities, when a Mo content of the base steel sheet is measured by line analysis using an EPMA in a range of 0.05 mm in a sheet thickness direction, in which a ¼ depth position of a sheet thickness of the base steel sheet from a surface of the base steel sheet is a center, a maximum value of the Mo content, a minimum value of the Mo content, and an average value of the Mo content satisfy $([Mo]_{mMAX}-[Mo]_{mMIN})/[Mo]_{mAVE}<0.50$, herein meaning of each symbol is, $[Mo]_{mMAX}$: the maximum value of the Mo content of the base steel sheet (mass %), $[Mo]_{mMIN}$: the minimum value of the Mo content of the base steel sheet (mass %), and $[Mo]_{mAVE}$: the average value of the Mo content of the base steel sheet (mass %), a metallographic microstructure of the base steel sheet contains 90.0% or more of martensite, a standard deviation of a Vickers hardness in a region of 0.3 mm in the sheet thickness direction and 0.6 mm in a direction perpendicular to the sheet thickness direction, in which the ¼ depth position of the sheet thickness of the base steel sheet from the surface of the base steel sheet is a center, is 20 (Hv) or less, and a tensile strength of the base steel sheet is 2,300 MPa or more.

(14) The automobile body described in (3) may have a hot-stamping formed body and a lateral surface member structure of a vehicle body, in which the hot-stamping formed body includes, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3, the lateral surface member structure of a vehicle body includes: a tubular body extending in a front-rear direction of the vehicle body; and an impact absorbing member disposed inside the tubular body, the impact absorbing member includes a web extending along the front-rear direction and flat in a vehicle width direction, a vehicle outer flange joined to a vehicle outer end portion of the web and extending along the front-rear direction, and a vehicle inner flange joined to a vehicle inner end portion of the web and extending along the front-rear direction, and the vehicle outer flange and the vehicle inner flange include a rib disposed so as to sandwich the web from above and below and extending along the front-rear direction.

(15) The automobile body described in (14) may have a structural member for an automobile body, the structural member being formed extending in a predetermined direction, the structural member having a top portion, a ridge portion continuous to the top portion, and a vertical wall portion continuous to the ridge portion, the structural member having a cross-section crossing the predetermined direction that forms a substantially groove-shaped cross-section, and the structural member being made of a press formed steel sheet, the structural member further having at least one groove portion formed at the top portion extending to the predetermined direction from an end portion in the predetermined direction, and an outward flange formed at least in the range of the ridge portion at the end portion, wherein a depth (h) of the groove portion; a width (w) of the groove portion; and a sheet thickness (t) of the steel sheet satisfy relations of $0.2\times H_0\leq h\leq 3.0\times H_0$, and $H_0=(0.037\ t-0.25)\times w-5.7\ t+29.2$, and a high strength frame member having an L-shape and a T-shape.

(16) In the automobile body according to (14) may include: a coated steel member including a steel sheet substrate and a coating containing Al and Fe formed on a surface of the steel sheet substrate, wherein the steel sheet substrate contains, as a chemical composition, by mass %, C: 0.10% to 0.65%, Si: 0.10% to 2.00%, Mn: 0.30% to 3.00%, P: 0.050% or less, S: 0.0100% or less, N: 0.010% or less, O: 0.010% or less, Ti: 0% to 0.100%, B: 0% to 0.0100%, Cr: 0% to 1.00%, Mo: 0% to 1.00%, Ni: 0% to 1.00%, Nb: 0% to 0.10%, Cu: 0% to 1.00%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder including Fe and impurities, the steel sheet substrate includes a decarburized layer formed on a side of the coating, the decarburized layer includes an internal oxidized layer formed on the side of the coating, a depth of the decarburized layer from an interface between the steel sheet substrate and the coating is 30 μm or more, a depth of the internal oxidized layer from the interface is less than 20 μm, and no scale is included between the steel sheet substrate and the coating containing Al and Fe.

(17) In the automobile body according to (15) may include: a coated steel member including a steel sheet substrate and a coating containing Al and Fe formed on a surface of the steel sheet substrate, wherein the steel sheet substrate contains, as a chemical composition, by mass %, C: 0.10% to 0.65%, Si: 0.10% to 2.00%, Mn: 0.30% to 3.00%, P: 0.050% or less, S: 0.0100% or less, N: 0.010% or less, O: 0.010% or less, Ti: 0% to 0.100%, B: 0% to 0.0100%, Cr: 0% to 1.00%, Mo: 0% to 1.00%, Ni: 0% to 1.00%, Nb: 0% to 0.10%, Cu: 0% to 1.00%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder including Fe and impurities, the steel sheet substrate includes a decarburized layer formed on a side of the coating, the decarburized layer includes an internal oxidized layer formed on the side of the coating, a depth of the decarburized layer from an interface between the steel sheet substrate and the coating is 30 μm or more, a depth of the internal oxidized layer from the interface is less than 20 μm, and no scale is included between the steel sheet substrate and the coating containing Al and Fe.

(18) The automobile body described in (14) may have a tray, in which the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray includes a bottom wall and a peripheral side wall erected from an outer periphery of the bottom wall the tray includes a high-strength portion having a high tensile strength, and a low-strength portion having a tensile strength lower than that of the high-strength portion, the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

(19) The automobile body described in (15) may have a tray, in which the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray includes a bottom wall and a peripheral side wall erected from an outer periphery of the bottom wall the tray includes a high-strength portion having a high tensile strength, and a low-strength portion having a tensile strength lower than that of the high-strength portion, the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

(20) The automobile body described in (16) may have a tray, in which the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray includes a bottom wall and a peripheral side wall erected from an outer periphery of the bottom wall the tray includes a high-strength portion having a high tensile strength, and a low-strength portion having a tensile strength lower than that of the high-strength portion, the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

(21) The automobile body described in (17) may have a tray, in which the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray includes a bottom wall and a peripheral side wall erected from an outer periphery of the bottom wall the tray includes a high-strength portion having a high tensile strength, and a low-strength portion having a tensile strength lower than that of the high-strength portion, the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

Effect of Invention

According to the present invention, an automobile body can be provided that can reduce the total greenhouse gas emissions generated during a series of life cycles, including the manufacture, use, and disposal of an automobile.

EMBODIMENTS OF THE INVENTION

Hereinafter, some embodiments relating to the present invention will be described with reference to the figures. However, these descriptions are intended to be merely illustrative of preferred embodiments of the invention and are not intended to limit the invention to such specific embodiments.

As described above, in order to reduce the total greenhouse gas emissions into the global environment (Green House Gas: GHG) in light of the lifecycle of automobiles, it is not sufficient to reduce greenhouse gases by focusing solely on the use (driving) of vehicles as described above. It is necessary to reduce the total amount of greenhouse gases, including "1. Greenhouse gases generated in the manufacture of materials for automobiles", "2. Greenhouse gases generated in the manufacture of automobiles", "3. Greenhouse gases generated in the use of automobiles", and "4. Greenhouse gases generated in the disposal of automobiles".

In this specification, greenhouse gases such as $CO_2$ generated during the life cycle of an automobile are referred to as "lifecycle greenhouse gases" and the $CO_2$ amount is defined as the sum of $CO_2$ and greenhouse gases other than $CO_2$ by equivalent mass conversion.

Greenhouse gases other than $CO_2$ include substances that deplete the ozone layer, such as methane, dinitrogen oxide, and freon compounds. How to calculate the $CO_2$ equivalent mass is described below.

Figure 1:
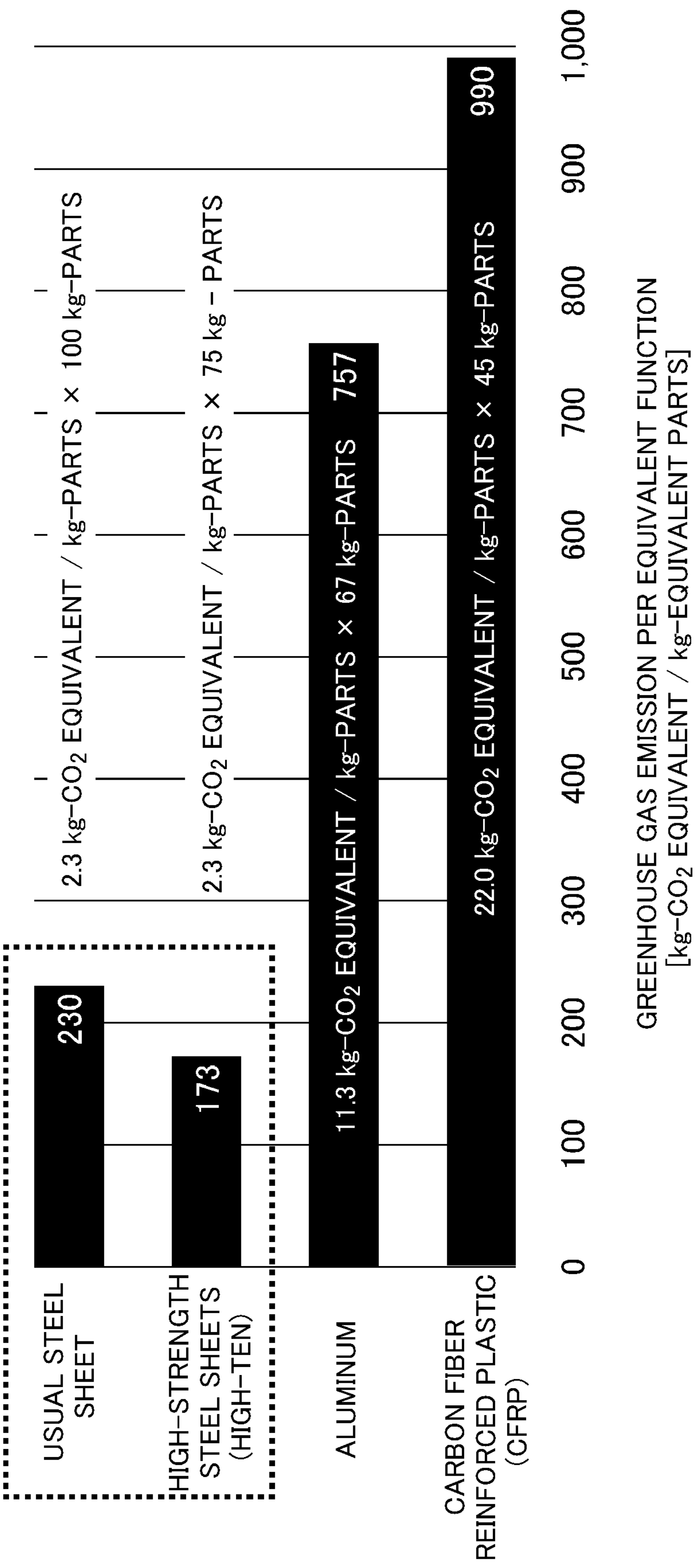
FIG. 1 is a characteristic diagram showing the environmental impact (the greenhouse gas emissions) of each automobile material during manufacture.

With regard to "1. Greenhouse gases generated in the manufacture of materials for automobiles," the greenhouse gas emissions per vehicle is the smallest for steel materials compared to other materials. FIG. 1 is a characteristic diagram showing the environmental impact (the greenhouse gas emission) of each automobile material. The vertical axis shows materials for automobiles (usually steel sheets, high strength steel sheets (high tens), aluminum, and carbon fiber reinforced plastics (CFRP)), and the horizontal axis shows the greenhouse gas emission per equivalent function [kg-$CO_2$ equivalent/kg-equivalent parts]. As shown in FIG. 1, the greenhouse gas emission by steel materials (usually steel sheets and high-strength steel sheets) is significantly lower than that of other materials (aluminum and carbon fiber reinforced plastics), and the main use of steel materials as materials that make up automobiles reduces greenhouse gas emissions and greatly contributes to the reduction of lifecycle greenhouse gases. "$CO_2$ equivalent" is also referred to as "$CO_2$ equivalent mass" and herein "$CO_2$ equivalent", "$CO_2$ equivalent mass" and "$CO_2$ converted amount" are used in the same meaning. "$CO_2$ equivalent mass" is a mass calculated by weighting the $CO_2$ (global warming potential: 1) and gases other than the $CO_2$, such as $CH_4$ (greenhouse effect per unit mass: 25 times the $CO_2$; global warming potential: 25) and $N_2O$ (greenhouse effect per unit mass: 298 times the $CO_2$; global warming potential: 298) by the global warming coefficient, and then calculating the $CO_2$ equivalent mass. In this specification, "$CO_2$ equivalent mass" is calculated by the conversion factor of "$CO_2$ equivalent mass" set for each material (as described in Table 4 below).

With regard to the "3. Greenhouse gases generated in the use of automobiles" mentioned above, from the viewpoint of reducing the load on driving sources such as internal combustion engines by reducing the weight of the automobiles to reduce greenhouse gases, the current focus is on reducing the weight of automobiles by using multi-material such as aluminum and carbon. For this reason, as shown in FIG. 1, the greenhouse gas emission is made lighter by using a materials by which the greenhouse gas emission is relatively large. Therefore, it is not considered that the reduction of "3. Greenhouse gases generated in the use of automobiles" and "1. Greenhouse gases generated in the manufacture of materials for automobiles" are compatible. Currently, "1. Greenhouse gases generated in the manufacture of materials for automobiles" and "3. Greenhouse gases generated in the use of automobiles" are considered to be trade-offs, and it is not assumed that they will be reduced in any way by combining the two.

The present inventors focused on the reduction of "1. Greenhouse gases generated in the manufacture of materials for automobiles" and "3. Greenhouse gases generated in the use of automobiles" in order to reduce the lifecycle greenhouse gases, and the present inventors studied the Element Technologies of the automobile body 100, especially its materials and structures. The present inventors have applied new materials (high-tensile materials) and novel structures according to the functions of each portion of the automobile body 100. More specifically, the present inventors constructed the automobile body 100 mainly of steel materials and applied new steel materials to each part of the automobile body 100, and applied new structures to each part to supplement the body stiffness which is insufficient due to the steel sheet thinning resulting therefrom. As a result, the automobile body 100 of a public road vehicle in accordance with the present embodiment has been made both lighter and more rigid by making steel sheets thinner, and it has become possible to reduce the lifecycle greenhouse gases while satisfying the necessary strength.

Figure 2:
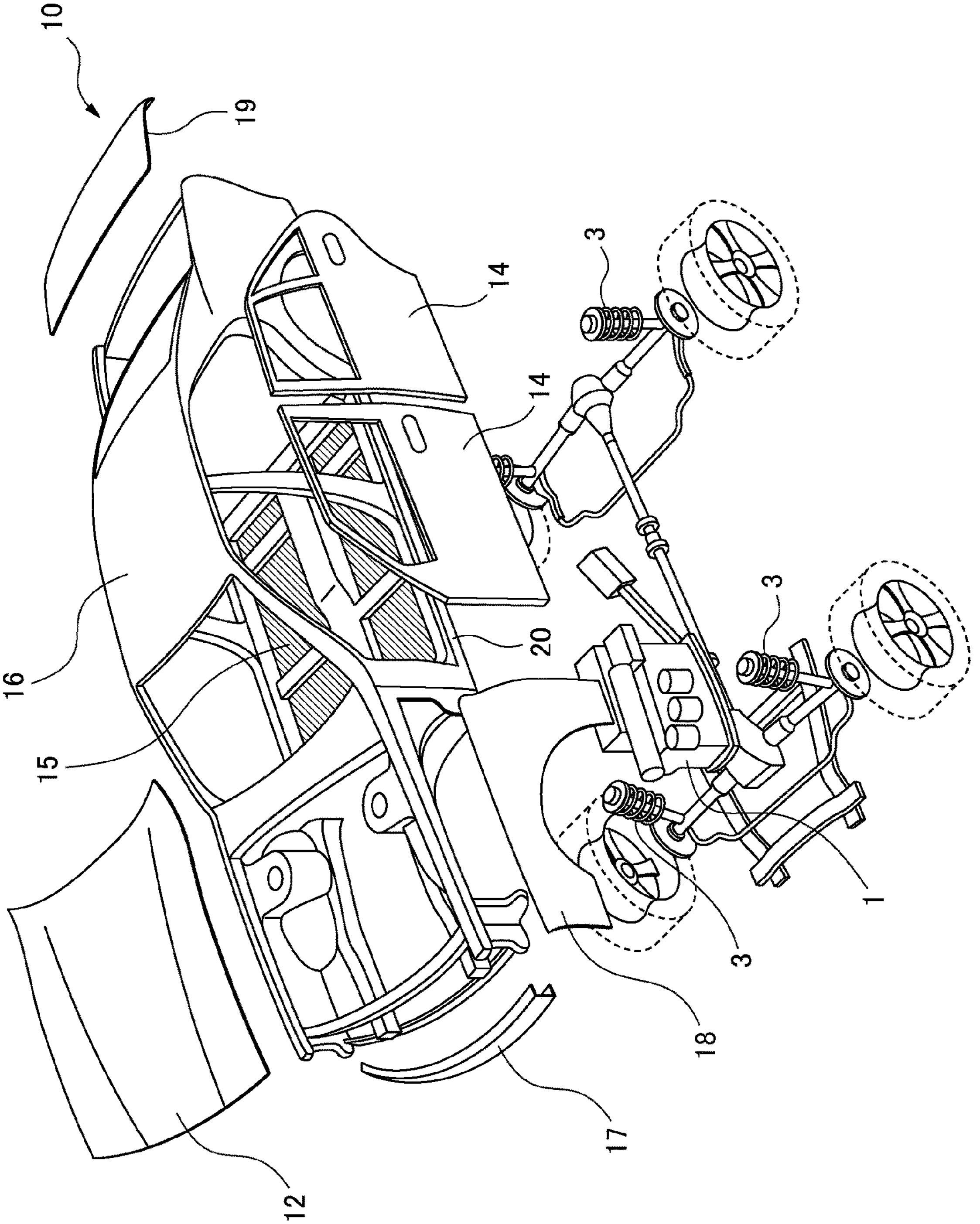
FIG. 2 is an exploded perspective view illustrating an automobile body of a public road vehicle in accordance with the present embodiment.
Figure 3:
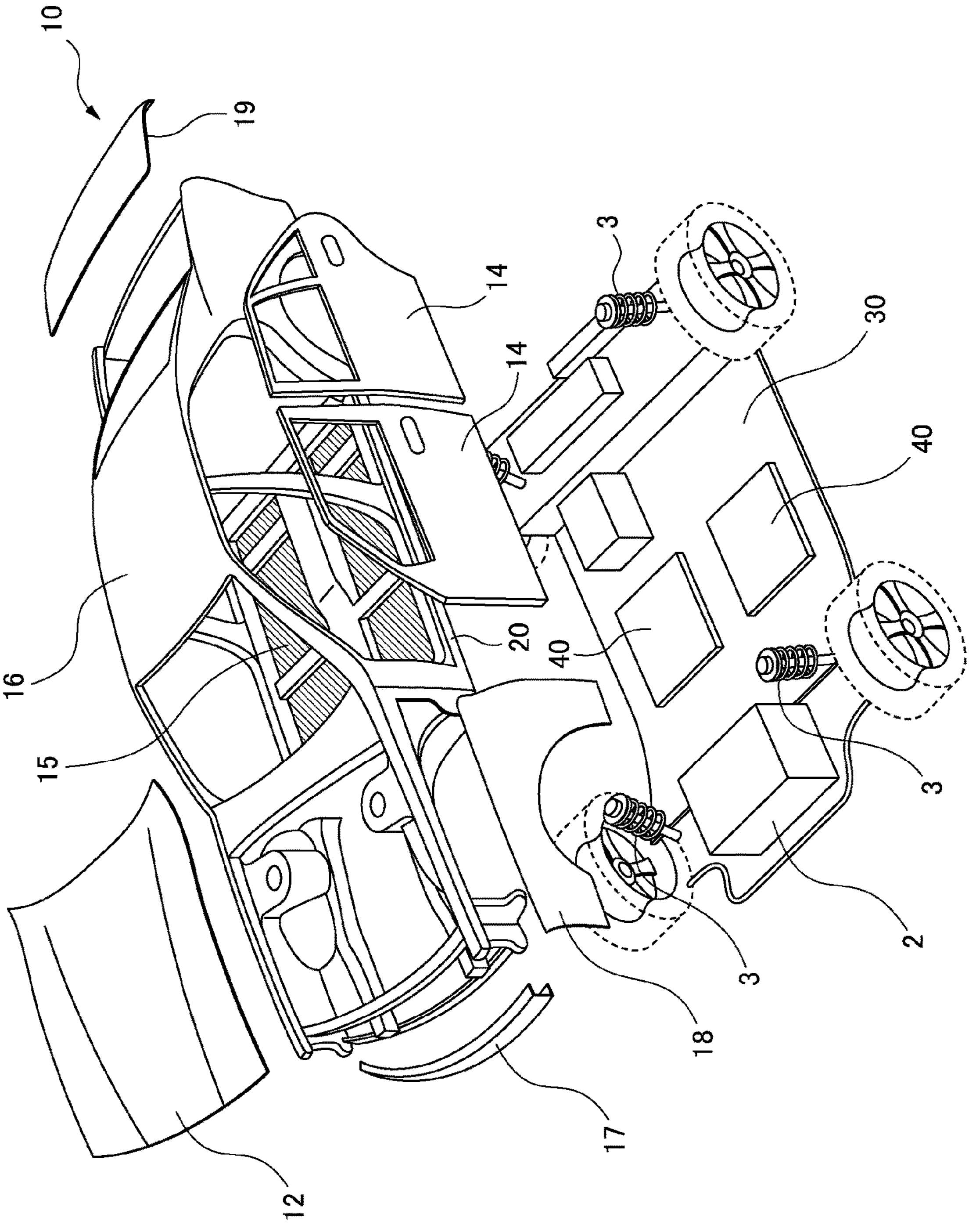
FIG. 3 is an exploded perspective view illustrating an automobile body of a public road vehicle in accordance with the present embodiment.

FIGS. 2 and 3 are exploded perspective views showing an automobile body 100 of a public road vehicle in accordance with the present embodiment. FIG. 2 shows an automobile body 100 of an automobile (engine vehicle) driven by an internal combustion engine 1. FIG. 3 also shows an automobile body 100 of an electric vehicle driven by an electric motor 2. The automobile body 100 shown in FIGS. 2 and 3 includes an exterior panel 10 and a monocock structure frame 20, with an exterior panel 10 mounted on the monocock structure frame 20. The exterior panel 10 includes a bonnet 12, a door 14, a roof 16, a fender 18, a trunk lid 19, and the like. The automobile body 100 shown in FIGS. 2 and 3 are all of public road vehicles free of batteries, tires, and liquids containing water or oil.

In the automobile body 100 of the engine vehicle shown in FIG. 2 and the electric automobile body 100 shown in FIG. 3, since the electric vehicle is mounted with a large capacity battery near the floor of the body, the composition mainly of the floor parts is different. In the automobile body 100 of an engine vehicle, a floor 15 is provided on the frame 20 and an internal combustion engine 1, a suspension 3, or the like is mounted on the frame 20. The automobile body 100 of an electric vehicle may have a structure in which a motor 2, a suspension 3, or the like is mounted on the frame 20 as well as an engine vehicle. However, as shown in FIG. 3, a motor 2, a suspension 3, or the like may be mounted on the floor frame member 30. In addition, the automobile body 100 of an electric vehicle differs from the vehicle 100 of an engine vehicle in that a battery box 40 for mounting the battery is provided on the floor frame member 30. Also shown in FIG. 3 is a structure wherein the floor 15 is mounted on the frame 20, but the floor 15 may be mounted on the battery box 40 and the top surface of the battery box 40 may be constructed to serve as a floor.

The automobile body 100 of a public road vehicle in accordance with the present embodiment can satisfy certain conditions that are not satisfied by the conventional automobile body by applying new materials and new structures.

Specifically, the automobile body 100 of a public road vehicle in accordance with the present embodiment is an automobile body in which batteries, tires, and liquids containing water or oil are removed from a public road vehicle with superior collision safety, the public road vehicle including at least a steel material containing a steel sheet with a tensile strength of 1180 MPa or higher, a non-ferrous metal material, and a resin material, wherein a ratio of a mass $m_h$(kg) of the steel sheet having a tensile strength of 1180 MPa or higher to a mass m (kg) of the automobile body 100 is 9% or higher, and a mass m (kg) of the automobile body 100 and a projected area s ($m^2$) of the automobile body 100 from an upper side satisfy a formula (1) and a formula (2)

$$6 < s < 11 \tag{1}$$

$$m < (272.37 \times s - 835) \times 0.98. \tag{2}$$

More preferably, the ratio of a mass $m_h$ (kg) of the steel sheet having a tensile strength of 1470 MPa or higher to a mass m (kg) of the automobile body 100 is 9% or higher.

The coefficient of 0.98 is the value when the margin of 2% is taken, and it is more preferable when the margin of 2.8% is taken to set the coefficient of 0.972. Furthermore, a margin of 3.5% with a coefficient of 0.965 is more preferable.

In addition, the automobile body 100 of a public road vehicle in accordance with the present embodiment is an automobile body in which batteries, tires, and liquids containing water or oil are removed from a public road vehicle with superior collision safety, the public road vehicle including at least a steel material containing a steel sheet with a tensile strength of 1180 MPa or higher, a non-ferrous metal material, and a resin material, wherein a ratio of a mass $m_h$ (kg) of the steel sheet having a tensile strength of 1180 MPa or higher to a mass m (kg) of the automobile body 100 is 9% or higher, and a total mass M of the $CO_2$ emission amount at the time of manufacturing, using, and disposing, calculated from a material composition of the automobile body 100, a projected area s ($m^2$) of the automobile body 100 from an upper side, and a height h (m) of the automobile body 100 satisfy a formula (3) and a formula (4).

$$9 < s \times h < 19 \tag{3}$$

$$M < (1925.1 \times s \times h - 81.4) \times 0.98 \tag{4}$$

More preferably, the ratio of the mass $m_h$ (kg) of steel sheets having a tensile strength of 1470 MPa or more to the mass m (kg) of the automobile body 100 is 9% or more. The coefficient of 0.98 is the value when the margin of 2% is taken, and is more preferable when the margin of 2.5% is taken to set the coefficient to 0.975. More preferably, a margin of 3% is taken to set the coefficient to 0.97.

In addition, the automobile body 100 of the public road vehicle in accordance with the present embodiment has a ratio 64% or more of the weight $m_s$ (kg) of the steel material to the weight m (kg) of the automobile body 100.

In addition, the automobile body 100 of the public road vehicle according to the present embodiment has a ratio of a total mass $m_{ht}$ (kg) of the sheet metal part made of the steel sheet having a tensile strength of 1180 MPa or higher to a body weight $m_b$ (kg) including the automobile body 100 is 24% or more, and the ratio of a total mass $m_{hs}$ (kg) of a sheet metal part made of the steel sheet having a tensile strength of 1.9 GPa or higher is 9% or more. More preferably, the ratio of a total mass $m_{ht}$ (kg) of the sheet metal part made of the steel sheet having a tensile strength of 1470 MPa or higher to a body weight $m_b$ (kg) including the automobile body 100 is 24% or more.

In addition, the automobile body 100 of the public road vehicle in accordance with the present embodiment has a ratio of a total mass $m_{se}$ (kg) of a sheet metal part containing Cu: 0.013% or more, Ni: 0.018% or more, and Sn: 0.002% or more, to a total mass $m_{sp}$ (kg) of the sheet metal part of the automobile body is 20% or more.

"Public road vehicles with superior collision safety" include vehicles that conform to the New Vehicle Assessment Program, which can meet collision safety standards of U.S.NCAP and other countries around the world.

As will be described in detail below, these conditions are satisfied by the new materials and new structures possessed by the automobile body 100 in accordance with the present embodiment and are not satisfied by conventional vehicle bodies which do not have these new materials and new structures. The automobile body 100 according to the present embodiment can be implemented (realizable) by employing a plurality of technologies of the Element Technologies A to L described below in an appropriate combination.

Further, it is desirable that the automobile body 100 according to the present embodiment employs three or more of the Element Technologies A-L.

In particular, in order to satisfy the condition of the automobile body in which the ratio of a mass $m_s$ (kg) of the steel material to the mass m (kg) of the automobile body is 64% or more, and the ratio of a total mass $m_{hs}$ (kg) of a sheet metal part made of the steel sheet having a tensile strength of 1.9 GPa or higher is 9% or more, it is preferable to combine the element technologies A to L as follows.

Combination 1: Element Technologies B+C+E
Combination 2: Element Technologies E+G
Combination 3: Element Technologies A+C+G
Combination 3-1: Element Technologies A+C+G+K+L
Combination 4: Element Technologies E+H
Combination 4-1: Element Technologies E+H+K+L
Combination 4-2-1: Element Technologies E+H+F
Combination 4-2-2: Element Technologies E+H+K+L+F
Combination 5: Element Technologies E+I
Combination 5-1: Element Technologies E+I+K+L
Combination 5-2-1: Element Technologies E+I+D
Combination 5-2-2: Element Technologies E+I+K+L+D
Combination 5-3-1: Element Technologies E+I+J
Combination 5-3-2: Element Technologies E+I+K+L+J
Combination 5-3-3: Element Technologies E+I+D+J
Combination 5-3-4: Element Technologies E+I+K+L+D+J In this specification, a public road vehicle is a vehicle that meets the safety standards of each country's laws and regulations (type approval) and is excellent in collision safety performance evaluation for each collision test of the NCAP (New Car Assessment Program), which is an assessment test of each country. The assessment tests are more stringent than the laws and regulations of each country. If the highest evaluation (5 star safety evaluation) is obtained in the assessment tests, it is possible to run on public roads sufficiently.

The automobile body 100 of the public road vehicle according to the present embodiment is not limited to the engine vehicle shown in FIG. 2 or the automobile body of the electric vehicle shown in FIG. 3, but may be a hybrid vehicle driven by an internal combustion engine and an electric motor, a fuel cell vehicle, a hydrogen engine vehicle, or the like. Also shown in FIGS. 2 and 3 is an automobile body having a monocock structure frame 20, but the automobile body 100 is not limited to an automobile body having a monocock structure frame 20, but may be a ladder frame automobile body. Other types of public road vehicles include passenger or commercial vehicles such as sedans, hatchbacks, station wagons, one boxes, pickup trucks, and the like. In addition, public road vehicles include loaded vehicles such as trucks.

An outline of the Element Technology applied to the automobile body 100 according to the present embodiment is as follows. Details of each Element Technology will be described later.

1. External Panel

Figure 4:
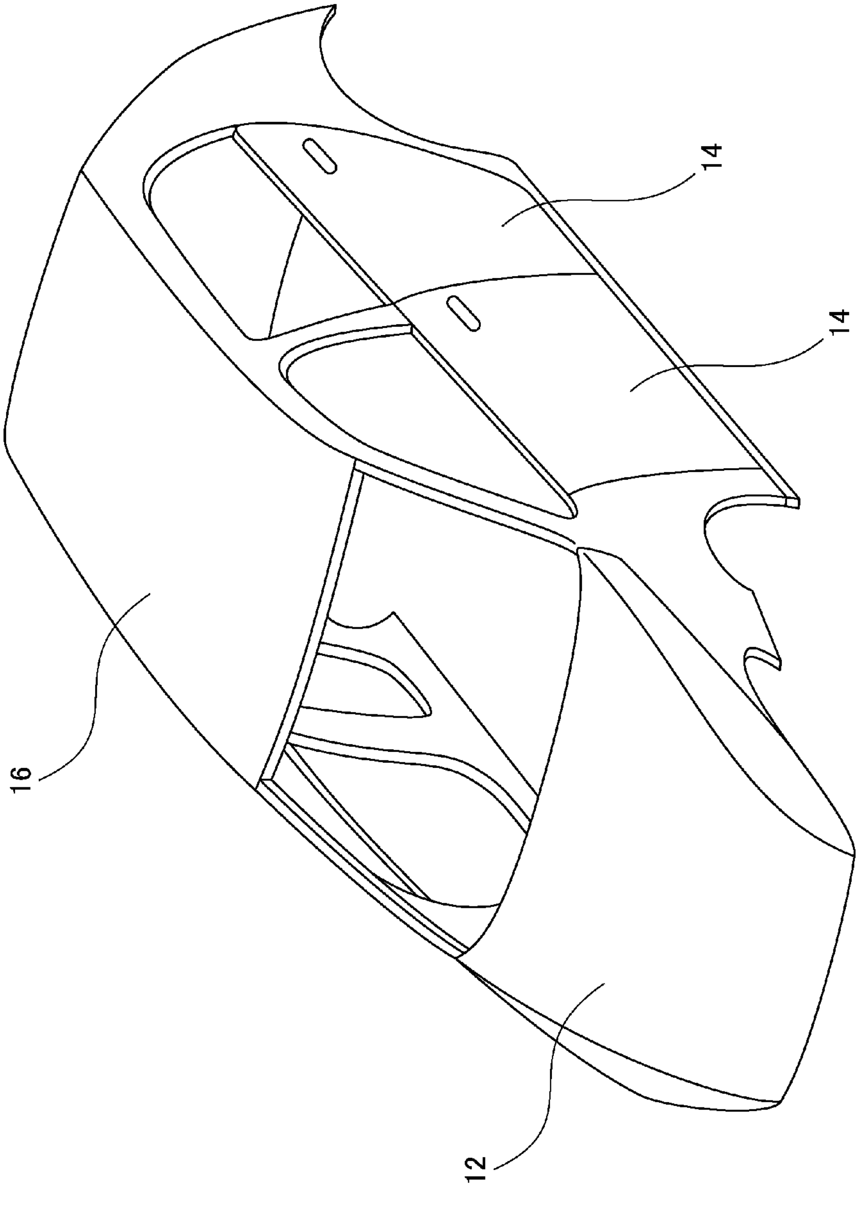
FIG. 4 is a perspective view illustrating an exterior panel of an automobile body according to the present embodiment.

FIG. 4 is a perspective view illustrating an example of an exterior panel 10 of an automobile body 100 according to the present embodiment.

Specifically, the exterior panel 10 includes a bonnet 12, a door 14, and a roof 16, and is considered to have excellent surface quality and appearance after press forming.

The material of the exterior panel 10 is mainly a cold rolled high-tensile material having a tensile strength of 590 MPa or more and 780 MPa or less.

2. Shock Absorbing Frame Members (Element Technologies A, B, and C)

Figure 5:
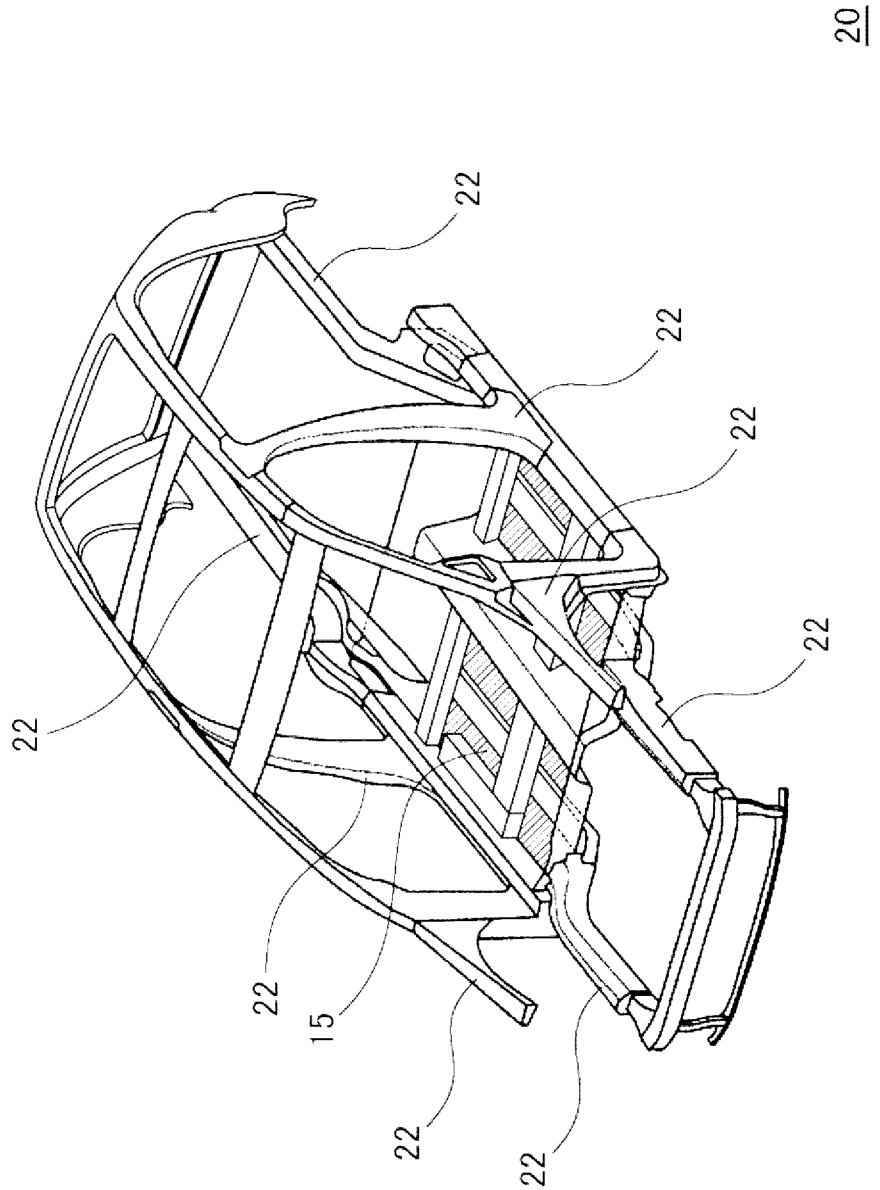
FIG. 5 is a perspective view illustrating an example of a frame of a monocock structure of an automobile body according to the present embodiment having an impact absorbing frame member.

FIG. 5 is a perspective view showing an example of a monocock structure frame 20 of the automobile body 100 according to the present embodiment and having a shock absorbing frame member 22. The shock absorbing frame 22 is provided in the figure at a gray concentration and deforms during collision to absorb collision energy. Details of the material and structure of the shock absorbing frame member 22 are shown below.

2.1. Structure Using Cold Rolled High-Tensile Material with a Tensile Strength of 980 MPa or More (Element Technology A)

2.2. Hot Stamped Body with a Tensile Strength of 1470 MPa or More (Element Technology B)

2.3. Frame Members with Excellent Energy Absorption Efficiency (Element Technology C)

2.4. Frame Member with Continuous Flange and Method of Manufacture Thereof (Element Technology K)

3. Cabin Frame Member and Floor Frame Member (Element Technologies D, E, F, G, H)

Figure 6:
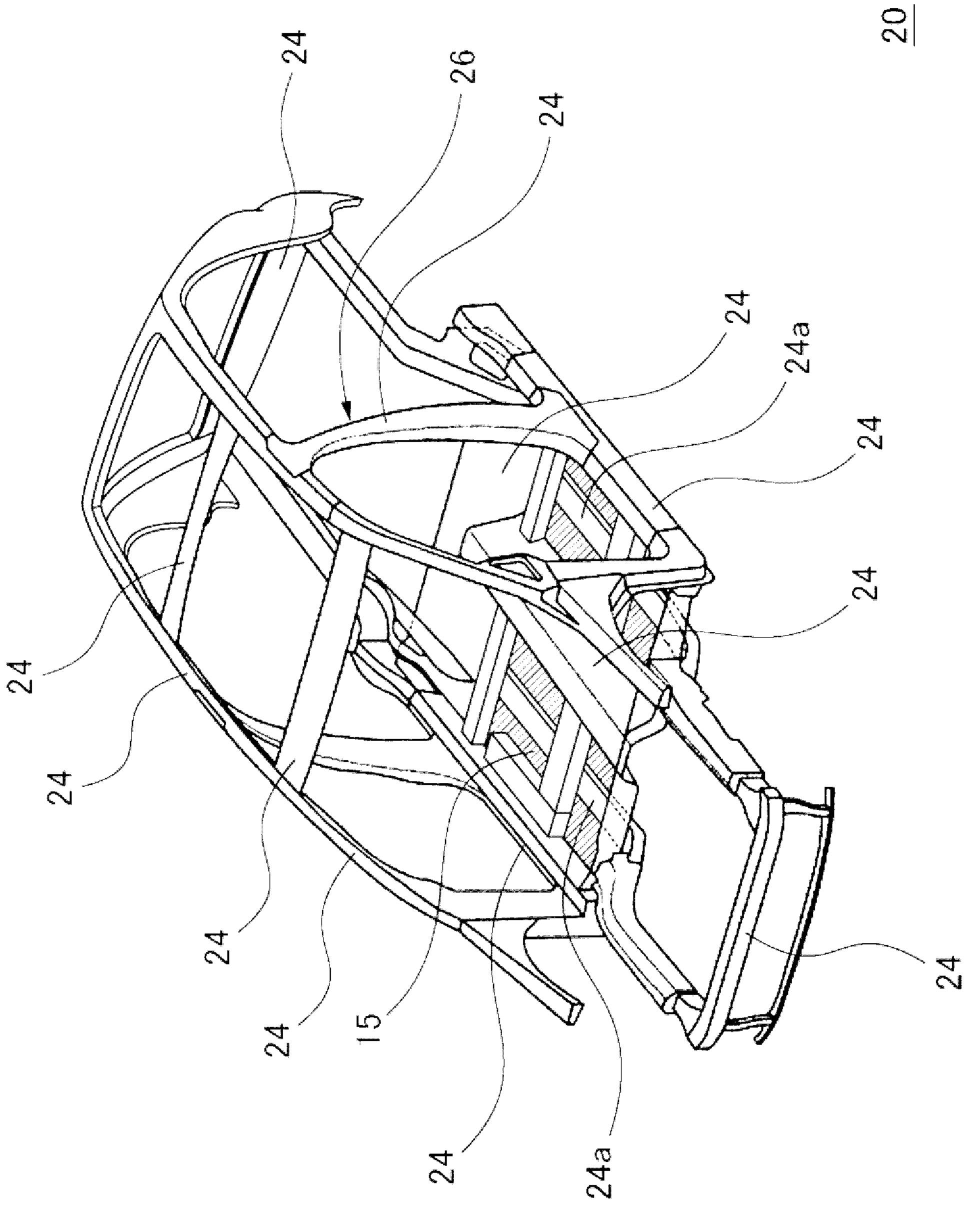
FIG. 6 is a perspective view illustrating an example of a frame of a monocock structure of an automobile body according to the present embodiment having a cabin frame member.
Figure 7:
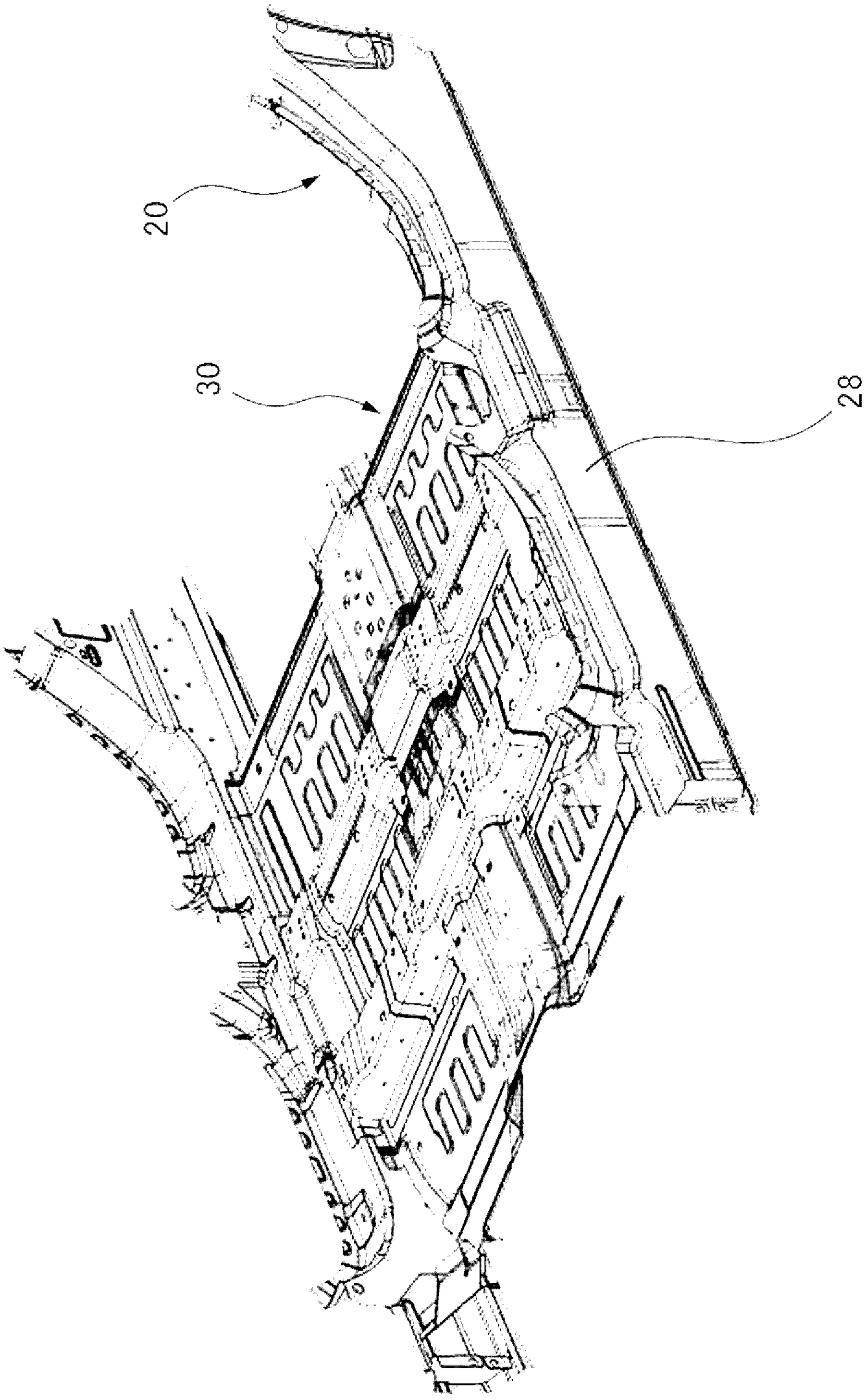
FIG. 7 is a perspective view illustrating a floor frame member of a monocock structure of an electric automobile body when a public road vehicle is an electric vehicle.

FIG. 6 is a perspective view showing an example of a monocock structure frame 20 of the automobile body 100 according to the present embodiment and having a cabin frame member 24. The cabin frame 24 is provided at a gray concentration site in the figure. Incidentally, the cabin frame member 24*a* provided in the floor portion of the cabin frame member 24 is provided only on the upper portion of the floor 15 in the case of an engine vehicle and on the upper and lower portions of the floor 15 in the case of an electric vehicle. FIG. 7 is a perspective view showing a state in which the floor frame member 30 is connected to the monocock structure frame 20 of the automobile body 100 of an electric vehicle and is integrated when the public road vehicle is an electric vehicle. Details of the materials and structure of the cabin backbone member 24 and the floor backbone member 30 are shown below.

3.1. Materials 3.1.1. Steel Members with High Strength and Excellent Bendability and Weldability and Steel suitable as a Material for the Steel Members (Subject to Anti-Corrosion Parts in Body Underparts, Improvement of Spot Weldability Performance) (Element Technology D)

3.1.2. Hot Stamped Body (Element Technology E) with Excellent Strength and Flexibility and High Load Resistance 3.1.3. Steel Sheets for Hot Stamping Suitable as Materials for Hot Stamped Products with Superior Collision Resistance and Tensile Strength of 2300 MPa or More (Element Technology F)

3.2. Structure 3.2.1. Frame Members with Excellent Energy Absorption Efficiency (Element Technology G)

3.2.2. Frame Member Capable of Exerting Excellent Energy Absorption Performance Commensurate with High Strength by Suppressing the Break at the Spot Weld in the Event of a Collision (Element Technology H)

3.2.3. Frame Member with Continuous Flange and Method of Manufacture Thereof (Element Technology K)

3.2.4. Method of Manufacturing a High Strength Frame Member Having L-Shape and T-Shape (Element Technology L)

4. Side Sils and Battery Boxes (Element Technologies I, J)

As shown in FIG. 7, side sills 28 are provided on the left and right sides of the monocock structure frame 20.

Side sill 28, also referred to as a rocker, is a component that connects back and forth in the vicinity of the floor on the side of the vehicle.

In the case of an electric vehicle, the floor frame 30 is equipped with a battery box.

Details of the material and structure of the side sill 28 and the battery box are shown below.

4.1 Side Sill Structure of the Automobile Body that can Suppress Local Deformation while Maintaining Shock Absorbing Capacity (Element Technology I)

4.2 High Collision Performance Battery Box (Element Technology J)

These are applied to the upper lid of the battery box and parts around the floor, whereby the coating process is omitted to reduce greenhouse gas emissions during manufacturing.

The above-described Element Technologies A-L are characterized by steel sheet materials themselves or structures using steel sheet materials. The present embodiment achieves a substantial reduction in lifecycle greenhouse gases compared to conventional vehicle bodies by employing these materials and structures, while reducing the "1. Greenhouse gases generated in the manufacture of materials for automobiles" mentioned above by increasing the weight ratio of steel materials in the automobile body 100, and reducing the "3. Greenhouse gases generated in the use of automobiles" mentioned above by reducing the weight of the automobile body 100.

EXAMPLES

Hereinafter, the present invention will be described in detail with reference to examples. It should be noted that the conditions of the embodiments are an example adopted to confirm the practicability and effectiveness of the present disclosure, and the present disclosure is not limited to the conditions of the embodiments.

This disclosure may adopt various conditions as long as it does not deviate from the gist of it and achieves its purpose.

Table 1 and Table 2 show the various characteristic values of the automobile body of a public road vehicle according to the present invention (Inventive Examples 1-12) and the automobile body of Comparative Examples (Comparative Examples 1-8). Table 1 shows the total weight of public road vehicles (weight or mass; the same shall apply hereinafter), vehicle weight, width h, length l, projected area s, volume v, weight percent of iron alloy, weight % of aluminum alloy, weight percent of other non-ferrous metal materials, weight percent of resin materials, weight percent of other materials, weight percent of ultra-high-tensile materials, weight of ultra-high-tensile materials, scrap ratio, power train types, and total greenhouse gas emissions (GHG emission in the table) as characteristic values of Examples 1-12 and Comparative Examples 1-8 of the Invention.

The total weight of a public road vehicle is the weight of the vehicle itself in a condition in which the vehicle can run on a public road while carrying a passenger. The entire vehicle weight is the total weight of one vehicle and includes, for example, a body, interior, seat, accessories such as car navigation, electronic components such as batteries and electrical harness, suspensions, engines, motor generators, transmissions, brake systems, heating and cooling systems, air conditioners, steering systems, safety devices such as air bags, pedal systems for acceleration and deceleration, and fluid such as oils, fuels, refrigerants, and the like.

The automobile body weight is a weight that is calculated by subtracting batteries, tires, and liquids containing water and oil (cooling water, air conditioner refrigerants, brake oil, engine oil, differential oil, wash solution, etc.) from total weight of a public road vehicle.

Each weight in the Comparative Examples was determined by disassembling the automobile body of a generally distributed public road vehicle and measuring the shape and weight of the vehicle and analyzing the data.

Each weight in some Examples and Comparative examples was determined by measuring and analyzing design and development data with CAD (Computer-Aided Design).

Width w, height h, and length l are total widths, total heights, and total lengths, respectively, as specified by the Japanese Industrial Standard JIS D 0302-1996 Automobile-Measuring Method of Exterior Dimensions.

The projected area s is the projected area from above the automobile body and having a relationship of projected area s=width w×length l. In addition, the volume v described herein is an index of vehicle size and is specified as the volume v=projected area s×height h.

The weight percent of the iron alloy is the percentage of the total weight of the parts made of iron (steel materials such as sheets, strips, bars, wires, tubes, shapes, and forgings, cast iron, and the like) to the weight of the automobile body.

The weight percent of the aluminum alloy is the ratio of the total weight of the parts made of aluminum (aluminum materials, such as sheets, strips, bars, wires, tubes, shapes, and forgings, aluminum castings, and the like) to the weight of the automobile body.

The weight percent of other non-ferrous metal materials is the ratio of the total weight of non-ferrous metal materials other than iron and aluminum to the weight of the automobile body.

The weight of the ultra-high-tensile materials is the total weight of the parts made of material with component strength of 1180 MPa or higher. The strength of the part is the tensile strength $\sigma_{ts}$ measured according to JIS Z2241: 2011 Metallic Materials-Tensile Testing-Method using JIS No. 5 test specimens collected from the part. If JIS No. 5 specimen could not be obtained from the part, the tensile strength was calculated using the Vickers hardness measured at a test load of 50 kg according to the JIS Z2244:2009 Vickers hardness test method using Equation (5) below from the aforementioned Vickers hardness HV, and the aforementioned component strength was used.

$$\text{Tensile strength } \sigma_{ts} = HV \times 3.27 \tag{5}$$

The scrap ratio is the usage ratio of the steel sheet recycled from scraps, and is the ratio of the total mass of sheet metal parts that contain 0.013% or more of Cu, 0.018% or more of Ni, and 0.002% or more of Sn, to the total mass of sheet metal parts. The inventors conducted chemical analyses of parts using blast furnace materials and parts using scrap recycled materials, and investigated diligently, as a result, the inventors found that the chemical composition of Cu, Ni, and Sn could be used to determine the parts recycled from scrap.

The numerical range of chemical composition not detected in blast furnace materials is 0.013% or more for Cu, 0.018% or more for Ni, and 0.002% or more for Sn, which can be judged as inevitable elements from scrap. Scraps may include H, Na, Cl, Co, Zn, Ga, Ge, As, Se, Y, Tc, Ru, Rh, Pd, Ag, Cd, In, Te, Cs, Ta, Re, Os, Ir, Pt, Au, Pb, Bi, or Po as other impurity elements. The upper limit of Cu content is 1.0% or less. When Cu content is more than 1.0% in the manufacture of steel sheets using scrap, hot working cracks are generated and productivity is reduced. The upper limit of the Sn content is 0.5% or less. When Sn content is more than 0.5% in the manufacture of steel sheets using scrap, hot working cracks are generated, and the productivity is reduced. The upper limit of Ni content is 5.0% or less. Ni is added to de-toxify Cu, Sn, but adding more than 5.0% of Ni leads to increase of cost.

The total greenhouse gas emissions (GHG emissions) are the sum of the $CO_2$ equivalent masses calculated from "1. Greenhouse gases generated in the manufacture of materials for automobiles", "2. Greenhouse gases generated in the manufacture of automobiles", "3. Greenhouse gases generated in the use of automobiles", and "4. Greenhouse gases generated in the disposal of automobiles", and are equivalent to the amount of the emission of the lifecycle greenhouse gases. The total greenhouse gas emissions (GHG emissions) are calculated in the manner described below.

Each characteristic values of Inventive Examples 1-12 was obtained by measuring and analyzing the automobile body 100 constituted by the inventors using each of the above-described Element Technologies. Inventors obtained the characteristic values of Comparative Examples 1-8 by measuring and analyzing the generally distributed public road vehicles. For some Comparative Examples, the values described as default values on the World Auto Steel (WAS: World Auto Steel, hereinafter referred to as WAS) website were used. WAS is an automobile subcommittee of the World Steel Association (World Iron and Steel Federation) and consists of 17 steel makers around the world. In analyzing the aforementioned lifecycle greenhouse gas emissions, software for analysis in Excel format (hereinafter referred to as WAS analysis software) downloaded from the WAS website (https://www.worldautosteel.org/life-cycle-thinking/case-studies/comparing-material-usage-in-production-vehicle-efficient-designs/) was used as appropriate.

Regarding the calculation of "1. Greenhouse gases generated in the manufacture of materials for automobiles", the default setting of the WAS analysis software was used as a basic condition. In this default setting, the percentage of scrap charged into blast furnaces is 11.9%, and the use rate of recycled materials using scrap is set as 5% for sheet materials, 85% for bars and wire materials, and 100% for cast iron, based on statistical data. Based on these assumptions, numerical values were entered and calculated to be used for the various material configurations shown in Table 1. By using the above-described Element Technologies, it is possible to increase the use rate of recycled materials using scrap. Therefore, for Examples 6, 7, 9, and 10, the use rate of recycled materials was set and analyzed for sheet materials with tensile strength of 1180 MPa or less.

With regard to the calculation of "2. Greenhouse gases generated in the manufacture of automobiles", based on the default settings of the WAS analysis software, it is assumed that the material yield in the manufacture of automobile parts was 55% for steel sheets, 52% for aluminum alloy sheets, 75% for sheet bars and wires 80% for cast iron, aluminum extruders, and aluminum castings, and values are input so that configuration of various materials is as shown in Table 1 and calculated.

In the calculation of "3. Greenhouse gases generated in the use of automobiles", the power train type (gasoline engine, diesel engine, hybrid, electric vehicle) of the target vehicle was selected. The vehicle types (compact cars, medium-sized cars, SUVs, and electric vehicle classes) were categorized and set according to the size and weight of each vehicle to be analyzed. The following WLTP (Class 3b) mode was selected as the driving pattern of the vehicle.

WLTP mode

Average speed: 36.57 km/h

Maximum speed: 97.4 km/h

Running time: 1477 seconds

Traveling distance: 15.01 km

Idling ratio: 15.4%

Cold start ratio: 100%

Assuming a driving distance of 100,000 km, the resize of the power train was considered while considering reducing the automobile body weight. It was assumed that electric power generated in Japan was used for electric vehicles, and the value of the vehicle weight obtained by the inventors shown in Table 1 was entered into the calculation.

In the calculation of "4. Greenhouse gases generated in the disposal of automobiles", the default setting of the WAS analysis software was used as the basic condition. The recycling rate of steel materials was assumed to be 90.3%, and the recycling rate of aluminum alloy materials was assumed to be 78.6%, and energy recovery from recycling to non-automobiles was also considered as the $CO_2$ absorption amount.

The $CO_2$ equivalent mass was calculated using a coefficient to calculate greenhouse gases in the material manufacturing process shown in table 3, vehicle manufacturing process, fuel manufacturing and use process, material and vehicle recycling process as $CO_2$ equivalent mass, and using weight or energy amount. These values are the default values for WAS analysis software and are based on statistical data on greenhouse gas emissions for each substance and process.

In the above procedure, the total greenhouse gas emissions (GHG emissions) listed in Table 1 was calculated by adding up the $CO_2$ equivalent mass based on "1. Greenhouse gases generated in the manufacture of materials for automobiles", "2. Greenhouse gases generated in the manufacture of automobiles", "3. Greenhouse gases generated in the use of automobiles", and "4. Greenhouse gases generated in the disposal of automobiles".

TABLE 1

| Symbol | Total weight kg | Vehicle weight kg | Width w mm | Length l mm | Height h mm | Projected area s m2 | Volume v/ m3 | Iron alloy wt % | Aluminum alloy wt % | Other non-ferrous metals wt % |
|---|---|---|---|---|---|---|---|---|---|---|
| Inventive Example 1 | 1872.7 | 1708.9 | 1954 | 5254 | 1878 | 10.3 | 18.2 | 64% | 21% | 2% |
| Inventive Example 2 | 1018.6 | 929.8 | 1745 | 3940 | 1500 | 6.9 | 9.6 | 82% | 5% | 2% |
| Inventive Example 3 | 1681.7 | 1528.4 | 1900 | 4690 | 1660 | 8.9 | 13.8 | 70% | 12% | 2% |
| Inventive Example 4 | 1876.4 | 1712.6 | 1954 | 5254 | 1878 | 10.3 | 18.2 | 78% | 5% | 2% |
| Inventive Example 5 | 1224.2 | 1093.1 | 1799 | 4265 | 1460 | 7.7 | 10.4 | 75% | 5% | 2% |
| Inventive Example 6 | 1681.7 | 1528.4 | 1900 | 4690 | 1660 | 8.9 | 13.8 | 70% | 12% | 2% |
| Inventive Example 7 | 1224.2 | 1093.1 | 1799 | 4265 | 1460 | 7.7 | 10.4 | 75% | 5% | 2% |
| Inventive Example 8 | 2174 | 1763.5 | 2011 | 5000 | 1565 | 10.1 | 14.7 | 66% | 3% | 3% |
| Inventive Example 9 | 1875.4 | 1712.6 | 1954 | 5254 | 1878 | 10.3 | 18.2 | 78% | 5% | 2% |
| Inventive Example 10 | 2174 | 1763.5 | 2011 | 5000 | 1565 | 10.1 | 14.7 | 66% | 3% | 3% |
| Inventive Example 11 | 1171.1 | 1040.1 | 1799 | 4265 | 1460 | 7.7 | 10.4 | 74% | 5% | 2% |
| Inventive Example 12 | 1062.5 | 973.7 | 1799 | 4265 | 1460 | 7.7 | 10.4 | 72% | 3% | 3% |
| Comparative Example 1 | 1386.8 | 1255.7 | 1799 | 4265 | 1460 | 7.7 | 10.4 | 77% | 6% | 2% |
| Comparative Example 2 | 1100 | 1011.3 | 1690 | 3940 | 1500 | 6.7 | 9.3 | 72% | 3% | 3% |
| Comparative Example 3 | 1146.3 | 1045.9 | 1745 | 3940 | 1500 | 6.9 | 9.6 | 83% | 8% | 1% |
| Comparative Example 4 | 2131.1 | 1967.3 | 1954 | 5254 | 1878 | 10.3 | 18.2 | 80% | 7% | 1% |
| Comparative Example 5 | 2580 | 2481 | 1955 | 5210 | 1825 | 10.2 | 17.5 | 65% | 7% | 2% |
| Comparative Example 6 | 2230 | 1820 | 2011 | 4682 | 1565 | 9.4 | 13.7 | 42% | 22% | 3% |
| Comparative Example 7 | 2279 | 2181.9 | 1955 | 5210 | 1825 | 10.2 | 17.5 | 31% | 37% | 2% |
| Comparative Example 8 | 2045.5 | 1890 | 1845 | 5170 | 1470 | 9.5 | 13.0 | 59% | 16% | 3% |

| Symbol | Resin wt % | Other material wt % | Ultra-high-tensile materials wt % | Ultra-high-tensile materials weight-kg | scrap ratio | power train types | GHG emission, kg $Co_2eq$ |
|---|---|---|---|---|---|---|---|
| Inventive Example 1 | 9% | 4% | 9% | 153.8 | 5% | diesel engine | 33022 |
| Inventive Example 2 | 9% | 2% | 11% | 102.3 | 5% | hybrid | 17186 |
| Inventive Example 3 | 13% | 3% | 10% | 152.8 | 6% | hybrid | 25695 |
| Inventive Example 4 | 9% | 6% | 16% | 274.0 | 5% | gasoline engine | 31981 |
| Inventive Example 5 | 12% | 6% | 14% | 153.6 | 5% | gasoline engine | 19135 |
| Inventive Example 6 | 13% | 3% | 10% | 152.8 | 41% | hybrid | 25625 |
| Inventive Example 7 | 12% | 6% | 14% | 153.6 | 60% | gasoline engine | 19041 |
| Inventive Example 8 | 19% | 9% | 12% | 211.6 | 6% | electric vehicle | 26635 |
| Inventive Example 9 | 9% | 6% | 16% | 274.0 | 31% | gasoline engine | 31855 |
| Inventive Example 10 | 19% | 9% | 12% | 211.6 | 21% | electric vehicle | 26588 |
| Inventive Example 11 | 13% | 6% | 14% | 148.2 | 5% | gasoline engine | 18651 |
| Inventive Example 12 | 19% | 3% | 20% | 196.0 | 5% | hybrid | 17776 |

TABLE 1-continued

| | | | | | | | | |
|---|---|---|---|---|---|---|---|---|
| Comparative Example 1 | 11% | 4% | 4% | 50.2 | 5% | gasoline engine | 20569 |
| Comparative Example 2 | 15% | 6% | 0% | 0.0 | 5% | gasoline engine | 17980 |
| Comparative Example 3 | 7% | 1% | 4% | 41.8 | 4% | hybrid | 18353 |
| Comparative Example 4 | 8% | 4% | 3% | 59.0 | 5% | gasoline engine | 34916 |
| Comparative Example 5 | 12% | 14% | 0% | 0.0 | 5% | diesel engine | 35983 |
| Comparative Example 6 | 19% | 14% | 1% | 9.1 | 6% | electric vehicle | 29391 |
| Comparative Example 7 | 14% | 16% | 0% | 0.0 | 5% | diesel engine | 36816 |
| Comparative Example 8 | 15% | 7% | 2% | 28.4 | 6% | gasoline engine | 35967 |

TABLE 2

| Symbol | Body weight kg | Aluminum alloy wt % | Resin wt % | Iron alloy wt % | 1.9 GPa or higher high-tensile material wt % | 1180 MPa or higher and lower than 1.9 GPa high-tensile material wt % | 780 MPa or higher and lower than 1180 MPa high-tensile material wt % | 590 MPa or higher and lower than 780 MPa high-tensile material wt % | 390 MPa or higher and lower than 590 MPa high-tensile material wt % |
|---|---|---|---|---|---|---|---|---|---|
| Inventive Example 1 | 554.9 | 18% | 7% | 68% | 18% | 10% | 1% | 2% | 2% |
| Inventive Example 2 | 329.3 | 0% | 4% | 87% | 9% | 31% | 2% | 3% | 22% |
| Inventive Example 3 | 634.8 | 3% | 4% | 85% | 16% | 8% | 3% | 8% | 8% |
| Inventive Example 4 | 556.0 | 5% | 7% | 81% | 30% | 19% | 2% | 2% | 16% |
| Inventive Example 5 | 384.5 | 0% | 4% | 88% | 19% | 21% | 2% | 2% | 19% |
| Inventive Example 6 | 634.8 | 3% | 4% | 85% | 16% | 8% | 3% | 8% | 8% |
| Inventive Example 7 | 384.5 | 0% | 4% | 88% | 19% | 21% | 2% | 2% | 19% |
| Inventive Example 8 | 553.2 | 4% | 18% | 65% | 12% | 26% | 0% | 1% | 13% |
| Inventive Example 9 | 556.0 | 5% | 7% | 81% | 30% | 19% | 2% | 2% | 16% |
| Inventive Example 10 | 553.2 | 4% | 18% | 65% | 12% | 26% | 0% | 1% | 13% |
| Inventive Example 11 | 361.6 | 0% | 4% | 86% | 21% | 20% | 4% | 1% | 15% |
| Inventive Example 12 | 351.6 | 0% | 4% | 85% | 27% | 22% | 7% | 4% | 24% |
| Comparative Example 1 | 487.2 | 0% | 3% | 90% | 0% | 15% | 8% | 5% | 23% |
| Comparative Example 2 | 386.4 | 0% | 7% | 88% | 0% | 1% | 0% | 12% | 18% |
| Comparative Example 3 | 417.2 | 0% | 3% | 90% | 0% | 4% | 3% | 10% | 15% |
| Comparative Example 4 | 631.5 | 5% | 7% | 81% | 0% | 7% | 6% | 13% | 21% |
| Comparative Example 5 | 806.4 | 0% | 6% | 85% | 0% | 2% | 0% | 9% | 21% |
| Comparative Example 6 | 567.5 | 51% | 20% | 16% | 0% | 1% | 0% | 1% | 0% |
| Comparative Example 7 | 700.6 | 61% | 6% | 24% | 0% | 1% | 0% | 2% | 1% |
| Comparative Example 8 | 617.7 | 19% | 12% | 64% | 0% | 4% | 1% | 3% | 0% |

TABLE 3

| Manufacture of materials | Unit | Greenhouse gas emissions kgCO2eq/unit |
|---|---|---|
| Aluminum, primary ingot, RoW | kg | 10.70 |
| Aluminum, primary ingot, GLO | kg | 16.40 |
| Aluminum, secondary ingot | kg | 0.51 |
| Battery | kg | 19.90 |
| CFRP, primary | kg | 20.20 |
| Copper | kg | 3.78 |
| GFRP, primary | kg | 7.26 |
| Rubber | kg | 3.38 |
| Steel, BF/BOF slab | kg | 2.08 |
| Steel EAF slab | kg | 0.48 |
| Aluminum casting | kg | 0.74 |
| Aluminum extrusion | kg | 0.73 |
| Aluminum rolling | kg | 0.50 |
| Magnesium casting | kg | 0.95 |
| Magnesium rolling | kg | 0.50 |
| Rubber compression molding | kg | 0.81 |
| Rubber injection molding | kg | 0.83 |
| Steel casting | kg | 0.14 |
| Steel HDG | kg | 0.62 |
| Steel HRC | kg | 0.14 |
| Steel long | kg | 0.15 |
| Tires (long steel/rubber molding) | kg | 0.59 |
| Blow molding (HDPE) | kg | 1.16 |
| Calendaring (PVC) | kg | 0.39 |
| Compression Molding | kg | 0.81 |
| Extrusion (HDPE) | kg | 0.37 |
| Extrusion (PP) | kg | 0.47 |
| Extrusion (PVC) | kg | 0.36 |
| Injection Molding (HDPE) | kg | 1.35 |
| Injection Molding (PP) | kg | 0.54 |
| Injection Molding (PVC) | kg | 0.83 |
| Brake Fluid | kg | 1.08 |
| Powertrain Coolant | kg | 1.57 |
| Engine Oil | kg | 1.08 |
| Transmission Fluid | kg | 1.08 |
| Windshield Fluid | kg | 0.39 |

| Manufacture of automobiles | Unit | Greenhouse gas emissions kgCO2eq/unit |
|---|---|---|
| Paint Production | car | 56.99 |
| Painting | car | 277.32 |
| VAC and lightning | car | 196.58 |
| Heating | car | 235.03 |
| Material Handling | car | 40.71 |
| Welding | car | 54.21 |
| Compressed Air | car | 81.21 |

| Manufacture and use of fuel | Unit | Greenhouse gas emissions kgCO2eq/unit |
|---|---|---|
| Diesel production | MJ | 12.00 |
| Gasoline production | MJ | 15.70 |
| Electricity production, China | MJ | 269.00 |
| Electricity production, coal | MJ | 290.00 |
| Electricity production, Europe | MJ | 130.00 |
| Electricity production, India | MJ | 387.00 |
| Electricity production, Japan | MJ | 184.00 |
| Electricity production, USA | MJ | 172.00 |
| Electricity production, USA green mix | MJ | 7.50 |
| Biodiesel combustion | MJ | 77.00 |
| Diesel combustion | MJ | 77.00 |
| Bioethanol combustion | MJ | 72.00 |
| Gasoline combustion | MJ | 72.00 |
| Hydrogen use | MJ | 0.00 |

TABLE 3-continued

| Recycle of scrap | Unit | Greenhouse gas emissions kgCO2eq/unit |
|---|---|---|
| Aluminum | kg | −15.89 |
| Steel | kg | −1.60 |
| Battery recycling, pyrometallugical | kg | −7.51 |
| Battery recycling, hydrometallugical | kg | −2.31 |

In Inventive Examples 1-12, in order to reduce "1. Greenhouse gases generated in the manufacture of materials for automobiles" as described above, as a result of using steel materials using the above-described element technologies, the ratio of the weight of iron to the weight of automobiles (the weight of iron alloys) is high. As shown in Table 1, in any of Inventive Examples 1-12, the amount of the iron alloy is 64% or more by weight. On the other hand, Comparative Examples 1-8 include those in which the amount of the iron alloy is 64% or more by weight and the amount of the iron alloy is less than 64% by weight.

In the Inventive Examples 1-12, the amount of the ultra-high-tensile material can be larger than that of the comparative Examples due to the application of the above-described element technology. As shown in Table 1, in any of Inventive Examples 1-12, the amount of the ultra-high-tensile material is 9% or more by weight. On the other hand, in Comparative Examples 1-8, the amount of the ultra-high-tensile material is up to 4% by weight (Comparative Examples 1 and 3). In addition, the weight of the ultra-high-tensile material per se in the Inventive Example is at least 102.3 kg. In Inventive Example 5, the amount of the ultra-high tensile material having a tensile strength of the 1180 MPa or more was 14% by weight, while the amount of the ultra-high tensile material having a tensile strength of 1470 MPa or more was 8% by weight. On the other hand, in Inventive Example 11, the amount of the ultra-high tensile material having a tensile strength of 1180 MPa or more was similarly 14% by weight, while the amount of the ultra-high-tensile material having strength of 1470 MPa or more was 9% by weight. When Inventive Example 11 and Inventive Example 5 are compared, it can be seen that the volume v is equivalent, but the lifecycle greenhouse gases can be more reduced in Inventive Example 11 than Inventive Example 5. Therefore, more preferably, it is said that the ratio of the mass $m_h$ (kg) of steel sheets having a tensile strength of 1470 MPa or more to the mass m (kg) of the automobile body 100 is 9% or more.

Further, in Inventive Examples 6, 7, 9, and 10, due to the application of the above-described Element Technology, the strength and performance can be secured using the ultra-high-tensile parts having a tensile strength of 1180 MPa or higher, thereby improving the ratio of using scrap recycle materials to other than the ultra-high-tensile parts. Accordingly, in Inventive Examples 6, 7, 9, and 10, the ratio of the total mass of sheet metal parts $m_{se}$ (kg) containing Cu of 0.015% or more, Ni of 0.01% or more, and Sn of 0.004% or more to the total mass of sheet metal parts $m_{sp}$ (kg) is 20% or more, and the ratio of the use of parts using scrap-recycle materials is significantly higher than in Comparative Examples 1-8. When Inventive Example 10 and Inventive Example 8 are compared, it can be seen that by increasing the scrap ratio from 6% to 20%, the lifecycle greenhouse gases taking into account recycling other than automobiles are reduced by 47 kg $CO_{2-eq}$. Furthermore, when Inventive Examples 5 and 7 are compared, it can be seen that by increasing the scrap ratio from 5% to 60%, it is possible to reduce the lifecycle greenhouse gases taking into account recycling other than automobiles by 94 kg $CO_{2\text{-}eq}$. Thus, the higher the scrap ratio is preferable, and the more preferred the numerical range is 20% or more. In addition, as a result of the inventors' diligent investigation, if the scrap ratio exceeded 60%, the formability and performance of the parts were not satisfied, and vehicle performance in the event of a collision was deteriorated. Therefore, the upper limit of the scrap ratio is 60%.

Figure 8:
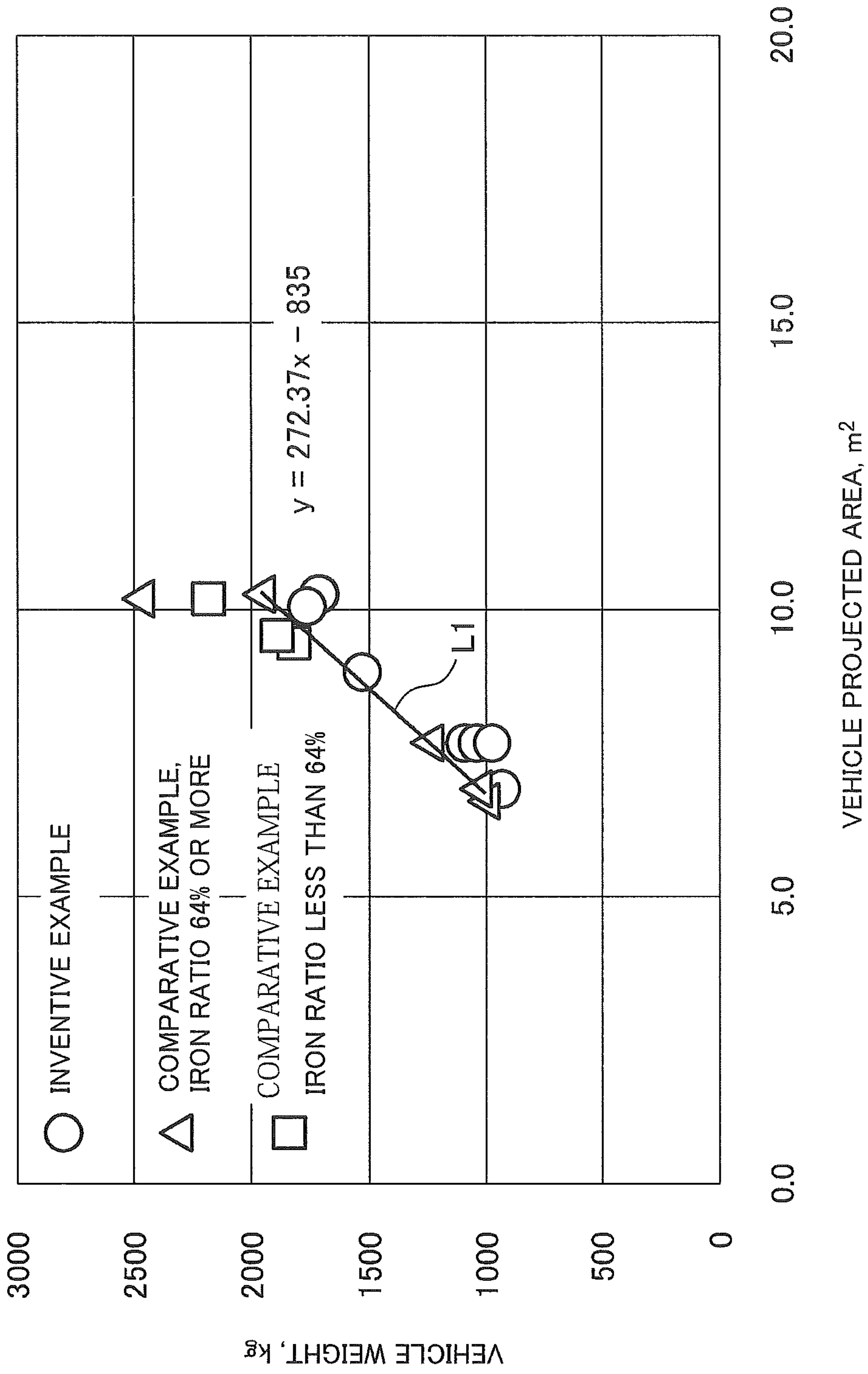
FIG. 8 is a diagram showing the relationship between the projected area s of the automobile body and the vehicle weight, in Table 1.

FIG. 8 is a diagram showing the relationship between the projected area s of the automobile body shown in Table 1 and the vehicle weight, wherein the horizontal axis represents the projected area s of the automobile body and the vertical axis represents the vehicle weight. As shown in FIG. 8, the larger the projected area s, the larger the vehicle weight. In all of Inventive Examples 1-12 and Comparative Examples 1-8, when the projected area of the automobile body from above is s ($m^2$), the projected area s is larger than 6 and less than 11, and the condition of Equation (1) is satisfied.

As shown in FIG. 8, in Inventive Examples 1-12 using each of the above-described Element Technologies, the ratio of the use of the new material (ultra-high-tensile material) is increased, and it is found that the vehicle weight corresponding to the projected area s is lower than in Comparative Examples 1-8. More specifically, in Inventive Examples 1-12, when the vehicle weight is y and the projected area is x, the projected area s and the vehicle weight are applied to the horizontal axis and the vertical axis of FIG. 8, and an open circle mark is plotted, each point is positioned below the straight line L1 represented by Equation (6) described below, on the drawing $$y = 272.37 \times x - 840 \quad (6)$$

On the other hand, for each of Comparative Examples 1-8, when the vehicle weight and the projected area are applied to the horizontal axis and the vertical axis of FIG. 8, and plots the points indicated by an open triangle mark and an open square mark are plotted, each point is located above the straight line L1 represented by Equation (6) or above the straight line L1, on the drawing. The open triangle mark shows Comparative Examples 1-5 in which the weight percent of the iron alloy is 64% or more, and the open square mark shows Comparative Examples 6-8 in which the weight percent of the iron alloy is less than 64%.

Here, when the vehicle weight (mass) of any automobile body is m (kg) and the projected area is s($m^2$), the condition where the vehicle weight m and the projected area s of the automobile body are applied to the horizontal axis and the vertical axis of FIG. 8 and the plotted point is located below the straight line L1 is m smaller than 0.98 times the value of y obtained by substituting the projected area s with the x of Equation (6), so that the conditions of Inventive Examples 1-12 satisfy the conditions of Equation (2) described above. As described above, the margin value may be 3.5%.

As described above, as a result of applying each of the above-described element technologies, in the automobile body 100 of Inventive Examples 1-12, a weight corresponding to the projected area of the automobile body is reduced as compared to the automobile body of the Comparative Examples 1-8. More specifically, the automobile body 100 of Inventive Examples 1-12 is composed mainly of iron and steel materials, and new steel materials are applied to each part. In addition, a new structure is applied to each part to reinforce the stiffness of the automobile body which is insufficient due to the thinning of steel sheets with application of the new steel materials. Therefore, the weight of the automobile body 100 corresponding to projected area of Inventive Examples 1-12 is reduced compared to the automobile body of Comparative Example 1-8. Accordingly, according to Inventive Examples 1-12 of the present invention, it is possible to reduce lifecycle greenhouse gases because both "1. Greenhouse gases generated in the manufacture of materials for automobiles" and "3. Greenhouse gases generated in the use of automobiles" are reduced, in particular.

Figure 9:
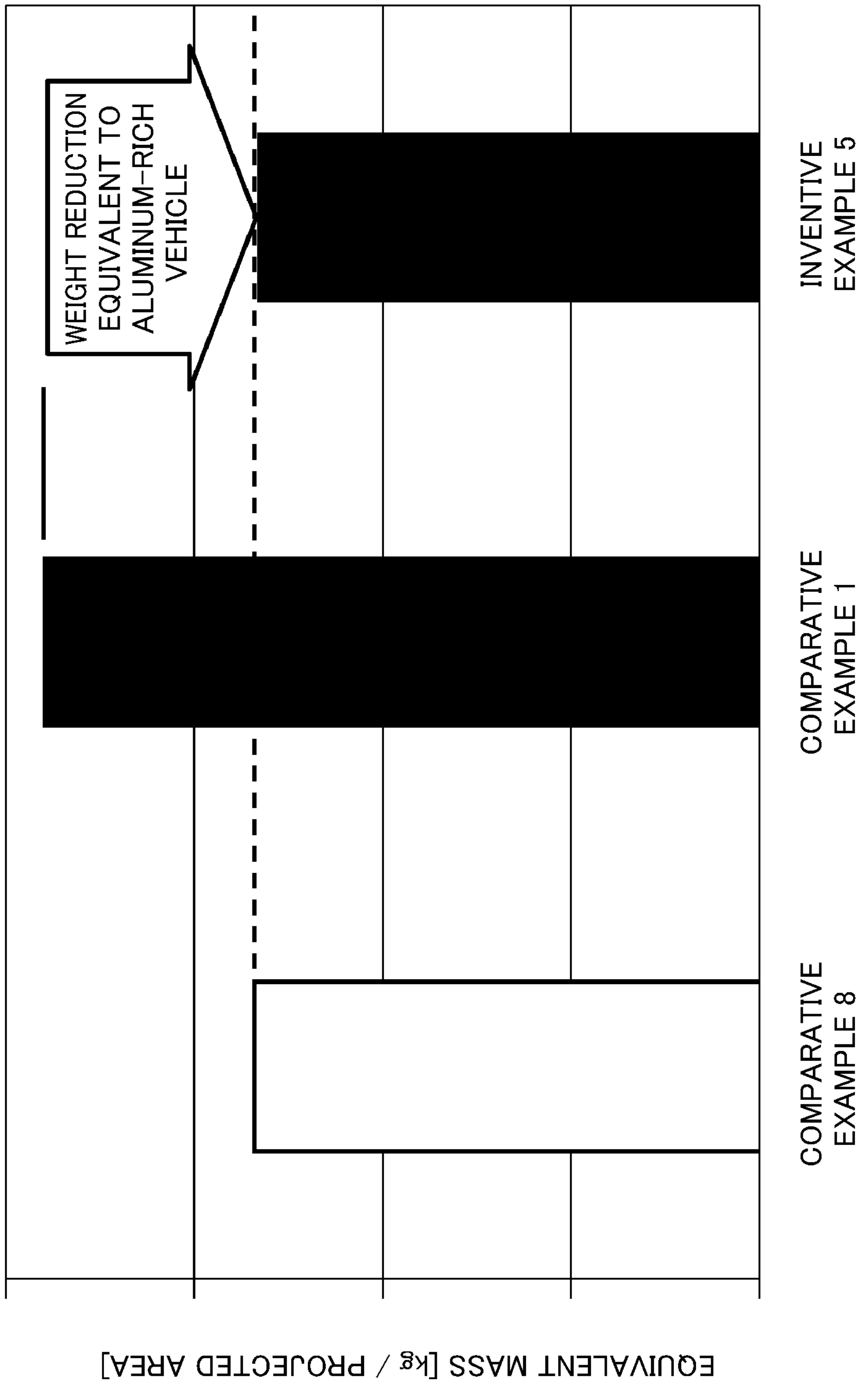
FIG. 9 is a characteristic diagram illustrating the result of comparing the mass (equivalent mass) per projected area of the automobile body with respect to Inventive Example 5, Comparative Example 1, and Comparative Example 8.

FIG. 9 is a characteristic diagram showing the result of comparing the mass (equivalent mass) of the automobile body 100 per projected area of the Inventive Example 5, Comparative Example 1, and Comparative Example 8.

As shown in Table 1, Comparative Example 8 relates to a automobile body of aluminum-rich vehicle that uses a large amount of aluminum with a low weight percent of iron alloy of 59% and a high weight percent of aluminum alloy of 16%. On the other hand, Comparative Example 1 relates to a automobile body that uses a large amount of iron and steel materials with the high weight percent of the iron alloy of 77% and a low weight percent of the aluminum alloy of 6%. Therefore, as shown in FIG. 9, in Comparative Example 1 and Comparative Example 5, Comparative Example 8 has a smaller equivalent mass than Comparative Example 1. In Example 5, although the weight of the iron alloy is high at 75%, and the steel material is mainly composed of steel materials, new steel materials are applied to each part, and new structures are applied to each part to reinforce the body stiffness which is insufficient due to the steel sheet thinning with the application of the new steel materials. Accordingly, it is understood that Inventive Example 5 has an equivalent mass sufficiently smaller than that of Comparative Example 1, has an equivalent mass equivalent to that of Comparative Example 8, which is a automobile body for am aluminum-rich vehicle, and thus, it can be seen that the equivalent mass of Inventive Example 5 is reduced to a level equivalent to that of an aluminum-rich vehicle.

Figure 10:
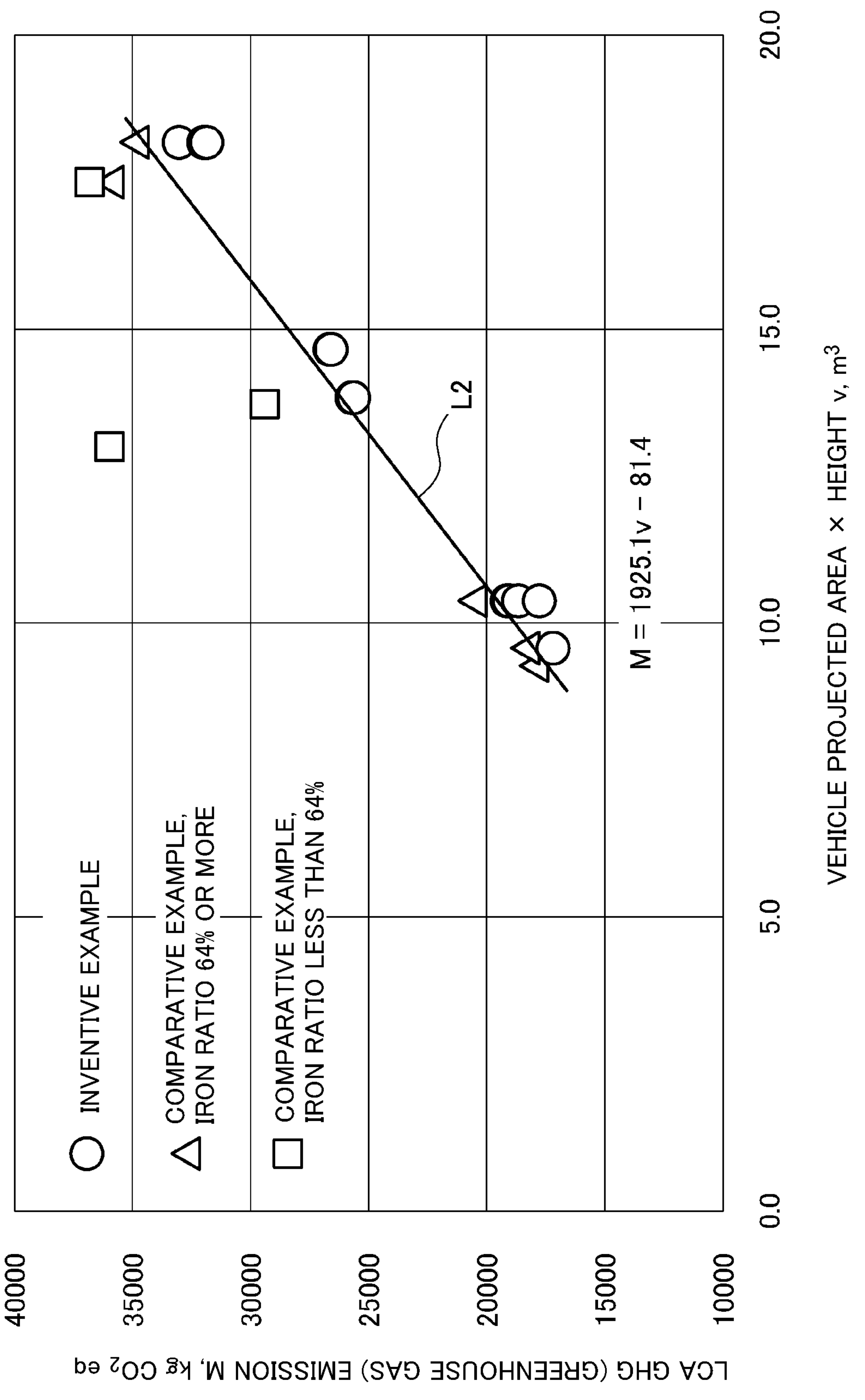
FIG. 10 is a diagram showing the relationship between the volume v of the automobile body and the total greenhouse gas (GHG) emission converted by the $CO_2$ equivalent mass shown in Table 1.

FIG. 10 is a diagram showing the relationship between the volume v of automobile body and the total greenhouse gas emissions in terms of the $CO_2$ equivalent mass of greenhouse gases shown in Table 1. The horizontal axis shows the volume v or the automobile body and the vertical axis shows the emissions in terms of the $CO_2$ equivalent mass. As shown in FIG. 10, the larger the volume v, the greater the use of materials such as steel material, non-ferrous metal materials, and resins that make up the automobile body 100, and thus the greenhouse gas emissions increase. In all of Inventive Examples 1-12 and Comparative Examples 1-8, when the projected area from above the automobile body is s($m^2$) and the height of the automobile body is h(m), the value of the volume v(=s×h)($m^3$) is larger than 9 and is less than 19, and the condition of Equation (3) is satisfied.

As illustrated in FIG. 10, in Inventive Examples 1-12 using the above-described element technology, the ratio of the weight of iron to the weight of the vehicle (the weight percent of the iron alloy) is increased, and the ratio of the weight of materials such as aluminum, carbon fiber reinforced plastic (CFRP) to the weight of the vehicle is decreased. Therefore, it is understood that the amount of greenhouse gas emissions by the $CO_2$ equivalent mass is reduced compared to Comparative Examples 1-8. More specifically, in Inventive Examples 1-12, when the greenhouse gas emissions by the $CO_2$ equivalent mass are y and the automobile body volume is x, the volumes, and the greenhouse gas emissions by the $CO_2$ equivalent mass are applied to the horizontal and vertical axes of FIG. 10, and the points are plotted below the straight line L2 represented by Equation (7) below the figure.

$$y = 1925.1 \times x - 121.4 \quad (7)$$

On the other hand, for each of Comparative Examples 1-8, when the volume and the amount of greenhouse gas emissions by the $CO_2$ equivalent mass are applied to the horizontal and vertical axes of FIG. 10 and open triangle mark and open square mark are plotted, each point is located on the figure above the straight line L2 or straight line L2 represented by Equation (6). The open triangle mark shows the Comparative Examples 1-5 in which the weight percent of the iron alloy is 64% or more, and the open square mark shows the Comparative Examples 6-8 in which the weight percent of the iron alloy is less than 64%.

Here, when the volume of any automobile body is v($m^3$) and the greenhouse gas emissions by the $CO_2$ equivalent mass is M, the condition where the volume v of the automobile body and the amount of greenhouse gas emissions M of the automobile body are applied to the horizontal axis and the vertical axis of FIG. 10 and the point where the point is plotted below the vertical axis L2 is M less than 0.98 times the value of y obtained by substituting the volume v(=projected area s×height h) with the x of Equation (7), so that the conditions of Inventive Examples 1-12 satisfy the conditions of Equation (4) above. As described above, the margin value may be 2.5%.

As described above, as a result of the application of each of the above-described element technologies, the automobile body 100 of the Invention Examples 1-12 can reduce the emissions of said greenhouse gases in accordance with the volume v compared to the automobile body of the Comparative Examples 1-8. More specifically, the automobile body 100 of Inventive Examples 1-12 is composed mainly of iron and steel materials, and new steel materials are applied to each part. In addition, a new structure is applied to each part to reinforce the stiffness of the automobile body, which is insufficient due to the thinning of steel sheets. Therefore, the emissions of greenhouse gases corresponding to the volume v are reduced compared to the automobile body of Comparative Examples 1-8. Accordingly, according to Inventive Examples 1-12, it is possible to reduce lifecycle greenhouse gases.

Table 2 shows the property values of Examples 1-12 and Comparative Examples 1-8 as follows:

- body weight,
- amount (weight %) of aluminum alloy,
- amount (weight %) of resin material,
- amount (weight %) of iron alloy,
- amount (weight %) of high-tensile material having a tensile strength of 1.9 GPa or higher,
- amount (weight %) of high-tensile material having a tensile strength of 1180 MPa or higher and lower than 1.9 GPa,
- amount (weight %) of high-tensile material having a tensile strength of 780 MPa or higher and lower than 1180 MPa,
- amount (weight %) of high-tensile material having a tensile strength of 590 MPa or higher and lower than 780 MPa, and
- amount (weight %) of high-tensile material having a tensile strength of 390 MPa or higher and lower than 590 MPa.

In Table 2, the body weight is the mass of the sum of the frame 20 composed of sheet metal parts and the components constituting the automobile body, including the frame 20, the lid such as the bonnet 12 and trunk lid 19, the fender 18, and the bumper 17 (including components other than sheet metal parts (including interior parts, internal parts, etc.) shown in FIGS. 1 and 2.

The weight % of the aluminum alloy, the weight % of the resin material, the weight % of the iron alloy, and the weight % of each high-tensile material are the ratios of the mass of the aluminum alloy, the mass of the resin material, the mass of the iron alloy, and the mass of each high-tensile material, to the weight of the body.

As shown in Table 2, it can be seen that in Examples 1-12, the amount (weight percent) of each high-tensile material is higher than in Comparative Examples 1-8.

For example, in Example 1-12, the amount (weight percent) of the high-tensile material having a tensile strength of 1.9 GPa or higher is 9% by weight of the smallest (Example 2).

On the other hand, in any of Comparative Examples 1-8, the high-tensile material having a tensile strength of 1.9 GPa or higher is not used, and the amount (weight %) of the high-tensile material having a tensile strength of 1.9 GPa or higher is 0.

In Examples 1-12, the amount of the high-tensile material having a tensile strength of 1180 MPa or higher and lower than 1.9 GPa is 8% by weight even if the amount thereof is the smallest (Examples 3, 6).

On the other hand, in Comparative Examples 1-8, the amount of the high-tensile material having a tensile strength of 1180 MPa or higher and lower than 1.9 GPa is up to 7% by weight (Comparative Example 4).

When the amount of the high-tensile material having a tensile strength of 1.9 GPa or higher is combined with the amount of the high-tensile material having a tensile strength of 1180 MPa or higher and lower than 1.9 GPa, and the amount of the high-tensile material having a tensile strength of 1180 MPa or higher is defined, even the smallest is 24% by weight in Examples 1-12 (Examples 3,6).

In Examples 1-12, as a result of applying the above-described Element Technology, the ratio of the high-tensile materials having a tensile strength of 1.9 GPa or higher and having a tensile strength of 1180 MPa or higher and lower than 1.9 GPa can be improved, thereby contributing to the weight reduction.

Thus, as shown in Table 1, Examples 1-12 of the present invention shows that it is possible to reduce the lifecycle greenhouse gases.

From the results of Tables 1 and 2, the weight percentage of the ultra high-tens material having a tensile strength of 1180 MPa or more relative to the body weight is 24% or more and more preferably 38% or more.

In addition, the ratio of the weight percentage of the high-tensile material having a tensile strength of 1.9 GPa or higher to the body weight is 9% or more and more preferably 16% or more.

In Example 5, the amount of the ultra-high-tensile material of 1180 MPa or more relative to the body weight was 40% by weight, whereas the amount of the ultra-high-tensile material of 1470 MPa or more relative to the body weight was 23% by weight.

On the other hand, in Example 11, the amount of the ultra-high-tensile material of 1180 MPa or more relative to the body weight was 41%, whereas the amount of the ultra-high-tensile material of 1470 MPa or more relative to the body weight was 24% by weight.

Comparative Example 11 and Example 5, it can be seen that the volume v is equivalent, but the lifecycle greenhouse gases can be reduced in Example 11.

Therefore, more preferably, the ratio of the mass (kg) of steel sheets having a tensile strength of 1470 MPa or more to said body weight is 24% or more.

Appendix 3 shows the results of the collision tests performed on Examples 1-12 and Comparative Examples 1-8.

Table 3 shows test results for frontal collision, offset collision, side collision, pole collision, and rear collision, respectively, in evaluation values A-D.

In this evaluation, the automobile body of Comparative Example 1 (Evaluation B) with excellent crash safety performance, which has been certified (type approval) in each country's laws and regulations and which discloses the 5 star safety evaluation report in the EURO NCAP test, was used as the criterion (Evaluation B).

The automobile body shown in Comparative Examples 2-8 is also an automobile body that has been certified (type approval) by the laws and regulations of each country. The results of safety performance evaluation are shown in comparison with Comparative Example 1.

Numerical simulations were used to assess cabin frame deformation and energy resorption for frontal collision, offset collision, side collision, pole collision, and rear collision, and safety performance was assessed by comparing Comparative Example 1 with the test results.

Comparisons were made of the relative intrusion of the front pillar into the cabin for frontal collision and offset collision, the relative intrusion of the center pillar into the cabin for side collision, the entry of the side sill (rocker panel) into the cabin for pole collision, and the entry of the carrier into the cabin for rear collision.

In the EURO NCAP study, the test results were superior to those of the 5 star safety rated vehicle (Comparative Example 1) as Evaluation A.

In addition, the safety test results in Comparative Example 1 were inferior to those in Comparative Example 1, but the parts were not broken down, and this was considered as Evaluation C.

Furthermore, the result of the safety test in Comparative Example 1 was inferior to the result of the safety test, and the part was broken. The result was considered as Evaluation D.

Evaluation D is a standard that has been certified (type approval) by the laws and regulations of each country, and it is a good evaluation as a public road vehicle.

TABLE 4

| Symbol | Frontal collision | Offset collision | Side collision | Pole collision | Rear collision |
|---|---|---|---|---|---|
| Example 1 | A | A | B | B | A |
| Example 2 | C | C | B | B | A |
| Example 3 | B | A | B | A | A |
| Example 4 | B | B | A | A | B |
| Example 5 | B | B | B | B | B |
| Example 6 | B | B | B | B | B |
| Example 7 | B | C | B | B | B |
| Example 8 | B | B | A | A | B |
| Example 9 | B | B | B | B | A |
| Example 10 | B | B | B | A | B |
| Example 11 | B | B | B | B | B |
| Example 12 | B | B | B | B | B |

TABLE 4-continued

| Symbol | Frontal collision | Offset collision | Side collision | Pole collision | Rear collision |
|---|---|---|---|---|---|
| Comparative Example 1 | B | B | B | B | B |
| Comparative Example 2 | C | C | B | D | C |
| Comparative Example 3 | C | C | B | B | A |
| Comparative Example 4 | B | B | B | C | C |
| Comparative Example 5 | B | B | B | A | A |
| Comparative Example 6 | B | B | A | A | B |
| Comparative Example 7 | B | B | B | B | A |
| Comparative Example 8 | A | A | B | B | A |

As shown in Table 3, in Examples 1, 3-6, and 8-12 of the invention, for all of frontal collision, offset collision, side collision, pole collision, and rear collision, achieved results (evaluation A or evaluation B) equal to or greater than the safety test results of the 5 star safety rated vehicle in the EURO NCAP test.

In Example 2, only frontal collision and offset collision were evaluated as C, but for side collision, pole collision, and rear collision, the results (evaluation A or evaluation B) were equal to or greater than the safety test results of the 5 star safety evaluation vehicle in the EURO NCAP test.

In the case of Example 7 of the invention, only offset collision was evaluated as C. However, for frontal collision, side collision, pole collision, and rear collision, the results of the 5 star safety evaluation in the EURO NCAP test were equal to or greater than the safety test results of the vehicle (evaluation A or evaluation B).

Thus, according to Examples 1-12 of the invention, it is possible to reduce the lifecycle greenhouse gases described above while satisfying collision test performance comparable to or greater than the safety test results of a vehicle evaluated at 5 star safety in the EURO NCAP test.

Figure 11:
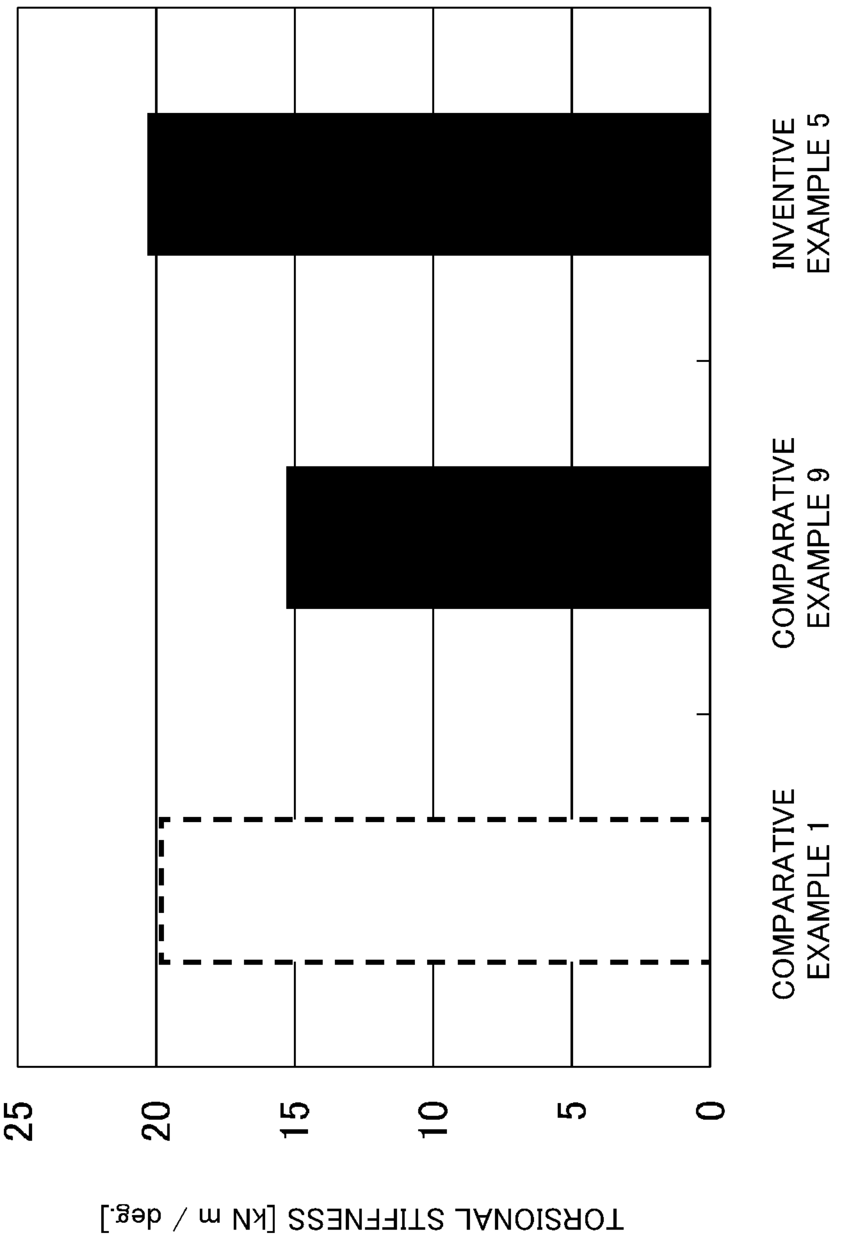
FIG. 11 is a characteristic diagram illustrating a result of comparing torsional stiffness of Example 5, Comparative Example 1, and Comparative Example 9.
Figure 12:
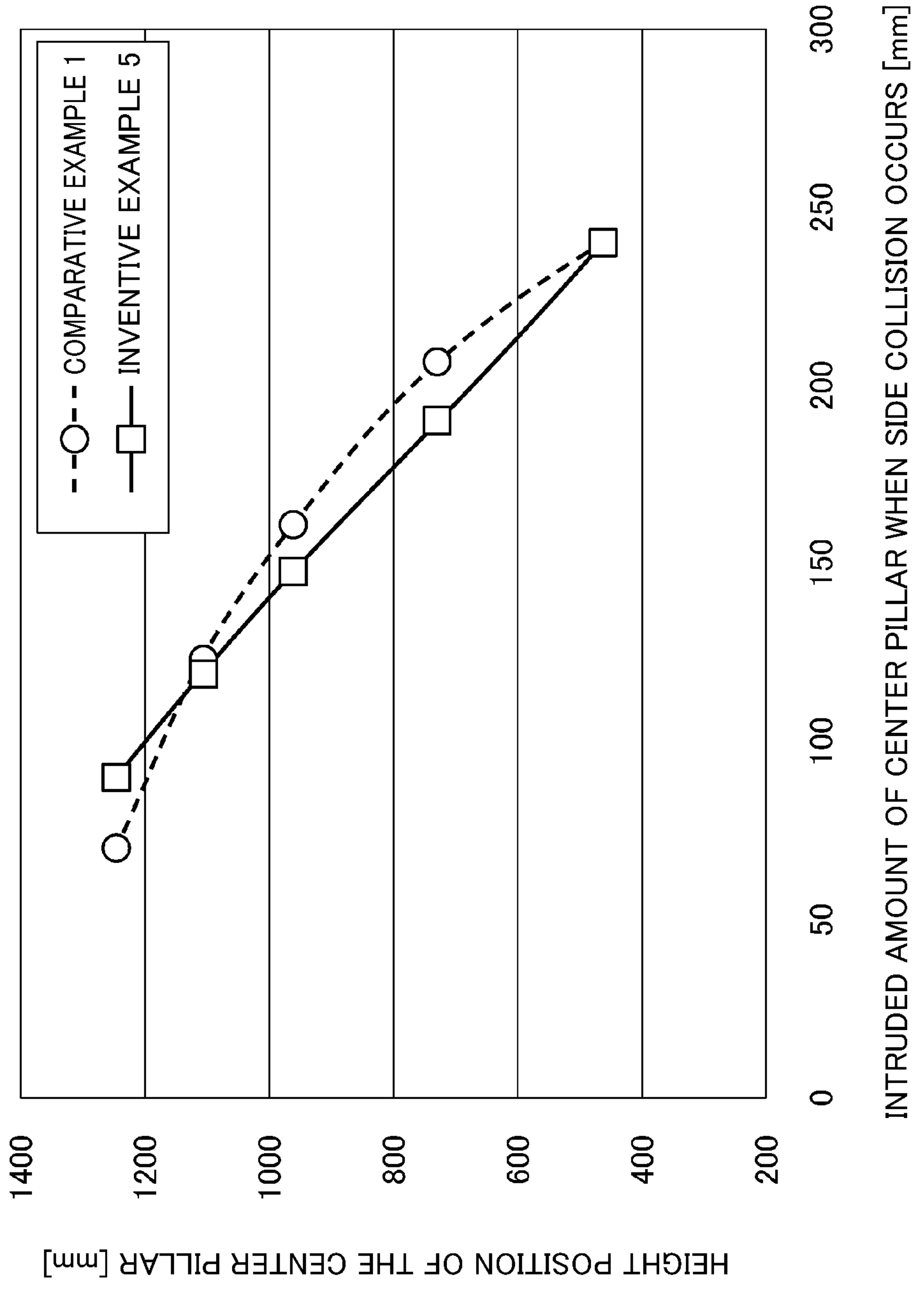
FIG. 12 is a characteristic diagram illustrating the result of comparing the amount of the center pillar of the automobile body intruded into the inside of the automobile body when the side collision occurs in a numerical simulation of Example 5 and Comparative Example 1.

FIGS. 11 and 12 are characteristic diagrams illustrating specific examples in which the stiffness and collision safety performance of the vehicle of Examples are equivalent to that of Comparative Example 1.

FIG. 11 is a characteristic diagram illustrating a result of comparing torsional stiffness of Example 5, Comparative Example 1, and Comparative Example 9.

As shown in FIG. 11, Example 5 has a torsional stiffness equivalent to that of Comparative Example 1 despite the use of a thin ultra-high-tensile material.

Comparative Example 9 shown in FIG. 11 shows a case in which the weight is reduced by simply making the Comparative Example 1 strong and thin, without using the new structure adopted in the inventive Example 5.

Reviewing Comparative Example 5 and Example 9, in Example 5 to which the new structure is applied, the torsional stiffness is the same as in Comparative Example 1, and it is found that the stiffness of the vehicle can be guaranteed.

FIG. 12 shows the result of comparing the intrusion amount of the center pillars 26 of the automobile body 100 into an inside of the vehicle during the side collision in a numerical simulation with respect to Example 5 and Comparative Example 1.

The center pillar 26 constitutes the cabin frame member 24 as shown in FIG. 6.

In FIG. 12, the transverse axis shows the intrusion amount of the center pillar 26 during side collision, and the longitudinal axis shows the position of the center pillar 26 in the height direction.

As shown in FIG. 12, it can be seen that Example 5 has reduced the intrusion amount of the center pillar compared to Comparative Example 1, particularly in a position in the height direction of the center pillar 26 from 430 to 1150 mm.

By applying the new material and structure according to Example 5 of the invention, the intrusion amount of the center pillar is the same as that of Comparative Example 1, and therefore, it can be found that the crash safety performance is equivalent to or higher than that of the 5 star safety rated vehicle in the EURO NCAP test.

Next, each of the above-described Element Technologies A to L will be described in detail.

The elements, equations, examples, etc. in the description of each Element Technology are assigned to each Element Technology for the purpose of simplifying the description. Accordingly, identical codes may be assigned.

(Element Technology A)

Element Technology A is a frame member formed by cold-pressing a steel sheet, in which the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is greater than 1.0.

According to the Element Technology A, in a case where the width and the hardness standard deviation ratio are controlled within appropriate ranges in the reference flat part, it is possible to prevent the fracture during bellows deformation due to a load in an axial direction while suppressing elastic buckling. Accordingly, a high degree of energy absorption performance can be obtained even in a case where a high-strength thin member is used. Accordingly, it is possible to exhibit excellent energy absorption efficiency.

The present inventors intensively studied the configuration of a frame member capable of exhibiting excellent energy absorption efficiency.

First, in order to exhibit excellent energy absorption efficiency, it is important that the frame member has a proof stress of a certain level or higher. In a case where an input load in an axial direction is applied due to a collision, elastic buckling may occur in a flat part in the initial stage of deformation. In a case where elastic buckling occurs, a required proof stress may not be obtained, and excellent energy absorption efficiency may not be exhibited.

In addition, in order to exhibit excellent energy absorption efficiency, it is also important that the frame member realizes folding deformation in a desired deformation mode immediately after an input load in an axial direction is applied thereto due to a collision, in order to efficiently absorb impact energy. In particular, in a case where fracture (fracture at a folded portion) occurs during bellows deformation due to the load in the axial direction, excellent energy absorption efficiency may not be exhibited.

Accordingly, it can be said that in a case where a cross section where elastic buckling hardly occurs in a flat part is designed and high bending performance can be imparted so that fracture hardly occurs, excellent energy absorption efficiency can be exhibited.

Here, in a case where the member is increased in strength and thinned as a method for realizing the weight reduction, the following problems occur.

- Due to the thinning, elastic buckling is likely to occur in a flat part of the member, whereby it becomes difficult to obtain a necessary proof stress.
- Due to the increase of the strength, the bending performance of the steel sheet is reduced, and fracture is likely to occur in a folded portion after the start of deformation. Therefore, it becomes difficult to efficiently absorb impact energy.

The present inventors paid attention to the fact that the above-described problems hinder a further increase of the strength and thinning of a high strength steel sheet.

The present inventors further conducted studies, and found that in a case where the width and the hardness standard deviation ratio are controlled within appropriate ranges in a reference flat part, it is possible to prevent the fracture during bellows deformation due to a load in an axial direction while suppressing elastic buckling. The present inventors found that thanks to such control, it is possible to solve the above-described problems which may occur in using a high strength steel sheet, and to exhibit excellent energy absorption efficiency, and completed the Element Technology A.

Hereinafter, a frame member A10 according to a first embodiment of the Element Technology A contrived based on the above findings will be described.

In the present specification and the drawings, constituent elements having substantially the same functional configuration are designated by the same reference numerals to avoid duplicating description.

First, terms and phrases in the present specification will be described.

The "longitudinal direction" means a member axis direction of a frame member, that is, a direction in which the axis extends.

The "flat part" means a linear part in a cross section perpendicular to the longitudinal direction of the frame member, specifically, a part having a radius of curvature larger than a maximum external dimension of the cross section. The maximum external dimension means the maximum straight line length between end portions at two arbitrary points in the cross section.

The "corner part" means a non-linear part excluding the flat part in the cross section perpendicular to the longitudinal direction of the frame member.

The "width" means a line length along the circumferential direction of a closed cross section portion, and the "width of the flat part" means a line length between one end and the other end of the flat part.

The "effective width" is an effective width $W_e$ obtained from Formula (A1) based on Karman's effective width theory, that is, Karman's effective width formula.

$$W_e = t(4\pi^2 E/12(1-\nu^2)\sigma_y)^{1/2} \quad \text{Formula (A1)}$$

Here, the meanings of the symbols are as follows.

$\sigma_y$: Yield stress (MPa) of flat part

E: Young's modulus (MPa) of flat part t: sheet thickness (mm) of flat part v: Poisson's ratio of flat part In addition, in the steel sheet, as the Young's modulus of the flat part and the Poisson's ratio of the flat part, general physical property values may be used, and by replacing the yield stress of the flat part with the Vickers hardness of the thickness middle portion, the effective width $W_e$ can be obtained from Expression $W_e$=577 t/h.

Here, the meanings of the symbols are as follows.

t: sheet thickness (mm) of flat part h: Vickers hardness (Hv) of thickness middle portion of flat part In a case where it is difficult to obtain the effective width $W_e$ from Formula (A1), the effective width $W_e$ can be obtained from the above expression.

The "effective width ratio" is a ratio of a width W of the flat part to the effective width $W_e$, and is a value calculated by $W/W_e$. It can be said that the smaller the value of the effective width ratio, the more hardly the elastic buckling occurs in the cross-sectional shape.

The "reference flat part" means a flat part where the effective width ratio is maximum in the flat part of the closed cross section portion in an optional position in the longitudinal direction.

The "surface layer portion" means a region between: a depth position where a distance from a surface of the steel sheet to the depth position separated therefrom in the sheet thickness direction is 1% of the sheet thickness of the steel sheet; and a depth position where a distance from the surface of the steel sheet to the depth position separated therefrom in the sheet thickness direction is 5% of the sheet thickness of the steel sheet.

The "thickness middle portion" means a depth position where a distance from the surface of the steel sheet to the depth position separated therefrom in the sheet thickness direction of the steel sheet is 3/8 of the sheet thickness.

The "surface of the steel sheet" set as the reference of the depth position means a surface of a base steel sheet. For example, in a case where the steel sheet is plated or painted, or rust or the like is formed thereon, the surface of the steel sheet in a state where the plating, painting, and rust have been removed is set as the reference of the depth position. In a case where a surface layer coating such as plating, painting, rust, or the like is formed on the surface of the base steel sheet, the boundary between the surface layer coating and the surface of the base steel sheet is easily identified by various known methods.

Figure 13:
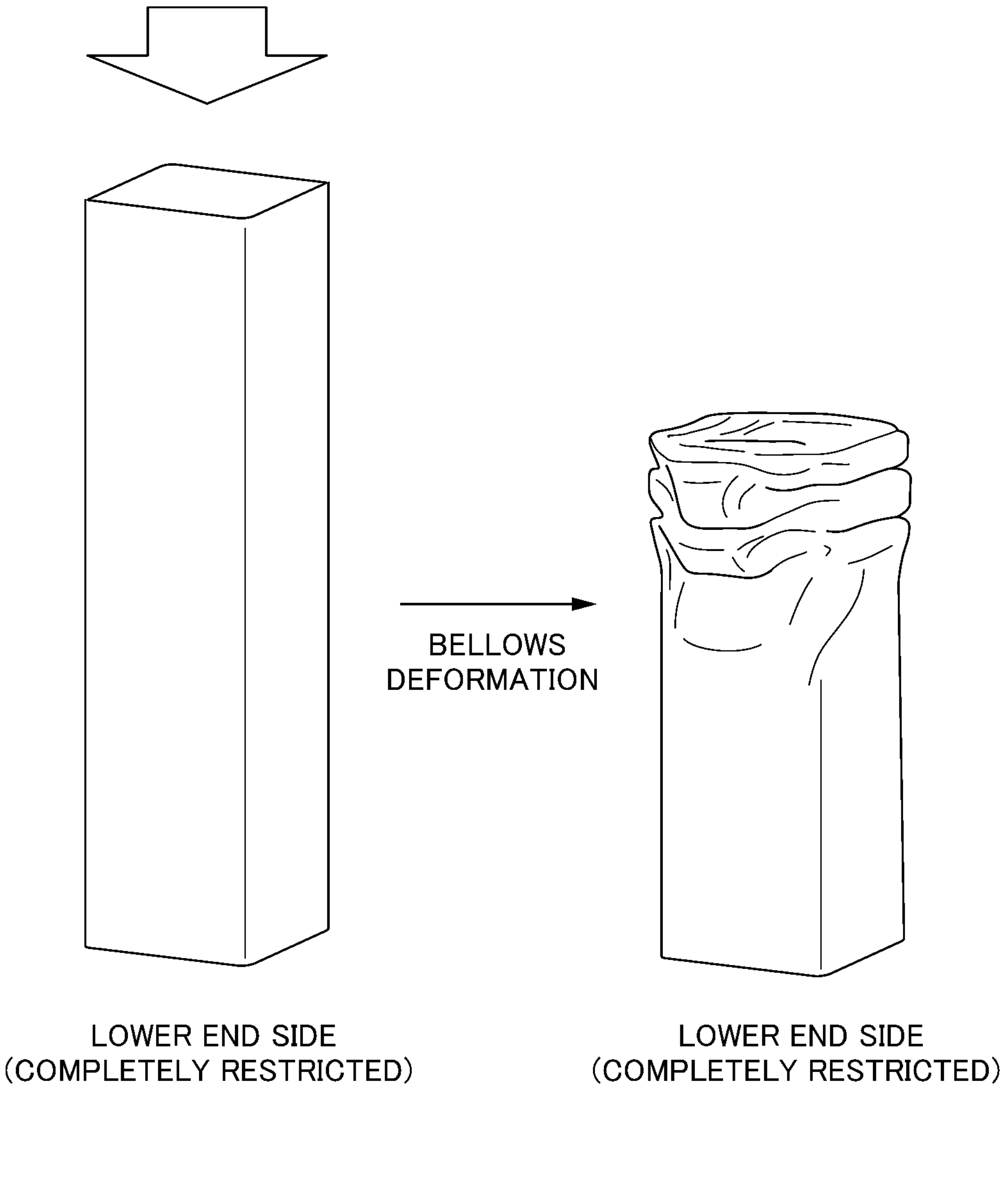
FIG. 13 is a schematic diagram illustrating the amount of energy absorption.

The "amount of energy absorbed" is an amount of energy absorbed calculated from the relationship between the impactor reaction force (load) and the stroke when the frame member is subjected to bellows deformation. Regarding the impactor reaction force (load) and the stroke, in a state in which the frame member is disposed so that the longitudinal direction thereof is in the vertical direction, and a lower end side is completely restricted as shown in FIG. 13, a rigid flat impactor is allowed to collide with the frame member in a direction of the white arrow from the upper end side, and thus the impactor reaction force and the stroke can be obtained.

The "energy absorption efficiency" is an amount of energy absorbed per cross-section area (sheet thickness×cross section line length) of the frame member. In a case where the frame member does not have a uniform cross section in the longitudinal direction, the energy absorption efficiency is an amount of energy absorbed per cross-section area (sheet thickness×cross section line length) in a closed cross section where the cross-section area (sheet thickness×cross section line length) is minimum in a closed cross section perpendicular to the longitudinal direction of the member.

Figure 14:
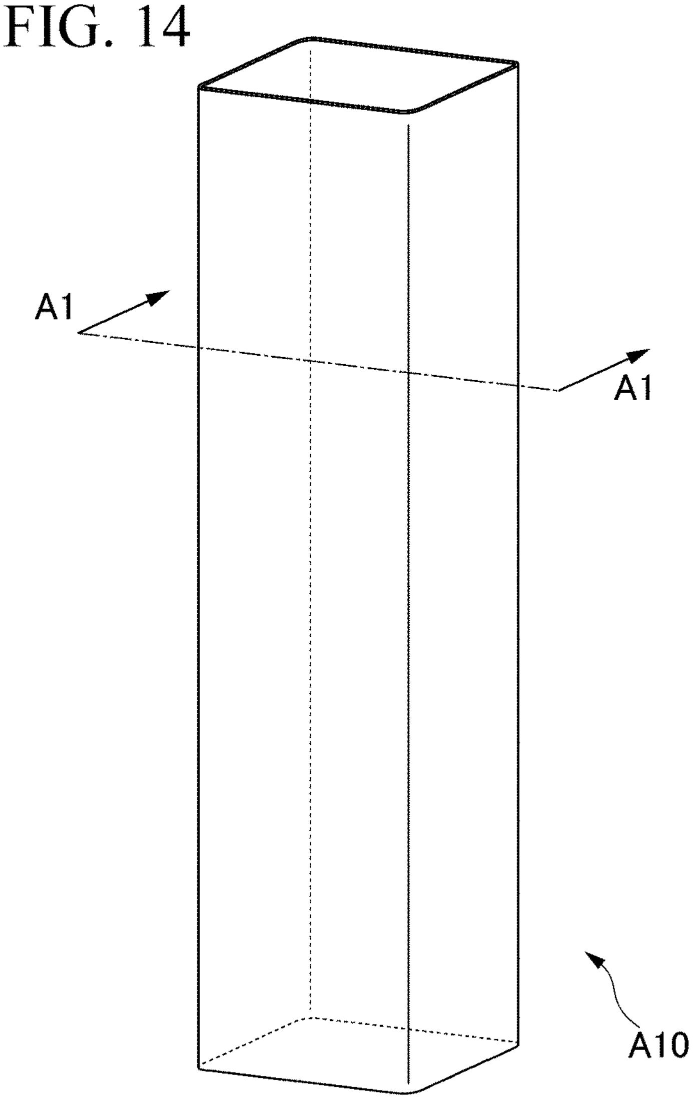
FIG. 14 is a perspective view showing a frame member A10 according to one embodiment of the Element Technology A.

FIG. 14 is a perspective view of the frame member A10. The frame member A10 is a member having a hollow tube shape extending in the longitudinal direction.

Figure 15:
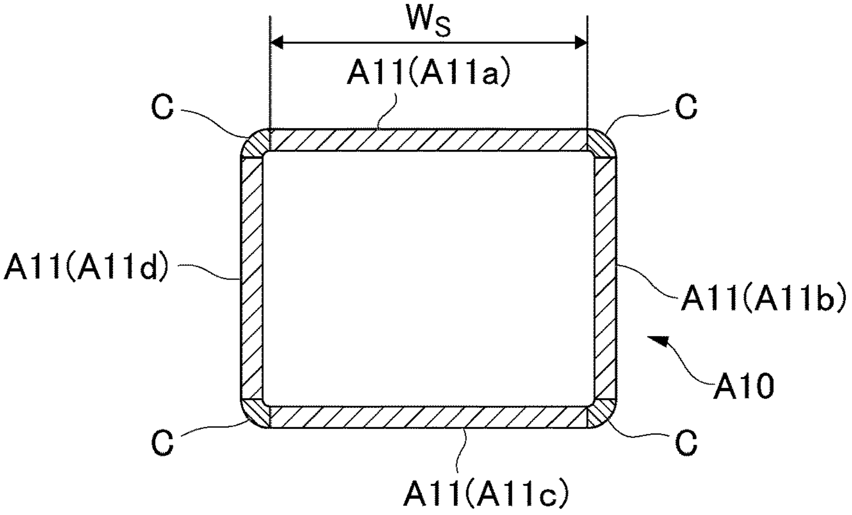
FIG. 15 is a cross-sectional view along the cutting-plane line A1-A1 of FIG. 14.

FIG. 15 is a cross-sectional view along the cutting-plane line A1-A1 of FIG. 14. As shown in FIG. 15, the frame member A10 has a substantially rectangular closed cross section portion formed by four flat parts A11 and four corner parts C.

Specifically, the closed cross section portion is formed by being provided with a first flat part A11*a*, a second flat part A11*b* which is connected to the first flat part A11*a* via a corner part C, a third flat part A11*c* which is connected to the second flat part A11*b* via a corner part C, and a fourth flat part A11*d* which is connected to the third flat part A11*c* via a corner part C, and by connecting the fourth flat part A11*d* to the first flat part via a corner part C.

All the four corner parts C have the same radius of curvature r. For example, in a case where the maximum external dimension is 140 mm, the radius of curvature r may be 140 mm or less. The radii of curvature of the four corner parts C do not need to be the same, and may be different from each other. The upper limit of the radius of curvature is not particularly specified. However, a part having a radius of curvature larger than the maximum external dimension of the cross section is not regarded as a corner part, but as a separate flat part or a part of an adjacent flat part. Therefore, it can be said that the upper limit of the radius of curvature of the corner part C is substantially "less than the maximum external dimension of the cross section".

In the present application, the reference flat part is defined as a flat part where the effective width ratio is maximum in the flat part of the closed cross section portion.

The first flat part A11*a*, the second flat part A11*b*, the third flat part A11*c*, and the fourth flat part A11*d* all have the same yield stress $\sigma_y$, Young's modulus E, sheet thickness t, and Poisson's ratio v.

Accordingly, the effective width ratio in each flat part A11 calculated by width W/effective width $W_e$ is determined depending only on the width W of each flat part A11.

Therefore, in the present embodiment, the first flat part A11*a* and the third flat part A11*c* having the largest width W in the closed cross section portion are set as the reference flat parts.

In the reference flat part, when the frame member A10 receives a compression force in the axial direction, elastic buckling is most likely to occur in the initial stage of deformation. Accordingly, in a case where a width $W_S$ of the reference flat part is too large, a required proof stress cannot be obtained, and it becomes difficult to exhibit excellent energy absorption efficiency. Accordingly, the upper limit of the width $W_S$ of the reference flat part is set to 2.0 times or less the effective width $W_e$.

The lower limit of the width $W_S$ of the reference flat part is not particularly set. However, in a case where the width $W_S$ of the reference flat part is too small, the area of the closed cross section portion of the frame member A10 is reduced, and it becomes difficult to ensure the proof stress.

Accordingly, the width $W_S$ of the reference flat part is preferably 0.1 times or greater the effective width $W_e$.

The sheet thickness of the reference flat part is preferably 4.2 mm or less from the viewpoint of weight reduction.

Meanwhile, in a case where the sheet thickness of the reference flat part is less than 0.4 mm, elastic buckling is likely to occur in the reference flat part, and thus the limitation of the setting range of the width $W_S$ of the reference flat part is increased. Accordingly, the sheet thickness of the reference flat part is preferably 0.4 mm or greater.

The frame member A10 is formed by forming a steel sheet having a tensile strength of 980 MPa or greater into a predetermined shape by press forming and by then joining end surfaces together. The frame member A10 formed as described above has a strength of 980 MPa or greater in terms of tensile strength. In addition, since the frame member is formed as described above, the Vickers hardness of the thickness middle portion of the reference flat part in the frame member A10 is 300 Hv or greater in a hardness test performed by the method described in JIS Z 2244: 2009 with a test load of 300 gf (2.9 N).

In the present application, since excellent energy absorption efficiency is exhibited by increasing the deformability on the premise of an increase of the strength, the hardness of the thickness middle portion of the reference flat part is specified to be 300 Hv or greater in terms of Vickers hardness.

The upper limit of the hardness of the thickness middle portion is not particularly specified, but may be 900 Hv or less in terms of Vickers hardness.

A method of measuring the hardness of the thickness middle portion is as follows.

A sample having a cross section perpendicular to the sheet surface is collected from the frame member. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244: 2009. After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water. The hardness test is performed by the method disclosed in JIS Z 2244: 2009. Hardness is measured using a micro-Vickers hardness tester at 30 points that are arranged at intervals of three times or more the indentation under a load of 300 gf in the position at a depth of 3/8 of the sheet thickness of the sample, and the average value of the measured values is defined as the hardness of the thickness middle portion.

As described above, in a case where the width $W_S$ of the reference flat part is 2.0 times or less the effective width $W_e$, elastic buckling can be suppressed. However, in a high-strength material, e.g., a cold-rolled steel sheet having a tensile strength of 980 MPa or greater, in a case where the bending performance is insufficient, fracture occurs during bellows deformation due to a load in an axial direction even in a case where elastic buckling can be suppressed by controlling the effective width $W_e$, whereby excellent energy absorption efficiency cannot be obtained.

In the related art, the standard deviation of hardness frequency distribution in the thickness middle portion and the standard deviation of hardness frequency distribution in the surface layer portion in the reference flat part are almost the same, and the hardness standard deviation ratio is 1.0.

However, in the frame member A10 according to the present embodiment, the bending performance is increased by appropriately controlling the ratio between the standard deviation of hardness frequency distribution in the thickness middle portion and the standard deviation of hardness frequency distribution in the surface layer portion in the reference flat part.

Accordingly, even in a case where a high-strength material is applied, fracture during bellows deformation is suppressed, and it is possible to exhibit significantly excellent energy absorption efficiency compared to the related art.

Specifically, in the frame member A10 according to the present embodiment, the hardness standard deviation ratio which is a value obtained by dividing the standard deviation of hardness frequency distribution in the surface layer portion by the standard deviation of hardness frequency distribution in the thickness middle portion in the reference flat part is controlled to be greater than 1.0.

The present inventors have found through experiments that in a case where the hardness standard deviation ratio is greater than 1.0 in applying a cold-rolled steel sheet having a tensile strength of 980 MPa or greater, the maximum bending angle in a VDA bending test based on the VDA standard (VDA238-100) specified by the German Association of the Automotive Industry can be considerably improved.

Figure 16:
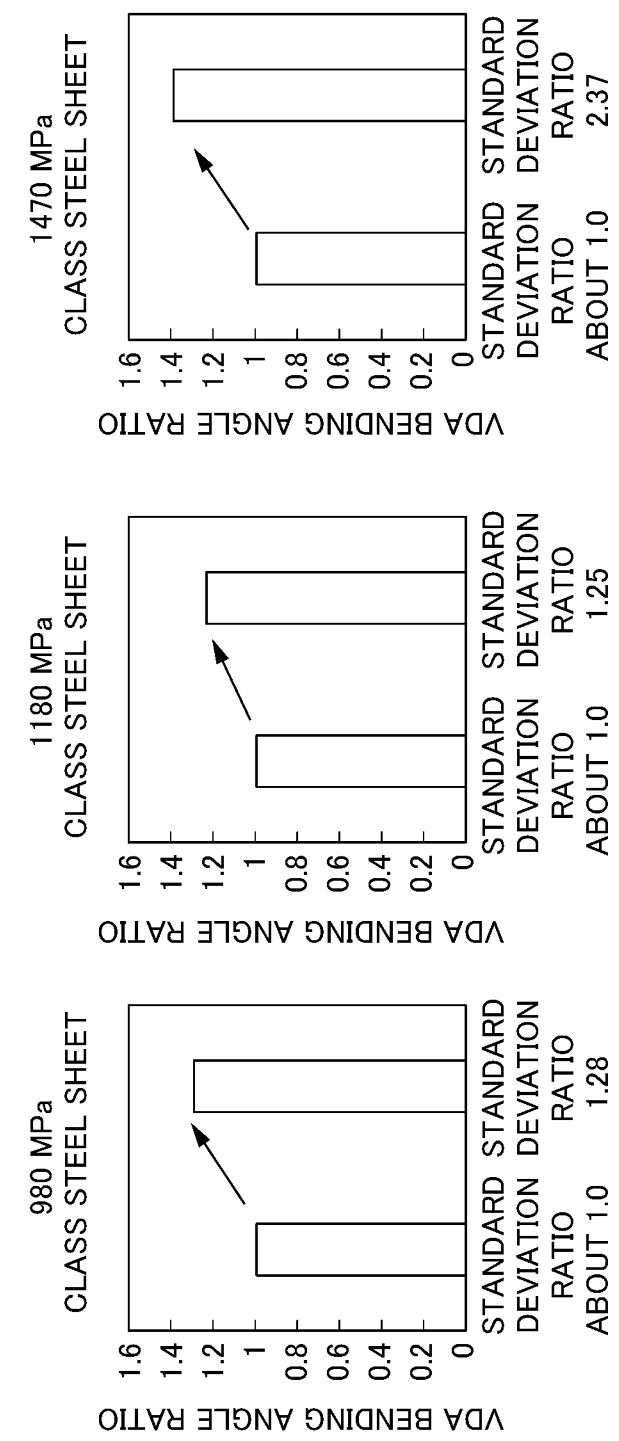
FIG. 16 is a graph showing a relationship between a hardness standard deviation ratio and a VDA bending angle ratio in a VDA bending test with respect to a cold-rolled steel sheet having a tensile strength of 980 MPa or greater.

FIG. 16 includes graphs showing the results of the VDA bending tests using cold rolled steel sheets of 1470 MPa-grade, 1180 MPa-grade, and 980 MPa-grade with a thickness of 1.6 mm respectively. In each strength grade, it is found that in a case that the hardness standard deviation ratio of the steel sheet is greater than 1.0, the maximum bending angle (°) in the VDA bending test becomes large and the VDA angle ratio becomes high, with respect to the conventional steel sheet in which the hardness standard deviation ratio is 1.0. That is, in a case where the hardness standard deviation ratio is greater than 1.0, fracture hardly occurs during bellows deformation due to a load in an axial direction, and excellent energy absorption efficiency can be exhibited.

Accordingly, the hardness standard deviation ratio is preferably greater than 1.05, and more preferably greater than 1.20.

If the hardness standard deviation ratio is larger than 3.0, the bendability increase effect is saturated. Accordingly, the hardness standard deviation ratio is preferably 3.0 or less.

Here, the hardness frequency distribution in the thickness middle portion and the hardness frequency distribution in the surface layer portion are acquired by a Vickers hardness test.

A sample having a cross section perpendicular to the sheet surface is collected from the frame member. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244: 2009. After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water.

The measurement surface mirror-finished as described above is subjected to the hardness test by the method described in JIS Z 2244: 2009.

The hardness in the surface layer portion is measured using a micro-Vickers hardness tester.

Hardness is measured at 30 points that are arranged at intervals of three times or more the indentation under a load of 300 gf, and the hardness frequency distribution in the surface layer portion is obtained.

Similarly, in the depth position of ⅜ of the sheet thickness, hardness is measured at 30 points that are arranged at intervals of three times or more the indentation under a load of 300 gf, and the hardness frequency distribution in the thickness middle portion is obtained.

In addition, a known statistical method is used to obtain the standard deviations of the hardness frequency distribution in the surface layer portion and the hardness frequency distribution in the thickness middle portion, obtained as a result of the Vickers hardness test described above.

In a case where the metallographic structure is the same in a thickness middle portion and a surface layer portion of a cold-rolled steel sheet having a tensile strength of 980 MPa or greater as in the related art, the hardness frequency distribution in the surface layer portion is the same as the hardness frequency distribution in the thickness middle portion, and the hardness standard deviation ratio is 1.0.

Meanwhile, in a case where the metallographic structure in only the surface layer portion and the vicinity thereof is modified, the hardness standard deviation ratio becomes a value different from 1.0.

In the frame member 10 formed of a cold-rolled steel sheet having a tensile strength of 980 MPa or greater according to the present embodiment, in a case where the metallographic structure in only the surface layer portion and the vicinity thereof is modified, the metallographic structure in the surface layer portion becomes a structure close to a dual-phase structure, whereby the distribution and unevenness of the hardness in the surface layer portion are increased, and the hardness standard deviation ratio between the surface layer portion and the thickness middle portion can be made greater than 1.0.

Specifically, the hardness standard deviation ratio can be controlled by adjusting a highest heating temperature and a holding time in decarburization annealing of the steel sheet, which is a known technology. As for preferable conditions of the decarburization annealing, the decarburization annealing temperature (maximum attainment temperature of the steel sheet) is 700° C. to 950° C., and the residence time in a temperature range of 700° C. to 950° C. is 5 seconds to 1,200 seconds under a moist atmosphere containing hydrogen, nitrogen, or oxygen.

In addition, in a case where the annealing temperature is set to a higher temperature range and the residence temperature is narrowed to a longer time range within the above condition ranges, the hardness standard deviation ratio can be made greater than 1.20.

At least one surface layer portion of the frame member A10 may satisfy the above hardness standard deviation ratio condition. However, it is preferable that the surface layer portions on both sides of the frame member A10 satisfy the above hardness standard deviation ratio condition.

As described above, according to the frame member A10 of the present embodiment, in the reference flat part, elastic buckling is suppressed by controlling the width $W_S$ of the reference flat part, and fracture during bellows deformation can be suppressed by controlling the hardness standard deviation ratio.

Accordingly, the energy absorption efficiency can be significantly improved while the thickness middle portion of the reference flat part has sufficient hardness of 300 Hv or greater in terms of Vickers hardness.

Although the preferable embodiments of the Element Technology A have been described in detail with reference to the accompanying drawings, the Element Technology A is not limited to such examples.

It is apparent that a person having common knowledge in the technical field to which the Element Technology A belongs is able to devise various changes or modifications within the scope of the technical idea of the present application, and it should be understood that such examples belong to the technical scope of the Element Technology A as a matter of course.

Figure 17:
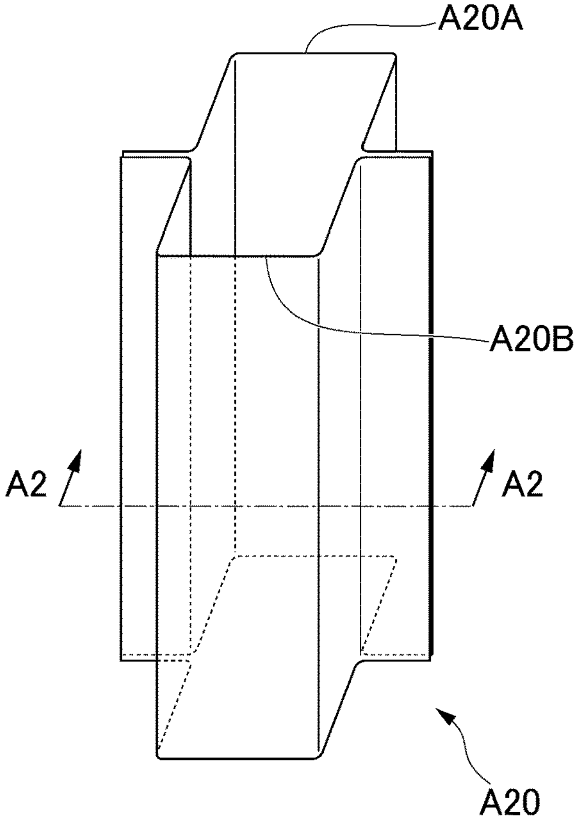
FIG. 17 is a perspective view showing a frame member A20 according to a modification example.

For example, the frame member A10 described above is formed of a single member, but may be formed of a plurality of members. FIG. 17 is a perspective view showing a frame member A20 according to a modification example, and FIG. 18 is a cross-sectional view along the cutting-plane line A2-A2 of FIG. 17.

The frame member A20 includes a first frame member A20A extending in a longitudinal direction and a second frame member A20B extending in the longitudinal direction and joined to the first frame member A20A. A closed cross section portion is formed by the first frame member A20A and the second frame member A20B.

The first frame member A20A is a member having an open cross section, which is provided by subjecting a steel sheet having a sheet thickness of 1.2 mm to cold-press forming so that the cross section perpendicular to the longitudinal direction has a substantially hat shape.

Figure 18:
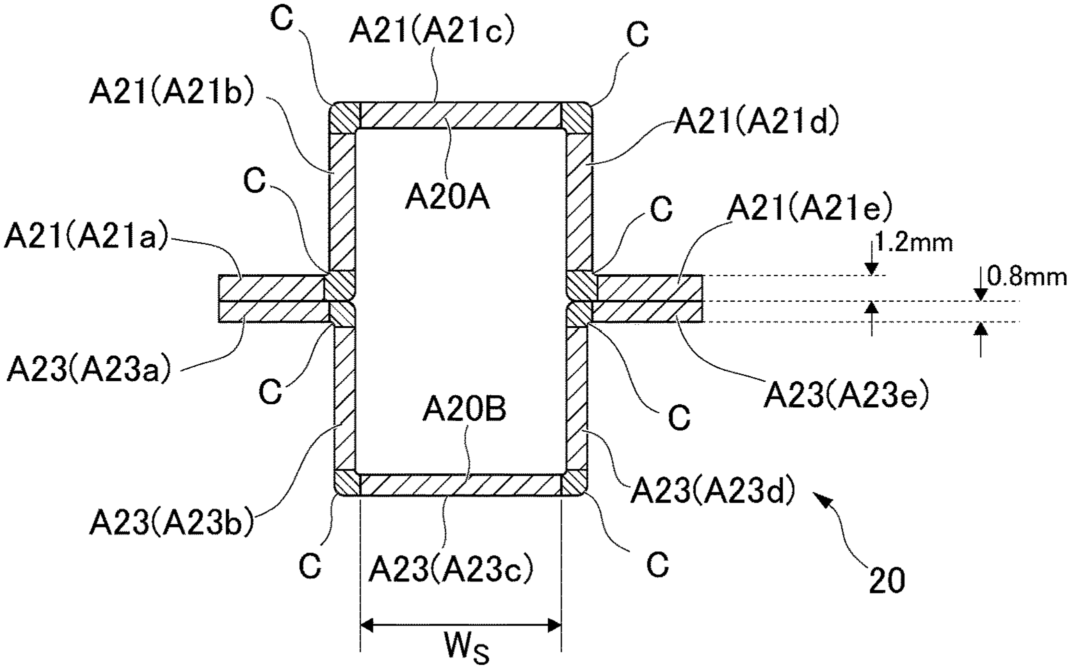
FIG. 18 is a cross-sectional view along the cutting-plane line A2-A2 of FIG. 17.

As shown in FIG. 18, a cross section portion of the first frame member A20A perpendicular to the longitudinal direction is provided with five flat parts A21 and four corner parts C.

Specifically, the cross section portion of the first frame member A20A perpendicular to the longitudinal direction is provided with a first flat part A21*a*, a second flat part A21*b* which is connected to the first flat part A21*a* via a corner part C, a third flat part A21*c* which is connected to the second flat part A21*b* via a corner part C, a fourth flat part A21*d* which is connected to the third flat part A21*c* via a corner part C, and a fifth flat part A21*e* which is connected to the fourth flat part A21*d* via a corner part C.

The second frame member A20B is a member having an open cross section, which is provided by subjecting a steel sheet having a sheet thickness of 0.8 mm to cold-press forming so that the cross section perpendicular to the longitudinal direction has a substantially hat shape.

As shown in FIG. 18, a cross section portion of the second frame member A20B perpendicular to the longitudinal direction is provided with five flat parts A23 and four corner parts C.

Specifically, the cross section portion of the second frame member A20B perpendicular to the longitudinal direction is provided with a first flat part A23*a*, a second flat part A23*b* which is connected to the first flat part A23*a* via a corner part C, a third flat part A23*c* which is connected to the second flat part A23*b* via a corner part C, a fourth flat part A23*d* which is connected to the third flat part A23*c* via a corner part C, and a fifth flat part A23*e* which is connected to the fourth flat part A23*d* via a corner part C.

In addition, the first flat part A21*a* and the fifth flat part A21*e* of the first frame member A20A are joined to the first flat part A23*a* and the fifth flat part A23*e* of the second frame member A20B by spot welding.

With such a configuration, the frame member A20 has a closed cross section portion in the cross section perpendicular to the longitudinal direction.

In the present application, the reference flat part is defined as a flat part where the effective width ratio is maximum in the flat part of the closed cross section portion.

The flat part A21 of the first frame member A20A and the flat part A23 of the second frame member A20B all have the same yield stress ay, Young's modulus E, and Poisson's ratio v. Accordingly, the effective width ratios in the flat parts A21, A23 calculated by width W/effective width $W_e$ are determined depending on the width W and the sheet thickness t of the flat parts A21, A23.

In this closed cross section portion, the third flat part A21*c* of the first frame member A20A and the third flat part A23*c* of the second frame member A20B both are flat parts having the maximum width among all the flat parts. However, since the third flat part A23*c* of the second frame member A20B has a smaller sheet thickness than the third flat part A21*c* of the first frame member A20A, the third flat part A23*c* of the second frame member A20B has the largest effective width ratio. Accordingly, the third flat part A23*c* of the second frame member A20B is the reference flat part.

Accordingly, in the frame member A20 according to the modification example, by controlling the Vickers hardness of the thickness middle portion to 300 Hv or greater, controlling the width $W_S$ to 2.0 times or less the effective width $W_e$, and controlling the standard deviation ratio to a value greater than 1.0 in the third flat part A23*c* of the second frame member A20B which is the reference flat part, excellent energy absorption efficiency can be exhibited.

The frame member A10 has a substantially rectangular cross-sectional shape in which the sides facing each other have the same width, but may have a substantially square cross-sectional shape in which the four flat parts A11 have the same width.

The number of the flat parts A11 is not particularly limited, and may be at least one.

In addition, the frame member A10 according to the embodiment has a uniform cross-sectional shape over the whole length, but may not have a uniform cross-sectional shape over the whole length. A closed cross section where the cross-section area (sheet thickness×cross section line length) is minimum in the closed cross section perpendicular to the longitudinal direction of the member may be the above-described closed cross section portion, and may be present in a part of the whole length in the longitudinal direction. The closed cross section portion is present in preferably 50% or greater, and more preferably 80% or greater of the whole length in the longitudinal direction.

Figure 19:
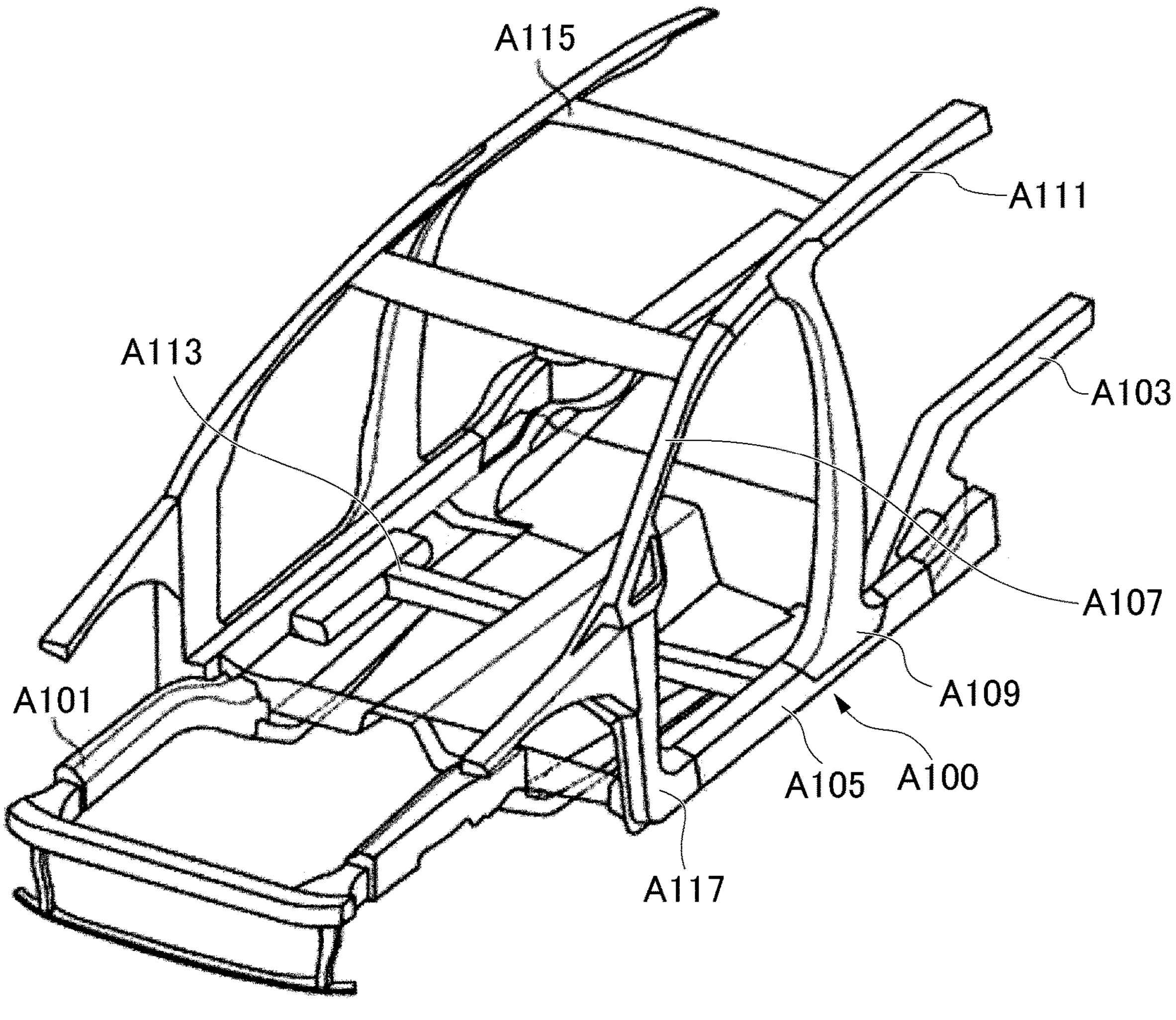
FIG. 19 is a perspective view showing a vehicle frame A100 as an example to which a structural member is applied.

The frame members A10, A20 are applied to members to which a compression input is to be applied mainly in the axial direction at the time of the collision, among structural members of a vehicle body. FIG. 19 is a view showing a vehicle frame A100 as an example to which the frame members A10, A20 are applied.

Referring to FIG. 19, the frame members A10, A20 can be applied to a frontside member A101, a rearside member A103, a side sill A105, an A pillar A107, a B pillar A109, a roof rail A111, a floor cross A113, a roof cross A115, and an under reinforcement A117 among structural members of a vehicle body.

EXAMPLES

A steel sheet A and a steel sheet B of 1470 MPa-grade having a sheet thickness of 1.6 mm, a steel sheet C of 1180 MPa-grade having a sheet thickness of 1.6 mm, and a steel sheet D of 980 MPa-grade having a sheet thickness of 1.6 mm were prepared.

In decarburization annealing of the steel sheet B, the steel sheet C, and the steel sheet D, the decarburization annealing temperature (maximum attainment temperature of the steel sheet) was set to 700° C. to 900° C., and the residence time in a temperature range of 700° C. to 900° C. was set to 60 to 600 seconds under a moist atmosphere provided by mixing hydrogen and nitrogen, to modify the metallographic structure in only a surface layer portion and the vicinity thereof.

The steel sheet A, the steel sheet B, the steel sheet C, and the steel sheet D were subjected to cold-press forming, end surfaces were welded to each other, and thus rectangular tube members of 300 mm in height, formed of the steel sheets, were obtained.

In the steel sheet A, the metallographic structure was the same in a thickness middle portion and a surface layer portion. Therefore, the standard deviation of hardness frequency distribution in the thickness middle portion in the reference flat part and the standard deviation of hardness frequency distribution in the surface layer portion in the reference flat part were the same, and the hardness standard deviation ratio was 1.0. Meanwhile, in the steel sheet B, the steel sheet C, and the steel sheet D, the metallographic structure in the thickness middle portion was not modified, but the metallographic structure in the surface layer portion was modified to change the hardness frequency distribution in the surface layer portion, so that the standard deviation in the surface layer portion was adjusted. As a result, the hardness standard deviation ratio of the surface layer portion to the thickness middle portion in the reference flat part of the steel sheet B was 2.37, the hardness standard deviation ratio in the reference flat part of the steel sheet C was 1.25, and the hardness standard deviation ratio in the reference flat part of the steel sheet D was 1.28.

Table 5 shows material characteristics in the flat parts after press forming.

TABLE 5

| Steel Sheet Used | Strength grade | Yield tress $\sigma_y$ (MPa) | Young's Modulus E (MPa) | Poisson's Ratio ν | Sheet Thickness (mm) | Hardness in Center in Sheet Thickness (Hv) | Hardness Standard Deviation in Thickness Middle Portion | Hardness Standard Deviation in Surface Layer Portion | Hardness Standard Deviation Ratio | Effective Width $W_c$ (mm) |
|---|---|---|---|---|---|---|---|---|---|---|
| Steel Sheet A (Material of Related Art) | 1470 MPa grade | 1130 | 205800 | 0.3 | 1.6 | 506 | 14.2 | 14.3 | 1.0 | 41 |
| Steel Sheet B (Modified Material) | 1470 MPa grade | 1105 | 205800 | 0.3 | 1.6 | 494 | 14.3 | 33.9 | 2.37 | 41 |

TABLE 5-continued

| Steel Sheet Used | Strength grade | Yield tress $\sigma_y$ (MPa) | Young's Modulus E (MPa) | Poisson's Ratio ν | Sheet Thickness (mm) | Hardness in Center in Sheet Thickness (Hv) | Hardness Standard Deviation in Thickness Middle Portion | Hardness Standard Deviation in Surface Layer Portion | Hardness Standard Deviation Ratio | Effective Width $W_e$ (mm) |
|---|---|---|---|---|---|---|---|---|---|---|
| Steel Sheet C (Modified Material) | 1180 MPa grade | 880 | 205800 | 0.3 | 1.6 | 395 | 13.8 | 17.2 | 1.25 | 46 |
| Steel Sheet D (Modified Material) | 980 MPa grade | 670 | 205800 | 0.3 | 1.6 | 300 | 12.5 | 16 | 1.28 | 53 |

Figure 20:
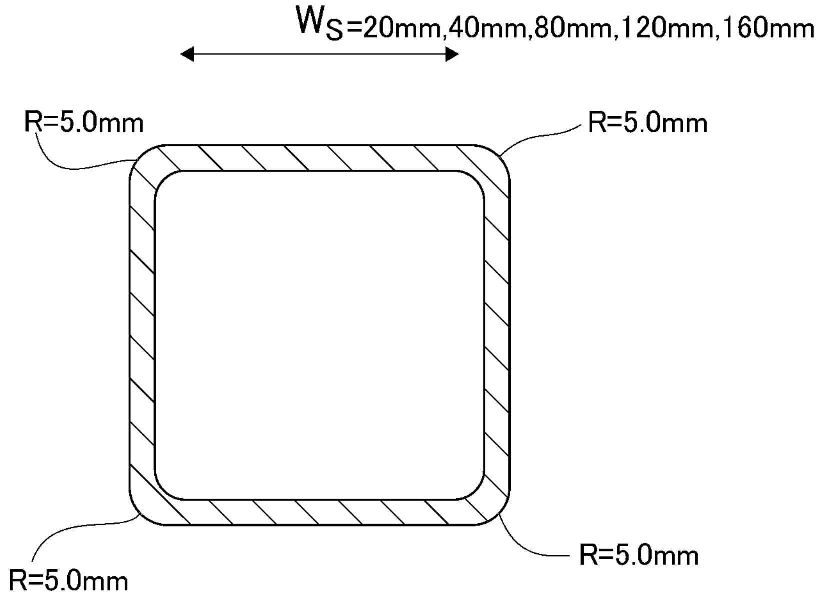
FIG. 20 is a schematic view for explaining a cross-sectional shape of a rectangular tube member used in examples.

As shown in FIG. 20, a cross section of the rectangular tube member perpendicular to the longitudinal direction was designed to have a substantially square shape in which four flat parts had the same width. That is, in each rectangular tube member, all of the four flat parts are reference flat parts where the effective width ratio is maximum. On the premise of such conditions, a width $W_S$ of the reference flat part was set for each experimental example. The radii of curvature of four corner portions C were all designed to be 5 mm.

A rigid flat impactor was allowed to collide with each of the rectangular tube members at a speed of 90 km/h from the upper end side in a state in which the lower end side was completely restricted, and the deformation states at the time of the collision, the states in which fracture occurred, and the absorbed energy calculated from the impactor reaction force (load) and the stroke were compared. Table 6 shows the setting conditions and the results for each experimental example.

TABLE 6

| Experiment No. | Steel Sheet Used | Width $W_s$ (mm) | Effective Width Ratio | Cross Section Area ($mm^2$) | Deformation Continuation Stroke (mm) | Absorbed Energy (kJ) | Energy Absorption Efficiency ($kJ/mm^2$) |
|---|---|---|---|---|---|---|---|
| No. 1A | A | 20 | 0.5 | 178 | 40 | 4.8 | 26.7 |
| No. 1B | B | 20 | 0.5 | 178 | 150 | 10.7 | 60.2 |
| No. 2A | A | 40 | 1.0 | 306 | 45 | 6.8 | 22.3 |
| No. 2B | B | 40 | 1.0 | 306 | 150 | 12.6 | 41.2 |
| No. 2C | C | 40 | 0.87 | 306 | 150 | 10.4 | 33.8 |
| No. 2D | D | 40 | 0.75 | 306 | 150 | 8.0 | 26.2 |
| No. 3A | A | 80 | 2.0 | 562 | 90 | 14.5 | 25.8 |
| No. 3B | B | 80 | 2.0 | 562 | 150 | 16.2 | 28.8 |
| No. 4A | A | 120 | 2.9 | 818 | 150 | 20.5 | 25.1 |
| No. 4B | B | 120 | 2.9 | 818 | 150 | 20.5 | 25.1 |
| No. 5A | A | 160 | 3.9 | 1074 | 150 | 26.5 | 24.7 |
| No. 5B | B | 160 | 3.9 | 1074 | 150 | 26.8 | 24.9 |

Figure 21:
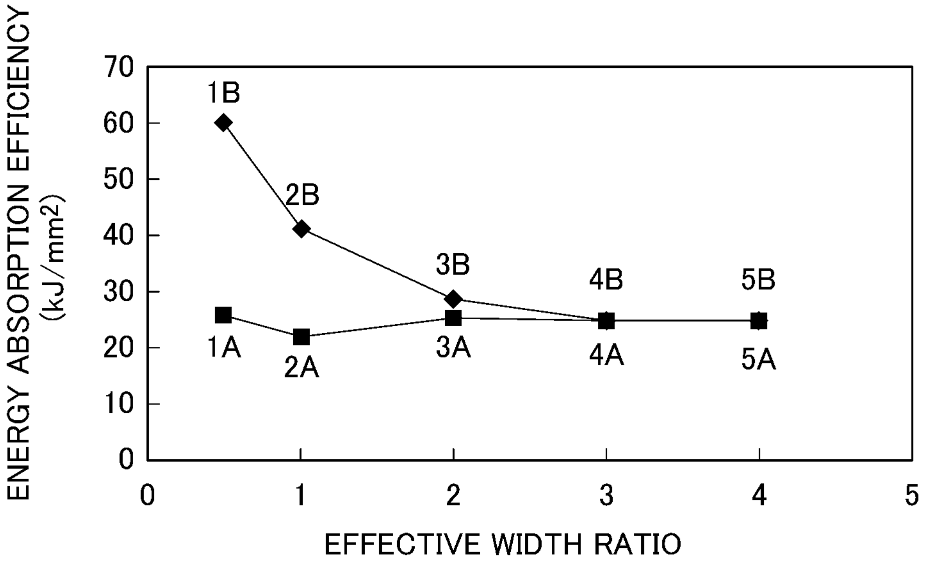
FIG. 21 is a graph in which a relationship between an effective width ratio and energy absorption efficiency in experimental examples is plotted.

FIG. 21 is a graph for comparison of the energy absorption efficiency relative to the effective width ratio based on the experimental results shown in Table 6. As shown in this graph, the energy absorption efficiency is not improved only by reducing the effective width ratio. However, it is found that in a case where the hardness standard deviation ratio is appropriately controlled as in the present application, the energy absorption efficiency is significantly improved by reducing the effective width ratio.

(Element Technology B)

Element Technology B is a hot-stamping formed body including, as a chemical composition, by mass %: C: 0.30% to 0.50%; Si: 0.50% to 3.00%; Mn: 0.50% to 3.00%; Al: 0.0002% to 2.000%; P: 0.100% or less; S: 0.1000% or less; N: 0.0100% or less; Nb: 0% to 0.150%; Ti: 0% to 0.150%; Co: 0% to 2.00%; Mo: 0% to 1.00%; Cr: 0% to 1.00%; Cu: 0% to 1.00%; V: 0% to 1.00%; W: 0% to 1.00%; Ni: 0% to 3.00%; Mg: 0% to 1.00%; Zr: 0% to 1.00%; Sb: 0% to 1.00%; Ca: 0% to 0.10%; REM: 0% to 0.30%; B: 0% to 0.0100%; and a remainder consisting of Fe and impurities; and microstructure which includes residual austenite of which an area ratio is 5% or more and less than 10%, bainite and tempered martensite of which a total area ratio exceeds 90% and is 95% or less, and a remainder in microstructure of which an area ratio is less than 5%, among grain boundaries of crystal grains of the bainite and the tempered martensite, a ratio of a length of a grain boundary having a rotation angle in a range of 55° to 75° to a total length of a grain boundary having a rotation angle in a range of 4° to 12°, a grain boundary having a rotation angle in a range of 49° to 54°, and the grain boundary having a rotation angle in a range of 55° to 75° to the <011> direction as a rotation axis is 30% or more, wherein a tensile strength of the hot-stamping formed body is 1500 MPa or more.

According to the Element Technology B, it is possible to obtain a hot-stamping formed body that is excellent in strength and collision characteristics.

The inventors have found that a hot-stamping formed body can be improved in collision characteristics while having high strength in a case where the microstructure of the hot-stamping formed body includes predetermined amounts of residual austenite and bainite and tempered martensite and a ratio of a length of a grain boundary (high angle boundary) having a rotation angle in a range of 550 to 750 to a total length of a grain boundary having a rotation angle in a range of 4° to 12°, a grain boundary having a rotation angle in a range of 49° to 54°, and a grain boundary (hereinafter, referred to as a high angle boundary) having a rotation angle in a range of 55° to 75° among grain boundaries of crystal grains of the bainite and the tempered martensite to the <011> direction as a rotation axis is set to 30% or more.

In this embodiment, excellent collision characteristics mean excellent uniform deformability and excellent crack propagation suppression characteristics.

A high angle boundary is a grain boundary that has the highest angle among grain boundaries included in the crystal grains of bainite and tempered martensite. When austenite is transformed into bainite or martensite, strain associated with the transformation is generated. In a case where austenite before transformation has high hardness or a case where prior austenite grains cannot be deformed, a high angle boundary, which is highly effective in relieving strain, is likely to be formed. The inventors have found that by applying pressure in a predetermined temperature range after hot stamping to make austenite in the state of undeformable, many high angle boundaries can be formed in a case where austenite is transformed into bainite or martensite.

A hot-stamping formed body according to this embodiment will be described in detail below. First, the reason why the chemical composition of the hot-stamping formed body according to this embodiment is to be limited will be described.

A limited numerical range described using "to" to be described below includes a lower limit and an upper limit. Numerical values represented using "less than" or "exceed" are not included in a numerical range. All percentages (%) related to the chemical composition mean mass %.

The hot-stamping formed body according to this embodiment includes, as a chemical composition, by mass %, 0.30% to 0.50% of C, 0.50% to 3.00% of Si, 0.50% to 3.00% of Mn, 0.0002% to 2.000% of Al, 0.100% or less of P, 0.1000% or less of S, 0.0100% or less of N, and a remainder consisting of Fe and impurities. Each element will be described in detail below.

"C: 0.30% to 0.50%"

C is an element that improves the strength of the hot-stamping formed body. Further, C is also an element that stabilizes residual austenite. In a case where the C content is less than 0.30%, the desired strength of the hot-stamping formed body cannot be obtained. For this reason, the C content is set to 0.30% or more. The C content is preferably 0.32% or more or 0.35% or more. On the other hand, in a case where the C content exceeds 0.50%, excellent uniform deformability is not obtained. For this reason, the C content is set to 0.50% or less. Preferably, the C content is 0.46% or less, 0.43% or less, or 0.40% or less.

"Si: 0.50% to 3.00%"

Si is an element that stabilizes residual austenite. In a case where the Si content is less than 0.50%, the above-mentioned effects are not obtained and the stabilization of residual austenite is insufficient. As a result, a desired amount of residual austenite cannot be obtained. For this reason, the Si content is set to 0.50% or more. The Si content is preferably 1.00% or more or 1.10% or more. On the other hand, in a case where the Si content exceeds 3.00%, the amount of ferrite is increased. As a result, a desired microstructure is not obtained. For this reason, the Si content is set to 3.00% or less. The Si content is preferably 2.70% or less, 2.30% or less, or 2.00% or less.

"Mn: 0.50% to 3.00%"

Mn is an element that is segregated at a prior austenite grain boundary and suppresses the formation of ferrite and pearlite. In a case where the Mn content is less than 0.50%, a large amount of ferrite and pearlite is generated. As a result, a desired microstructure cannot be obtained. For this reason, the Mn content is set to 0.50% or more. The Mn content is preferably 0.70% or more or 1.00% or more. On the other hand, in a case where the Mn content exceeds 3.00%, excellent uniform deformability is not obtained. For this reason, the Mn content is set to 3.00% or less. Preferably, the Mn content is 2.50% or less or 2.00% or less.

"Al: 0.0002% to 2.000%"

Al is an element that improves deformability by deoxidizing molten steel to suppress the formation of oxide serving as the origin of fracture and improves the collision characteristics of the hot-stamping formed body. In a case where the Al content is less than 0.0002%, deoxidation is not sufficiently performed and coarse oxide is generated. As a result, the above-mentioned effects are not obtained. For this reason, the Al content is set to 0.0002% or more. The Al content is preferably 0.001% or more, 0.050% or more, 0.100% or more, or 0.300% or more. On the other hand, in a case where the Al content exceeds 2.000%, coarse oxide is generated in steel. As a result, the collision characteristics of the hot-stamping formed body deteriorate. For this reason, the Al content is set to 2.000% or less. The Al content is preferably 1.700% or less, 1.500% or less, 1.000% or less, or 0.800% or less.

"P: 0.100% or Less"

P is an impurity element and serves as the origin of fracture by being segregated at a grain boundary. For this reason, the P content is set to 0.100% or less. The P content is preferably 0.050% or less or 0.030% or less. The lower limit of the P content is not particularly limited. However, in a case where the lower limit of the P content is reduced to be less than 0.0001%, cost required to remove P is significantly increased, which is not preferable economically. For this reason, 0.0001% may be set as the lower limit of the P content in actual operation.

"S: 0.1000% or Less"

S is an impurity element and forms an inclusion in steel. Since this inclusion serves as the origin of fracture, the S content is set to 0.1000% or less. The S content is preferably 0.0500% or less, 0.0300% or less, or 0.0100% or less. The lower limit of the S content is not particularly limited. However, in a case where the lower limit of the S content is reduced to be less than 0.0001%, cost required to remove S is significantly increased, which is not preferable economically. For this reason, 0.0001% may be set as the lower limit of the S content in actual operation.

"N: 0.0100% or Less"

N is an impurity element and forms nitride in steel. Since this nitride serves as the origin of fracture, the N content is set to 0.0100% or less. The N content is preferably 0.0050% or less. The lower limit of the N content is not particularly limited. However, in a case where the lower limit of the N content is reduced to be less than 0.0001%, cost required to remove N is significantly increased, which is not preferable economically. For this reason, 0.0001% may be set as the lower limit of the N content in actual operation.

The remainder of the chemical composition of the hot-stamping formed body according to this embodiment may be Fe and impurities. Elements, which are unavoidably mixed from a steel raw material or scrap and/or during the manufacture of steel and are allowed in a range where the characteristics of the hot-stamping formed body according to this embodiment do not deteriorate, are exemplified as the impurities.

The hot-stamping formed body according to this embodiment may contain the following elements as arbitrary elements instead of a part of Fe. The contents of the following arbitrary elements, which are obtained in a case where the following arbitrary elements are not contained, are 0%.

"Nb: 0% to 0.150%"

"Ti: 0% to 0.150%"

Nb and Ti increase the ratio of a high angle boundary by refining prior austenite grains in heating before hot stamping and suppressing the deformation of prior austenite in a case where austenite is transformed into bainite or martensite. In order to reliably exert this effect, it is preferable that the content of even any one of Nb and Ti is set to 0.010% or more. On the other hand, since this effect is saturated even though the content of even any one of Nb and Ti exceeds 0.150%, it is preferable that each of the Nb content and the Ti content is set to 0.150% or less.

"Co: 0% to 2.00%"

"Mo: 0% to 1.00%"

"Cr: 0% to 1.00%"

"Cu: 0% to 1.00%"

"V: 0% to 1.00%"

"W: 0% to 1.00%"

"Ni: 0% to 3.00%"

Co, Mo, Cr, Cu, V, W, and Ni have a function to increase the strength of the hot-stamping formed body by being dissolved in prior austenite grains in the heating before hot stamping. Accordingly, it is possible to increase the ratio of a high angle boundary by suppressing the deformation of the prior austenite grains in a case where austenite is transformed into bainite or martensite. In order to reliably obtain this effect, it is preferable that any one or more of 0.01% or more of Co, 0.005% or more of Mo, 0.005% or more of Cr, 0.001% or more of Cu, 0.0005% or more of V, 0.001% or more of W, and 0.001% or more of Ni are contained. On the other hand, since the effect is saturated even though a large amount of these elements is contained, it is preferable that the Co content is set to 2.00% or less, each of the Mo content, the Cr content, the Cu content, the V content, and the W content is set to 1.00% or less, and the Ni content is set to 3.00% or less.

"Mg: 0% to 1.00%"

"Zr: 0% to 1.00%"

"Sb: 0% to 1.00%"

"Ca: 0% to 0.10%"

"REM: 0% to 0.30%"

Mg, Zr, Sb, Ca, and REM are elements that improve deformability by suppressing the formation of oxide serving as the origin of fracture and improve the collision characteristics of the hot-stamping formed body. In order to reliably obtain this effect, it is preferable that the content of even any one of Mg, Zr, Sb, Ca, and REM is set to 0.001% or more. On the other hand, since the effect is saturated even though a large amount of these elements is contained, it is preferable that each of the Mg content, the Zr content, and the Sb content is set to 1.00% or less, the Ca content is set to 0.10% or less, and the REM content is set to 0.30% or less.

In this embodiment, REM refers to a total of 17 elements that are composed of Sc, Y, and lanthanoid and the REM content refers to the total content of these elements.

"B: 0% to 0.0100%"

B is an element that is segregated at a prior austenite grain boundary and suppresses the formation of ferrite and pearlite. In order to reliably exert this effect, it is preferable that the B content is set to 0.0005% or more. On the other hand, since the effect is saturated even though the B content exceeds 0.0100%, it is preferable that the B content is set to 0.0100% or less.

The chemical composition of the above-mentioned hot-stamping formed body may be measured by a general analysis method. For example, the chemical composition of the above-mentioned hot-stamping formed body may be measured using inductively coupled plasma-atomic emission spectrometry (ICP-AES). C and S may be measured using a combustion-infrared absorption method and N may be measured using an inert gas fusion-thermal conductivity method. In a case where a plating layer is provided on the surface of the hot-stamping formed body, the chemical composition may be analyzed after the plating layer is removed by mechanical grinding.

Next, the microstructure of the hot-stamping formed body according to this embodiment will be described.

The hot-stamping formed body according to this embodiment includes residual austenite of which the area ratio is 5% or more and less than 10%, bainite and tempered martensite of which the total area ratio exceeds 90% and is 95% or less, and a remainder in microstructure of which the area ratio is less than 5%. The hot-stamping formed body includes microstructure in which a ratio of the length of a grain boundary having a rotation angle in the range of 550 to 750 to the total length of a grain boundary having a rotation angle in the range of 4° to 12°, a grain boundary having a rotation angle in the range of 49° to 54°, and a grain boundary (high angle boundary) having a rotation angle in the range of 55° to 75° among grain boundaries of crystal grains of bainite and tempered martensite to the <011> direction as a rotation axis is 30% or more.

In this embodiment, microstructure at a depth position corresponding to ¼ of a sheet thickness from the surface of the hot-stamping formed body (a region between a depth corresponding to ⅛ of the sheet thickness from the surface and a depth corresponding to ⅜ of the sheet thickness from the surface) is specified. This depth position is an intermediate point between the surface of the hot-stamping formed body and a central position of the sheet thickness, and microstructure at the depth position typifies the steel structure of the hot-stamping formed body (shows the average microstructure of the entire hot-stamping formed body).

"Residual Austenite of which the Area Ratio is 5% or More and Less than 10%"

Residual austenite improves the collision characteristics of the hot-stamping formed body. In a case where the area ratio of residual austenite is less than 5%, desired uniform deformability cannot be obtained. For this reason, the area ratio of residual austenite is set to 5% or more. The area ratio of residual austenite is preferably 6% or more or 7% or more. On the other hand, in a case where the area ratio of residual austenite is 10% or more, desired strength cannot be obtained. For this reason, the area ratio of residual austenite is set to be less than 10%. The area ratio of residual austenite is preferably 9% or less or 8% or less.

"Bainite and Tempered Martensite of which the Total Area Ratio Exceeds 90% and is 95% or Less"

Bainite and tempered martensite improve the strength of the hot-stamping formed body. In a case where the total area ratio of bainite and tempered martensite is 90% or less, desired strength cannot be obtained. For this reason, the total area ratio of bainite and tempered martensite is set to exceed 90%. The total area ratio of bainite and tempered martensite is preferably 91% or more or 92% or more. On the other hand, in a case where the total area ratio of bainite and tempered martensite exceeds 95%, desired uniform deformability cannot be obtained. For this reason, the total area ratio of bainite and tempered martensite is set to 95% or less.

The total area ratio of bainite and tempered martensite is preferably 94% or less or 93% or less.

"A Remainder in Microstructure of which the Area Ratio is Less than 5%"

Ferrite, pearlite, fresh martensite, and granular bainite may be included in the microstructure of the hot-stamping formed body according to this embodiment as the remainder in microstructure. In a case where the area ratio of the remainder in microstructure is high, desired strength and desired collision characteristics cannot be obtained. For this reason, the area ratio of the remainder in microstructure is set to be less than 5%. The area ratio of the remainder in microstructure is preferably 3% or less or 1% or less.

"Measurement of the Area Ratios of Residual Austenite and Bainite and Tempered Martensite"

A sample is cut out from an arbitrary position away from an end surface of the hot-stamping formed body by a distance of 50 mm or more (a position that avoids an end portion in a case where the sample cannot be collected at this position) so that a cross section (sheet thickness-cross section) perpendicular to the surface can be observed. The size of the sample also depends on a measurement device but is set to a size that can be observed by about 10 mm in a rolling direction.

After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water. Then, the sample is polished for 8 minutes using colloidal silica not containing alkaline solution at a room temperature, so that strain introduced into the surface layer of the sample is removed. A region, which has a length of 50 μm and is present between a depth corresponding to ⅛ of the sheet thickness from the surface and a depth corresponding to ⅜ of the sheet thickness from the surface, is measured at a measurement interval of 0.1 μm at an arbitrary position on the cross section of the sample in a longitudinal direction by an electron backscatter diffraction method, so that crystal orientation information is obtained. An EBSD device formed of a schottky emission scanning electron microscope (JSM-7001F manufactured by JEOL Ltd.) and an EBSD detector (DVC5 detector manufactured by TSL Solutions) is used for measurement. In this case, the degree of vacuum in the EBSD device is set to $9.6\times10^{-5}$ Pa or less, an accelerating voltage is set to 15 kV, an irradiation current level is set to 13, and the irradiation level of an electron beam is set to 62. The area ratio of residual austenite is calculated from the obtained crystal orientation information using "Phase Map" function of software "OIM Analysis (registered trademark)" included in an EBSD analysis device. A region where a crystal structure is fee is determined as residual austenite.

Next, regions where a crystal structure is bcc are determined as bainite, tempered martensite, fresh martensite, granular bainite, and ferrite; regions where a grain average image quality value is less than 60000 in these regions are determined as bainite, tempered martensite, and fresh martensite using "Grain Average Misorientation" function of software "OIM Analysis (registered trademark)" included in the EBSD analysis device; and the sum of the area ratios of these regions is calculated, so that the total area ratio of "bainite, tempered martensite, and fresh martensite" is obtained. The area ratio of fresh martensite, which is obtained by a method to be described later, is subtracted from the total area ratio of "bainite, tempered martensite, and fresh martensite" obtained by the above-mentioned method, so that the total area ratio of "bainite and tempered martensite" is obtained.

"Measurement of the Area Ratio of a Remainder in Microstructure"

A sample is cut out from an arbitrary position away from an end surface of the hot-stamping formed body by a distance of 50 mm or more (a position that avoids an end portion in a case where the sample cannot be collected at this position) so that a cross section (sheet thickness-cross section) perpendicular to the surface can be observed. The size of the sample also depends on a measurement device but is set to a size that can be observed by about 10 mm in a rolling direction.

After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water and Nital etching is performed. Then, photographs having a plurality of visual fields are taken using a schottky emission scanning electron microscope (JSM-7001F manufactured by JEOL Ltd.) in a region that has a length of 50 μm and is present between a depth corresponding to ⅛ of the sheet thickness from the surface and a depth corresponding to ⅜ of the sheet thickness from the surface at an arbitrary position on the cross section of the sample in a longitudinal direction. Evenly spaced grids are drawn in the taken photographs, and structures at grid points are identified. The number of grid points corresponding to each structure is obtained and is divided by the total number of grid points, so that the area ratio of each structure is obtained. The area ratio can be more accurately obtained as the total number of grid points is larger. In this embodiment, grid spacings are set to 2 μm×2 μm and the total number of grid points is set to 1500.

A region where cementite is precipitated in a lamellar shape in the grains is determined as pearlite. A region where luminance is low and a substructure is not recognized is determined as ferrite. Regions where luminance is high and a substructure does not appear after etching are determined as fresh martensite and residual austenite. Regions not corresponding to any of the above-mentioned region are determined as granular bainite. The area ratio of residual austenite obtained by the above-mentioned EBSD analysis is subtracted from the area ratio of fresh martensite and residual austenite obtained from the taken photographs, so that the area ratio of fresh martensite is obtained.

"A ratio of the length of a grain boundary (high angle boundary) having a rotation angle in the range of 550 to 750 to the total length of a grain boundary having a rotation angle in the range of 4° to 12°, a grain boundary having a rotation angle in the range of 49° to 54°, and a grain boundary having a rotation angle in the range of 55° to 75° among grain boundaries of crystal grains of bainite and tempered martensite to the <011> direction as a rotation axis is 30% or more"

A high angle boundary is a grain boundary that has the highest angle among grain boundaries included in the crystal grains of bainite and tempered martensite. A high angle boundary is highly effective in suppressing the propagation of cracks generated at the time of collision. In a case where a ratio of the length of a high angle boundary is less than 30%, desired collision characteristics cannot be obtained in the hot-stamping formed body. For this reason, a ratio of the length of a high angle boundary is set to 30% or more. A ratio of the length of a high angle boundary is preferably 35% or more, 40% or more, or 45% or more. The upper limit of a ratio of the length of a high angle boundary is not particularly specified. However, according to the chemical composition and a manufacturing method according to this embodiment, a substantial upper limit thereof is 90%.

"Method of Measuring a Ratio of the Length of a High Angle Boundary"

A sample is cut out from a position away from an end surface of the hot-stamping formed body by a distance of 50 mm or more (a position that avoids an end portion in a case where the sample cannot be collected at this position) so that a cross section (sheet thickness-cross section) perpendicular to the surface can be observed. The sample also depends on a measurement device but is set to have a length that can be observed by about 10 mm in a rolling direction. A depth position of the cut-out sample corresponding to ¼ of a sheet thickness (a region between a depth corresponding to ⅛ of the sheet thickness from the surface and a depth corresponding to ⅜ of the sheet thickness from the surface) is subjected to EBSD analysis at a measurement interval of 0.1 μm, so that crystal orientation information is obtained. Here, the EBSD analysis is performed using an EBSD device formed of a schottky emission scanning electron microscope (JSM-7001F manufactured by JEOL Ltd.) and an EBSD detector (DVC5 detector manufactured by TSL Solutions) in a state where the irradiation level of an electron beam is 62.

Next, regions where a grain average image quality value is less than 60000 are determined as the crystal grains of bainite, tempered martensite, and fresh martensite with regard to the obtained crystal orientation information using "Grain Average Image Quality" function of software "OIM Analysis (registered trademark)" included in the EBSD analysis device; the length of a grain boundary having a rotation angle in the range of 4° to 12°, the length of a grain boundary having a rotation angle in the range of 49° to 54°, and the length of a grain boundary having a rotation angle in the range of 550 to 750 to the <011> direction as a rotation axis are calculated with regard to the grain boundaries of the crystal grains of bainite and tempered martensite among grain boundaries of these crystal grains; and a ratio of the length of a grain boundary having a rotation angle in the range of 550 to 750 to the value of the sum of the lengths of the respective grain boundaries is calculated. Accordingly, a ratio of the length of the grain boundary (high angle boundary) having a rotation angle in the range of 55° to 75° to the total length of the grain boundary having a rotation angle in the range of 4° to 12°, the grain boundary having a rotation angle in the range of 49° to 54°, and the grain boundary (high angle boundary) having a rotation angle in the range of 55° to 75° among the crystal grains of bainite and tempered martensite to the <011> direction as a rotation axis is obtained.

Taken photographs may be obtained by the same method as a method of measuring the area ratio of the remainder in microstructure; fresh martensite may be determined from the crystal grains of bainite, tempered martensite, and fresh martensite; and fresh martensite may be excluded from the crystal grains of bainite, tempered martensite, and fresh martensite. The reason why the grain boundaries of the crystal grains of fresh martensite are not included in the measurement of a high angle boundary is that fresh martensite has high hardness and serves as the origin of fracture.

The length of the grain boundary can be easily calculated in a case where, for example, "Inverse Pole Figure Map" function and "Axis Angle" function of software "OIM Analysis (registered trademark)" included in the EBSD analysis device are used. In these functions, among grain boundaries of crystal grains of the bainite and the tempered martensite, the total length of the grain boundaries can be calculated in a case where specific rotation angles are specified to an arbitrary direction as a rotation axis. The above-mentioned analysis may be performed over all crystal grains included in a measurement region, and the lengths of the above-mentioned three types of grain boundaries among the grain boundaries of the crystal grains of bainite and tempered martensite to the <011> direction as a rotation axis may be calculated.

"Sheet Thickness and Tensile Strength"

The sheet thickness of the hot-stamping formed body according to this embodiment is not particularly limited. However, in terms of reducing the weight of a vehicle body, it is preferable that the sheet thickness of the hot-stamping formed body according to this embodiment is set in the range of 0.5 mm to 3.5 mm. Further, in terms of reducing the weight of a vehicle body, the tensile strength of the hot-stamping formed body is set to 1500 MPa or more. Preferably, the tensile strength of the hot-stamping formed body is set to 1800 MPa or more or 2000 MPa or more. The upper limit of the tensile strength is not particularly specified, but may be set to 2600 MPa or less or 2550 MPa or less.

"Plating Layer"

For the purpose of improving corrosion resistance and the like, a plating layer may be formed on the surface of the hot-stamping formed body according to this embodiment. The plating layer may be any of an electroplating layer and a hot-dip plating layer. The electroplating layer includes, for example, an electrogalvanized layer, an electrolytic Zn—Ni alloy plating layer, and the like. The hot-dip plating layer includes, for example, a hot-dip galvanized layer, a hot-dip galvannealed layer, a hot-dip aluminum plating layer, a hot-dip Zn—Al alloy plating layer, a hot-dip Zn—Al—Mg alloy plating layer, a hot-dip Zn—Al—Mg—Si alloy plating layer, and the like. The adhesion amount of a plating layer is not particularly limited and may be a general adhesion amount.

"Method of Manufacturing a Hot-Stamping Formed Body"

Next, a preferred method of manufacturing the hot-stamping formed body according to this embodiment will be described.

The hot-stamping formed body according to this embodiment can be manufactured by performing hot stamping on a cold-rolled steel sheet manufactured by a routine method or a cold-rolled steel sheet including a plating layer on the surface thereof, pressurizing and retaining the cold-rolled steel sheet in a predetermined temperature range after the hot stamping, and cooling the cold-rolled steel sheet.

"Heating and Holding Before Hot Stamping"

It is preferable that the cold-rolled steel sheet is held for 60 sec to 600 sec in the temperature range of 800° C. to 1000° C. before the hot stamping. In a case where a heating temperature is lower than 800° C. or a holding time is less than 60 sec, the cold-rolled steel sheet cannot be sufficiently austenitized. For this reason, a desired amount of bainite and tempered martensite may not be capable of being obtained in the hot-stamping formed body. In a case where a heating temperature exceeds 1000° C. or a holding time exceeds 600 sec, transformation into bainite and tempered martensite is delayed due to an increase in austenite grain size. For this reason, a desired amount of bainite and tempered martensite may not be capable of being obtained.

An average heating rate during the heating may be set to 0.1° C./s or more or 200° C./s or less. An average heating rate mentioned here is a value that is obtained in a case where a temperature difference between the surface temperature of a steel sheet at the time of start of the heating and a holding temperature is divided by a time difference from the start of the heating to a time when a temperature reaches a holding temperature. Further, during the holding, the temperature of a steel sheet may be fluctuated in the temperature range of 800° C. to 1000° C. or may be constant.

Examples of a heating method before the hot stamping include heating using an electric furnace, a gas furnace, or the like, flame heating, energization heating, high-frequency heating, induction heating, and the like.

"Cooling after Hot Stamping"

Hot stamping is performed after the heating and the holding described above. After the hot stamping, it is preferable that cooling is performed at an average cooling rate of 1.0° C./s to 100° C./s up to the temperature range of 200° C. to 400° C. In a case where a cooling stop temperature is lower than 200° C. in the cooling after the hot stamping, the stabilization of residual austenite is not facilitated. For this reason, a desired amount of residual austenite may not be capable of being obtained. In a case where a cooling stop temperature exceeds 400° C., the hardness of prior austenite grains is reduced. For this reason, a desired number of high angle boundaries may not be capable of being formed. Further, in a case where an average cooling rate is lower than 1.0° C./s, transformation into ferrite, granular bainite, or pearlite is facilitated. For this reason, a desired amount of bainite and tempered martensite may not be capable of being obtained. In a case where an average cooling rate exceeds 100° C./s, the driving force of transformation into tempered martensite and bainite is increased and an action for relieving strain to be introduced by transformation is reduced. For this reason, it is difficult to obtain a desired number of high angle boundaries.

An average cooling rate mentioned here is a value of the difference in the surface temperatures between at the cooling start and at the cooling end divided by time difference between the cooling start and the cooling end.

"Pressurization and Holding"

Pressurization and holding are performed for a holding time of 30 sec to 3600 sec at a contact pressure P (MPa), which satisfies Expression (B1), in the temperature range of 200° C. to 400° C.

In a case where a holding time is less than 30 sec, carbon is not sufficiently distributed to untransformed austenite from martensite. For this reason, a desired amount of residual austenite may not be capable of being obtained. In a case where a holding time exceeds 3600 sec, the softening of bainite or tempered martensite proceeds. For this reason, a desired strength may not be capable of being obtained. In a case where a contact pressure P is less than the left side of the following expression (B1), the deformation of prior austenite grains is not sufficiently suppressed. For this reason, the ratio of a high angle boundary may be reduced.

The upper limit of a contact pressure P is not particularly limited. However, in order to prevent equipment from being broken, a substantial upper limit thereof is 300 MPa with regard to a material having the strength class of this embodiment. During the pressurization and holding, the temperature of a steel sheet may be fluctuated in the temperature range of 200° C. to 400° C. or may be constant.

Pressurization and holding may be performed after a formed steel sheet is transported to a separate die, which has a heating function, from a die that has been subjected to hot stamping and cooling after the hot stamping.

In a case where the steel sheet is heated in the temperature range of 400° C. or more after hot stamping and cooling and before being pressurized and held, bainite is generated. As a result, a desired number of high angle boundaries cannot be obtained. For this reason, in a case where the hot-stamping formed body according to this embodiment is to be manufactured, it is not preferable that the steel sheet is heated in the temperature range of 400° C. or more after hot stamping and cooling and before being pressurized and held.

$$-1.85\times Ms+755\leq P\leq 300 \quad \text{Expression (B1)}$$

$$Ms(^\circ\text{ C.})=539-423\times C-30\times Mn-12\times Cr-17\times Ni-7.5\times Mo \quad \text{Expression (B2)}$$

A symbol of an element in Expression (B2) represents the content of each element by mass %, and is substituted for 0 in a case where the element is not contained.

"Cooling after Pressurization and Holding"

It is preferable that the steel sheet is cooled up to a temperature of 80° C. or less at an average cooling rate of 1.0° C./s to 100° C./s after the pressurization and holding. In a case where an average cooling rate is lower than 1.0° C./s, residual austenite may be decomposed. In a case where an average cooling rate exceeds 100° C./s, a load is applied to the device. Residual austenite is decomposed. An average cooling rate mentioned here is a value of the difference in the surface temperatures between at the time of start of the cooling after the pressurization and holding and at the time of end of the cooling divided by time difference between the cooling start and the cooling end.

Next, examples of the Element Technology B will be described. Conditions in the examples are one condition example that is employed to confirm the feasibility and effects of the Element Technology B, and the Element Technology B is not limited to this condition example. The Element Technology B may employ various conditions to achieve the object of the Element Technology B without departing from the scope of the Element Technology B.

Hot rolling and cold rolling were performed on steel pieces manufactured by the casting of molten steel having the chemical composition shown in Tables 7 and 8, and plating was performed on the steel pieces as necessary, so that cold-rolled steel sheets were obtained. Then, hot-stamping formed bodies shown in Tables 9 and 10 were manufactured using the cold-rolled steel sheets under conditions shown in Tables 9 and 10.

An average heating rate during heating before hot stamping was set to 0.1° C./s to 200° C./s, cooling after hot stamping was performed up to the temperature range of 200° C. to 400° C., and cooling after pressurization and holding was performed up to a temperature of 80° C. or less.

Further, Manufacture No. 16 of Table 9 was provided with a hot-dip aluminum plating layer and Manufacture No. 17 was provided with a hot-dip galvanized layer.

Manufacture No. 55 of Table 10 was held for 30 sec in the temperature range of 410° C. to 560° C. after hot stamping and cooling and before pressurization and holding, and was then subjected to pressurization and holding shown in Table 10.

γr in Tables 9 and 10 denotes residual austenite, B denotes bainite, and TM denotes tempered martensite.

With regard to the microstructure of the hot-stamping formed body, the measurement of the area ratio of each structure and the measurement of a ratio of the length of a high angle boundary were performed by the above-mentioned measurement methods. Further, the mechanical characteristics of the hot-stamping formed body were evaluated by the following methods.

"Tensile Strength"

No. 5 test pieces described in JIS Z 2241:2011 were prepared from an arbitrary position of the hot-stamping formed body, and the tensile strength of the hot-stamping formed body was obtained according to a test method described in JIS Z 2241:2011. The speed of a cross-head was set to 3 mm/min. The test piece was determined to be acceptable in a case where tensile strength was 1500 MPa or more, and was determined to be unacceptable in a case where tensile strength was less than 1500 MPa.

"Collision Characteristics (Uniform Deformability and Crack Propagation Suppression Effect)"

The collision characteristics of the hot-stamping formed body were evaluated by the following method on the basis of VDA standards (VDA238-100) specified by the German Association of the Automotive Industry.

Figure 22:
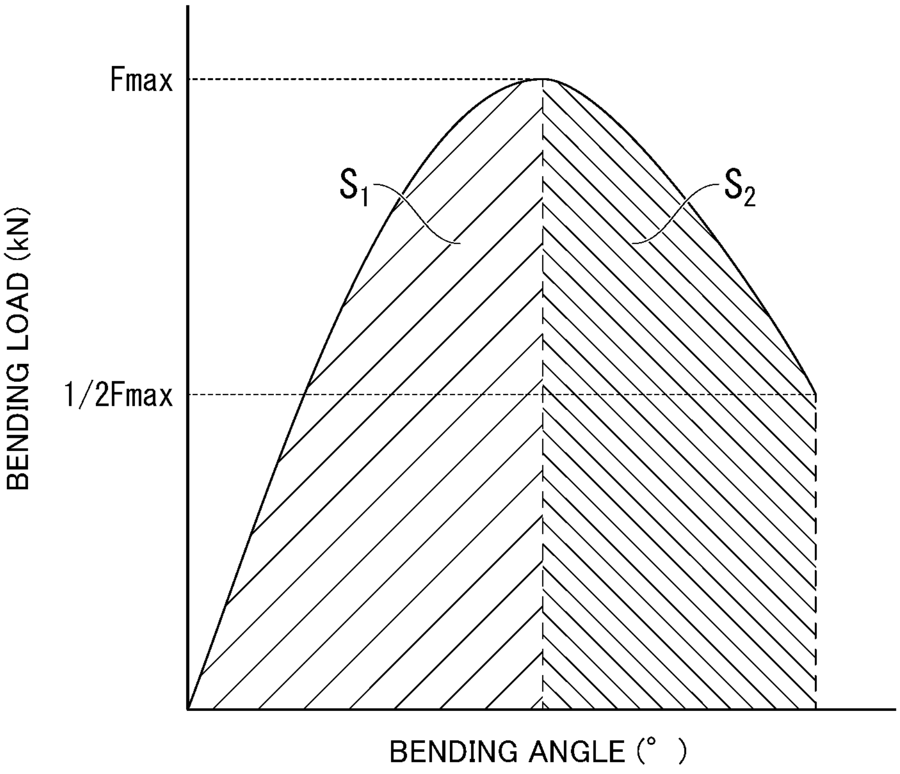
FIG. 22 is an example of F-S curve obtained from a bending test.

In this example, absorbed energy S1 was obtained as the index of uniform deformability and absorbed energy S2 was obtained as the index of a crack propagation suppression effect from an F-S curve (load-bending angle diagram) shown in FIG. 22 that was obtained from a bending test. An increase in load per unit bending angle until a load reaches the maximum load from the start of a test was calculated according to the gradient of the F-S curve and S1 was calculated as an integrated value (absorbed energy S1) of these minute areas. A change in load per unit bending angle until a load is reduced to ½ of the maximum load after a load reaches the maximum load was calculated according to the gradient of the F—S curve and S2 was calculated as an integrated value (absorbed energy S2) of these minute areas.

In this example, the test piece was determined to be acceptable since being excellent in uniform deformability in a case where S1 was 100 (°·kN) or more; and was written as "Fair" in a case where S1 was 100 (°·kN) or more, was written as "Good" in a case where S1 was 120 (°·kN) or more, and was written as "Very Good" in a case where S1 was 180 (°·kN) or more in Tables 9 and 10. In a case where S1 was less than 100 (°·kN), the hot-stamping formed body was determined to be unacceptable since being inferior in uniform deformability and was written as "Bad" in Tables 9 and 10.

The test piece was determined to be acceptable since being excellent in crack propagation suppression characteristics in a case where a value (S2/(S1+S2)), which is obtained in a case where S2 is divided by the sum of S1 and S2, is 0.01 or more; and was written as "Fair" in a case where the value (S2/(S1+S2)) was 0.01 or more, was written as "Good" in a case where the value (S2/(S1+S2)) was 0.02 or more, and was written as "Very Good" in a case where the value (S2/(S1+S2)) was 0.07 or more in Tables 9 and 10. In a case where the value (S2/(S1+S2)) was less than 0.01, the test piece was determined to be unacceptable since being inferior in crack propagation characteristics and was written as "Bad" in Tables 9 and 10.

The conditions of the bending test were as follows.

Dimensions of test piece: 60 mm (rolling direction)×30 mm (a direction parallel to a sheet width direction)

Sheet thickness of test piece: 1.01 to 1.05 mm (the surface and back were ground by the same amount)

Bending ridge: a direction parallel to a sheet width direction

Test method: roll support and punch pressing

Roll diameter: φ 30 mm

Punch shape: tip end R=0.4 mm

Roll-to-roll distance: 2.0×sheet thickness (mm)+0.5 mm

Pressing speed: 20 mm/min

Testing machine: AG-100KNI manufactured by Shimadzu Corporation

TABLE 7

| Steel | Chemical composition (mass %) Remainder Fe and impurities | | | | | | | | Ms |
|---|---|---|---|---|---|---|---|---|---|
| No. | C | Si | Mn | Al | P | S | N | Others | (° C.) |
| 1 | 0.30 | 1.72 | 1.94 | 0.441 | 0.004 | 0.0018 | 0.0041 | | 354 |
| 2 | 0.46 | 0.97 | 0.85 | 0.311 | 0.006 | 0.0004 | 0.0047 | | 319 |
| 3 | 0.32 | 0.61 | 1.90 | 0.309 | 0.003 | 0.0019 | 0.0028 | | 347 |
| 4 | 0.37 | 2.88 | 1.87 | 0.533 | 0.005 | 0.0026 | 0.0049 | | 326 |
| 5 | 0.35 | 1.82 | 0.78 | 0.365 | 0.010 | 0.0018 | 0.0030 | | 368 |
| 6 | 0.34 | 0.94 | 2.91 | 0.504 | 0.006 | 0.0020 | 0.0035 | | 308 |
| 7 | 0.32 | 0.99 | 1.69 | 0.001 | 0.002 | 0.0026 | 0.0047 | | 353 |
| 8 | 0.37 | 1.78 | 0.97 | 1.880 | 0.007 | 0.0004 | 0.0038 | | 353 |
| 9 | 0.34 | 1.64 | 1.49 | 0.740 | 0.081 | 0.0019 | 0.0025 | | 350 |
| 10 | 0.34 | 1.62 | 1.80 | 0.668 | 0.0001 | 0.0012 | 0.0044 | | 341 |
| 11 | 0.35 | 1.17 | 1.05 | 0.799 | 0.005 | 0.0780 | 0.0027 | | 359 |
| 12 | 0.31 | 1.04 | 1.41 | 0.618 | 0.004 | 0.0003 | 0.0048 | | 366 |
| 13 | 0.37 | 1.55 | 1.35 | 0.478 | 0.009 | 0.0013 | 0.0071 | | 342 |
| 14 | 0.37 | 1.18 | 0.90 | 0.423 | 0.002 | 0.0030 | 0.0002 | | 355 |
| 15 | 0.35 | 1.69 | 1.35 | 0.459 | 0.003 | 0.0022 | 0.0029 | | 350 |
| 16 | 0.36 | 1.45 | 1.29 | 0.432 | 0.003 | 0.0022 | 0.0029 | Nb: 0.032, Ti: 0.002, Cr: 0.20, B: 0.0020, Mo: 0.10 | 345 |
| 17 | 0.46 | 1.50 | 1.27 | 0.443 | 0.003 | 0.0022 | 0.0029 | Nb: 0.028, Ti: 0.002, Cr: 0.20, B: 0.0022, Mo: 0.10 | 303 |
| 18 | 0.32 | 1.74 | 1.68 | 0.498 | 0.007 | 0.0029 | 0.0042 | Co: 0.23 | 353 |
| 19 | 0.32 | 1.14 | 1.26 | 0.783 | 0.003 | 0.0011 | 0.0028 | Nb: 0.045 | 366 |
| 20 | 0.30 | 1.00 | 1.15 | 0.398 | 0.008 | 0.0015 | 0.0049 | Ti: 0.018 | 378 |
| 21 | 0.34 | 1.51 | 1.94 | 0.659 | 0.010 | 0.0015 | 0.0029 | Mo: 0.10 | 336 |
| 22 | 0.35 | 1.72 | 1.75 | 0.751 | 0.010 | 0.0019 | 0.0042 | Cr: 0.21 | 336 |

TABLE 8

| Steel No. | Chemical composition (mass %) Remainder Fe and impurities C | Si | Mn | Al | P | S | N | Others | Ms (° C.) |
|---|---|---|---|---|---|---|---|---|---|
| 23 | 0.34 | 1.52 | 1.85 | 0.329 | 0.004 | 0.0011 | 0.0031 | Cu: 0.25 | 340 |
| 24 | 0.32 | 1.57 | 1.14 | 0.414 | 0.004 | 0.0023 | 0.0026 | V: 0.28 | 369 |
| 25 | 0.35 | 1.42 | 1.13 | 0.348 | 0.009 | 0.0027 | 0.0025 | W: 0.26 | 357 |
| 26 | 0.30 | 1.37 | 0.85 | 0.450 | 0.008 | 0.0026 | 0.0033 | Ni: 0.31 | 381 |
| 27 | 0.35 | 1.61 | 1.34 | 0.372 | 0.010 | 0.0022 | 0.0049 | Mg: 0.02 | 351 |
| 28 | 0.33 | 1.66 | 1.61 | 0.558 | 0.003 | 0.0016 | 0.0042 | Zr: 0.03 | 351 |
| 29 | 0.37 | 1.41 | 1.84 | 0.498 | 0.009 | 0.0025 | 0.0029 | Sb: 0.02 | 327 |
| 30 | 0.37 | 1.39 | 1.84 | 0.411 | 0.007 | 0.0027 | 0.0029 | B: 0.0020 | 327 |
| 31 | 0.33 | 1.19 | 1.68 | 0.418 | 0.007 | 0.0014 | 0.0030 | Ca: 0.02 | 349 |
| 32 | 0.31 | 1.41 | 1.02 | 0.545 | 0.010 | 0.0015 | 0.0043 | REM: 0.12 | 377 |
| 33 | 0.25 | 1.09 | 1.92 | 0.773 | 0.006 | 0.0022 | 0.0041 | | 376 |
| 34 | 0.59 | 1.50 | 0.60 | 0.491 | 0.004 | 0.0006 | 0.0027 | | 271 |
| 35 | 0.33 | 0.21 | 1.55 | 0.731 | 0.009 | 0.0025 | 0.0040 | | 353 |
| 36 | 0.33 | 3.26 | 1.09 | 0.593 | 0.008 | 0.0006 | 0.0043 | | 367 |
| 37 | 0.37 | 1.10 | 0.32 | 0.307 | 0.004 | 0.0007 | 0.0045 | | 373 |
| 38 | 0.34 | 1.55 | 3.24 | 0.409 | 0.004 | 0.0018 | 0.0041 | | 298 |
| 39 | 0.37 | 1.17 | 1.08 | 0.0001 | 0.009 | 0.0018 | 0.0044 | | 350 |
| 40 | 0.33 | 1.03 | 1.24 | 2.110 | 0.005 | 0.0019 | 0.0045 | | 362 |
| 41 | 0.37 | 1.30 | 1.19 | 0.319 | 0.210 | 0.0009 | 0.0049 | | 347 |
| 42 | 0.32 | 1.08 | 1.33 | 0.457 | 0.007 | 0.1800 | 0.0028 | | 364 |
| 43 | 0.36 | 1.79 | 1.00 | 0.603 | 0.006 | 0.0024 | 0.0210 | | 357 |

TABLE 9

| Manufacture No. | Steel No. | Heating: Heating temperature (° C.) | Heating: Holding time (s) | Cooling after HS Average cooling rate until pressurization and holding (° C./s) | Pressurization and holding: Holding temperature (° C.) | Holding time (s) | Left side of Expression (B1) | Contact pressure P (MPa) |
|---|---|---|---|---|---|---|---|---|
| 1 | 1 | 910 | 311 | 22 | 303 | 93 | 100 | 122 |
| 2 | 2 | 889 | 293 | 23 | 287 | 246 | 165 | 180 |
| 3 | 3 | 888 | 333 | 10 | 309 | 359 | 114 | 143 |
| 4 | 4 | 885 | 307 | 8 | 330 | 226 | 151 | 179 |
| 5 | 5 | 883 | 333 | 6 | 337 | 76 | 75 | 93 |
| 6 | 6 | 902 | 327 | 5 | 311 | 280 | 185 | 202 |
| 7 | 7 | 891 | 342 | 16 | 322 | 307 | 102 | 128 |
| 8 | 8 | 896 | 351 | 23 | 299 | 226 | 101 | 119 |
| 9 | 9 | 917 | 322 | 20 | 344 | 304 | 107 | 127 |
| 10 | 10 | 880 | 285 | 27 | 310 | 325 | 124 | 152 |
| 11 | 11 | 880 | 268 | 23 | 346 | 211 | 90 | 117 |
| 12 | 12 | 899 | 342 | 8 | 287 | 140 | 79 | 100 |
| 13 | 13 | 915 | 273 | 24 | 306 | 197 | 122 | 152 |
| 14 | 14 | 912 | 307 | 11 | 321 | 163 | 97 | 109 |
| 15 | 15 | 914 | 328 | 25 | 290 | 274 | 107 | 132 |
| 16 | 16 | 881 | 259 | 27 | 311 | 310 | 117 | 142 |
| 17 | 17 | 892 | 243 | 29 | 319 | 348 | 194 | 213 |
| 18 | 18 | 889 | 282 | 23 | 321 | 87 | 102 | 121 |
| 19 | 19 | 897 | 293 | 26 | 314 | 46 | 78 | 106 |
| 20 | 20 | 899 | 272 | 6 | 340 | 189 | 56 | 69 |
| 21 | 21 | 900 | 284 | 13 | 303 | 303 | 133 | 163 |
| 22 | 22 | 906 | 330 | 17 | 285 | 201 | 134 | 150 |
| 23 | 23 | 889 | 323 | 30 | 285 | 223 | 127 | 145 |
| 24 | 24 | 914 | 279 | 7 | 312 | 167 | 72 | 98 |
| 25 | 25 | 896 | 285 | 10 | 335 | 348 | 94 | 123 |
| 26 | 26 | 884 | 359 | 20 | 324 | 268 | 50 | 67 |
| 27 | 27 | 893 | 269 | 29 | 289 | 139 | 106 | 124 |
| 28 | 28 | 893 | 328 | 25 | 329 | 300 | 105 | 119 |
| 29 | 29 | 894 | 328 | 19 | 314 | 254 | 150 | 172 |
| 30 | 30 | 909 | 336 | 29 | 294 | 332 | 150 | 160 |
| 31 | 31 | 884 | 355 | 16 | 318 | 164 | 109 | 123 |
| 32 | 32 | 912 | 351 | 16 | 321 | 168 | 57 | 62 |

TABLE 9-continued

| Manufacture No. | Cooling after pressurization and holding Average cooling rate (° C./s) | Microstructure γr (area %) | B + TM (area %) | Remainder (area %) | Ratio of length of grain boundary having rotation angle in range of 55° to 75° (%) | Mechanical characteristics Tensile strength (MPa) | S1 | S2/(S1 + S2) |
|---|---|---|---|---|---|---|---|---|
| 1 | 44 | 6 | 92 | 2 | 35 | 1590 | Fair | Good |
| 2 | 40 | 7 | 91 | 2 | 44 | 2510 | Fair | Good |
| 3 | 58 | 6 | 92 | 2 | 39 | 1912 | Fair | Good |
| 4 | 57 | 5 | 91 | 4 | 46 | 1856 | Good | Fair |
| 5 | 30 | 5 | 91 | 4 | 48 | 1857 | Good | Fair |
| 6 | 56 | 8 | 91 | 1 | 49 | 1899 | Fair | Good |
| 7 | 36 | 6 | 91 | 3 | 52 | 1933 | Good | Fair |
| 8 | 51 | 7 | 91 | 2 | 47 | 2039 | Good | Fair |
| 9 | 56 | 6 | 91 | 3 | 39 | 1962 | Good | Fair |
| 10 | 22 | 6 | 91 | 3 | 40 | 1893 | Good | Very Good |
| 11 | 49 | 7 | 91 | 2 | 41 | 2037 | Good | Fair |
| 12 | 35 | 6 | 91 | 3 | 43 | 1902 | Good | Very Good |
| 13 | 55 | 6 | 91 | 3 | 49 | 1858 | Good | Fair |
| 14 | 60 | 8 | 91 | 1 | 50 | 2063 | Good | Very Good |
| 15 | 54 | 6 | 91 | 3 | 43 | 2083 | Very Good | Very Good |
| 16 | 50 | 6 | 91 | 3 | 44 | 2017 | Very Good | Very Good |
| 17 | 57 | 7 | 92 | 1 | 50 | 2025 | Very Good | Very Good |
| 18 | 37 | 8 | 91 | 1 | 72 | 1839 | Good | Very Good |
| 19 | 60 | 7 | 92 | 1 | 67 | 2042 | Good | Very Good |
| 20 | 28 | 8 | 91 | 1 | 62 | 2013 | Good | Very Good |
| 21 | 26 | 7 | 92 | 1 | 68 | 1963 | Good | Very Good |
| 22 | 39 | 7 | 92 | 1 | 64 | 1925 | Good | Very Good |
| 23 | 36 | 7 | 92 | 1 | 63 | 1987 | Good | Very Good |
| 24 | 43 | 7 | 92 | 1 | 67 | 1815 | Good | Very Good |
| 25 | 23 | 6 | 91 | 3 | 65 | 1819 | Good | Very Good |
| 26 | 35 | 6 | 91 | 3 | 65 | 1820 | Good | Very Good |
| 27 | 50 | 7 | 92 | 1 | 42 | 1960 | Good | Very Good |
| 28 | 32 | 6 | 91 | 3 | 37 | 2032 | Good | Very Good |
| 29 | 36 | 6 | 91 | 3 | 45 | 2089 | Good | Very Good |
| 30 | 28 | 6 | 91 | 3 | 49 | 1842 | Good | Very Good |
| 31 | 47 | 7 | 92 | 1 | 44 | 1812 | Good | Very Good |
| 32 | 32 | 7 | 91 | 2 | 45 | 1831 | Good | Very Good |

TABLE 10

| Manufacture No. | Steel No. | Heating Heating temperature (° C.) | Heating Holding time (s) | Cooling after HS Average cooling rate until pressurization and holding (° C./s) | Pressurization and holding Holding temperature (° C.) | Holding time (s) | Left side of Expression (B1) | Contact pressure P (MPa) |
|---|---|---|---|---|---|---|---|---|
| 33 | 33 | 882 | 345 | 20 | 295 | 103 | 60 | 71 |
| 34 | 34 | 890 | 271 | 7 | 326 | 211 | 253 | 285 |
| 35 | 35 | 901 | 327 | 7 | 347 | 360 | 102 | 119 |
| 36 | 36 | 904 | 284 | 5 | 332 | 194 | 77 | 105 |
| 37 | 37 | 896 | 338 | 16 | 291 | 153 | 65 | 80 |
| 38 | 38 | 886 | 266 | 17 | 345 | 246 | 204 | 223 |
| 39 | 39 | 905 | 296 | 5 | 283 | 341 | 107 | 130 |
| 40 | 40 | 909 | 300 | 20 | 320 | 84 | 85 | 111 |
| 41 | 41 | 901 | 333 | 26 | 348 | 303 | 113 | 139 |
| 42 | 42 | 911 | 340 | 15 | 323 | 289 | 82 | 92 |
| 43 | 43 | 897 | 245 | 8 | 323 | 218 | 95 | 119 |
| 44 | 15 | 750 | 304 | 5 | 314 | 186 | 107 | 129 |
| 45 | 15 | 1089 | 266 | 20 | 336 | 86 | 107 | 128 |
| 46 | 15 | 908 | 48 | 27 | 281 | 307 | 107 | 124 |
| 47 | 15 | 918 | 647 | 18 | 324 | 46 | 107 | 119 |
| 48 | 15 | 882 | 247 | 0.2 | 292 | 93 | 107 | 134 |
| 49 | 15 | 883 | 349 | 26 | 154 | 337 | 107 | 127 |
| 50 | 15 | 903 | 356 | 19 | 409 | 208 | 107 | 127 |
| 51 | 15 | 880 | 303 | 28 | 348 | 21 | 107 | 133 |
| 52 | 15 | 885 | 318 | 30 | 344 | 3895 | 107 | 117 |

TABLE 10-continued

| | | | | | | | | |
|---|---|---|---|---|---|---|---|---|
| 53 | 15 | 908 | 360 | 22 | 288 | 221 | 107 | 87 |
| 54 | 15 | 918 | 276 | 26 | 306 | 298 | 107 | 121 |
| 55* | 15 | 906 | 300 | 14 | 340 | 264 | 107 | 135 |

| | Cooling after pressurization and holding | Microstructure | | | | Mechanical characteristics | | |
|---|---|---|---|---|---|---|---|---|
| Manufacture No. | Average cooling rate (° C./s) | γr (area %) | B + TM (area %) | Remainder (area %) | Ratio of length of grain boundary having rotation angle in range of 55° to 75° (%) | Tensile strength (MPa) | S1 | S2/ (S1 + S2) |
| 33 | 52 | 6 | 91 | 3 | 49 | 1204 | Good | Good |
| 34 | 31 | 7 | 91 | 2 | 46 | 2503 | Bad | Good |
| 35 | 34 | 2 | 94 | 4 | 39 | 1863 | Bad | Good |
| 36 | 43 | 7 | 86 | 7 | 46 | 1992 | Good | Bad |
| 37 | 51 | 7 | 85 | 8 | 53 | 1920 | Good | Bad |
| 38 | 60 | 6 | 91 | 3 | 54 | 1889 | Bad | Good |
| 39 | 43 | 7 | 91 | 2 | 54 | 2063 | Good | Bad |
| 40 | 47 | 7 | 92 | 1 | 48 | 2044 | Good | Bad |
| 41 | 35 | 7 | 92 | 1 | 37 | 1950 | Good | Bad |
| 42 | 23 | 7 | 92 | 1 | 41 | 1820 | Good | Bad |
| 43 | 27 | 7 | 90 | 3 | 41 | 1865 | Good | Bad |
| 44 | 51 | 7 | 57 | 36 | 42 | 1321 | Good | Bad |
| 45 | 25 | 8 | 50 | 42 | 47 | 1410 | Good | Bad |
| 46 | 44 | 8 | 51 | 41 | 53 | 1258 | Good | Bad |
| 47 | 29 | 8 | 56 | 36 | 38 | 1362 | Good | Bad |
| 48 | 37 | 7 | 85 | 8 | 43 | 1995 | Good | Bad |
| 49 | 57 | 4 | 94 | 2 | 38 | 1941 | Bad | Good |
| 50 | 46 | 7 | 92 | 1 | 21 | 2042 | Good | Bad |
| 51 | 52 | 1 | 97 | 2 | 54 | 1951 | Bad | Good |
| 52 | 29 | 7 | 91 | 2 | 45 | 1164 | Good | Good |
| 53 | 53 | 6 | 91 | 3 | 19 | 2069 | Good | Bad |
| 54 | 0.6 | 1 | 96 | 3 | 43 | 1803 | Bad | Good |
| 55* | 47 | 7 | 92 | 1 | 22 | 1886 | Good | Bad |

(Element Technology C)

Element Technology C is a frame member formed by hot-stamping a steel sheet, in which the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is less than 1.0.

According to the Element Technology C, in a case where the width and the hardness standard deviation ratio are controlled within appropriate ranges in the reference flat part, it is possible to prevent the fracture during bellows deformation due to a load in an axial direction while suppressing elastic buckling. Accordingly, a high degree of energy absorption performance can be obtained even in a case where a high-strength thin member is used. Accordingly, it is possible to exhibit excellent energy absorption efficiency.

The present inventors intensively studied the configuration of a frame member capable of exhibiting excellent energy absorption efficiency.

First, in order to exhibit excellent energy absorption efficiency, it is important that the frame member has a proof stress of a certain level or higher. In a case where an input load in an axial direction is applied due to a collision, elastic buckling may occur in a flat part in the initial stage of deformation. In a case where elastic buckling occurs, a required proof stress may not be obtained, and excellent energy absorption efficiency may not be exhibited.

In addition, in order to exhibit excellent energy absorption efficiency, it is also important that the frame member realizes folding deformation in a desired deformation mode immediately after an input load in an axial direction is applied thereto due to a collision, in order to efficiently absorb impact energy. In particular, in a case where fracture (fracture at a folded portion) occurs during bellows deformation due to the load in the axial direction, excellent energy absorption efficiency may not be exhibited.

Accordingly, it can be said that in a case where a cross section where elastic buckling hardly occurs in a flat part is designed and high bending performance can be imparted so that fracture hardly occurs, excellent energy absorption efficiency can be exhibited.

Here, in a case where the member is increased in strength and thinned as a method for realizing the weight reduction, the following problems occur.

Due to the thinning, elastic buckling is likely to occur in a flat part of the member, whereby it becomes difficult to obtain a necessary proof stress.

Due to the increase of the strength, the bending performance of the steel sheet is reduced, and fracture is likely to occur in a folded portion after the start of deformation. Therefore, it becomes difficult to efficiently absorb impact energy.

The present inventors paid attention to the fact that the above-described problems hinder a further increase of the strength and thinning of a high strength steel sheet.

The present inventors further conducted studies, and found that in a case where the width and the hardness standard deviation ratio are controlled within appropriate ranges in a reference flat part, it is possible to prevent the fracture during bellows deformation due to a load in an axial direction while suppressing elastic buckling. The present inventors found that thanks to such control, it is possible to solve the above-described problems which may occur in using a high strength steel sheet, and to exhibit excellent energy absorption efficiency, and completed the Element Technology C.

Hereinafter, a frame member C10 according to a first embodiment of the Element Technology C contrived based on the above findings will be described.

In the present specification and the drawings, constituent elements having substantially the same functional configuration are designated by the same reference numerals to avoid duplicating description.

First, terms and phrases in the present specification will be described.

The "longitudinal direction" means a member axis direction of a frame member, that is, a direction in which the axis extends.

The "flat part" means a linear part in a cross section perpendicular to the longitudinal direction of the frame member, specifically, a part having a radius of curvature larger than a maximum external dimension of the cross section. The maximum external dimension means the maximum straight line length between end portions at two arbitrary points in the cross section.

The "corner part" means a non-linear part excluding the flat part in the cross section perpendicular to the longitudinal direction of the frame member.

The "width" means a line length along the circumferential direction of a closed cross section portion, and the "width of the flat part" means a line length between one end and the other end of the flat part.

The "effective width" is an effective width $W_e$ obtained from Formula (C1) based on Karman's effective width theory, that is, Karman's effective width formula.

$$W_e = t\left(4\pi^2 E/12\left(1 - v^2\right)\sigma_y\right)^{1/2} \quad \text{Formula (C1)}$$

Here, the meanings of the symbols are as follows.

$\sigma_y$: Yield stress (MPa) of flat part

E: Young's modulus (MPa) of flat part t: sheet thickness (mm) of flat part v: Poisson's ratio of flat part In addition, in the steel sheet, as the Young's modulus of the flat part and the Poisson's ratio of the flat part, general physical property values may be used, and by replacing the yield stress of the flat part with the Vickers hardness of the thickness middle portion, the effective width $W_e$ can be obtained from Expression $W_e$=577 t/h.

Here, the meanings of the symbols are as follows.

t: sheet thickness (mm) of flat part h: Vickers hardness (Hv) of thickness middle portion of flat part In a case where it is difficult to obtain the effective width $W_e$ from Formula (C1), the effective width $W_e$ can be obtained from the above expression.

The "effective width ratio" is a ratio of a width W of the flat part to the effective width $W_e$, and is a value calculated by $W/W_e$. It can be said that the smaller the value of the effective width ratio, the more hardly the elastic buckling occurs in the cross-sectional shape.

The "reference flat part" means a flat part where the effective width ratio is maximum in the flat part of the closed cross section portion in an optional position in the longitudinal direction.

The "surface layer portion" means a region between: a depth position where a distance from a surface of the steel sheet to the depth position separated therefrom in the sheet thickness direction is 1% of the sheet thickness of the steel sheet; and a depth position where a distance from the surface of the steel sheet to the depth position separated therefrom in the sheet thickness direction is 5% of the sheet thickness of the steel sheet.

The "thickness middle portion" means a depth position where a distance from the surface of the steel sheet to the depth position separated therefrom in the sheet thickness direction of the steel sheet is 3/8 of the sheet thickness.

The "surface of the steel sheet" set as the reference of the depth position means a surface of a base steel sheet. For example, in a case where the steel sheet is plated or painted, or rust or the like is formed thereon, the surface of the steel sheet in a state where the plating, painting, and rust have been removed is set as the reference of the depth position. In a case where a surface layer coating such as plating, painting, rust, or the like is formed on the surface of the base steel sheet, the boundary between the surface layer coating and the surface of the base steel sheet is easily identified by various known methods.

Figure 23:
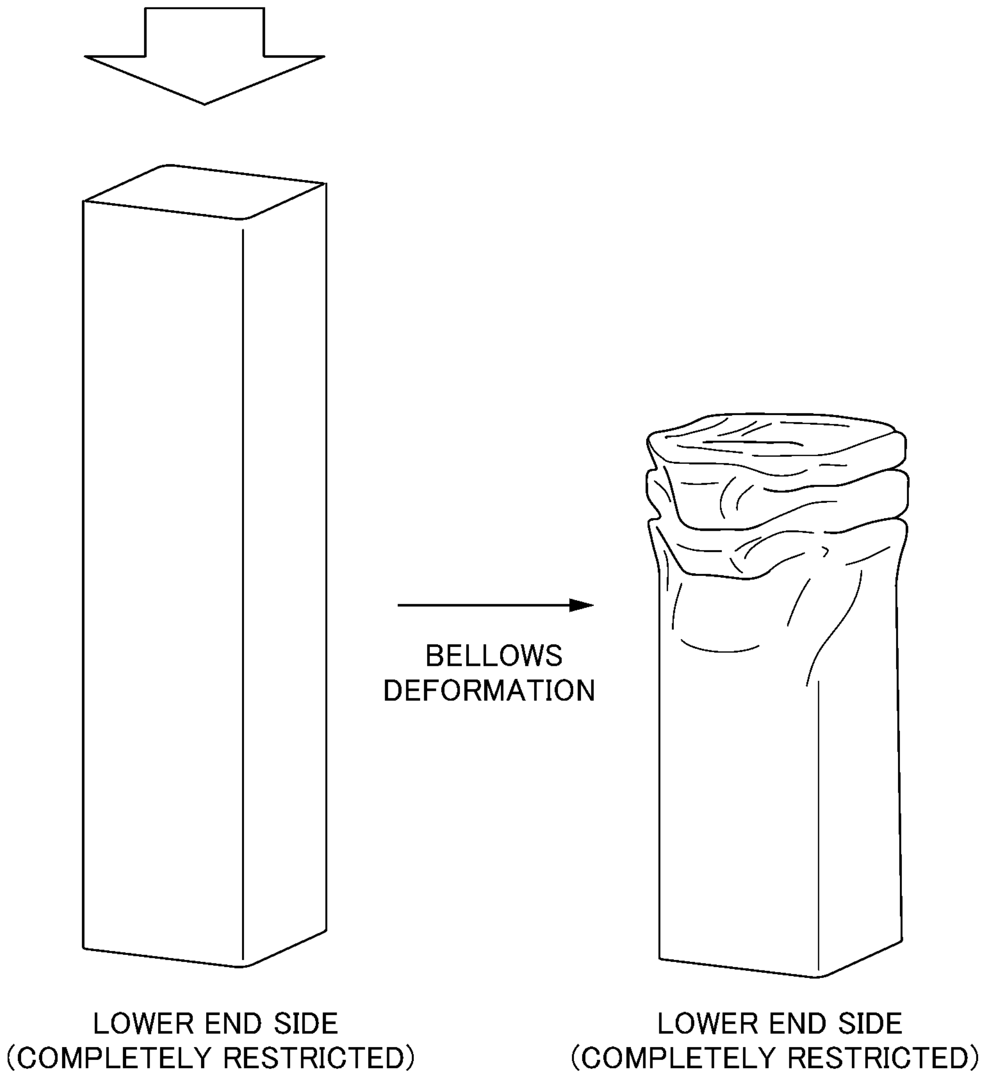
FIG. 23 is a schematic view for explaining an energy absorption amount.

The "amount of energy absorbed" is an amount of energy absorbed calculated from the relationship between the impactor reaction force (load) and the stroke when the frame member is subjected to bellows deformation. Regarding the impactor reaction force (load) and the stroke, in a state in which the frame member is disposed so that the longitudinal direction thereof is in the vertical direction, and a lower end side is completely restricted as shown in FIG. 23, a rigid flat impactor is allowed to collide with the frame member in a direction of the white arrow from the upper end side, and thus the impactor reaction force and the stroke can be obtained.

The "energy absorption efficiency" is an amount of energy absorbed per cross-section area (sheet thickness×cross section line length) of the frame member. In a case where the frame member does not have a uniform cross section in the longitudinal direction, the energy absorption efficiency is an amount of energy absorbed per cross-section area (sheet thickness×cross section line length) in a closed cross section where the cross-section area (sheet thickness×cross section line length) is minimum in a closed cross section perpendicular to the longitudinal direction of the member.

Figure 24:
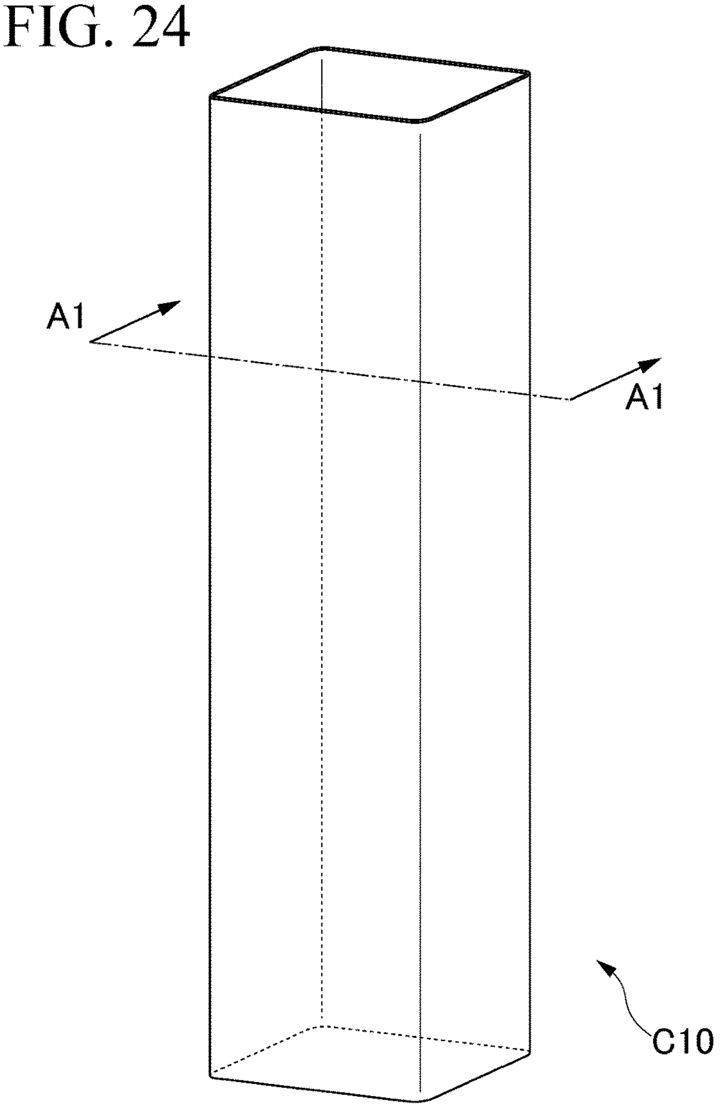
FIG. 24 is a perspective view showing a frame member C10 according to one embodiment of the Element Technology C.

FIG. 24 is a perspective view of the frame member C10. The frame member C10 is a member having a hollow tube shape extending in the longitudinal direction.

Figure 25:
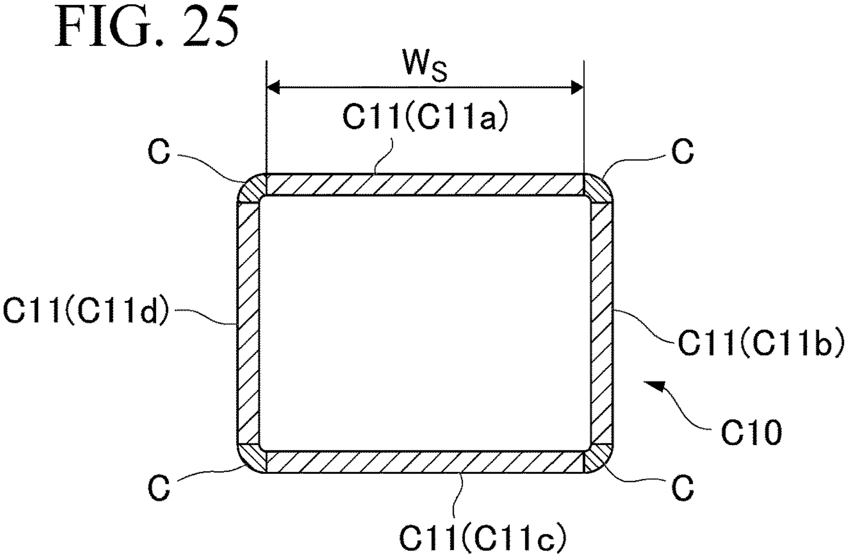
FIG. 25 is a cross-sectional view along the cutting-plane line A1-A1 of FIG. 24.

FIG. 25 is a cross-sectional view along the cutting-plane line A1-A1 of FIG. 24. As shown in FIG. 25, the frame member C10 has a substantially rectangular closed cross section portion formed by four flat parts C11 and four corner parts C.

Specifically, the closed cross section portion is formed by being provided with a first flat part C11_a_, a second flat part C11_b_ which is connected to the first flat part C11_a_ via a corner part C, a third flat part C11_c_ which is connected to the second flat part C11_b_ via a corner part C, and a fourth flat part C11_d_ which is connected to the third flat part C11_c_ via a corner part C, and by connecting the fourth flat part C11_d_ to the first flat part via a corner part C.

All the four corner parts C have the same radius of curvature r. For example, in a case where the maximum external dimension is 140 mm, the radius of curvature r may be 140 mm or less. The radii of curvature of the four corner parts C do not need to be the same, and may be different from each other. The upper limit of the radius of curvature is not particularly specified. However, a part having a radius of curvature larger than the maximum external dimension of the cross section is not regarded as a corner part, but as a separate flat part or a part of an adjacent flat part. Therefore, it can be said that the upper limit of the radius of curvature of the corner part C is substantially "less than the maximum external dimension of the cross section".

In the present application, the reference flat part is defined as a flat part where the effective width ratio is maximum in the flat part of the closed cross section portion.

The first flat part C11_a_, the second flat part C11_b_, the third flat part C11_c_, and the fourth flat part C11_d_ all have the same yield stress $\sigma_y$, Young's modulus E, sheet thickness t, and Poisson's ratio ν.

Accordingly, the effective width ratio in each flat part C11 calculated by width W/effective width $W_e$ is determined depending only on the width W of each flat part C11.

Therefore, in the present embodiment, the first flat part C11_a_ and the third flat part C11_c_ having the largest width W in the closed cross section portion are set as the reference flat parts.

In the reference flat part, when the frame member C10 receives a compression force in the axial direction, elastic buckling is most likely to occur in the initial stage of deformation. Accordingly, in a case where a width $W_S$ of the reference flat part is too large, a required proof stress cannot be obtained, and it becomes difficult to exhibit excellent energy absorption efficiency. Accordingly, the upper limit of the width $W_S$ of the reference flat part is set to 2.0 times or less the effective width $W_e$.

The lower limit of the width $W_S$ of the reference flat part is not particularly set. However, in a case where the width $W_S$ of the reference flat part is too small, the area of the closed cross section portion of the frame member C10 is reduced, and it becomes difficult to ensure the proof stress.

Accordingly, the width $W_S$ of the reference flat part is preferably 0.1 times or greater the effective width $W_e$.

The sheet thickness of the reference flat part is preferably 4.2 mm or less from the viewpoint of weight reduction.

Meanwhile, in a case where the sheet thickness of the reference flat part is less than 0.4 mm, elastic buckling is likely to occur in the reference flat part, and thus the limitation of the setting range of the width $W_S$ of the reference flat part is increased. Accordingly, the sheet thickness of the reference flat part is preferably 0.4 mm or greater.

The frame member C10 is formed by forming a steel sheet for hot stamping into a predetermined shape by hot stamping and by then joining end surfaces together. The frame member C10 formed as described above has a strength of 1.5 GPa or greater in terms of tensile strength. In addition, since the frame member is formed as described above, the Vickers hardness of the thickness middle portion of the reference flat part in the frame member C10 is 300 Hv or greater in a hardness test performed by the method described in JIS Z 2244: 2009 with a test load of 300 gf (2.9 N).

In the present application, since excellent energy absorption efficiency is exhibited by increasing the deformability on the premise of an increase of the strength, the hardness of the thickness middle portion of the reference flat part is specified to be 300 Hv or greater in terms of Vickers hardness.

The upper limit of the hardness of the thickness middle portion is not particularly specified, but may be 900 Hv or less in terms of Vickers hardness.

A method of measuring the hardness of the thickness middle portion is as follows.

A sample having a cross section perpendicular to the sheet surface is collected from the frame member. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244: 2009. After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water. The hardness test is performed by the method disclosed in JIS Z 2244: 2009. Hardness is measured using a micro-Vickers hardness tester at 30 points that are arranged at intervals of three times or more the indentation under a load of 300 gf in the position at a depth of 3/8 of the sheet thickness of the sample, and the average value of the measured values is defined as the hardness of the thickness middle portion.

As described above, in a case where the width $W_S$ of the reference flat part is 2.0 times or less the effective width $W_e$, elastic buckling can be suppressed. However, in a high-strength material, e.g., a hot-stamped material (hot-stamped formed body) having a tensile strength of 1.5 GPa or greater, in a case where the bending performance is insufficient, fracture occurs during bellows deformation due to a load in an axial direction even in a case where elastic buckling can be suppressed by controlling the effective width $W_e$, whereby excellent energy absorption efficiency cannot be obtained.

In the related art, the standard deviation of hardness frequency distribution in the thickness middle portion and the standard deviation of hardness frequency distribution in the surface layer portion in the reference flat part are almost the same, and the hardness standard deviation ratio is 1.0.

However, in the frame member C10 according to the present embodiment, the bending performance is increased by appropriately controlling the ratio between the standard deviation of hardness frequency distribution in the thickness middle portion and the standard deviation of hardness frequency distribution in the surface layer portion in the reference flat part.

Accordingly, even in a case where a high-strength material is applied, fracture during bellows deformation is suppressed, and it is possible to exhibit significantly excellent energy absorption efficiency compared to the related art.

Specifically, in the frame member C10 according to the present embodiment, the hardness standard deviation ratio which is a value obtained by dividing the standard deviation of hardness frequency distribution in the surface layer portion by the standard deviation of hardness frequency distribution in the thickness middle portion in the reference flat part is controlled to be less than 1.0.

The present inventors have found through experiments that in a case where the hardness standard deviation ratio is less than 1.0 in applying a hot-stamped material having a tensile strength of 1.5 GPa or greater, the maximum bending angle in a VDA bending test based on the VDA standard (VDA238-100) specified by the German Association of the Automotive Industry can be considerably improved.

Figure 26:
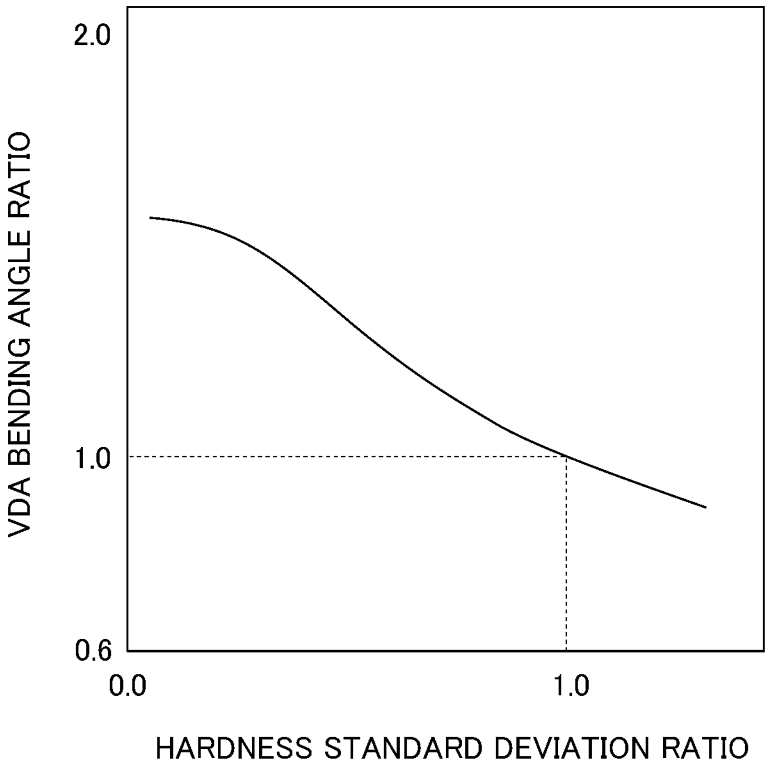
FIG. 26 is a graph showing a relationship between a hardness standard deviation ratio and a VDA bending angle ratio in a VDA bending test with respect to a 2.0 GPa-grade material.

FIG. 26 is a graph showing the results of the VDA bending test using a steel sheet of a 2.0 GPa-grade material with a thickness of 1.4 mm. It is found that the less the hardness standard deviation ratio is than 1.0, the larger the maximum bending angle (°) in the VDA bending test and the higher the VDA bending angle ratio. That is, in a case where the hardness standard deviation ratio is less than 1.0, fracture hardly occurs during bellows deformation due to a load in an axial direction, and excellent energy absorption efficiency can be exhibited.

Accordingly, the hardness standard deviation ratio is preferably less than 0.95, and more preferably less than 0.80.

The hardness standard deviation ratio is preferably as small as possible, but even in a case where the hardness standard deviation ratio is less than 0.01, the bendability increase effect is saturated. Accordingly, the hardness standard deviation ratio is preferably 0.01 or greater.

Here, the hardness frequency distribution in the thickness middle portion and the hardness frequency distribution in the surface layer portion are acquired by a Vickers hardness test.

A sample having a cross section perpendicular to the sheet surface is collected from the frame member. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244: 2009.

After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water.

The measurement surface mirror-finished as described above is subjected to the hardness test by the method described in JIS Z 2244: 2009.

The hardness in the surface layer portion is measured using a micro-Vickers hardness tester.

Hardness is measured at 30 points that are arranged at intervals of three times or more the indentation under a load of 300 gf, and the hardness frequency distribution in the surface layer portion is obtained.

Similarly, in the depth position of ⅜ of the sheet thickness, hardness is measured at 30 points that are arranged at intervals of three times or more the indentation under a load of 300 gf, and the hardness frequency distribution in the thickness middle portion is obtained.

In addition, a known statistical method is used to obtain the standard deviations of the hardness frequency distribution in the surface layer portion and the hardness frequency distribution in the thickness middle portion, obtained as a result of the Vickers hardness test described above.

In a case where the metallographic structure is the same in a thickness middle portion and a surface layer portion of a steel sheet for hot stamping as in the related art, the hardness frequency distribution in the surface layer portion is the same as the hardness frequency distribution in the thickness middle portion, and the hardness standard deviation ratio is 1.0.

Meanwhile, in a case where the metallographic structure in only the surface layer portion and the vicinity thereof is modified, the hardness standard deviation ratio becomes a value different from 1.0.

In the frame member C10 formed of a steel sheet for hot stamping according to the present embodiment, in a case where the metallographic structure in only the surface layer portion and the vicinity thereof is modified, the distribution and unevenness of the hardness in the surface layer portion are suppressed, and the hardness standard deviation ratio between the surface layer portion and the thickness middle portion can be made less than 1.0.

Specifically, the hardness standard deviation ratio can be controlled by adjusting a highest heating temperature and a holding time in decarburization annealing of the steel sheet for hot stamping, which is a known technology. As for preferable conditions of the decarburization annealing, the decarburization annealing temperature (maximum attainment temperature of the steel sheet) is 700° C. to 950° C., and the residence time in a temperature range of 700° C. to 950° C. is 5 seconds to 1,200 seconds under a moist atmosphere containing hydrogen, nitrogen, or oxygen.

In addition, in a case where the annealing temperature is set to a higher temperature range and the residence temperature is narrowed to a longer time range within the above condition ranges, the hardness standard deviation ratio can be made less than 0.80.

At least one surface layer portion of the frame member C10 may satisfy the above hardness standard deviation ratio condition. However, it is preferable that the surface layer portions on both sides of the frame member C10 satisfy the above hardness standard deviation ratio condition.

As described above, according to the frame member C10 of the present embodiment, in the reference flat part, elastic buckling is suppressed by controlling the width $W_S$ of the reference flat part, and fracture during bellows deformation can be suppressed by controlling the hardness standard deviation ratio.

Accordingly, the energy absorption efficiency can be significantly improved while the thickness middle portion of the reference flat part has sufficient hardness of 300 Hv or greater in terms of Vickers hardness.

Although the preferable embodiments of the Element Technology C have been described in detail with reference to the accompanying drawings, the Element Technology C is not limited to such examples.

It is apparent that a person having common knowledge in the technical field to which the Element Technology C belongs is able to devise various changes or modifications within the scope of the technical idea of the present application, and it should be understood that such examples belong to the technical scope of the Element Technology C as a matter of course.

Figure 27:
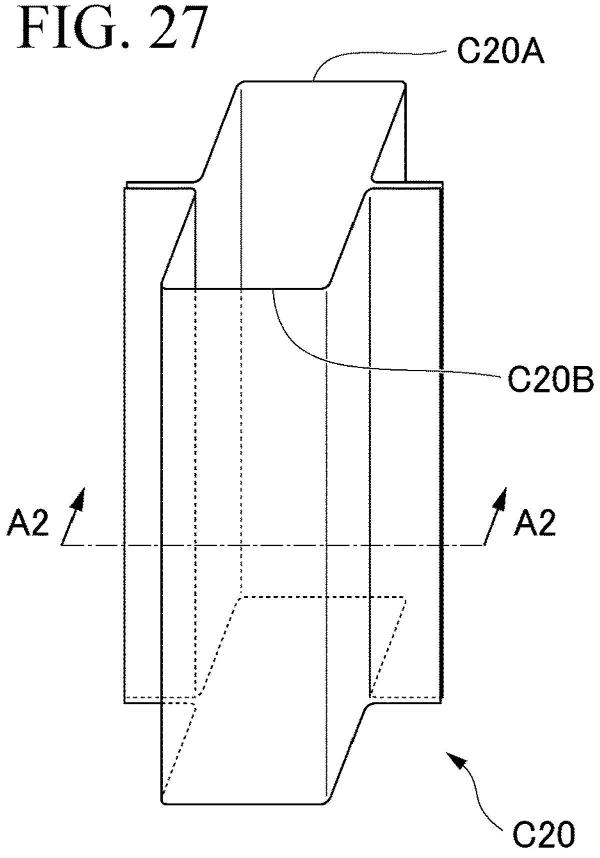
FIG. 27 is a perspective view showing a frame member C20 according to a modification example.

For example, the frame member C10 described above is formed of a single member, but may be formed of a plurality of members. FIG. 27 is a perspective view showing a frame member C20 according to a modification example, and FIG. 28 is a cross-sectional view along the cutting-plane line A2-A2 of FIG. 27.

The frame member C20 includes a first frame member C20A extending in a longitudinal direction and a second frame member C20B extending in the longitudinal direction and joined to the first frame member C20A. A closed cross section portion is formed by the first frame member C20A and the second frame member C20B.

The first frame member C20A is a member having an open cross section, which is provided by subjecting a steel sheet having a sheet thickness of 1.2 mm to hot stamp forming so that the cross section perpendicular to the longitudinal direction has a substantially hat shape.

Figure 28:
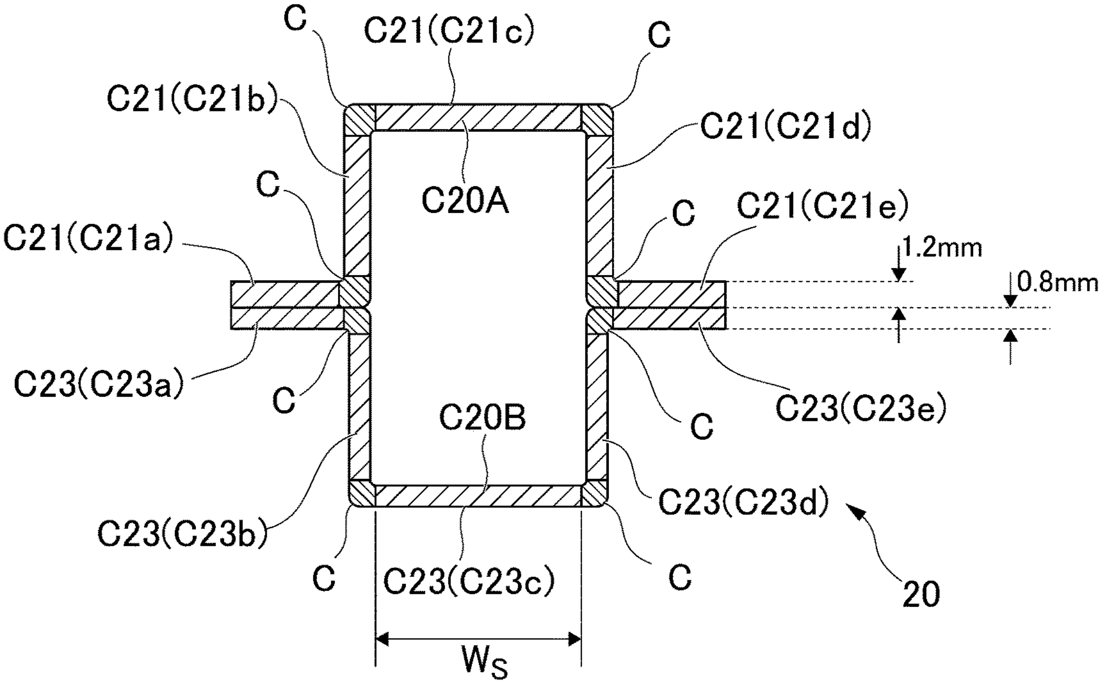
FIG. 28 is a cross-sectional view along the cutting-plane line A2-A2 of FIG. 27.

As shown in FIG. 28, a cross section portion of the first frame member C20A perpendicular to the longitudinal direction is provided with five flat parts C21 and four corner parts C.

Specifically, the cross section portion of the first frame member C20A perpendicular to the longitudinal direction is provided with a first flat part C21*a*, a second flat part C21*b* which is connected to the first flat part C21*a* via a corner part C, a third flat part C21*c* which is connected to the second flat part C21*b* via a corner part C, a fourth flat part C21*d* which is connected to the third flat part C21*c* via a corner part C, and a fifth flat part C21*e* which is connected to the fourth flat part C21*d* via a corner part C.

The second frame member C20B is a member having an open cross section, which is provided by subjecting a steel sheet having a sheet thickness of 0.8 mm to hot stamp forming so that the cross section perpendicular to the longitudinal direction has a substantially hat shape.

As shown in FIG. 28, a cross section portion of the second frame member C20B perpendicular to the longitudinal direction is provided with five flat parts C23 and four corner parts C.

Specifically, the cross section portion of the second frame member C20B perpendicular to the longitudinal direction is provided with a first flat part C23*a*, a second flat part C23*b* which is connected to the first flat part C23*a* via a corner part C, a third flat part C23*c* which is connected to the second flat part C23*b* via a corner part C, a fourth flat part C23*d* which is connected to the third flat part C23*c* via a corner part C, and a fifth flat part C23*e* which is connected to the fourth flat part C23*d* via a corner part C.

In addition, the first flat part C21*a* and the fifth flat part C21*e* of the first frame member C20A are joined to the first flat part C23*a* and the fifth flat part C23*e* of the second frame member C20B by spot welding.

With such a configuration, the frame member C20 has a closed cross section portion in the cross section perpendicular to the longitudinal direction.

In the present application, the reference flat part is defined as a flat part where the effective width ratio is maximum in the flat part of the closed cross section portion.

The flat part C21 of the first frame member C20A and the flat part C23 of the second frame member C20B all have the same yield stress $\sigma_y$, Young's modulus E, and Poisson's ratio ν. Accordingly, the effective width ratios in the flat parts C21, C23 calculated by width W/effective width $W_e$ are determined depending on the width W and the sheet thickness t of the flat parts C21, C23.

In this closed cross section portion, the third flat part C21*c* of the first frame member C20A and the third flat part C23*c* of the second frame member C20B both are flat parts having the maximum width among all the flat parts C21, C23. However, since the third flat part C23*c* of the second frame member C20B has a smaller sheet thickness than the third flat part C21*c* of the first frame member C20A, the third flat part C23*c* of the second frame member C20B has the largest effective width ratio. Accordingly, the third flat part C23*c* of the second frame member C20B is the reference flat part.

Accordingly, in the frame member C20 according to the modification example, by controlling the Vickers hardness of the thickness middle portion to 300 Hv or greater, controlling the width $W_S$ to 2.0 times or less the effective width $W_e$, and controlling the standard deviation ratio to a value smaller than 1.0 in the third flat part C23*c* of the second frame member C20B which is the reference flat part, excellent energy absorption efficiency can be exhibited.

The frame member C10 has a substantially rectangular cross-sectional shape in which the sides facing each other have the same width, but may have a substantially square cross-sectional shape in which the four flat parts C11 have the same width.

The number of the flat parts C11 is not particularly limited, and may be at least one.

In addition, the frame member C10 according to the embodiment has a uniform cross-sectional shape over the whole length, but may not have a uniform cross-sectional shape over the whole length. A closed cross section where the cross-section area (sheet thickness×cross section line length) is minimum in the closed cross section perpendicular to the longitudinal direction of the member may be the above-described closed cross section portion, and may be present in a part of the whole length in the longitudinal direction. The closed cross section portion is present in preferably 50% or greater, and more preferably 80% or greater of the whole length in the longitudinal direction.

Figure 29:
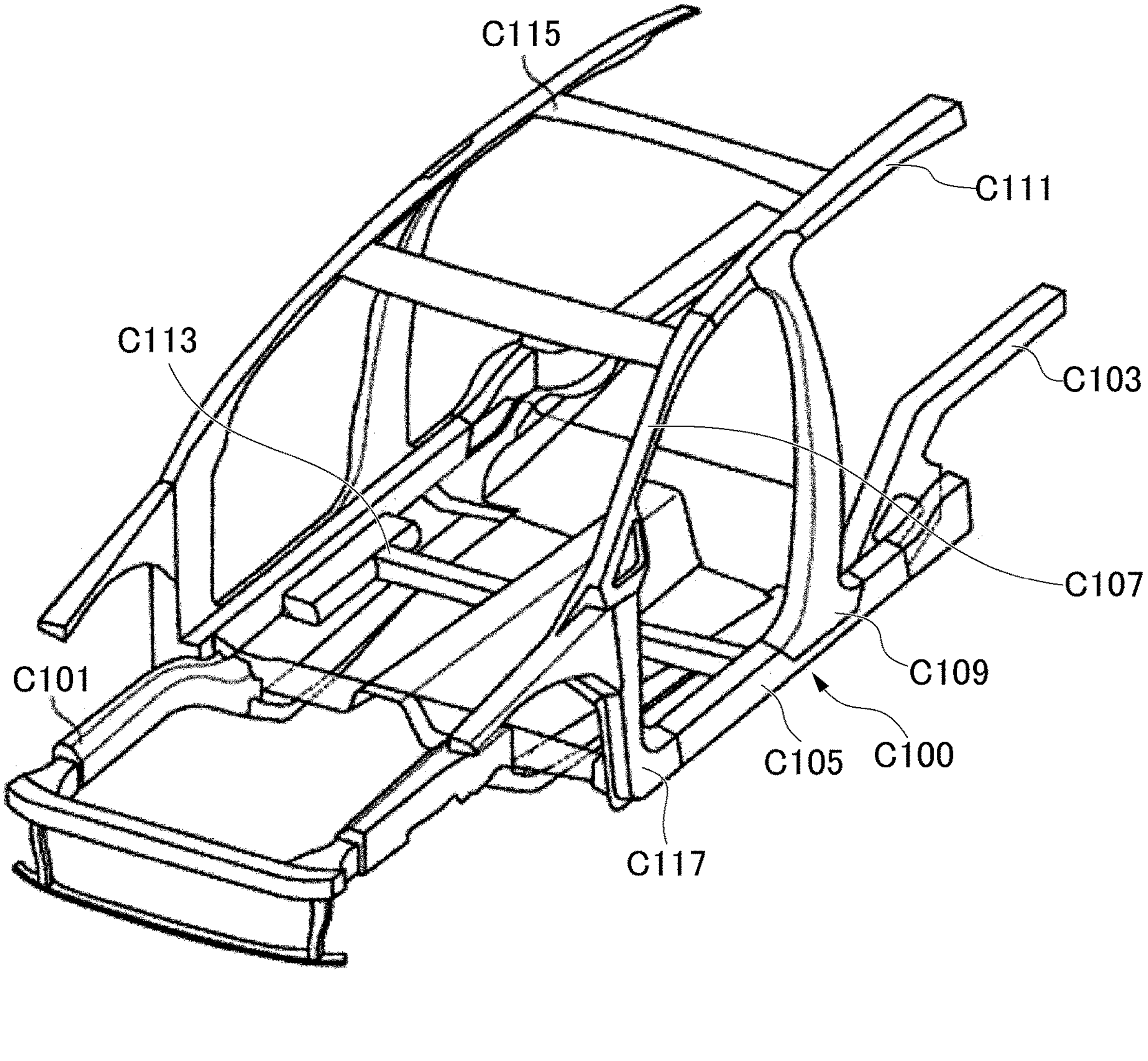
FIG. 29 is a perspective view showing a vehicle frame C100 as an example to which a structural member is applied.

The frame members C10, C20 are applied to members to which a compression input is to be applied mainly in the axial direction at the time of the collision, among structural members of a vehicle body. FIG. 29 is a view showing a vehicle frame C100 as an example to which the frame members C10, C20 are applied.

Referring to FIG. 29, the frame members C10, C20 can be applied to a frontside member C101, a rearside member C103, a side sill C105, an A pillar C107, a B pillar C109, a roof rail C111, a floor cross C113, a roof cross C115, and an under reinforcement C117 among structural members of a vehicle body.

EXAMPLES

A steel sheet A, a steel sheet B, and a steel sheet C having a sheet thickness of 1.6 mm were prepared.

In decarburization annealing of the steel sheet B and the steel sheet C, the decarburization annealing temperature (maximum attainment temperature of the steel sheet) was set to 700° C. to 900° C., and the residence time in a temperature range of 700° C. to 900° C. was set to 60 to 600 seconds under a moist atmosphere provided by mixing hydrogen and nitrogen, to modify the metallographic structure in only a surface layer portion and the vicinity thereof.

The steel sheet A, the steel sheet B, and the steel sheet C were subjected to hot stamp forming by being heated, held in a temperature range of 900° C., and rapidly cooled in a die and punch, end surfaces were welded to each other, and thus rectangular tube members of 300 mm in height, formed of the steel sheets, were obtained.

In the steel sheet A, the metallographic structure was the same in a thickness middle portion and a surface layer portion. Therefore, the standard deviation of hardness frequency distribution in the thickness middle portion in the reference flat part and the standard deviation of hardness frequency distribution in the surface layer portion in the reference flat part were the same, and the hardness standard deviation ratio was 1.0. Meanwhile, in the steel sheet B and the steel sheet C, the metallographic structure in the thickness middle portion was not modified, but the metallographic structure in the surface layer portion was modified to change the hardness frequency distribution in the surface layer portion, so that the standard deviation in the surface layer portion was adjusted. As a result, the hardness standard deviation ratio of the surface layer portion to the thickness middle portion in the reference flat part of the steel sheet B was 0.65, and the hardness standard deviation ratio in the reference flat part of the steel sheet C was 0.80.

Table 11 shows material characteristics in the flat parts after hot stamping.

TABLE 11

| Steel Sheet Used | Tensile Strength | Yield stress $\sigma_y$ (MPa) | Young's modulus E (MPa) | Poisson's ratio ν | Sheet Thickness (mm) | Hardness in Center in Sheet Thickness (Hv) | Hardness Standard Deviation in Thickness Middle Portion | Hardness Standard Deviation in Surface Layer Portion | Hardness Standard Deviation Ratio | Effective Width $W_c$ (mm) |
|---|---|---|---|---|---|---|---|---|---|---|
| Steel Sheet A (Material of Related Art) | 1500 MPa | 1163 | 205800 | 0.3 | 1.6 | 521 | 8.2 | 8.2 | 1.0 | 40 |
| Steel Sheet B (Modified Material) | 1500 MPa | 1163 | 205800 | 0.3 | 1.6 | 521 | 8.2 | 5.3 | 0.65 | 40 |
| Steel Sheet C (Modified Material) | 1500 MPa | 1163 | 205800 | 0.3 | 1.6 | 521 | 8.2 | 6.6 | 0.80 | 40 |

Figure 30:
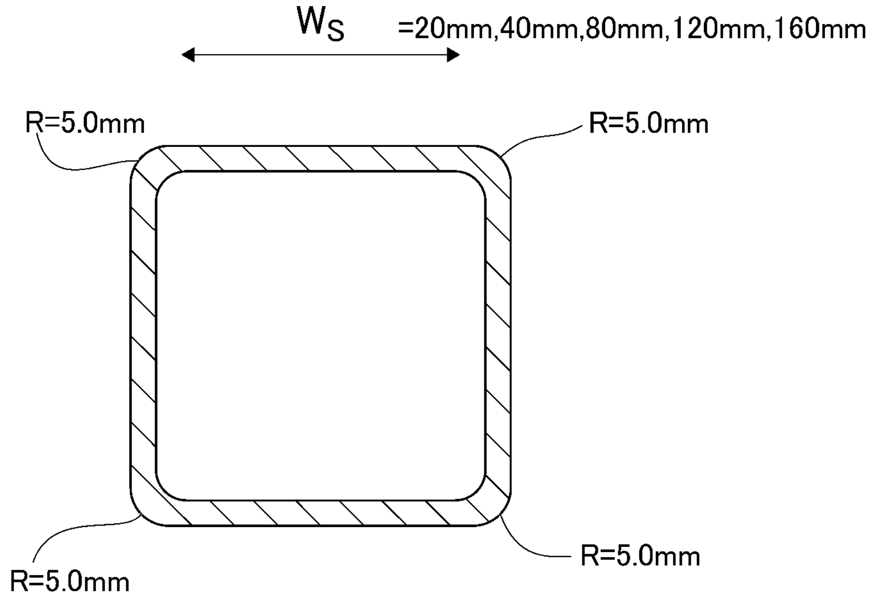
FIG. 30 is a schematic view for explaining a cross-sectional shape of a rectangular tube member used in examples.

As shown in FIG. 30, a cross section of the rectangular tube member perpendicular to the longitudinal direction was designed to have a substantially square shape in which four flat parts had the same width. That is, in each rectangular tube member, all of the four flat parts are reference flat parts where the effective width ratio is maximum. On the premise of such conditions, a width $W_S$ of the reference flat part was set for each experimental example.

The radii of curvature of four corner portions C were all designed to be 5 mm.

A rigid flat impactor was allowed to collide with each of the rectangular tube members at a speed of 90 km/h from the upper end side in a state in which the lower end side was completely restricted, and the deformation states at the time of the collision, the states in which fracture occurred, and the absorbed energy calculated from the impactor reaction force (load) and the stroke were compared. Table 12 shows the setting conditions and the results for each experimental example.

TABLE 12

| Experiment No. | Steel Sheet Used | Width $W_s$ (mm) | Effective Width Ratio | Cross Section Area (mm$^2$) | Deformation Continuation Stroke (mm) | Absorbed Energy (kJ) | Energy Absorption Efficiency (kJ/mm$^2$) |
|---|---|---|---|---|---|---|---|
| No. 1A | A | 20 | 0.5 | 178 | 35 | 4.4 | 24.9 |
| No. 1B | B | 20 | 0.5 | 178 | 150 | 11.3 | 63.3 |
| No. 2A | A | 40 | 1.0 | 306 | 40 | 6.7 | 22.0 |
| No. 2B | B | 40 | 1.0 | 306 | 150 | 13.3 | 43.6 |
| No. 3A | A | 80 | 2.0 | 562 | 80 | 14.1 | 25.1 |
| No. 3B | B | 80 | 2.0 | 562 | 150 | 17.0 | 30.3 |
| No. 3C | C | 80 | 2.0 | 562 | 150 | 16.2 | 28.8 |
| No. 4A | A | 120 | 3.0 | 818 | 150 | 19.8 | 24.2 |
| No. 4B | B | 120 | 3.0 | 818 | 150 | 21.4 | 26.1 |
| No. 5A | A | 160 | 4.0 | 1074 | 150 | 27.1 | 25.2 |
| No. 5B | B | 160 | 4.0 | 1074 | 150 | 27.3 | 25.4 |

Figure 31:
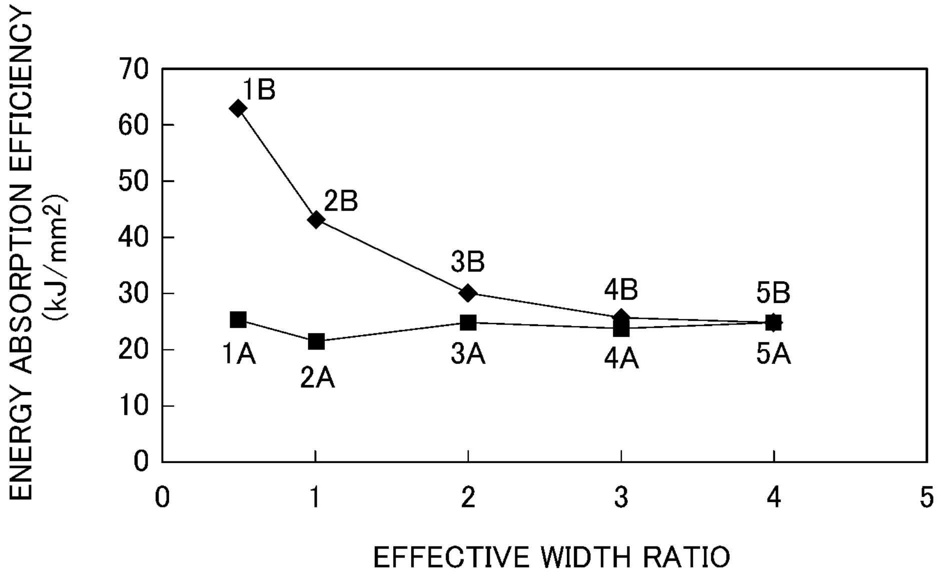
FIG. 31 is a graph in which a relationship between an effective width ratio and energy absorption efficiency in experimental examples is plotted.

FIG. 31 is a graph for comparison of the energy absorption efficiency relative to the effective width ratio based on the experimental results shown in Table 12. As shown in this graph, the energy absorption efficiency is not improved only by reducing the effective width ratio. However, it is found that in a case where the hardness standard deviation ratio is appropriately controlled as in the present application, the energy absorption efficiency is significantly improved by reducing the effective width ratio.

(Element Technology D)

Element technology D includes: a steel sheet substrate; and a coating containing Al and Fe formed on a surface of the steel sheet substrate, in which the steel sheet substrate contains, as a chemical composition, by mass %, C: 0.10% to 0.65%, Si: 0.10% to 2.00%, Mn: 0.30% to 3.00%, P: 0.050% or less, S: 0.0100% or less, N: 0.010% or less, O: 0.010% or less, Ti: 0% to 0.100%, B: 0% to 0.0100%, Cr: 0% to 1.00%, Mo: 0% to 1.00%, Ni: 0% to 1.00%, Nb: 0% to 0.10%, Cu: 0% to 1.00%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder including Fe and impurities, the steel sheet substrate includes a decarburized layer formed on a side of the coating, the decarburized layer includes an internal oxidized layer formed on the side of the coating, a depth of the decarburized layer from an interface between the steel sheet substrate and the coating is 30 μm or more, a depth of the internal oxidized layer from the interface is less than 20 μm, and no scale is included between the steel sheet substrate and the coating containing Al and Fe.

According to the element technology D, it is possible to provide a steel member (including a coated steel member) having high strength and excellent bendability and weldability and a steel sheet suitable as a material for the steel member.

Hereinafter, a steel sheet (a steel sheet according to the present embodiment) and a steel member (including a coated steel member) (a steel member according to the present embodiment) according to an element technology D, and a preferable manufacturing method thereof will be described.

Figure 32:
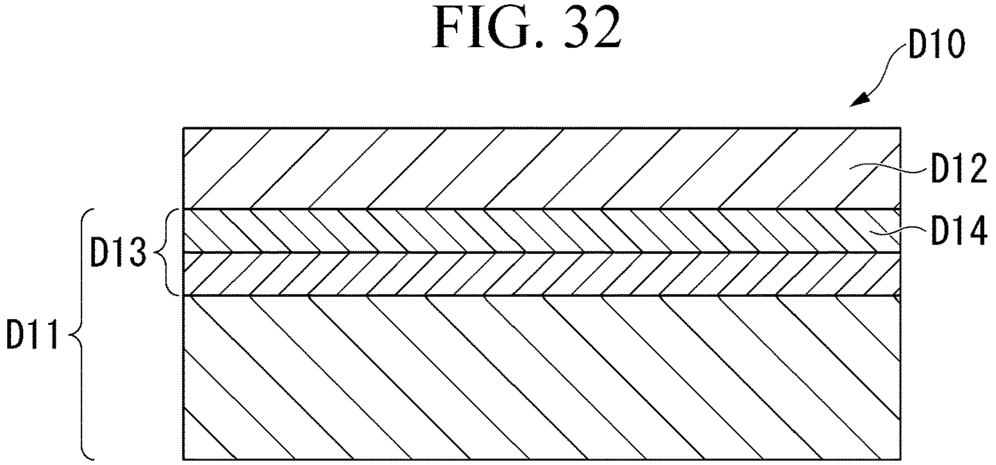
FIG. 32 is a schematic view showing an example of a steel sheet according to the present embodiment.

Next, the steel sheet according to the present embodiment will be described. As shown in FIG. 32, a steel sheet D10 according to the present embodiment includes a base steel sheet D11 having a chemical composition described below and a scale D12 formed on a surface of the base steel sheet D11 and containing 80 mass % or more of Fe. In addition, the base steel sheet D11 has a decarburized layer D13 having a predetermined depth on a side of an interface (a region in contact with an interface) with the scale D12, and the decarburized layer D13 has an internal oxidized layer D14 on the side of the interface between the base steel sheet D11 and the scale D12.

Although only the scale on one surface is shown in FIG. 32, the scale may be formed on both surfaces. In this case, the decarburized layer D13 and the internal oxidized layer D14 are formed on regions in contact with both interfaces of the base steel sheet D11 with the scale.

In the present embodiment, a "scale side" indicates a "scale side in a sheet thickness direction of the base steel sheet", and the "side of the interface with the scale" indicates an "side of the interface (a region in contact with the interface)" between the base steel sheet and the scale in the sheet thickness direction of the base steel sheet.

<Base Steel Sheet>

[Chemical Composition]

In a numerically limited range including "to" described below, values on both sides are included in the range as a lower limit and an upper limit. Numerical values indicating "more than" or "less than" do not fall within the numerical range. "%" regarding an amount of each element indicates "mass %" unless otherwise specified.

C: 0.10% to 0.65%

C is an element that enhances hardenability of steel and improves strength of the steel member after hot stamping (obtained by performing hot stamping on the steel sheet). However, when a C content is less than 0.10%, it becomes difficult to secure sufficient strength (more than 1.0 GPa) in the steel member after hot stamping (the steel member obtained by performing hot stamping on the steel sheet). Therefore, the C content is set to 0.10% or more. The C content is preferably 0.15% or more, and more preferably 0.26% or more.

On the other hand, when the C content is more than 0.65%, the strength of the steel member after hot stamping becomes too high, and deterioration of bendability becomes significant. In addition, weldability also deteriorates. Therefore, the C content is set to 0.65% or less. The C content is preferably 0.60% or less.

Si: 0.10% to 2.00%

Si is an element that is effective for enhancing the hardenability of steel and stably securing the strength of the steel member after hot stamping. In order to obtain this effect, a Si content needs to be set to 0.10% or more. The Si content is preferably 0.35% or more.

On the other hand, when the Si content in the steel sheet is more than 2.00%, a heating temperature required for austenitic transformation becomes significantly high during a heat treatment. This may lead to an increase in a cost required for the heat treatment. Furthermore, when the Si content is more than 2.00%, toughness of a quenched portion deteriorates. Therefore, the Si content is set to 2.00% or less. The Si content is preferably 1.60% or less.

Mn: 0.30% to 3.00%

Mn is an element that is very effective for enhancing the hardenability of steel and stably securing the strength of the steel member after hot stamping. Mn is an element that further lowers an Ac3 point and promotes lowering of a quenching treatment temperature. In addition, Mn is an element having an effect of improving corrosion resistance by being diffused into an Al—Fe-based coating. When a Mn content is less than 0.30%, these effects are not sufficient, so that the Mn content is set to 0.30% or more. The Mn content is preferably 0.40% or more.

On the other hand, when the Mn content is more than 3.00%, the above effects are saturated, and the toughness and bendability of the quenched portion deteriorate. Therefore, the Mn content is set to 3.00% or less. The Mn content is preferably 2.80% or less, and more preferably 2.50% or less.

P: 0.050% or Less

P is an element that deteriorates toughness of the steel member after hot stamping. In particular, when a P content is more than 0.050%, the deterioration of toughness becomes significant. Therefore, the P content is limited to 0.050% or less. The P content is preferably limited to 0.005% or less. Since the P content is preferably as small as possible, the P content may be 0%. However, from the viewpoint of cost, the P content may be set to 0.001% or more.

S: 0.0100% or Less

S is an element that deteriorates the toughness and bendability of the steel member after hot stamping. In particular, when a S content is more than 0.0100%, the deterioration of the toughness and bendability becomes significant. Therefore, the S content is limited to 0.0100% or less. The S content is preferably limited to 0.0050% or less. Since the S content is preferably as small as possible, the S content may be 0%. However, from the viewpoint of cost, the S content may be set to 0.0001% or more.

N: 0.010% or Less

N is an element that deteriorates the toughness of the steel member after hot stamping. In particular, when a N content is more than 0.010%, coarse nitrides are formed in the steel, and the toughness is significantly deteriorated. Therefore, the N content is set to 0.010% or less. A lower limit of the N content does not need to be particularly limited and may be 0%. However, setting the N content to less than 0.0002% leads to an increase in steelmaking cost and is economically undesirable. Therefore, the N content may be set to 0.0002% or more, or 0.0008% or more.

O: 0.010% or Less

O is an element that deteriorates the toughness of the steel member after hot stamping. In particular, when an O content is more than 0.010%, coarse oxides are formed in the steel, and the toughness is significantly deteriorated. Therefore, the O content is set to 0.010% or less. A lower limit of the O content does not need to be particularly limited and may be 0%. However, setting the O content to less than 0.0002% leads to an increase in steelmaking cost and is economically undesirable. Therefore, the O content may be set to 0.0002% or more, or 0.0008% or more.

In order to improve the strength, toughness, bendability, corrosion resistance, and deoxidation, the steel member according to the present embodiment may also contain one or more elements selected from Ti, B, Cr, Mo, Ni, Nb, Cu, V, Ca, Mg, Al, Sn, W, Sb, Zr, Co, and REM described below, in addition to the above elements. These elements are optional elements and do not necessarily have to be contained. Therefore, lower limits thereof are 0%.

Ti: 0 to 0.100%

Ti is an element having an action of suppressing recrystallization when the steel sheet is subjected to a heat treatment by being heated to a temperature of the Ac3 point or higher, and suppressing grain growth by forming fine carbides, thereby refining austenite grains. Therefore, by including Ti, an effect of greatly improving the toughness of the steel member after hot stamping can be obtained. In addition, Ti is an element that suppresses consumption of B due to precipitation of BN by being preferentially bonded to N in the steel and promotes an effect of improving the hardenability by B, which will be described later. Therefore, Ti may be contained. In a case of sufficiently obtaining the above effects, a Ti content is preferably set to 0.010% or more. The Ti content is more preferably 0.020% or more.

On the other hand, when the Ti content is more than 0.100%, the amount of TiC precipitated increases and C is consumed, resulting in a decrease in the strength of the steel member after hot stamping. Therefore, the Ti content is set to 0.100% or less. The Ti content is preferably 0.080% or less.

B: 0% to 0.0100%

B is an element having an action of dramatically improving the hardenability of the steel even in a small amount. In addition, B is an element that strengthens grain boundaries and enhances the toughness by being segregated at the grain boundaries, and is an element that suppresses the growth of austenite grains when the steel sheet is heated. Therefore, B may be contained. In a case of sufficiently obtaining the above effects, a B content is preferably set to 0.0010% or more. The B content is more preferably 0.0020% or more.

On the other hand, when the B content is more than 0.0100%, a large amount of coarse compounds are precipitated, and the toughness of the steel member after hot stamping deteriorates. Therefore, in a case where B is contained, the B content is set to 0.0100% or less. The B content is preferably 0.0080% or less.

Cr: 0% to 1.00%

Cr is an element effective for increasing the hardenability of steel, and stably securing the strength of the steel member after hot stamping. Therefore, Cr may be contained. In a case of obtaining the above effects, a Cr content is preferably set to 0.01% or more. The Cr content is more preferably 0.05% or more, and even more preferably 0.08% or more.

However, when the Cr content is more than 1.00%, the above effects are saturated and the cost increases. Moreover, since Cr has an action of stabilizing iron carbides, when the Cr content is more than 1.00%, there are cases where coarse iron carbides remain undissolved when the steel sheet is heated, and the toughness of the steel member after hot stamping deteriorates. Therefore, in a case where Cr is contained, the Cr content is set to 1.00% or less. The Cr content is preferably 0.80% or less.

Mo: 0% to 1.00%

Mo is an element effective for increasing the hardenability of steel, and stably securing the strength of the steel member after hot stamping. Therefore, Mo may be contained. In a case of obtaining the above effects, a Mo content is preferably set to 0.01% or more. The Mo content is more preferably 0.05% or more.

However, when the Mo content is more than 1.00%, the above effects are saturated and the cost increases. Moreover, since Mo has an action of stabilizing iron carbides, when the Mo content is more than 1.00%, there are cases where coarse iron carbides remain undissolved when the steel sheet is heated, and the toughness of the steel member after hot stamping deteriorates. Therefore, in a case where Mo is contained, the Mo content is set to 1.00% or less. The Mo content is preferably 0.80% or less.

Ni: 0% to 1.00%

Ni is an element effective for increasing the hardenability of steel, and stably securing the strength of the steel member after hot stamping. Therefore, Ni may be contained. In a case of obtaining the above effects, a Ni content is preferably set to 0.01% or more. The Ni content is more preferably 0.10% or more.

However, when the Ni content is more than 1.00%, the above effects are saturated and economic efficiency is lowered. Therefore, in a case where Ni is contained, the Ni content is set to 1.00% or less.

Nb: 0% to 0.10%

Nb is an element having an action of forming fine carbides and increasing the toughness of steel due to the refining effect. Therefore, Nb may be contained. In a case of sufficiently obtaining the above effects, a Nb content is preferably set to 0.02% or more. The Nb content is more preferably 0.03% or more.

On the other hand, when the Nb content is more than 0.10%, the carbides become coarse and the toughness of the steel member deteriorates. Therefore, the Nb content is set to 0.10% or less. The Nb content is preferably 0.08% or less.

Cu: 0% to 1.00%

Cu is an element effective for increasing the hardenability of steel, and stably securing the strength of the steel member after hot stamping. Therefore, Cu may be contained. In addition, Cu is an element having an effect of improving the corrosion resistance of the steel member. In a case of obtaining the above effects, a Cu content is preferably set to 0.01% or more. The Cu content is more preferably 0.05% or more.

However, when the Cr content is more than 1.00%, the above effects are saturated and the cost increases. Therefore, in a case where Cu is contained, the Cu content is set to 1.00% or less. The Cu content is preferably 0.80% or less.

V: 0% to 1.00%

V is an element that forms fine carbides and increases the toughness of steel due to the refining effect. Therefore, V may be contained. In a case of obtaining the above effects, a V content is preferably set to 0.01% or more. The V content is more preferably 0.10% or more.

However, when the V content is more than 1.00%, the above effects are saturated and the economic efficiency is lowered. Therefore, in a case where V is contained, the V content is set to 1.00% or less.

Ca: 0% to 0.010%

Ca is an element having an effect of refining inclusions in steel and improving toughness after hot stamping. Therefore, Ca may be contained. In a case of obtaining the above effects, a Ca content is preferably set to 0.001% or more. The Ca content is more preferably 0.002% or more.

However, when the Ca content is more than 0.010%, the effects are saturated and the cost increases. Therefore, in a case where Ca is contained, the Ca content is set to 0.010% or less. The Ca content is preferably 0.005% or less, and more preferably 0.004% or less.

Mg: 0% to 0.010%

Mg is an element having an effect of refining inclusions in steel and improving the toughness of the steel member after hot stamping. Therefore, Mg may be contained. In a case of obtaining the above effects, a Mg content is preferably set to 0.001% or more. The Mg content is more preferably 0.002% or more.

However, when the Mg content is more than 0.010%, the effects are saturated and the cost increases. Therefore, in a case where Mg is contained, the Mg content is set to 0.010% or less. The Mg content is preferably 0.005% or less, and more preferably 0.004% or less.

Al: 0% to 1.00%

Al is an element generally used as a steel deoxidizing agent. Therefore, Al may be contained. In order to obtain the above effect, an Al content is preferably set to 0.01% or more.

However, when the Al content is more than 1.00%, the above effect is saturated and the economic efficiency is lowered. Therefore, in a case where Al is contained, the Al content is set to 1.00% or less.

Sn: 0% to 1.00%

Sn is an element that improves corrosion resistance in a corrosive environment. Therefore, Sn may be contained. In a case of obtaining the above effect, a Sn content is preferably set to 0.01% or more.

On the other hand, when the Sn content is more than 1.00%, grain boundary strength decreases, and the toughness of the steel member after hot stamping deteriorates. Therefore, in a case where Sn is contained, the Sn content is set to 1.00% or less.

W: 0% to 1.00%

W is an element that makes it possible to increase the hardenability of steel and stably secure the strength of the steel member after hot stamping. Therefore, W may be contained. In addition, W is an element that improves corrosion resistance in a corrosive environment. In a case of obtaining the above effects, a W content is preferably set to 0.01% or more.

However, when the W content is more than 1.00%, the above effects are saturated and the economic efficiency is lowered. Therefore, in a case where W is contained, the W content is set to 1.00% or less.

Sb: 0% to 1.00%

Sb is an element that improves corrosion resistance in a corrosive environment. Therefore, Sb may be contained. In order to obtain the above effect, a Sb content is preferably set to 0.01% or more.

However, when the Sb content is more than 1.00%, the grain boundary strength decreases, and the toughness of the steel member after hot stamping deteriorates. Therefore, in a case where Sb is contained, the Sb content is set to 1.00% or less.

Zr: 0% to 1.00%

Zr is an element that improves corrosion resistance in a corrosive environment. Therefore, Zr may be contained. In order to obtain the above effect, a Zr content is preferably set to 0.01% or more.

On the other hand, when the Zr content is more than 1.00%, the grain boundary strength decreases, and hydrogen embrittlement resistance of the steel member after hot stamping decreases. Therefore, in a case where Zr is contained, the Zr content is set to 1.00% or less.

Co: 0% to 1.00%

Co is an element that improves corrosion resistance in a corrosive environment. Therefore, Co may be contained. In a case of obtaining the above effect, a Co content is preferably set to 0.01% or more.

However, when the Co content is more than 1.00%, the above effect is saturated and the economic efficiency is lowered. Therefore, in a case where Co is contained, the Co content is set to 1.00% or less.

REM: 0% to 0.30%

Like Ca, REM is an element having an effect of refining inclusions in steel and improving the toughness of the steel member after hot stamping. Therefore, REM may be contained. In order to obtain the above effects, a REM content is preferably set to 0.01% or more. The REM content is more preferably 0.02% or more.

However, when the REM content is more than 0.30%, the effects are saturated and the cost increases. Therefore, in a case where REM is contained, the REM content is set to 0.30% or less. The REM content is preferably 0.20% or less.

Here, REM refers to a total of 17 elements of Sc, Y, and lanthanoids such as La and Nd, and the REM content indicates the total amount of these elements. REM is added to molten steel using, for example, an Fe—Si-REM alloy, and this alloy contains, for example, La, Nd, Ce, and Pr.

In the chemical composition of the base steel sheet of the steel sheet of the present embodiment, the remainder other than the elements described above includes Fe and impurities.

Here, the "impurities" are elements that are incorporated due to various factors including raw materials such as ore and scrap and a manufacturing process when the steel sheet is industrially manufactured, and are acceptable in a range without adversely affecting the properties of the steel sheet according to the present embodiment and the steel member according to the present embodiment.

The chemical composition of the base steel sheet can be obtained by the following method.

The chemical composition of the base steel sheet is obtained by cutting out an analysis sample from the base steel sheet and performing elemental analysis such as inductively coupled plasma (ICP) atomic emission spectrometry. In addition, C and S may be measured using a combustion-infrared absorption method, N may be measured using an inert gas fusion-thermal conductivity method, and O may be measured using an inert gas fusion-non-dispersive infrared absorption method.

The analysis sample is collected so as to obtain an average chemical composition of the overall sheet thickness of the base steel sheet, as described in JIS G 0417:1999. Specifically, the analysis sample is collected from a ¼ thickness position in the sheet thickness direction from the surface of the base steel sheet, avoiding end portions of the base steel sheet in a width direction.

[Decarburized Layer]

[Internal Oxidized Layer]

As shown in FIG. 32, the base steel sheet D11 included in the steel sheet D10 according to the present embodiment has the decarburized layer D13 on the scale D12 side (the side of the interface between the base steel sheet D11 and the scale D12). That is, a portion of the base steel sheet D11 on the scale D12 side is the decarburized layer D13. In addition, the decarburized layer D13 has the internal oxidized layer D14 on the scale D12 side. That is, a portion of the decarburized layer D13 on the scale D12 side is the internal oxidized layer D14. A depth (distance from the interface in the sheet thickness direction) of the internal oxidized layer D14 from the interface between the base steel sheet D11 and the scale D12 in a cross section in the sheet thickness direction is less than 30 μm. A depth (distance from the interface in the sheet thickness direction) of the decarburized layer 13 from the interface between the base steel sheet D11 and the scale D12 in the cross section in the sheet thickness direction is 90 μm or more.

In the steel member obtained by performing hot stamping on the steel sheet, it is extremely effective to decarburize and soften a surface layer in order to improve the bendability. Since stress and strain generated in bending deformation are larger in a surface layer outside a bend, the bendability can be improved by softening the surface layer and improving a fracture limit.

In the steel sheet D10 according to the present embodiment, in order to form a decarburized layer on a surface layer of the steel member after hot stamping, the decarburized layer D13 having a depth (thickness) of 90 μm or more from the interface is formed on the side of the interface with the scale D12 described later, in the base steel sheet D11. When the depth (thickness) of the decarburized layer D13 is less than 90 μm, the decarburized layer is not formed to a sufficient depth in the steel sheet substrate of the steel member after hot stamping, and the bendability of the steel member decreases. Although the surface of the base steel sheet undergoes carbon restoration by hot stamping and the depth of the decarburized layer decreases, by setting the depth of the decarburized layer of the base steel sheet D11 to 90 μm or more, the depth of the decarburized layer of the steel member after hot stamping can be set to 60 μm or more under normal hot stamping conditions.

As described above, as a technique for decarburizing the surface layer of the steel sheet, a method of annealing a steel sheet at a high dew point and decarburizing the steel sheet with $H_2O$ in an atmosphere (high dew point annealing) is known. However, as a result of studies by the present inventors, it was found that in a case where such high dew point annealing is performed, internal oxidation (oxidation of easily oxidizable elements such as Si and Mn in steel) that occurs simultaneously with decarburization causes various problems. Specifically, it was found that in the steel member obtained by hot stamping, there are cases where scale (internal scale) is generated inside the steel sheet from the internal oxidized layer as an origin during hot stamping, and the scale generated from the inside of the steel sheet impairs weldability.

As a result of further studies by the present inventors, it was found that in the steel sheet (base steel sheet D11) to be subjected to hot stamping, by setting the depth of the internal oxidized layer D14 to less than 30 μm, the generation of the scale inside the steel sheet during hot stamping can be suppressed. Therefore, in the steel sheet D10 according to the present embodiment, the depth (thickness) of the internal oxidized layer D14 of the base steel sheet D11 from the interface between the base steel sheet D11 and the scale D12 is set to less than 30 μm.

The depth of the internal oxidized layer is preferably less than 5 μm. In this case, the bendability is further improved.

In order to suppress the depth of the internal oxidized layer D14 while securing the depth of the decarburized layer D13, it is necessary to control annealing conditions as described below.

In addition, it is preferable that a ratio of the depth (thickness) of the decarburized layer to the depth (thickness) of the internal oxidized layer satisfies a relationship of 3 or more (thickness of decarburized layer/thickness of internal oxidized layer ≥3). In this case, the bendability described later is even further improved. More preferably, the ratio is 10 or more. Even more preferably, the ratio is 20 or more.

The depth of the decarburized layer D13 from the interface between the base steel sheet D11 and the scale D12 can be obtained by the following method using glow discharge emission spectroscopy (GDS).

GDS is performed from the surface of the steel sheet in the sheet thickness direction to obtain the depth of the decarburized layer. In the GDS measurement, at a ¼ width (lateral) position from an end portion of the steel sheet in the width direction, the C content and the Fe content are measured in the sheet thickness direction from the surface (surface of the scale) at a pitch of 50 nm or less. As a result of the measurement, a position at which the Fe content becomes 95% or more for the first time is defined as the interface between the base steel sheet and the scale. In addition, a position at which the C content obtained by the GDS analysis becomes a C content at a ¼ thickness position from the surface of the base steel sheet described above is defined as the deepest position of the decarburized layer. A distance from the interface between the base steel sheet and the scale to the deepest position of the decarburized layer is defined as the depth of the decarburized layer from the interface between the base steel sheet and the scale (thickness of the decarburized layer). Here, the above measurement is performed five times at different locations, and an average value of the five times is defined as the depth of the decarburized layer of the steel sheet according to the present embodiment from the interface between the base steel sheet and the scale (also called whole decarburization depth).

In a case where the decarburized layer is deep enough to exceed a measurement limit of GDS, the depth of the decarburized layer may be obtained from microscopic observation as described in JIS G 0558 (2007). In this case, a sample for cross section observation is collected from the ¼ width (lateral) position in the width direction from the end portion of the steel sheet in the width direction, this sample is subjected to nital etching, and cross section observation is performed with an optical microscope. A depth at which a structure equivalent to that at the ¼ thickness position from the surface of the base steel sheet (interface with the scale) is measured, and the depth at that position is defined as the depth of the decarburized layer. Here, the measurement is performed five times at different locations, and an average value of the 5 times is defined as the depth of the decarburized layer.

The depth of the internal oxidized layer from the interface between the base steel sheet and the scale is obtained by observing the cross section of the steel sheet with a scanning electron microscope (SEM).

A sample for cross section observation is collected from the ¼ width (lateral) position from the end portion of the steel sheet in the width direction, and a COMPO image is observed by the SEM. Internal oxidation proceeds deeper in the grain boundaries than in the grains, and appears darker than in a steady portion (high Fe content) of the base steel sheet in the COMPO image. Therefore, the internal oxidized layer is identified by color difference, and the deepest depth of the internal oxidized layer from the interface between the base steel sheet and the scale is measured. Here, the above measurement is performed five times at different locations, and an average value of the five times is defined as the depth of the internal oxidized layer of the steel sheet according to the present embodiment from the interface with the scale.

[Scale]

The steel sheet according to the present embodiment has the scale formed on the surface of the base steel sheet. In the steel sheet according to the present embodiment, as will be described later, the base steel sheet is decarburized by utilizing 0 in the scale formed on the surface of the base steel sheet by rolling or the like. Therefore, in the scale after the decarburization occurs, the O content is significantly lower than that of a normal scale usually formed by hot rolling or the like, which is formed of FeO, $Fe_2O_3$, $Fe_3O_4$, or the like, and 80% or more of Fe is contained by mass %.

That is, by performing decarburization under a condition in which the Fe content of the scale is 80% or more, a steel sheet having the internal oxidized layer and the decarburized layer having the above-described depths can be obtained.

In other words, although there are cases where the scale is removed or the scale is peeled off during processing or the like of the steel sheet, the steel sheet in which the depths of the internal oxidized layer and the decarburized layer are in the above ranges can be considered to have had scale equivalent to the scale included in the steel sheet according to the present embodiment.

In addition, the thickness of the scale is preferably set to 5 μm or more in terms of supplying O for decarburization. The thickness of the scale is more preferably 8 μm or more, and even more preferably 10 μm or more. In terms of a yield of the steel sheet, the thickness of the scale is preferably less than 100 nm. The thickness of the scale is more preferably 50 μm or less or 30 μm or less.

The scale included in the steel sheet according to the present embodiment preferably includes, by mass %, a first region containing 80% or more of Fe and 0.1% or more and less than 3.0% of Si, and a second region containing 65% or more and less than 80% of Fe and 0.8% or more and less than 7.5% of Mn. Substantially, the scale preferably composed of the first region and the second region. However, as the scale, there may be a case where an impurity, an oxide primarily containing Cr, Si, or the like, or a simple element of a hard-to-oxidize element such as Cu, is present in an outermost layer as "other regions".

By including the scale having such a configuration, a current limit at which splash occurs during spot welding when a vehicle body is assembled is increased, and a steel sheet having a wide appropriate current range, that is, good weldability can be obtained.

There are cases where the first region contains C, Ni, Cr, Mo, and the like in addition to Fe, Si, and O. There are cases where the second region contains C, Ni, and the like in addition to Fe, Mn, and O.

In a case where the first region and the second region are present, there is often a case where the first region is a matrix, and the second region is present in a form in an island shape in the matrix. The second region may have a form in which the second region is dispersed in an island shape, or some islands are joined together. In either case, the first region and the second region can be distinguished from each other by a method described below.

The Fe content of the scale is obtained by the following method. Glow discharge emission spectroscopy (GDS) is performed from the surface in the sheet thickness direction at the ¼ width (lateral) position from the end portion of the steel sheet in the width direction, and the Fe content and the O content of the scale are obtained. A region where the O content is 0.1% or more is removed as an impurity, and an average value of the Fe contents in regions where the O content is less than 0.1% from the surface is measured. The measurement is performed five times at different locations, and an average value of the five times is defined as the Fe content of the scale.

The Fe content and Si content in the first region of the scale, and the Fe content and Mn content in the second region are obtained using the scanning electron microscope (SEM) and an electron probe micro-analyzer (EPMA). A sample is collected from the ¼ width (lateral) position in the width direction from the end portion of the steel sheet in the width direction so that a cross section of the steel sheet in the sheet thickness direction can be observed. For this sample, a COMPO image is acquired using the scanning electron microscope, and the presence of two types of structures having different contrasts constituting the scale is confirmed. Since the first region contains a larger amount of Fe, which is a heavy element, than the second region, the first region looks brighter than the second region. Therefore, a relatively bright region is determined to be the first region, and a relatively dark region is determined to be the second region. For each of the two types of structures (the first region and the second region), elemental analysis of spots (beam diameter of 1 μm or less) is performed using the electron probe micro-analyzer (EPMA), whereby the Fe content and the Si content included in the first region of the scale, and the Fe content and Mn content included in the second region can be obtained. In the measurement, 10 points are analyzed for each of the contents, and average values thereof are determined to be the Fe and Si contents included in the first region of the scale and the Fe content and the Mn content included in the second region. There are cases where the scale includes "other regions" as described above. A region containing Cr, Si, or Cu in an amount of 10 mass % or more is referred to as the "other regions" described above.

The thickness of the scale is obtained by the SEM. A sample for cross section observation is collected from the ¼ width (lateral) position in the width direction from the end portion of the steel sheet in the width direction, and a composition (COMPO) image is observed by the SEM. Scale thicknesses are measured at 10 points where the scale is not peeled off, and an average value thereof is determined to be the thickness of the scale.

<Steel Member>

Figure 33:
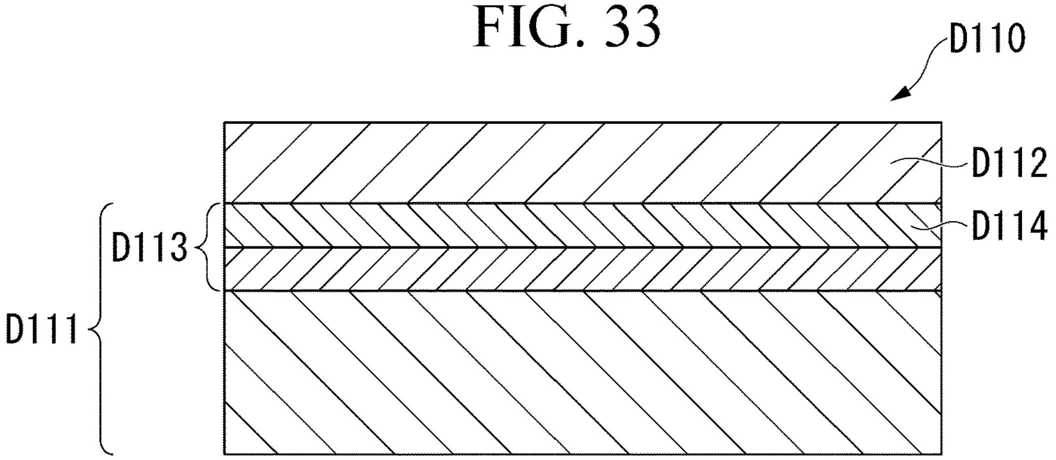
FIG. 33 is a schematic view showing an example of a steel member according to the present embodiment.

As shown in FIG. 33, a steel member D110 according to the present embodiment includes a steel sheet substrate D111 having a predetermined chemical composition and a scale D112 formed on a surface of the steel sheet substrate D111 and containing 70 mass % or more of Fe. In addition, the steel sheet substrate D111 has a decarburized layer D113 formed on a scale D112 side (a side of the interface with the scale D112) and having a predetermined depth, and the decarburized layer D113 has an internal oxidized layer D114 formed on the scale 112 side.

In addition, the steel member D110 according to the present embodiment is obtained by subjecting the steel sheet D10 according to the present embodiment described above to a heat treatment (and processing) such as hot stamping.

In the figure, the steel member D110 according to the present embodiment is shown in the form of a flat sheet, but the steel member D110 is a member obtained by hot stamping and is not limited to the flat sheet.

[Chemical Composition]

Since the chemical composition of the steel sheet does not substantially change by the hot stamping, the chemical composition of the steel sheet substrate D111 of the steel member D110 according to the present embodiment is the same as the chemical composition of the base steel sheet D11 of the steel sheet D10 according to the present embodiment, and can be measured by the same measurement method as that of the base steel sheet.

[Decarburized Layer]

[Internal oxidized Layer]

In the steel member 110 according to the present embodiment, the decarburized layer is present on the side of the interface with the scale D112, in the steel sheet substrate D111, and the internal oxidized layer D114 is present on the side of the interface with the scale D112, in the decarburized layer D113. In addition, the depth of the decarburized layer D113 from an interface between the steel sheet substrate D111 and the scale D112 is 60 μm or more, and a depth of the internal oxidized layer D114 from the interface between the steel sheet substrate DW111 and the scale D112 is less than 40 km.

In order to improve the bendability of the steel member, it is extremely effective to decarburize and soften a surface layer. Since stress and strain generated in bending deformation are larger in a surface layer outside a bend, the bendability can be improved by softening the surface layer and improving a fracture limit.

When the depth (thickness) of the decarburized layer D113 formed on the surface layer of the steel member D110 according to the present embodiment is 60 μm or more, the bendability is improved. Therefore, the depth of the decarburized layer 113 from the interface between the steel sheet substrate D111 and the scale DW112 is set to 60 μm or more.

In addition, in the steel member, when the depth of the internal oxidized layer is 40 μm or more, the weldability deteriorates due to the scale formed inside the steel sheet during hot stamping. Therefore, the depth of the internal oxidized layer D114 is set to less than 40 μm.

<Scale>

The steel member D110 according to the present embodiment has the scale D112 formed on the surface of the steel sheet substrate 111. The steel member D110 according to the present embodiment is obtained by performing hot stamping on the steel sheet having the scale containing 80 mass % or more of Fe. Although the surface layer of the scale is oxidized by the hot stamping, the scale D112 included in the steel member D1 according to the present embodiment contains 70% or more of Fe by mass %.

A steel member according to another embodiment of the element technology D may be a coated steel member obtained by subjecting the steel sheet according to the present embodiment described above to pickling or the like to remove the scale on the surface, then forming a coating containing Al, such as plating, on the steel sheet to obtain a coated steel sheet, and subjecting the coated steel sheet to a heat treatment such as hot stamping.

Figure 34:
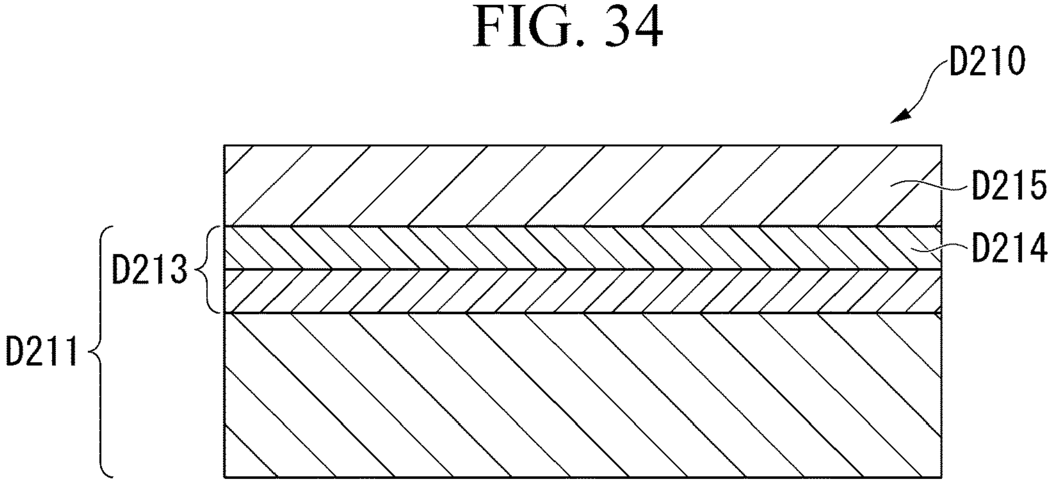
FIG. 34 is a schematic view showing an example of another aspect (coated steel member) of the steel member according to the present embodiment.

In this case, as shown in FIG. 34, a steel member (coated steel member) D210 according to another embodiment of the present invention includes a steel sheet substrate D211 and a coating D215 containing Al and Fe formed on a surface of the steel sheet substrate D211 and, and no scale is included between the steel sheet substrate D211 and the coating D215 containing Al and Fe.

In addition, the steel sheet substrate D211 has a decarburized layer D213 formed on a side of a coating D215, the decarburized layer D213 has an internal oxidized layer 214 formed on the side of the coating D215, a depth of the decarburized layer D213 from an interface between the steel sheet substrate D211 and the coating D215 is 30 μm or more, and a depth of the internal oxidized layer D214 from the interface between the steel sheet substrate D211 and the coating D215 is less than 20 μm.

When the depth (thickness) of the decarburized layer D213 is 30 μm or more, the bendability is improved. In addition, when the depth of the internal oxidized layer D214 is less than 20 μm, the weldability is improved.

In the case of the coated steel member having the coating, an oxidation state of the surface during a heat treatment such as hot stamping is different from that of the above-described steel member having no coating, and thus the depth of the decarburized layer and the depth of the internal oxidized layer are different.

<Manufacturing Method>

The steel sheet according to the present embodiment and the steel member according to the present embodiment can obtain the effects as long as the above-described properties are provided regardless of a manufacturing method. However, the steel sheet according to the present embodiment and the steel member according to the present embodiment can be stably manufactured by a manufacturing method including the following steps ((I) to (IV) for the steel sheet and (I) to (V) for the steel member), which is preferable:

(I) a steel piece manufacturing step of manufacturing a steel piece having a predetermined chemical composition;

(II) a hot rolling step of heating the steel piece and performing hot rolling on the steel piece to obtain a hot-rolled steel sheet;

(III) a coiling step of coiling the hot-rolled steel sheet to obtain a hot-rolled coil;

(IV) an annealing step of performing box annealing (BAF) on the hot-rolled coil on which a hot-rolled scale is formed; and (V) a heat treatment step of cutting out a blank having a predetermined size from the hot-rolled coil after the annealing step and performing a heat treatment on the blank to obtain a steel member.

Hereinafter, each step will be described. Steps and conditions that are not described below can be appropriately performed by known methods.

(I) Steel Piece Manufacturing Step

In the steel piece manufacturing step, a steel piece such as a slab having the above-described preferable chemical composition is manufactured. Molten steel adjusted to a predetermined chemical composition under known conditions may be made into a steel piece by continuous casting or the like.

(II) Hot Rolling Step

In the hot rolling step, the obtained steel piece is heated and hot-rolled to obtain a hot-rolled steel sheet. In the hot rolling step, a scale (hot-rolled scale) is formed on a surface of the steel sheet.

Hot rolling conditions are not particularly limited and may be appropriately set within a known condition range according to the required properties of the steel sheet.

(III) Coiling Step

In the coiling step, the hot-rolled steel sheet obtained in the hot rolling step is coiled into a coil shape to obtain a hot-rolled coil.

Conditions such as a coiling temperature are not particularly limited.

(IV) Annealing Step

In the annealing step, the hot-rolled coil having the hot-rolled scale formed on the surface thereof is subjected to box annealing (BAF) without performing scale removal (in a so-called mill scale state).

In the annealing, an annealing atmosphere is set to an inert gas atmosphere ($N_2$ atmosphere, $H_2$ atmosphere, or the like), and annealing is performed at 650° C. to 900° C. for 4 to 16 hours. In normal decarburization annealing, high dew point annealing is performed, and $H_2O$ in the atmosphere is used as a decarburization source. Contrary to this, in the present embodiment, by annealing the hot-rolled coil in a state of having the hot-rolled scale attached thereto, decarburization is performed using O in the scale as a decarburization source. Specifically, C in the outermost layer of the base steel sheet reacts with O in the scale to become CO gas, whereby decarburization occurs. In addition, subsequently, deficient C is supplied from the inside of the base steel sheet to the outermost layer, and C becomes CO gas, whereby the decarburization reaction further proceeds. At this time, O in the scale is consumed, and the Fe content in the scale increases.

However, when an annealing temperature is lower than 650° C. or an annealing time is shorter than four hours, decarburization does not proceed sufficiently. On the other hand, when the annealing temperature is higher than 900° C.

or the annealing time is longer than 16 hours, the scale reduction reaction is completed, and the supply of C from the inside of the steel sheet to the surface layer continues thereafter, so that the decarburization weakens. In addition, when the generated CO gas stays around the scale, a further decarburization reaction does not proceed, and a deep decarburized layer cannot be obtained. Therefore, in the manufacturing method of the steel sheet according to the present embodiment, it is important to move the gas in an annealing furnace so that the generated CO gas does not stay around the scale. Specifically, by installing a fan or the like in the annealing furnace and setting an air volume to 250 $m^3$/Hr or more, a flow velocity in the annealing furnace can be secured and the decarburization reaction can proceed. When the air volume is less than 250 $m^3$/Hr, the staying of CO gas around the scale cannot be sufficiently suppressed, and decarburization becomes insufficient. The air volume is set to an air volume around the hot-rolled coil, and a plurality of fans or the like may be installed depending on a size of the annealing furnace in order to obtain a predetermined air volume. A size of the hot-rolled coil is preferably set so that a sheet thickness is 9 mm or less, a sheet width is 2,100 mm or less, an outer diameter is 2,000 mm or less, and a weight of one coil is 30 tons or less.

Compared to a case where $H_2O$ in the atmosphere is used as the decarburization source in the high dew point annealing, in a case where O in the scale is used as the decarburization source, O of the decarburization source is less likely to penetrate into the inside of the base steel sheet, and as a result, Internal oxidation is less likely to proceed.

That is, as described above, by performing box annealing on the hot-rolled coil in the mill scale state in the inert gas atmosphere by blowing air at an air volume of 250 $m^3$/Hr or more, a desired depth of the decarburized layer, a desired depth of the internal oxidized layer, and a desired Fe content in the scale, which have been described regarding the steel sheet according to the present embodiment, can be obtained.

(V) Heat Treatment Step

In the heat treatment step, a blank having a predetermined size is cut out from the hot-rolled coil after the annealing step, and the blank is subjected to a heat treatment to obtain a steel member.

The heat treatment is preferably performed under conditions in which the blank is heated to an Ac3 point to (Ac3 point+300°) C at an average temperature rising rate of 1.0 to 1000° C./sec and cooled to an Ms point (° C.) or lower at an average cooling rate equal to or faster than an upper critical cooling rate.

When the temperature rising rate is slower than 1.0° C./s, productivity of the heat treatment decreases, which is not preferable. On the other hand, when the temperature rising rate is faster than 1000° C./s, a duplex grain structure is formed and a limit hydrogen content decreases, which is not preferable.

When a heat treatment temperature is lower than the Ac3 point (° C.), ferrite remains after cooling and strength decreases, which is not preferable. On the other hand, when the heat treatment temperature is higher than the Ac3 point+300° C., coarse grains are formed in the structure, and the limit hydrogen content decreases, which is not preferable.

The upper critical cooling rate is a minimum cooling rate at which austenite is supercooled to generate martensite without causing precipitation of ferrite and pearlite in the structure. When cooling is performed at an average cooling rate slower than the upper critical cooling rate, ferrite and pearlite are generated, resulting in insufficient strength.

During heating, holding may be performed for 1 to 300 seconds within a range of the heating temperature±10° C.

In addition, after cooling to a temperature equal to or lower than the Ms point, a tempering may be performed in a temperature range of about 100° C. to 600° C. in order to adjust the strength of the steel.

In this heat treatment, processing may be performed at the same time. That is, so-called hot stamping may be performed.

In addition, the steel member (including the coated steel member) according to the present embodiment may be a steel member having regions having different strengths obtained by performing hot forming or a heat treatment on a portion of the steel sheet as a material.

(VI) Pickling, Cold Rolling, and Coating

In a case where the steel member is a coated steel member, the hot-rolled coil may be pickled and cold-rolled, and a coating containing Al may be further formed on the surface thereof between the annealing step and the heat treatment step.

In this case, pickling, cold rolling, and coating may be performed under known conditions. In a case where the scale is not sufficiently peeled off during pickling, shot blasting may be performed before pickling to mechanically promote scale peeling. For example, #60 may be used as a shot blasting medium size.

EXAMPLES

First, steels having the chemical compositions shown in Table 13 were melted to obtain slabs for hot rolling.

Example 1

The obtained slab was subjected to hot rolling to obtain a hot-rolled steel sheet having a thickness of 3.2 mm and a sheet width of 1,000 mm, this hot-rolled steel sheet was coiled at a temperature of 800° C. or lower to obtain a hot-rolled coil having an outer diameter of 1,700 mm and a weight of 14 tons per coil.

The obtained hot-rolled coil was subjected to box annealing under the conditions (temperature, time, and air volume) shown in Tables 14 to 16. The annealing atmosphere was set to a nitrogen atmosphere.

TABLE 13

| Steel | Chemical composition (mass %), remainder: Fe and impurities | | | | | | | | | | | | | |
|---|---|---|---|---|---|---|---|---|---|---|---|---|---|---|
| No. | C | Si | Mn | P | S | N | O | Ti | B | Cr | Mo | Ni | Nb | Cu |
| A1 | 0.12 | 0.62 | 1.57 | 0.020 | 0.0030 | 0.006 | 0.005 | | | | | | | |
| A2 | 0.55 | 0.31 | 0.42 | 0.002 | 0.0002 | 0.003 | 0.004 | 0.026 | 0.0022 | | | | 0.03 | |
| A3 | 0.29 | 0.15 | 1.27 | 0.009 | 0.0006 | 0.005 | 0.004 | 0.031 | 0.0022 | | 0.18 | | | |
| A4 | 0.32 | 1.50 | 0.88 | 0.018 | 0.0008 | 0.005 | 0.006 | | | 0.14 | | 0.10 | | |
| A5 | 0.41 | 0.32 | 0.35 | 0.010 | 0.0010 | 0.007 | 0.005 | 0.023 | | | | | | |

TABLE 13-continued

| | | | | | | | | | | | | | | |
|---|---|---|---|---|---|---|---|---|---|---|---|---|---|---|
| A6 | 0.26 | 0.48 | 2.05 | 0.002 | 0.0003 | 0.003 | 0.004 | 0.025 | 0.0026 | | | | 0.04 | 0.25 |
| A7 | 0.14 | 0.15 | 2.02 | 0.018 | 0.0024 | 0.005 | 0.004 | 0.032 | 0.0024 | 0.18 | | | | |
| A8 | 0.21 | 0.21 | 1.32 | 0.015 | 0.0018 | 0.004 | 0.005 | 0.032 | 0.0022 | 0.21 | | | | |
| A9 | 0.30 | 0.23 | 1.27 | 0.010 | 0.0004 | 0.003 | 0.004 | 0.029 | 0.0020 | 0.42 | | 0.01 | 0.05 | |
| A10 | 0.34 | 0.40 | 0.66 | 0.011 | 0.0006 | 0.004 | 0.004 | 0.030 | 0.0025 | 0.11 | 0.19 | 0.09 | 0.04 | 0.25 |
| A11 | 0.35 | 0.22 | 1.25 | 0.009 | 0.0008 | 0.004 | 0.004 | 0.028 | 0.0022 | 0.23 | | | 0.04 | |
| A12 | 0.34 | 0.52 | 0.62 | 0.008 | 0.0007 | 0.004 | 0.005 | 0.024 | 0.0021 | 0.38 | 0.21 | 0.40 | 0.05 | |
| A13 | 0.48 | 0.48 | 0.44 | 0.005 | 0.0003 | 0.003 | 0.003 | 0.028 | 0.0021 | 0.18 | 0.20 | 0.14 | 0.02 | 0.30 |
| A14 | 0.15 | 0.46 | 1.28 | 0.016 | 0.0019 | 0.004 | 0.005 | 0.025 | 0.0016 | 0.10 | 0.18 | 0.06 | 0.06 | 0.22 |
| A15 | 0.47 | 0.44 | 0.38 | 0.007 | 0.0004 | 0.003 | 0.004 | 0.026 | 0.0018 | 0.08 | 0.22 | 0.08 | 0.03 | 0.28 |
| a1 | 0.04 | 0.82 | 2.05 | 0.032 | 0.0045 | 0.006 | 0.007 | | | | | | | |
| a2 | 0.80 | 0.42 | 0.98 | 0.009 | 0.0003 | 0.004 | 0.004 | 0.008 | | | | | 0.08 | |
| a3 | 0.45 | 0.01 | 0.78 | 0.012 | 0.0015 | 0.005 | 0.005 | | | | | | 0.04 | |
| a4 | 0.28 | 2.65 | 0.62 | 0.015 | 0.0023 | 0.004 | 0.005 | | | | | | | |
| a5 | 0.35 | 0.24 | 0.05 | 0.012 | 0.0018 | 0.005 | 0.005 | | | 0.14 | | 0.05 | | |
| a6 | 0.44 | 0.60 | 3.60 | 0.016 | 0.0023 | 0.006 | 0.004 | | 0.0022 | | | | | |

| Steel | Chemical composition (mass %), remainder: Fe and impurities | | | | | | | | | | Transformation point (° C.) | | Upper critical cooling rate |
|---|---|---|---|---|---|---|---|---|---|---|---|---|---|
| No. | V | Ca | Mg | Al | Sn | W | Sb | Zr | Co | REM | Ac3 | Ms | (° C./s) |
| A1 | | | | | | | | | | | 851 | 445 | 30 |
| A2 | | | | | | | | | | 0.06 | 773 | 314 | 10 |
| A3 | | | | | | | 0.02 | | | | 798 | 383 | 30 |
| A4 | | | | | | 0.02 | | 0.03 | | | 873 | 380 | 20 |
| A5 | 0.05 | | | | | | | | 0.03 | | 810 | 376 | 40 |
| A6 | | 0.002 | 0.002 | | | | | | | | 790 | 365 | 10 |
| A7 | | | | 0.03 | 0.02 | | | | | | 816 | 415 | 10 |
| A8 | | | | 0.04 | | | | | | | 818 | 411 | 30 |
| A9 | | | | 0.04 | | | | | | | 797 | 376 | 20 |
| A10 | | | | 0.03 | | | | | | | 818 | 379 | 20 |
| A11 | | | | 0.03 | | | | | | | 782 | 357 | 20 |
| A12 | | | | 0.04 | | | | | | | 824 | 376 | 20 |
| A13 | | | | 0.04 | | | | | | 0.04 | 801 | 330 | 20 |
| A14 | 0.01 | | | | | | | | | | 828 | 402 | 20 |
| A15 | | | | 0.03 | | 0.33 | | | | | 810 | 328 | 20 |
| a1 | | | | | | | 0.10 | | 0.10 | | 894 | 457 | 30 |
| a2 | | 0.005 | | | | | | | | | 733 | 194 | 20 |
| a3 | 0.15 | | | | 0.08 | | | | | | 762 | 345 | 70 |
| a4 | | | | 0.10 | | | 0.15 | | | | 978 | 396 | 20 |
| a5 | | | 0.005 | | | | | 0.25 | | | 810 | 411 | 80 |
| a6 | 0.15 | | | | | 0.18 | | | | 0.12 | 752 | 240 | 10 |

TABLE 14

| | | Annealing | | | Steel sheet | | | | | | | | | |
|---|---|---|---|---|---|---|---|---|---|---|---|---|---|---|
| Steel sheet No. | Steel No. | Temperature (° C.) | Time (hr) | Air volume ($m^3$/Hr) | Thickness of decarburized layer (μm) | Thickness of internal oxidized layer (μm) | Thickness of decarburized layer/ thickness of internal oxidized layer | Thickness of scale (μm) | Fe content in scale (mass %) | Fe content in first region (mass %) | Si content in first region (mass %) | Fe content in second region (mass %) | Mn content in second region (mass %) |
| B1 | A1 | 700 | 12 | 320 | 162 | 11 | 15 | 22 | 88 | 90 | 0.9 | 68 | 3.9 |
| B2 | A2 | 700 | 12 | 320 | 196 | 9 | 23 | 32 | 88 | 90 | 0.5 | 70 | 1.1 |
| B3 | A3 | 700 | 12 | 320 | 172 | 12 | 14 | 18 | 90 | 92 | 0.2 | 73 | 3.2 |
| B4 | A4 | 700 | 12 | 320 | 183 | 11 | 17 | 17 | 91 | 92 | 2.3 | 74 | 2.2 |
| B5 | A5 | 700 | 12 | 320 | 168 | 8 | 20 | 25 | 90 | 90 | 0.5 | 73 | 0.9 |
| B6 | A6 | 700 | 12 | 320 | 180 | 7 | 25 | 16 | 91 | 92 | 0.7 | 73 | 5.1 |
| B7 | A7 | 670 | 12 | 350 | 130 | 8 | 17 | 24 | 82 | 90 | 0.2 | 71 | 5.1 |
| B8 | A7 | 800 | 12 | 350 | 304 | 14 | 21 | 24 | 87 | 94 | 0.2 | 70 | 5.1 |
| B9 | A7 | 700 | 8 | 350 | 180 | 10 | 19 | 24 | 82 | 91 | 0.2 | 69 | 5.1 |
| B10 | A7 | 700 | 14 | 350 | 196 | 10 | 20 | 24 | 85 | 94 | 0.2 | 70 | 5.1 |
| B11 | A7 | 700 | 12 | 280 | 170 | 9 | 19 | 24 | 83 | 90 | 0.2 | 70 | 5.1 |
| B12 | A7 | 700 | 12 | 320 | 190 | 10 | 20 | 24 | 83 | 93 | 0.2 | 69 | 5.1 |
| B13 | A8 | 670 | 12 | 350 | 132 | 9 | 14 | 21 | 83 | 91 | 0.3 | 72 | 3.3 |
| B14 | A8 | 800 | 12 | 350 | 296 | 18 | 16 | 21 | 89 | 94 | 0.3 | 70 | 3.3 |
| B15 | A8 | 700 | 8 | 350 | 178 | 12 | 15 | 21 | 83 | 90 | 0.3 | 69 | 3.3 |
| B16 | A8 | 700 | 14 | 350 | 200 | 12 | 16 | 21 | 86 | 94 | 0.3 | 71 | 3.3 |
| B17 | A8 | 700 | 12 | 280 | 170 | 11 | 15 | 21 | 84 | 91 | 0.3 | 70 | 3.3 |

TABLE 14-continued

| Steel sheet No. | Steel No. | Annealing Temperature (° C.) | Annealing Time (hr) | Annealing Air volume ($m^3$/Hr) | Steel sheet: Thickness of decarburized layer (μm) | Steel sheet: Thickness of internal oxidized layer (μm) | Steel sheet: Thickness of decarburized layer/thickness of internal oxidized layer | Steel sheet: Thickness of scale (μm) | Steel sheet: Fe content in scale (mass %) | Steel sheet: Fe content in first region (mass %) | Steel sheet: Si content in first region (mass %) | Steel sheet: Fe content in second region (mass %) | Steel sheet: Mn content in second region (mass %) |
|---|---|---|---|---|---|---|---|---|---|---|---|---|---|
| B18 | A8 | 700 | 12 | 320 | 182 | 11 | 17 | 21 | 85 | 94 | 0.3 | 70 | 3.3 |
| B19 | A9 | 670 | 12 | 350 | 124 | 11 | 11 | 26 | 82 | 93 | 0.3 | 72 | 3.2 |
| B20 | A9 | 800 | 12 | 350 | 300 | 24 | 13 | 26 | 95 | 96 | 0.3 | 72 | 3.2 |
| B21 | A9 | 700 | 8 | 350 | 162 | 13 | 13 | 26 | 90 | 92 | 0.3 | 71 | 3.2 |
| B22 | A9 | 700 | 14 | 350 | 164 | 13 | 13 | 26 | 91 | 93 | 0.3 | 71 | 3.2 |
| B23 | A9 | 700 | 12 | 280 | 156 | 11 | 15 | 26 | 88 | 92 | 0.3 | 71 | 3.2 |
| B24 | A9 | 700 | 12 | 320 | 162 | 13 | 13 | 26 | 90 | 95 | 0.3 | 72 | 3.2 |
| B25 | A10 | 670 | 12 | 350 | 140 | 3 | 47 | 13 | 88 | 93 | 0.6 | 73 | 1.7 |
| B26 | A10 | 800 | 12 | 350 | 394 | 7 | 55 | 13 | 96 | 95 | 0.6 | 74 | 1.7 |
| B27 | A10 | 700 | 8 | 350 | 264 | 4 | 66 | 13 | 93 | 92 | 0.6 | 74 | 1.7 |
| B28 | A10 | 700 | 14 | 350 | 280 | 4 | 68 | 13 | 94 | 94 | 0.6 | 74 | 1.7 |
| B29 | A10 | 700 | 12 | 280 | 240 | 4 | 69 | 13 | 92 | 90 | 0.6 | 75 | 1.7 |
| B30 | A10 | 700 | 12 | 320 | 274 | 4 | 69 | 13 | 94 | 94 | 0.6 | 74 | 1.7 |

TABLE 15

| Steel sheet No. | Steel No. | Annealing Temperature (° C.) | Annealing Time (hr) | Annealing Air volume ($m^3$/Hr) | Steel sheet: Thickness of decarburized layer (μm) | Steel sheet: Thickness of internal oxidized layer (μm) | Steel sheet: Thickness of decarburized layer/thickness of internal oxidized layer | Steel sheet: Thickness of scale (μm) | Steel sheet: Fe content in scale (mass %) | Steel sheet: Fe content in first region (mass %) | Steel sheet: Si content in first region (mass %) | Steel sheet: Fe content in second region (mass %) | Steel sheet: Mn content in second region (mass %) |
|---|---|---|---|---|---|---|---|---|---|---|---|---|---|
| B31 | A11 | 670 | 12 | 350 | 128 | 12 | 11 | 20 | 83 | 92 | 0.3 | 71 | 3.1 |
| B32 | A11 | 800 | 12 | 350 | 296 | 24 | 12 | 20 | 94 | 94 | 0.3 | 72 | 3.1 |
| B33 | A11 | 700 | 8 | 350 | 164 | 13 | 13 | 20 | 91 | 93 | 0.3 | 72 | 3.1 |
| B34 | A11 | 700 | 14 | 350 | 166 | 13 | 13 | 20 | 91 | 95 | 0.3 | 72 | 3.1 |
| B35 | A11 | 700 | 12 | 280 | 154 | 11 | 14 | 20 | 87 | 92 | 0.3 | 72 | 3.1 |
| B36 | A11 | 700 | 12 | 320 | 166 | 13 | 13 | 20 | 90 | 94 | 0.3 | 72 | 3.1 |
| B37 | A12 | 670 | 12 | 350 | 136 | 7 | 20 | 18 | 84 | 90 | 0.8 | 70 | 1.6 |
| B38 | A12 | 800 | 12 | 350 | 332 | 9 | 37 | 18 | 95 | 96 | 0.8 | 74 | 1.6 |
| B39 | A12 | 700 | 8 | 350 | 240 | 8 | 31 | 18 | 90 | 91 | 0.8 | 71 | 1.6 |
| B40 | A12 | 700 | 14 | 350 | 262 | 8 | 33 | 18 | 91 | 93 | 0.8 | 71 | 1.6 |
| B41 | A12 | 700 | 12 | 280 | 215 | 8 | 28 | 18 | 88 | 91 | 0.8 | 70 | 1.6 |
| B42 | A12 | 700 | 12 | 320 | 166 | 7 | 22 | 18 | 91 | 92 | 0.8 | 71 | 1.6 |
| B43 | A13 | 670 | 12 | 350 | 150 | 3 | 48 | 15 | 89 | 90 | 0.7 | 73 | 1.1 |
| B44 | A13 | 800 | 12 | 350 | 398 | 7 | 55 | 15 | 96 | 96 | 0.7 | 75 | 1.1 |
| B45 | A13 | 700 | 8 | 350 | 272 | 4 | 68 | 15 | 93 | 94 | 0.7 | 74 | 1.1 |
| B46 | A13 | 700 | 14 | 350 | 286 | 4 | 72 | 15 | 94 | 94 | 0.7 | 74 | 1.1 |
| B47 | A13 | 700 | 12 | 280 | 248 | 3 | 73 | 15 | 92 | 93 | 0.7 | 74 | 1.1 |
| B48 | A13 | 700 | 12 | 320 | 280 | 4 | 68 | 15 | 94 | 94 | 0.7 | 75 | 1.1 |
| B49 | A14 | 670 | 12 | 350 | 138 | 2 | 69 | 20 | 84 | 84 | 0.4 | 71 | 3.0 |
| B50 | A14 | 800 | 12 | 350 | 311 | 4 | 78 | 20 | 87 | 88 | 0.4 | 71 | 3.0 |
| B51 | A14 | 700 | 8 | 350 | 187 | 2 | 94 | 20 | 84 | 85 | 0.4 | 69 | 3.0 |
| B52 | A14 | 700 | 14 | 350 | 203 | 2 | 102 | 20 | 85 | 85 | 0.4 | 70 | 3.0 |
| B53 | A14 | 700 | 12 | 280 | 175 | 2 | 88 | 20 | 83 | 84 | 0.4 | 70 | 3.0 |
| B54 | A14 | 700 | 12 | 320 | 199 | 2 | 100 | 20 | 84 | 84 | 0.4 | 70 | 3.0 |
| B55 | A15 | 670 | 12 | 350 | 161 | 2 | 81 | 12 | 90 | 91 | 0.7 | 74 | 1.0 |
| B56 | A15 | 800 | 12 | 350 | 401 | 4 | 100 | 12 | 96 | 96 | 0.7 | 75 | 1.0 |
| B57 | A15 | 700 | 8 | 350 | 288 | 2 | 144 | 12 | 94 | 95 | 0.7 | 74 | 1.0 |
| B58 | A15 | 700 | 14 | 350 | 292 | 2 | 146 | 12 | 94 | 94 | 0.7 | 75 | 1.0 |
| B59 | A15 | 700 | 12 | 280 | 255 | 2 | 128 | 12 | 93 | 94 | 0.7 | 74 | 1.0 |
| B60 | A15 | 700 | 12 | 320 | 280 | 2 | 140 | 11 | 94 | 95 | 0.7 | 75 | 1.0 |

TABLE 16

| | | Annealing | | | Steel sheet | | | | | | | | |
|---|---|---|---|---|---|---|---|---|---|---|---|---|---|
| Steel sheet No. | Steel No. | Temperature (° C.) | Time (hr) | Air volume ($m^3$/IIr) | Thickness of decarburized layer (μm) | Thickness of internal oxidized layer (μm) | Thickness of decarburized layer/thickness of internal oxidized layer | Thickness of scale (μm) | Fe content in scale (mass %) | Fe content in first region (mass %) | Si content in first region (mass %) | Fe content in second region (mass %) | Mn content in second region (mass %) |
| b1 | a1 | 700 | 12 | 320 | 165 | 10 | 17 | 28 | 89 | 90 | 1.2 | 71 | 5.1 |
| b2 | a2 | 700 | 12 | 320 | 170 | 12 | 14 | 42 | 89 | 90 | 0.6 | 70 | 2.5 |
| b3 | a3 | 700 | 12 | 320 | 166 | 9 | 18 | 27 | 90 | 90 | 0.0 | 71 | 2.0 |
| b4 | a4 | 700 | 12 | 320 | 168 | 14 | 12 | 35 | 90 | 91 | 4.0 | 72 | 1.6 |
| b5 | a5 | 700 | 12 | 320 | 175 | 9 | 20 | 25 | 89 | 90 | 0.4 | 72 | 0.1 |
| b6 | a6 | 700 | 12 | 320 | 170 | 14 | 12 | 18 | 90 | 91 | 0.9 | 71 | 9.0 |
| b7 | A1 | 400 | 10 | 300 | 32 | 10 | 3 | 22 | 62 | — | — | 51 | 1.6 |
| b8 | A2 | 660 | 1 | 300 | 36 | 10 | 4 | 32 | 64 | — | — | 53 | 0.4 |
| b9 | A3 | 660 | 10 | 150 | 34 | 8 | 4 | 18 | 62 | — | — | 50 | 1.2 |
| b10 | A4 | 660 | 10 | 50 | 31 | 8 | 4 | 17 | 60 | — | — | 48 | 0.9 |
| b11 | A5 | 400 | 10 | 300 | 33 | 9 | 4 | 25 | 63 | — | — | 51 | 0.4 |
| b12 | A6 | 660 | 1 | 300 | 36 | 4 | 10 | 16 | 65 | — | — | 52 | 2.0 |
| b13 | A7 | 660 | 10 | 150 | 34 | 8 | 4 | 24 | 62 | — | — | 49 | 2.0 |
| b14 | A8 | 660 | 10 | 50 | 30 | 9 | 3 | 21 | 61 | — | — | 48 | 1.2 |
| b15 | A9 | 400 | 10 | 300 | 32 | 9 | 3 | 26 | 62 | — | — | 50 | 1.3 |
| b16 | A10 | 660 | 1 | 300 | 37 | 3 | 13 | 13 | 64 | — | — | 52 | 0.8 |
| b17 | A11 | 660 | 10 | 150 | 33 | 10 | 3 | 20 | 62 | — | — | 51 | 1.4 |
| b18 | A12 | 660 | 10 | 50 | 31 | 10 | 3 | 18 | 61 | — | — | 50 | 0.6 |
| b19 | A13 | 400 | 10 | 300 | 32 | 3 | 12 | 15 | 61 | — | — | 49 | 0.5 |
| b20 | A10 | 1100 | 10 | 300 | 12 | 58 | 0 | 72 | 97 | 97 | 0.7 | 78 | 1.7 |
| b21 | A11 | 1100 | 10 | 300 | 10 | 67 | 0 | 83 | 96 | 97 | 0.4 | 79 | 3.2 |
| b22 | A12 | 1100 | 10 | 300 | 10 | 68 | 0 | 87 | 97 | 98 | 0.8 | 79 | 1.6 |
| b23 | A13 | 1100 | 10 | 300 | 9 | 54 | 0 | 72 | 97 | 97 | 0.8 | 80 | 1.2 |

A steel sheet (blank) having a predetermined size was cut out from the obtained hot-rolled coil after the annealing, and glow discharge emission spectroscopy (GDS), SEM observation, EPMA analysis, and optical microscope observation were performed in the manner described above, and the depth of the decarburized layer, the depth of the internal oxidized layer, the thickness of the scale, and the Fe content in the scale were evaluated. In addition, the Fe content and Si content in the first region included in the scale, and the Fe content and Mn content in the second region were evaluated in the manner described above. The evaluation results are shown in Tables 17-19.

The chemical composition of the steel sheet at the ¼ thickness position from the surface in the sheet thickness direction of the steel sheet was similar to the chemical composition of the slab.

Example 2

The steel sheets shown in Tables 14 to 16 were subjected to a heat treatment under the conditions shown in Tables 17 to 19 to obtain steel members.

The obtained steel member was cut out, and glow discharge emission spectroscopy (GDS), SEM observation, and optical microscope observation were performed in the manner described above to obtain the depth of the decarburized layer, the depth of the internal oxidized layer, and the Fe content in the scale.

The results are shown in Tables 17 to 19.

In addition, a tensile test, a bending test, and a spot welding test were conducted on the obtained steel members by the following methods, and tensile strength, bendability, and weldability (appropriate welding current range) were evaluated.

<Tensile Strength (Tensile Strength)>

The tensile test was conducted in accordance with the regulations of ASTM Standard E8.

A soaked portion of the steel member was ground to a thickness of 1.2 mm, and thereafter a half-sized sheet-shaped test piece of ASTM standard E8 (parallel portion length: 32 mm, parallel portion sheet width: 6.25 mm) was collected so that a test direction was parallel to the rolling direction. Then, a room temperature tensile test was conducted at a strain rate of 3 mm/min to measure the tensile strength (maximum strength).

In this example, a case of having a tensile strength of more than 1,000 MPa was evaluated as high strength.

<Bendability>

The bending test was conducted in accordance with the regulations of VDA238-100. A bending test piece of 60 mm parallel to the rolling direction and 30 mm perpendicular to the rolling direction was collected from the soaked portion of the steel member. A bending punch was aligned so as to be perpendicular to the rolling direction, and a bending angle at the maximum load was measured. Since the bending angle correlates with the strength, in this example, a case of having a bending angle of 55 degrees when the tensile strength was less than 2,100 MPa and a bending angle of more than 45 degrees when the tensile strength was 2,100 MPa or more was evaluated as having better bendability than in the related art.

<Appropriate Current Range>

Spot welding was performed in accordance with JIS Z 3001-6:2013. A 60 Hz single-phase AC power source was used, an electrode having a tip diameter of 8 mm was used, and a welding time was set to 10 cycles. A spot welding test piece of 40 mm in the rolling direction and 30 mm perpendicular to the rolling direction was collected from the soaked portion of the steel member. These were joined together, and a range from a welding current at which a nugget diameter was 3 t to an upper limit current at which splash did not occur was obtained and set as an appropriate current range.

A peel diameter obtained from a peel test was used as the nugget diameter, welding test pieces were collected five times at each current, and an average value of the peel diameters was defined as the nugget diameter.

When the appropriate current range was 2.5 kA or more, it was determined that the weldability was excellent.

TABLE 17

| Member No. | Steel sheet No. | Steel No. | Heat treatment: Temperature rising rate (° C./s) | Heat treatment: Heating temperature (° C.) | Heat treatment: Cooling rate (° C./s) | Steel member: Thickness of decarburized layer (μm) | Steel member: Thickness of internal oxidized layer (μm) | Steel member: Fe content in scale (%) | Steel member: Bending angle (°) | Steel member: Appropriate welding current range (kA) | Steel member: Tensile strength (MPa) |
|---|---|---|---|---|---|---|---|---|---|---|---|
| C1 | B1 | A1 | 5 | 920 | 50 | 119 | 14 | 82 | 88 | 4.2 | 1243 |
| C2 | B2 | A2 | 5 | 920 | 50 | 152 | 11 | 81 | 49 | 4.0 | 2738 |
| C3 | B3 | A3 | 5 | 920 | 50 | 127 | 15 | 81 | 65 | 4.0 | 1923 |
| C4 | B4 | A4 | 5 | 920 | 50 | 135 | 14 | 84 | 59 | 4.4 | 2044 |
| C5 | B5 | A5 | 5 | 920 | 50 | 121 | 11 | 81 | 52 | 4.0 | 2349 |
| C6 | B6 | A6 | 5 | 920 | 50 | 133 | 9 | 85 | 67 | 4.4 | 1884 |
| C7 | B7 | A7 | 6 | 920 | 50 | 88 | 11 | 77 | 80 | 3.4 | 1364 |
| C8 | B8 | A7 | 6 | 920 | 50 | 250 | 17 | 80 | 118 | 4.0 | 1270 |
| C9 | B9 | A7 | 6 | 920 | 50 | 134 | 12 | 74 | 98 | 3.2 | 1335 |
| C10 | B10 | A7 | 6 | 920 | 50 | 148 | 13 | 79 | 105 | 3.8 | 1320 |
| C11 | B11 | A7 | 6 | 920 | 50 | 122 | 12 | 76 | 92 | 3.6 | 1310 |
| C12 | B12 | A7 | 6 | 920 | 50 | 143 | 12 | 75 | 105 | 3.8 | 1321 |
| C13 | B13 | A8 | 6 | 920 | 50 | 87 | 12 | 75 | 70 | 3.4 | 1594 |
| C14 | B14 | A8 | 6 | 920 | 50 | 241 | 21 | 82 | 96 | 4.2 | 1522 |
| C15 | B15 | A8 | 6 | 920 | 50 | 131 | 14 | 76 | 84 | 3.4 | 1550 |
| C16 | B16 | A8 | 6 | 920 | 50 | 154 | 15 | 80 | 87 | 4.0 | 1538 |
| C17 | B17 | A8 | 6 | 920 | 50 | 125 | 14 | 77 | 83 | 3.4 | 1548 |
| C18 | B18 | A8 | 6 | 920 | 50 | 136 | 14 | 77 | 84 | 3.6 | 1548 |
| C19 | B19 | A9 | 6 | 920 | 50 | 80 | 14 | 77 | 56 | 3.4 | 1971 |
| C20 | B20 | A9 | 6 | 920 | 50 | 244 | 27 | 87 | 75 | 4.8 | 1895 |
| C21 | B21 | A9 | 6 | 920 | 50 | 114 | 16 | 82 | 66 | 4.4 | 1948 |
| C22 | B22 | A9 | 6 | 920 | 50 | 115 | 17 | 87 | 65 | 4.6 | 1950 |
| C23 | B23 | A9 | 6 | 920 | 50 | 109 | 14 | 83 | 61 | 4.2 | 1952 |
| C24 | B24 | A9 | 6 | 920 | 50 | 115 | 16 | 84 | 63 | 4.4 | 1945 |
| C25 | B25 | A10 | 10 | 920 | 60 | 97 | 5 | 83 | 61 | 4.0 | 2084 |
| C26 | B26 | A10 | 10 | 920 | 60 | 339 | 8 | 87 | 87 | 5.4 | 2004 |
| C27 | B27 | A10 | 10 | 920 | 60 | 217 | 5 | 87 | 76 | 4.6 | 2054 |
| C28 | B28 | A10 | 10 | 920 | 60 | 230 | 5 | 86 | 78 | 4.8 | 2048 |
| C29 | B29 | A10 | 10 | 920 | 60 | 189 | 5 | 87 | 70 | 4.4 | 2051 |
| C30 | B30 | A10 | 10 | 920 | 60 | 225 | 5 | 88 | 78 | 4.6 | 2075 |

TABLE 18

| Member No. | Steel sheet No. | Steel No. | Heat treatment: Temperature rising rate (° C./s) | Heat treatment: Heating temperature (° C.) | Heat treatment: Cooling rate (° C./s) | Steel member: Thickness of decarburized layer (μm) | Steel member: Thickness of internal oxidized layer (μm) | Steel member: Fe content in scale (%) | Steel member: Bending angle (°) | Steel member: Appropriate welding current range (kA) | Steel member: Tensile strength (MPa) |
|---|---|---|---|---|---|---|---|---|---|---|---|
| C31 | B31 | A11 | 10 | 920 | 60 | 88 | 14 | 78 | 53 | 3.6 | 2184 |
| C32 | B32 | A11 | 10 | 920 | 60 | 240 | 27 | 87 | 66 | 4.6 | 2102 |
| C33 | B33 | A11 | 10 | 920 | 60 | 121 | 16 | 83 | 59 | 4.2 | 2152 |
| C34 | B34 | A11 | 10 | 920 | 60 | 122 | 16 | 85 | 58 | 4.4 | 2154 |
| C35 | B35 | A11 | 10 | 920 | 60 | 107 | 14 | 80 | 56 | 4.0 | 2158 |
| C36 | B36 | A11 | 10 | 920 | 60 | 122 | 16 | 81 | 60 | 4.0 | 2152 |
| C37 | B37 | A12 | 20 | 920 | 60 | 93 | 10 | 79 | 58 | 3.8 | 2084 |
| C38 | B38 | A12 | 20 | 920 | 60 | 273 | 12 | 89 | 81 | 4.8 | 2008 |
| C39 | B39 | A12 | 20 | 920 | 60 | 192 | 11 | 83 | 74 | 4.2 | 2040 |
| C40 | B40 | A12 | 20 | 920 | 60 | 218 | 11 | 83 | 76 | 4.2 | 2038 |
| C41 | B41 | A12 | 20 | 920 | 60 | 169 | 10 | 81 | 67 | 4.0 | 2045 |
| C42 | B42 | A12 | 20 | 920 | 60 | 121 | 10 | 82 | 64 | 4.2 | 2061 |
| C43 | B43 | A13 | 20 | 920 | 60 | 108 | 4 | 81 | 49 | 4.0 | 2662 |
| C44 | B44 | A13 | 20 | 920 | 60 | 343 | 8 | 88 | 60 | 4.4 | 2558 |
| C45 | B45 | A13 | 20 | 920 | 60 | 227 | 5 | 88 | 55 | 4.6 | 2628 |
| C46 | B46 | A13 | 20 | 920 | 60 | 239 | 5 | 88 | 58 | 4.6 | 2629 |
| C47 | B47 | A13 | 20 | 920 | 60 | 202 | 4 | 85 | 54 | 4.2 | 2640 |
| C48 | B48 | A13 | 20 | 920 | 60 | 237 | 5 | 88 | 58 | 4.6 | 2630 |
| C49 | B49 | A14 | 6 | 920 | 50 | 93 | 3 | 79 | 91 | 3.6 | 1367 |
| C50 | B50 | A14 | 6 | 920 | 50 | 255 | 6 | 81 | 122 | 4.0 | 1271 |
| C51 | B51 | A14 | 6 | 920 | 50 | 136 | 4 | 76 | 108 | 3.2 | 1341 |
| C52 | B52 | A14 | 6 | 920 | 50 | 151 | 4 | 81 | 112 | 4.0 | 1328 |
| C53 | B53 | A14 | 6 | 920 | 50 | 126 | 4 | 77 | 101 | 3.8 | 1311 |

TABLE 18-continued

| Member No. | Steel sheet No. | Steel No. | Heat treatment: Temperature rising rate (° C./s) | Heat treatment: Heating temperature (° C.) | Heat treatment: Cooling rate (° C./s) | Steel member: Thickness of decarburized layer (μm) | Steel member: Thickness of internal oxidized layer (μm) | Steel member: Fe content in scale (%) | Steel member: Bending angle (°) | Steel member: Appropriate welding current range (kA) | Steel member: Tensile strength (MPa) |
|---|---|---|---|---|---|---|---|---|---|---|---|
| C54 | B54 | A14 | 6 | 920 | 50 | 145 | 4 | 77 | 112 | 3.8 | 1328 |
| C55 | B55 | A15 | 6 | 920 | 50 | 111 | 3 | 82 | 57 | 4.2 | 2668 |
| C56 | B56 | A15 | 6 | 920 | 50 | 351 | 6 | 89 | 66 | 4.4 | 2567 |
| C57 | B57 | A15 | 6 | 920 | 50 | 233 | 4 | 89 | 59 | 4.8 | 2633 |
| C58 | B58 | A15 | 6 | 920 | 50 | 244 | 4 | 88 | 63 | 4.8 | 2630 |
| C59 | B59 | A15 | 6 | 920 | 50 | 211 | 3 | 86 | 59 | 4.2 | 2649 |
| C60 | B60 | A15 | 6 | 920 | 50 | 240 | 4 | 88 | 64 | 4.6 | 2640 |

TABLE 19

| Member No. | Steel sheet No. | Steel No. | Heat treatment: Temperature rising rate (° C./s) | Heat treatment: Heating temperature (° C.) | Heat treatment: Cooling rate (° C./s) | Steel member: Thickness of decarburized layer (μm) | Steel member: Thickness of internal oxidized layer (μm) | Steel member: Fe content in scale (%) | Steel member: Bending angle (°) | Steel member: Appropriate welding current range (kA) | Steel member: Tensile strength (MPa) |
|---|---|---|---|---|---|---|---|---|---|---|---|
| c1 | b1 | a1 | 100 | 900 | 40 | 121 | 12 | 85 | 110 | 4.2 | 928 |
| c2 | b2 | a2 | 100 | 900 | 40 | 123 | 14 | 83 | 38 | 4.2 | 2935 |
| c3 | b3 | a3 | 100 | 900 | 40 | 120 | 12 | 82 | 112 | 4.0 | 873 |
| c4 | b4 | a4 | 100 | 900 | 40 | 123 | 17 | 84 | 102 | 4.2 | 955 |
| c5 | b5 | a5 | 100 | 900 | 40 | 131 | 11 | 82 | 113 | 4.0 | 882 |
| c6 | b6 | a6 | 100 | 900 | 40 | 126 | 16 | 82 | 40 | 4.0 | 2674 |
| c7 | b7 | A1 | 10 | 900 | 40 | 14 | 13 | 57 | 52 | 1.4 | 1243 |
| c8 | b8 | A2 | 10 | 900 | 40 | 17 | 13 | 56 | 25 | 1.4 | 2738 |
| c9 | b9 | A3 | 10 | 900 | 40 | 16 | 10 | 55 | 45 | 1.2 | 1923 |
| c10 | b10 | A4 | 10 | 900 | 40 | 14 | 12 | 54 | 41 | 1.2 | 2044 |
| c11 | b11 | A5 | 10 | 900 | 40 | 14 | 12 | 58 | 32 | 1.4 | 2349 |
| c12 | b12 | A6 | 10 | 900 | 40 | 18 | 6 | 59 | 46 | 1.6 | 1884 |
| c13 | b13 | A7 | 10 | 900 | 40 | 15 | 11 | 54 | 51 | 1.4 | 1364 |
| c14 | b14 | A8 | 10 | 900 | 40 | 13 | 12 | 55 | 48 | 1.2 | 1594 |
| c15 | b15 | A9 | 10 | 900 | 40 | 14 | 12 | 57 | 45 | 1.4 | 1971 |
| c16 | b16 | A10 | 10 | 900 | 40 | 18 | 6 | 56 | 35 | 1.4 | 2084 |
| c17 | b17 | A11 | 10 | 900 | 40 | 15 | 13 | 56 | 33 | 1.2 | 2184 |
| c18 | b18 | A12 | 10 | 900 | 40 | 14 | 13 | 54 | 35 | 1.2 | 2084 |
| c19 | b19 | A13 | 10 | 900 | 40 | 13 | 5 | 55 | 27 | 1.4 | 2662 |

Example 3

The steel sheets shown in Tables 14 to 16 were subjected to pickling, cold rolling, and hot-dip Al plating to obtain coated steel sheets having a thickness of 2.0 mm. The coated steel sheet was subjected to a heat treatment under the conditions shown in Tables 20 to 22 to obtain a coated steel member.

The obtained steel member was cut out, and glow discharge emission spectroscopy (GDS), SEM observation, and optical microscope observation were performed in the manner described above to obtain the depth of the decarburized layer, the depth of the internal oxidized layer, and the Fe content in the scale.

In addition, a tensile test, a bending test, and a spot welding test were conducted on the obtained steel members in the same manner as in Example 2, and tensile strength, bendability, and weldability were evaluated.

The results are shown in Tables 20 to 22.

TABLE 20

| Member No. | Steel sheet No. | Steel No. | Heat treatment: Temperature rising rate (° C./s) | Heat treatment: Heating temperature (° C.) | Heat treatment: Cooling rate (° C./s) | Coated steel member: Thickness of decarburized layer (μm) | Coated steel member: Thickness of internal oxidized layer (μm) | Coated steel member: Bending angle (°) | Coated steel member: Appropriate welding current range (kA) | Coated steel member: Tensile strength (MPa) |
|---|---|---|---|---|---|---|---|---|---|---|
| D1 | B1 | A1 | 5 | 920 | 50 | 51 | 7 | 90 | 8.0 | 1241 |
| D2 | B2 | A2 | 5 | 920 | 50 | 61 | 6 | 52 | 7.6 | 2732 |
| D3 | B3 | A3 | 5 | 920 | 50 | 56 | 8 | 69 | 7.8 | 1919 |
| D4 | B4 | A4 | 5 | 920 | 50 | 52 | 7 | 57 | 8.2 | 2039 |

TABLE 20-continued

| Member No. | Steel sheet No. | Steel No. | Heat treatment: Temperature rising rate (° C./s) | Heat treatment: Heating temperature (° C.) | Heat treatment: Cooling rate (° C./s) | Coated steel member: Thickness of decarburized layer (μm) | Coated steel member: Thickness of internal oxidized layer (μm) | Coated steel member: Bending angle (°) | Coated steel member: Appropriate welding current range (kA) | Coated steel member: Tensile strength (MPa) |
|---|---|---|---|---|---|---|---|---|---|---|
| D5 | B5 | A5 | 5 | 920 | 50 | 52 | 5 | 54 | 8.0 | 2341 |
| D6 | B6 | A6 | 5 | 920 | 50 | 54 | 5 | 70 | 8.2 | 1879 |
| D7 | B7 | A7 | 6 | 920 | 50 | 46 | 6 | 80 | 6.8 | 1358 |
| D8 | B8 | A7 | 6 | 920 | 50 | 91 | 8 | 120 | 7.4 | 1263 |
| D9 | B9 | A7 | 6 | 920 | 50 | 58 | 6 | 101 | 6.6 | 1327 |
| D10 | B10 | A7 | 6 | 920 | 50 | 60 | 7 | 109 | 7.2 | 1311 |
| D11 | B11 | A7 | 6 | 920 | 50 | 49 | 6 | 95 | 7.4 | 1307 |
| D12 | B12 | A7 | 6 | 920 | 50 | 61 | 6 | 107 | 7.6 | 1316 |
| D13 | B13 | A8 | 6 | 920 | 50 | 44 | 6 | 73 | 7.2 | 1588 |
| D14 | B14 | A8 | 6 | 920 | 50 | 98 | 10 | 96 | 7.8 | 1515 |
| D15 | B15 | A8 | 6 | 920 | 50 | 58 | 7 | 88 | 7.0 | 1539 |
| D16 | B16 | A8 | 6 | 920 | 50 | 66 | 8 | 95 | 7.2 | 1533 |
| D17 | B17 | A8 | 6 | 920 | 50 | 53 | 7 | 91 | 6.6 | 1542 |
| D18 | B18 | A8 | 6 | 920 | 50 | 62 | 7 | 91 | 6.8 | 1541 |
| D19 | B19 | A9 | 6 | 920 | 50 | 42 | 8 | 56 | 7.0 | 1959 |
| D20 | B20 | A9 | 6 | 920 | 50 | 91 | 12 | 84 | 8.6 | 1890 |
| D21 | B21 | A9 | 6 | 920 | 50 | 44 | 8 | 69 | 4.8 | 1944 |
| D22 | B22 | A9 | 6 | 920 | 50 | 49 | 9 | 69 | 8.2 | 1945 |
| D23 | B23 | A9 | 6 | 920 | 50 | 46 | 7 | 65 | 7.8 | 1946 |
| D24 | B24 | A9 | 6 | 920 | 50 | 47 | 8 | 72 | 8.0 | 1938 |
| D25 | B25 | A10 | 10 | 920 | 60 | 47 | 3 | 69 | 7.6 | 2072 |
| D26 | B26 | A10 | 10 | 920 | 60 | 125 | 4 | 90 | 9.0 | 1995 |
| D27 | B27 | A10 | 10 | 920 | 60 | 84 | 3 | 79 | 8.2 | 2054 |
| D28 | B28 | A10 | 10 | 920 | 60 | 84 | 2 | 82 | 8.6 | 2048 |
| D29 | B29 | A10 | 10 | 920 | 60 | 66 | 3 | 73 | 7.8 | 2051 |
| D30 | B30 | A10 | 10 | 920 | 60 | 93 | 3 | 82 | 8.0 | 2066 |

TABLE 21

| Member No. | Steel sheet No. | Steel No. | Heat treatment: Temperature rising rate (° C./s) | Heat treatment: Heating temperature (° C.) | Heat treatment: Cooling rate (° C./s) | Coated steel member: Thickness of decarburized layer (μm) | Coated steel member: Thickness of internal oxidized layer (μm) | Coated steel member: Bending angle (°) | Coated steel member: Appropriate welding current range (kA) | Coated steel member: Tensile strength (MPa) |
|---|---|---|---|---|---|---|---|---|---|---|
| D31 | B31 | A11 | 10 | 920 | 60 | 47 | 7 | 59 | 7.0 | 2180 |
| D32 | B32 | A11 | 10 | 920 | 60 | 83 | 12 | 69 | 8.0 | 2097 |
| D33 | B33 | A11 | 10 | 920 | 60 | 55 | 8 | 62 | 7.6 | 2146 |
| D34 | B34 | A11 | 10 | 920 | 60 | 53 | 8 | 63 | 7.4 | 2147 |
| D35 | B35 | A11 | 10 | 920 | 60 | 44 | 8 | 60 | 7.0 | 2150 |
| D36 | B36 | A11 | 10 | 920 | 60 | 53 | 8 | 65 | 8.0 | 2143 |
| D37 | B37 | A12 | 20 | 920 | 60 | 44 | 5 | 64 | 6.8 | 2078 |
| D38 | B38 | A12 | 20 | 920 | 60 | 108 | 6 | 88 | 8.8 | 2003 |
| D39 | B39 | A12 | 20 | 920 | 60 | 79 | 6 | 79 | 7.2 | 2034 |
| D40 | B40 | A12 | 20 | 920 | 60 | 93 | 6 | 80 | 8.2 | 2031 |
| D41 | B41 | A12 | 20 | 920 | 60 | 70 | 6 | 69 | 7.4 | 2043 |
| D42 | B42 | A12 | 20 | 920 | 60 | 50 | 6 | 67 | 7.6 | 2055 |
| D43 | B43 | A13 | 20 | 920 | 60 | 46 | 2 | 52 | 7.8 | 2653 |
| D44 | B44 | A13 | 20 | 920 | 60 | 126 | 4 | 63 | 8.2 | 2558 |
| D45 | B45 | A13 | 20 | 920 | 60 | 99 | 2 | 57 | 8.4 | 2628 |
| D46 | B46 | A13 | 20 | 920 | 60 | 99 | 2 | 58 | 8.4 | 2624 |
| D47 | B47 | A13 | 20 | 920 | 60 | 81 | 2 | 54 | 8.0 | 2634 |
| D48 | B48 | A13 | 20 | 920 | 60 | 94 | 2 | 60 | 8.4 | 2623 |
| D49 | B49 | A14 | 10 | 920 | 60 | 49 | 2 | 87 | 7.4 | 1361 |
| D50 | B50 | A14 | 10 | 920 | 60 | 97 | 3 | 122 | 6.6 | 1302 |
| D51 | B51 | A14 | 10 | 920 | 60 | 65 | 2 | 110 | 7.4 | 1323 |
| D52 | B52 | A14 | 10 | 920 | 60 | 66 | 2 | 117 | 7.4 | 1219 |
| D53 | B53 | A14 | 10 | 920 | 60 | 53 | 2 | 102 | 7.6 | 1310 |
| D54 | B54 | A14 | 10 | 920 | 60 | 63 | 1 | 113 | 7.8 | 1321 |
| D55 | B55 | A15 | 10 | 920 | 60 | 53 | 2 | 56 | 7.8 | 2659 |
| D56 | B56 | A15 | 10 | 920 | 60 | 131 | 3 | 67 | 8.2 | 2577 |
| D57 | B57 | A15 | 10 | 920 | 60 | 104 | 2 | 61 | 8.4 | 2640 |
| D58 | B58 | A15 | 10 | 920 | 60 | 103 | 2 | 62 | 8.4 | 2631 |
| D59 | B59 | A15 | 10 | 920 | 60 | 85 | 2 | 57 | 8.2 | 2638 |
| D60 | B60 | A15 | 10 | 920 | 60 | 99 | 1 | 64 | 8.4 | 2628 |

TABLE 22

| | | | Heat treatment | | | Coated steel member | | | | |
|---|---|---|---|---|---|---|---|---|---|---|
| Member No. | Steel sheet No. | Steel No. | Temperature rising rate (° C./s) | Heating temperature (° C.) | Cooling rate (° C./s) | Thickness of decarburized layer (μm) | Thickness of internal oxidized layer (μm) | Bending angle (°) | Appropriate welding current range (kA) | Tensile strength (MPa) |
| d1 | b1 | a1 | 100 | 900 | 40 | 53 | 6 | 113 | 8.0 | 920 |
| d2 | b2 | a2 | 100 | 900 | 40 | 53 | 7 | 42 | 7.4 | 2926 |
| d3 | b3 | a3 | 100 | 900 | 40 | 54 | 6 | 115 | 7.2 | 866 |
| d4 | b4 | a4 | 100 | 900 | 40 | 49 | 8 | 104 | 7.4 | 951 |
| d5 | b5 | a5 | 100 | 900 | 40 | 55 | 6 | 116 | 7.2 | 873 |
| d6 | b6 | a6 | 100 | 900 | 40 | 54 | 8 | 44 | 7.2 | 2671 |
| d7 | b7 | A1 | 10 | 900 | 40 | 17 | 7 | 54 | 4.6 | 1234 |
| d8 | b8 | A2 | 10 | 900 | 40 | 20 | 7 | 26 | 5.2 | 2734 |
| d9 | b9 | A3 | 10 | 900 | 40 | 18 | 5 | 47 | 4.8 | 1918 |
| d10 | b10 | A4 | 10 | 900 | 40 | 16 | 7 | 44 | 4.8 | 2038 |
| d11 | b11 | A5 | 10 | 900 | 40 | 17 | 7 | 36 | 5.2 | 2348 |
| d12 | b12 | A6 | 10 | 900 | 40 | 24 | 4 | 51 | 4.8 | 1882 |
| d13 | b13 | A7 | 10 | 900 | 40 | 20 | 6 | 54 | 4.6 | 1361 |
| d14 | b14 | A8 | 10 | 900 | 40 | 19 | 6 | 51 | 4.4 | 1590 |
| d15 | b15 | A9 | 10 | 900 | 40 | 21 | 7 | 49 | 4.6 | 1966 |
| d16 | b16 | A10 | 10 | 900 | 40 | 20 | 4 | 40 | 4.6 | 2078 |
| d17 | b17 | A11 | 10 | 900 | 40 | 21 | 7 | 36 | 4.4 | 2178 |
| d18 | b18 | A12 | 10 | 900 | 40 | 20 | 7 | 37 | 4.6 | 2077 |
| d19 | b19 | A13 | 10 | 900 | 40 | 10 | 3 | 29 | 4.8 | 2656 |
| d20 | b20 | A10 | 10 | 900 | 40 | 2 | 60 | 35 | 0.6 | 2070 |
| d21 | b21 | A11 | 10 | 900 | 40 | 1 | 69 | 30 | 0.6 | 2162 |
| d22 | b22 | A12 | 10 | 900 | 40 | 3 | 70 | 31 | 0.4 | 2071 |
| d23 | b23 | A13 | 10 | 900 | 40 | 3 | 57 | 23 | 0.4 | 2655 |

(Element Technology E)

Element Technology E is a hot-stamping formed body including, as a chemical composition, by mass %:

C: 0.15 to 0.50%;
Si: 0.0010% to 3.000%;
Mn: 0.30% to 3.00%;
Al: 0.0002% to 2.000%;
P: 0.100% or less;
S: 0.1000% or less;
N: 0.0100% or less;
Nb: 0% to 0.15%;
Ti: 0% to 0.15%;
V: 0% to 0.15%;
Mo: 0% to 1.0%;
Cr: 0% to 1.0%;
Cu: 0% to 1.0%;
Ni: 0% to 1.0%;
B: 0% to 0.0100%;
Ca: 0% to 0.010%;
REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3.

According to the Element Technology E, it is possible to provide a hot-stamping formed body having excellent strength and bendability and having high load capacity.

The present inventors studied a method enabling not only for a tensile (maximum) strength of 1.5 to 2.5 GPa and excellent bendability to be obtained but also for the deterioration of the load capacity to be suppressed after hot stamping. As a result, the present inventors found that, in a hot-stamping formed body, when the surface layer of the steel sheet is softened, and furthermore, the texture at a predetermined position in the sheet thickness direction is controlled, it is possible to obtain a high strength and superior bendability than ever and to suppress the deterioration of the load capacity.

The texture is affected by the texture and the carbon concentration of the metallographic structure before hot stamping. Therefore, the present inventors found that, in order to obtain a desired texture in the hot-stamping formed body, it is effective to control the texture in the steel sheet after hot rolling and, furthermore, to reduce the amount of carbon in the surface layer of the steel sheet during the subsequent annealing.

Hereinafter, the steel sheet for hot stamping and the hot-stamping formed body according to the present embodiment will be described in detail. First, the reason why the chemical composition of the steel sheet for hot stamping according to this embodiment is to be limited will be described.

Numerical limiting ranges expressed below using "to" include the lower limit and the upper limit in the ranges. Numerical values expressed with 'more than' and 'less than' are not included in numerical ranges. Regarding the chemical composition, "%" indicates "mass %" in all cases.

The steel sheet for hot stamping according to the present embodiment contains, as a chemical composition, mass %, C: 0.15% to 0.50%, Si: 0.0010% to 3.000%, Mn: 0.30% to 3.00%, Al: 0.0002% to 2.000%, P: 0.100% or less, S: 0.1000% or less, N: 0.0100% or less, Nb: 0% to 0.15%, Ti:

0% to 0.15%, V: 0% to 0.15%, Mo: 0% to 1.0%, Cr: 0% to 1.0%, Cu: 0% to 1.0%, Ni: 0% to 1.0%, B: 0% to 0.0100%, Ca: 0% to 0.010%, REM: 0% to 0.30%, and a remainder consisting of Fe and an impurity.

Hereinafter, each element will be described.

C: 0.15% to 0.50%

C is an element that improves the strength of the hot-stamping formed body. In a case where the C content is less than 0.15%, the desired strength of the hot-stamping formed body cannot be obtained. For this reason, the C content is set to 0.15% or more. The C content is preferably 0.17% or more, 0.20% or more, or 0.23% or more. On the other hand, when the C content is more than 0.50%, it is not possible to obtain excellent bendability. For this reason, the C content is set to 0.50% or less. The C content is preferably 0.46% or less or 0.43% or less.

Si: 0.0010% to 3.000%

Si is an element that improves the strength of the hot-stamping formed body by solid solution strengthening. When the Si content is less than 0.0010%, it is not possible to obtain a desired strength. For this reason, the Si content is set to 0.0010% or more. The Si content is preferably 0.050% or more, 0.100% or more, 0.300% or more, or 0.500% or more. On the other hand, when the Si content is more than 3.000%, the amount of ferrite increases, and it is not possible to obtain a desired metallographic structure. For this reason, the Si content is set to 3.000% or less. The Si content is preferably 2.700% or less or 2.500% or less.

Mn: 0.30% to 3.00%

Mn is an element that improves the hardenability of steel. In order to improve the hardenability and thereby obtain a desired amount of martensite after hot stamping, the Mn content is set to 0.30% or more. The Mn content is preferably 0.50% or more, 0.70% or more, or 1.00% or more. On the other hand, when the Mn content is more than 3.00%, cracking attributed to Mn segregation is likely to occur, and it is not possible to obtain excellent bendability. For this reason, the Mn content is set to 3.00% or less. The Mn content is preferably 2.70% or less, 2.50% or less, or 2.30% or less.

Al: 0.0002% to 2.000%

Al is an element that improves the distortion capability by deoxidizing molten steel to suppress the formation of oxide serving as the origin of fracture and improves the bendability of the hot-stamping formed body. When the Al content is less than 0.0002%, deoxidation is not sufficiently performed, and a coarse oxide is formed, which makes it impossible to obtain the above-mentioned effect. For this reason, the Al content is set to 0.0002% or more. The Al content is preferably 0.001% or more. On the other hand, when the Al content exceeds 2.000%, a coarse oxide is formed in steel, and the bendability of the hot-stamping formed body deteriorates. For this reason, the Al content is set to 2.000% or less. The Al content is preferably 1.700% or less or 1.500% or less.

P: 0.100% or Less

P is an impurity element and serves as the origin of fracture by being segregated at a grain boundary. For this reason, the P content is limited to 0.100% or less. The P content is preferably 0.050% or less. The lower limit of the P content is not particularly limited, but reduction of the P content to less than 0.0001% significantly increases the dephosphorization cost, which is not preferable economically. For this reason, the P content may be set to 0.0001% or more.

S: 0.1000% or Less

S is an impurity element and forms an inclusion in steel. Since this inclusion serves as the origin of fracture, the S content is limited to 0.1000% or less. The S content is preferably 0.0500% or less or 0.0300% or less. The lower limit of the S content is not particularly limited, but reduction of the S content to less than 0.0001% significantly increases the desulfurization cost, which is not preferable economically. For this reason, the S content may be set to 0.0001% or more.

N: 0.0100% or Less

N is an impurity element and forms nitride in steel. Since this nitride serves as the origin of fracture, the N content is limited to 0.0100% or less. The N content is preferably 0.0050% or less. The lower limit of the N content is not particularly limited, but reduction of the N content to less than 0.0001% significantly increases the denitrification cost, which is not preferable economically. For this reason, the N content may be set to 0.0001% or more.

The remainder of the chemical composition of the steel sheet for hot stamping according to this embodiment may be Fe and impurities. Elements, which are unavoidably mixed from a steel raw material or scrap and/or during the manufacture of steel and are allowed in a range where the characteristics of the steel sheet for hot stamping according to this embodiment do not deteriorate, are exemplary examples of the impurities.

The steel sheet for hot stamping according to this embodiment may contain the following elements as arbitrary elements instead of a part of Fe. The contents of the following arbitrary elements, which are obtained in a case where the following arbitrary elements are not contained, are 0%.

Nb: 0% to 0.15%

Ti: 0% to 0.15%

V: 0% to 0.15%

Nb and Ti have an effect on improvement in the strength of the hot-stamping formed body by precipitation hardening by forming a carbonitride in steel. In order to reliably exhibit this effect, the content of even one of Nb, Ti, and V is preferably set to 0.05% or more. On the other hand, in a case where the content of even one of Nb, Ti, and V is set to more than 0.15%, a large amount of a carbonitride is formed in steel, and the ductility of the hot-stamping formed body deteriorates. Therefore, the Nb content, Ti content, and V content are each set to 0.15% or less.

Mo: 0% to 1.0%

Cr: 0% to 1.0%

Cu: 0% to 1.0%

Ni: 0% to 1.0%

Mo and Cr have an action of increasing the strength of the hot-stamping formed body by forming a solid solution in prior austenite grains during heating before hot stamping. In order to reliably obtain this effect, the content of even one of Mo, Cr, Cu, and Ni is preferably set to 0.05% or more. On the other hand, since the effect is saturated even when a large amount of Mo, Cr, Cu, and Ni are contained, the Mo content, the Cr content, the Cu content, and the Ni content are each preferably set to 1.0% or less.

B: 0% to 0.0100%

B is an element that improves the hardenability of steel. In order to reliably obtain this effect, the B content is preferably set to 0.0001% or more. On the other hand, even when the B content is set to more than 0.0100%, the effect on improvement in the hardenability is saturated. For this reason, the B content is set to 0.0100% or less.

Ca: 0% to 0.010%

REM: 0% to 0.30%

Ca and REM are elements that improves the distortion capability by suppressing the formation of an oxide serving as the origin of fracture and improves the bendability of the hot-stamping formed body. In order to reliably obtain this effect, the content of even one of Ca and REM is preferably set to 0.001% or more. On the other hand, since the effect is saturated even when a large amount of Ca and REM are contained, the Ca content is set to 0.010% or less, and the REM content is set to 0.30% or less.

In this embodiment, REM refers to a total of 17 elements that are composed of Sc, Y, and lanthanoid and the REM content refers to the total content of these elements.

The above-mentioned chemical composition of the steel sheet for hot stamping may be measured by an ordinary analysis method. For example, the chemical composition of the above-mentioned hot-stamping formed body may be measured using inductively coupled plasma-atomic emission spectrometry (ICP-AES). C and S may be measured using a combustion-infrared absorption method and N may be measured using an inert gas fusion-thermal conductivity method. In a case where a plating layer is provided on the surface of the steel sheet for hot stamping, the chemical composition may be analyzed after the plating layer is removed by mechanical grinding.

Next, the metallographic structure of the steel sheet for hot stamping according to the present embodiment will be described.

The steel sheet for hot stamping according to the present embodiment has a metallographic structure consisting of, by area ratio, a total of 20% to 80% of ferrite, granular bainite, bainite, and martensite and the remainder in microstructure consisting of pearlite and a carbide. Regarding the metallographic structure to be described below, "%" indicates "area %" in all cases.

Ferrite, Granular Bainite, Bainite, and Martensite: 20% to 80%

Ferrite, granular bainite, bainite, and martensite are necessary structures to obtain a desired texture in a hot-stamping formed body. When the total area ratio of these structures is less than 20%, it is not possible to obtain a desired texture in the hot-stamping formed body. For this reason, the area ratio of the ferrite is set to 20% or more. The area ratio of the ferrite is preferably 30% or more or 40% or more. On the other hand, when the area ratio of these structures is more than 80%, carbon is concentrated in pearlite, which is the remainder, it becomes difficult for a carbide to dissolve during hot stamp heating, and the carbide serves as the origin of cracking during distortion. Therefore, the area ratio is set to 80% or less. The area ratio is preferably 70% or less or 60% or less.

Remainder in Microstructure: Pearlite and Carbide

The remainder in microstructure of the metallographic structure of the steel sheet for hot stamping consists of pearlite and a carbide. In the metallographic structure of the steel sheet for hot stamping, structures other than the above-mentioned structure, pearlite, and the carbide are not contained, the area ratio of the remainder in microstructure may be set to 20% to 80%.

Measurement Method of Metallographic Structure of Steel Sheet for Hot Stamping

A sample is cut out from an arbitrary position away from an end surface of the steel sheet for hot stamping by a distance of 50 mm or more (a position that avoids an end portion in a case where the sample cannot be collected at this position) so that a sheet thickness-cross section parallel to a rolling direction can be observed. The size of the sample also depends on a measurement device, but is set to a size that can be observed by about 10 mm in the rolling direction.

After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water and finish-polished using a colloidal silica solution. Next, analysis is performed in a region that has a length of 50 μm and is present between a depth corresponding to ⅛ of the sheet thickness from the surface and a depth corresponding to ⅜ of the sheet thickness from the surface at an arbitrary position on the cross section of the sample in a longitudinal direction at an analysis rate of 200 to 300 points/second using an EBSD analyzer including a schottky emission scanning electron microscope (JSM-7001F manufactured by JEOL Ltd.) and an EBSD detector (DVC 5-type detector manufactured by TSL Solutions). The area ratio of a region where the crystal structure is bcc is calculated using a "Phase Map" function installed in software "OIM Analysis (registered trademark)" included in an EBSD analyzer, whereby the total area ratio of the ferrite, the granular bainite, the bainite, and the martensite can be obtained.

The pearlite and the carbide can be identified by the following method. After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water and Nital etching is performed. Then, photographs having a plurality of visual fields are taken using a schottky emission scanning electron microscope (JSM-7001F manufactured by JEOL Ltd.) in a region that has a length of 50 μm and is present between a depth corresponding to ⅛ of the sheet thickness from the surface and a depth corresponding to ⅜ of the sheet thickness from the surface at an arbitrary position on the cross section of the sample in a longitudinal direction. Evenly spaced grids are drawn in the taken photographs, and structures at grid points are identified. The number of grid points corresponding to each structure is obtained and is divided by the total number of grid points, so that the area ratio of each structure is obtained. The area ratio can be more accurately obtained as the total number of grid points is larger. In this embodiment, grid spacings are set to 2 μm×2 μm and the total number of grid points is set to 1500. Particles with bright brightness are regarded as the carbide, and a region where regions with bright brightness are disposed in a granular or sheet shape and in a lamellar shape is regarded as the pearlite.

Next, the texture of the steel sheet for hot stamping according to the present embodiment will be described.

In the steel sheet for hot stamping according to the present embodiment, the ratio between the pole density of the orientation group consisting of {001} <1-10> to {001} <−1-10> and the pole density of the orientation group consisting of {111} <1-10> to {111} <−1-12> is less than 1.5 in the texture between the surface and the sheet thickness ¼ position from the surface, and the ratio between the pole density of the orientation group consisting of {001} <1-10> to {001} <−1-10> and the pole density of the orientation group consisting of {111} <1-10> to {111} <−1-12> is less than 2.0 in the texture between the sheet thickness ¼ position from the surface and the sheet thickness ½ position from the surface.

The orientation group consisting of {001} <1-10> to {001} <−1-10> includes crystal orientations of {001} <1-10>, {001} <1-20>, {001} <0-10>, and {001} <−1-10>.

The orientation group consisting of {111} <1-10> to {111} <−1-12> includes crystal orientations of {111} <1-10>, {111} <1-20>, {111} <0-10>, and {111} <−1-12>.

Texture between surface and sheet thickness ¼ position from surface: Ratio between pole density of orientation group consisting of {001} <1-10> to {001} <−1-10> and pole density of orientation group consisting of {111} <1-10> to {111} <−1-12> being less than 1.5 In the texture between the surface and the sheet thickness ¼ position from the surface (hereinafter, referred to as the surface layer region in some cases), the ratio between the pole density of the orientation group consisting of {001} <1-10> to {001} <−1-10> and the pole density of the orientation group consisting of {111} <1-10> to {111} <−1-12> is set to less than 1.5.

When the texture in the surface layer region of the steel sheet for hot stamping is preferably controlled, it is possible to suppress carbon recuperation in the surface layer region (diffusion of carbon from the inside region into the surface layer region having a low C concentration) during heating for hot stamping, and, when a texture that easily relaxes strain introduced by bending distortion in the surface layer region where energy attributed to distortion is absorbed such as a vicinity of the surface of the steel sheet is developed, it is possible to obtain a steel sheet for hot stamping having excellent bendability after hot stamping.

When the ratio between the pole density of the orientation group consisting of {001} <1-10> to {001} <−1-10> and the pole density of the orientation group consisting of {111} <1-10> to {111} <−1-12> of the texture in the surface layer region is 1.5 or more, the above-mentioned effect cannot be obtained. Therefore, the ratio between the pole density of the orientation group consisting of {001} <1-10> to {001} <−1-10> and the pole density of the orientation group consisting of {111} <1-10> to {111} <−1-12> of the texture in the surface layer region is set to less than 1.5. The ratio is preferably less than 1.2.

The ratio between the pole density of the orientation group consisting of {001} <1-10> to {001} <−1-10> and the pole density of the orientation group consisting of {111} <1-10> to {111} <−1-12> of the texture in the surface layer region may be set to 0.4 or more from the viewpoint of ensuring the strength of the hot-stamping formed body.

Texture between sheet thickness ¼ position from surface and sheet thickness ½ position from surface: Ratio between pole density of orientation group consisting of {001} <1-10> to {001} <−1-10> and pole density of orientation group consisting of {111} <1-10> to {111} <−1-12> being less than 2.0 In the texture between the sheet thickness ¼ position from the surface and the sheet thickness ½ position from surface (hereinafter, referred to as the inside region in some cases), the ratio between the pole density of the orientation group consisting of {001} <1-10> to {001} <−1-10> and the pole density of the orientation group consisting of {111} <1-10> to {111} <−1-12> is set to less than 2.0.

When the texture in the inside region of the steel sheet for hot stamping is preferably controlled, it is possible to develop a texture including grain boundaries that do not easily fracture in a region that withstands a load such as the vicinity of the inside of the steel sheet and also to improve the load capacity while maintaining excellent bendability. When the ratio between the pole density of the orientation group consisting of {001} <1-10> to {001} <−1-10> and the pole density of the orientation group consisting of {111} <1-10> to {111} <−1-12> of the texture in the inside region is 2.0 or more, the above-mentioned effect cannot be obtained. Therefore, the ratio between the pole density of the orientation group consisting of {001} <1-10> to {001} <−1-10> and the pole density of the orientation group consisting of {111} <1-10> to {111} <−1-12> of the texture in the inside region is set to less than 2.0. The ratio is preferably less than 1.6.

The ratio between the pole density of the orientation group consisting of {001} <1-10> to {001} <−1-10> and the pole density of the orientation group consisting of {111} <1-10> to {111} <−1-12> of the texture in the inside region may be set to 0.4 or more from the viewpoint of ensuring the toughness.

Measurement Method of Pole Density

The pole densities of the surface layer region and the inside region are measured by the following method.

The pole densities of the surface layer region and the inside region can be obtained from an orientation distribution function (ODF) that displays a three-dimensional texture calculated by computing, using spherical harmonics, an orientation data measured by an electron backscattering diffraction (EBSD) method using a device in which a scanning electron microscope and an EBSD analyzer are combined and OIM Analysis (registered trademark) manufactured by TSL Solutions.

The measurement ranges are a region between the surface and the sheet thickness ¼ position from the surface (a region between the surface as the start point and the sheet thickness ¼ position in the sheet thickness direction from the surface as the end point) for the surface layer region and a region between the sheet thickness ¼ position from the surface and the sheet thickness ½ position from the surface (a region between the sheet thickness ¼ position in the sheet thickness direction from the surface as the start point and the sheet thickness ½ position in the sheet thickness direction from the surface as the end point) for the inside region. The measurement pitches are set to 5 μm/step.

A value obtained by dividing the average value of the pole densities of the orientation group consisting of {001} <1-10> to {001} <−1-10> by the average value of the pole densities of the orientation group consisting of {111} <1-10> to {111} <−1-12> is regarded as the ratio between the pole density of the orientation group consisting of {001} <1-10> to {001} <−1-10> and the pole density of the orientation group consisting of {111} <1-10> to {111} <−1-12>.

It should be noted that {hkl} indicates a crystal plane parallel to a rolled surface and <uvw> indicates a crystal direction parallel to a rolling direction. That is, {hkl} <uvw> indicates a crystal in which {hkl} is oriented in the sheet surface normal direction and <uvw> is oriented in the rolling direction.

The steel sheet for hot stamping according to the present embodiment may have a plating layer on a surface. The plating layer provided on the surface makes it possible to improve the corrosion resistance after hot stamping. As the plating layer, an aluminum plating layer, an aluminum-zinc plating layer, an aluminum-silicon plating layer, a hot-dip galvanized layer, an electrogalvanized layer, a hot-dip galvannealed layer, or the like is an exemplary example.

Decarburization Index of Steel Sheet for Hot Stamping being 0.085 or More

When the decarburization index of the steel sheet for hot stamping is preferably controlled, it is possible to promote the development of the texture including grain boundaries that do not easily fracture in a region that withstands a load such as the vicinity of the inside of the steel sheet and also to improve the load capacity while maintaining excellent bendability. The decarburization index is preferably 0.140 or more and more preferably 0.180 or more. Due to the calculation method of the decarburization index, the upper limit becomes 1.000.

Measurement Method of Decarburization Index

The decarburization index is an index that quantifies the amount of carbon reduced in the surface layer of the steel sheet and can be calculated by the following method. An element concentration distribution in the sheet thickness direction in the steel sheet for hot stamping is measured using a glow discharge optical emission spectrometry (GD-OES). Here, the measurement range is set to a depth of 200 μm from the outermost surface of the steel sheet, and the measurement intervals are set to 0.02 μm or less. All elements that are contained in the steel sheet for hot stamping are measured.

For steel sheets having a plating layer, a coating film, or the like on the surface, a part or all of the plating layer, coating, or the like is removed by mechanical polishing or chemical polishing such that measurement becomes possible up to a position 200 μm deep from the outermost surface of the steel sheet, and GD-OES measurement is performed. In the GD-OES measurement, a region where the iron concentration becomes 90 mass % or more is determined as the steel sheet, and a measurement point where the iron concentration becomes 90 mass % is defined as the outermost surface position of the steel sheet.

Next, the average value of the measurement values (1000 points or more) of the carbon concentration from the outermost surface position of the steel sheet to a depth of 180 μm to a depth of 200 μm is calculated, and this average value is regarded as the carbon concentration of the steel sheet base metal.

Alternatively, regarding the measurement value of the carbon concentration in a 20 μm region from the deepest portion toward the surface layer, in a case where the absolute value of the difference between the average value of the carbon concentrations in the 20 μm regions from the deepest portion toward the surface layer and the maximum value of the measurement values of the carbon concentrations in the 20 μm regions from the deepest portion toward the surface layer is 0.1% or less, and the absolute value of the difference between the average value of the carbon concentrations in the 20 μm regions from the deepest portion toward the surface layer and the minimum value of the measurement values of the carbon concentrations in the 20 μm regions from the deepest portion toward the surface layer is 0.1% or less, the average value of the carbon concentrations in the 20 μm regions from the deepest portion toward the surface layer may be regarded as the carbon concentration of the steel sheet base metal.

The unit depth is 20 nm, and the deepest portion refers to each deep position in a case where positions are marked every unit depth from the outermost surface position of the steel sheet to a depth position of 200 μm. For example, in a case where the deepest portion is 120 μm, "the measurement value of the carbon concentration in the 20 μm region from the deepest portion toward the surface layer" means the carbon concentration at a measurement point that is included between the 100 μm position and the 120 μm position.

The amount of the carbon concentration decreased per unit depth (a value obtained by subtracting the carbon concentration at each measurement point from the carbon concentration of the base metal) is calculated from the outermost surface position of the steel sheet to the depth position of 200 μm, and the integrated value of the product of the unit depth and the amount of the carbon concentration decreased is obtained and regarded as the area of a carbon deficient region (area A). Next, the product of the carbon concentration of the base metal and 200 μm is regarded as a reference area (area B), and a value obtained by dividing the carbon deficient area (area A) by the reference area (area B) is regarded as the decarburization index.

Next, a hot-stamping formed body that can be obtained by applying a manufacturing method to be described below to the above-described steel sheet for hot stamping will be described. In the hot-stamping formed body according to the present embodiment, the texture is changed between the surface layer region and the inside region, whereby the distortion capability of the metallographic structure in the surface layer region is improved, and the load capacity of the inside is enhanced. The chemical composition of the hot-stamping formed body according to the present embodiment is the same as the chemical composition of the above-described steel sheet for hot stamping and thus will not be described again.

The hot-stamping formed body according to the present embodiment has a metallographic structure including, by area ratio, a total of 90% or more of martensite, bainite, and tempered martensite, the ratio between the pole density of the orientation group consisting of {001} <1-10> to {001} <−1-10> and the pole density of the orientation group consisting of {111} <1-10> to {111} <−1-12> is less than 1.8 in the texture between the surface and the sheet thickness ¼ position from the surface, and the ratio between the pole density of the orientation group consisting of {001} <1-10> to {001} <−1-10> and the pole density of the orientation group consisting of {111} <1-10> to {111} <−1-12> is less than 2.3 in the texture between the sheet thickness ¼ position from the surface and the sheet thickness ½ position from the surface. Regarding the metallographic structure to be described below, "%" indicates "area %" in all cases.

Martensite, Bainite, and Tempered Martensite: Total of 90% or More

Martensite, bainite, and tempered martensite are structures necessary to obtain a desired strength. When the total area ratio of martensite, bainite, and tempered martensite is less than 90%, a desired strength cannot be obtained. For this reason, the area ratio of martensite, bainite, and tempered martensite is set to 90% or more in total. The area ratio is preferably 93% or more or 95% or more. Since the area ratio of martensite, bainite, and tempered martensite is preferably as large as possible, the area ratio of martensite, bainite, and tempered martensite may be set to 100%.

In the present embodiment, two or more kinds of martensite, bainite, and tempered martensite may be contained in an area ratio of a total of 90% or more or one of martensite, bainite, or tempered martensite may be contained in an area ratio of 90% or more.

There is a case where the hot-stamping formed body according to the present embodiment includes one or more of ferrite and granular bainite as the remainder in microstructure. When the area ratio of these remainders in microstructure is more than 10%, a desired load capacity cannot be obtained. Therefore, the area ratio of the remainder in microstructure may be set to 10% or less. Since the area ratio of the remainder in microstructure is preferably as small as possible, the area ratio of the remainder in microstructure may be set to 7% or less, 5% or less, or 0%.

Measurement Method of Area Ratios of Martensite, Bainite, and Tempered Martensite The metallographic structure of the hot-stamping formed body according to the present embodiment is measured by the following method.

A sample is cut out from an arbitrary position away from an end surface of the hot-stamping formed body by a distance of 50 mm or more (a position that avoids an end portion in a case where the sample cannot be collected at this position) so that a sheet thickness-cross section parallel to a rolling direction can be observed. The size of the sample also depends on a measurement device, but is set to a size that can be observed by about 10 mm in the rolling direction.

After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water. Then, the sample is polished for 8 minutes using colloidal silica not containing alkaline solution at a room temperature, and thus, strain introduced into the surface layer of the sample is removed. A region, which has a length of 50 μm and is present between a depth corresponding to ⅛ of the sheet thickness from the surface and a depth corresponding to ⅜ of the sheet thickness from the surface, is measured at a measurement interval of 0.1 μm at an arbitrary position on the cross section of the sample in a longitudinal direction by an electron backscatter diffraction method, and thus, crystal orientation information is obtained. An EBSD analyzer formed of a schottky emission scanning electron microscope (JSM-7001F manufactured by JEOL Ltd.) and an EBSD detector (DVC 5-type detector manufactured by TSL Solutions) is used for measurement. In this case, the degree of vacuum in the EBSD analyzer is set to $9.6\times10^{-5}$ Pa or less, an accelerating voltage is set to 15 kV, an irradiation current level is set to 13, and the irradiation level of an electron beam is set to 62.

A region where the crystal structure is bcc is specified using the obtained crystal orientation information and "Phase Map" function of software "OIM Analysis (registered trademark)" included in an EBSD analyzer. Regions where the crystal structure is bcc are determined as bainite, tempered martensite, martensite, granular bainite, and ferrite. In these regions, regions where a grain average misorientation value is more than 3.0° are determined as martensite, bainite, and tempered martensite using "Grain Average Misorientation" function of software "OIM Analysis (registered trademark)" included in the EBSD analyzer, and the total of these area ratios is calculated, thereby obtaining the total of the area ratios of "martensite, bainite, and tempered martensite".

The area ratio of the remainder in microstructure may be obtained by subtracting the total of the area ratios of "martensite, bainite, and tempered martensite" from 100%.

Texture between surface and sheet thickness ¼ position from surface: Ratio between pole density of orientation group consisting of {001} <1-10> to 10011<–1-10> and pole density of orientation group consisting of {111} <1-10> to {111} <–1-12> being less than 1.8 In the texture between the surface and the sheet thickness ¼ position from the surface (surface layer region), when the ratio between the pole density of the orientation group consisting of {001} <1-10> to {001} <–1-10> and the pole density of the orientation group consisting of {111} <1-10> to {111} <–1-12> is set to less than 1.8, the bendability can be improved. Therefore, in the texture of the surface layer region, the ratio between the pole density of the orientation group consisting of {001} <1-10> to {001} <–1-10> and the pole density of the orientation group consisting of {111} <1-10> to {111} <–1-12> is set to less than 1.8. The ratio is preferably less than 1.7 or less than 1.6.

The ratio between the pole density of the orientation group consisting of {001} <1-10> to {001} <–1-10> and the pole density of the orientation group consisting of {111} <1-10> to {111} <–1-12> of the texture of the surface layer region may be set to 0.4 or more from the viewpoint of ensuring the strength.

Texture between sheet thickness ¼ position from surface and sheet thickness ½ position from surface: Ratio between pole density of orientation group consisting of {001} <1-10> to {001} <–1-10> and pole density of orientation group consisting of {111} <1-10> to {111} <–1-12> being less than 2.3 In the texture between the sheet thickness ¼ position from the surface and the sheet thickness ½ position from the surface (inside region), when the ratio between the pole density of the orientation group consisting of {001} <1-10> to {001} <–1-10> and the pole density of the orientation group consisting of {111} <1-10> to {111} <–1-12> is set to less than 2.3, a high load capacity can be obtained. Therefore, in the texture of the inside region, the ratio between the pole density of the orientation group consisting of {001} <1-10> to {001} <–1-10> and the pole density of the orientation group consisting of {111} <1-10> to {111} <–1-12> is set to less than 2.3. The ratio is preferably less than 2.2 or less than 2.1.

The ratio between the pole density of the orientation group consisting of {001} <1-10> to {001} <–1-10> and the pole density of the orientation group consisting of {111} <1-10> to {111} <–1-12> of the texture of the inside region may be set to 0.4 or more from the viewpoint of ensuring the toughness.

The pole densities of the surface layer region and the inside region may be measured by the same method as that for the steel sheet for hot stamping. However, the rolling direction in the hot-stamping formed body may be determined by the following method.

First, a test piece is collected such that the sheet thickness cross section of the hot-stamping formed body can be observed. The sheet thickness cross section of the collected test piece is finished by mirror polishing and then observed using an optical microscope. The observation range is set to the overall thickness of the sheet thickness, and a region where the brightness is dark is determined as an inclusion. Among inclusions, in inclusions having a major axis length of 40 μm or more, a direction parallel to a direction where the inclusion extends is determined as the rolling direction.

The hot-stamping formed body according to the present embodiment may have a plating layer on a surface. The plating layer provided on the surface makes it possible to improve the corrosion resistance. As the plating layer, an aluminum plating layer, an aluminum-zinc plating layer, an aluminum-silicon plating layer, a hot-dip galvanized layer, an electrogalvanized layer, a hot-dip galvannealed layer, or the like is an exemplary example.

Decarburization Index of Hot-Stamping Formed Body being 0.085 or More

When the decarburization index of the hot-stamping formed body is preferably controlled, it is possible to promote the development of the texture including grain boundaries that do not easily fracture in a region that withstands a load such as the vicinity of the inside of the steel sheet and also to improve the load capacity while maintaining excellent bendability. The decarburization index is preferably 0.140 or more and more preferably 0.180 or more. Due to the calculation method of the decarburization index, the upper limit of the decarburization index becomes 1.000; however, in order to improve the load capacity as well while maintaining excellent bendability, the upper limit is preferably 0.500 or less and more preferably 0.040 or less.

The decarburization index of the hot-stamping formed body may be measured by the same method as that for the steel sheet for hot stamping.

Manufacturing Method of Steel Sheet for Hot Stamping

Hereinafter, a preferable manufacturing method of the steel sheet for hot stamping according to the present embodiment will be described.

First, it is preferable that a cast piece is heated to 1200° C. or higher and held for 20 minutes or longer and then, in a hot rolling process, a rolling which is 1 pass before a final rolling is performed in a temperature range of 850° C. to 900° C. at a rolling reduction of 8% to 30%. Next, the hot rolling is preferably completed in a temperature range of 800° C. or higher and lower than 850° C. at a rolling reduction of 6% to 12%. That is, the final rolling of the hot rolling is preferably performed in a temperature range of 800° C. or higher and lower than 850° C. at a rolling reduction of 6% to 12%.

It is preferable that, after 2.5 seconds or longer elapses from the end of the hot rolling, cooling is performed at an average cooling rate in a temperature range from the hot rolling end temperature to 450° C. of slower than 10° C./s. After that, the hot-rolled steel sheet is preferably coiled in a temperature range of 700° C. or lower. Furthermore, it is preferable that decarburization annealing is performed, thereby manufacturing a steel sheet for hot stamping having the above-described chemical composition.

The present inventors found that a texture that improves the bending distortion capability and the load capacity after hot stamping develops by transformation from austenite including a small amount of dislocation into ferrite or granular bainite. Therefore, when the rolling one pass before the final rolling is performed at lower than 850° C. or performed at a rolling reduction of larger than 30%, there is a case where the cast piece is finally rolled while the dislocation of austenite before transformation remains unrecovered, transformation from austenite including the dislocation to ferrite occurs, and the development of a desired texture is impaired.

On the other hand, when the rolling one pass before the final rolling is performed at higher than 900° C. or performed at a rolling reduction of smaller than 8%, there is a case where the recovery of dislocation is excessively promoted, the dislocation density in austenite becomes too low, and a desired texture cannot be obtained.

Therefore, the rolling one pass before the final rolling in the hot rolling is preferably performed in a temperature range of 850° C. to 900° C. at a rolling reduction of 8% to 30%.

When the final rolling is performed at lower than 800° C. or performed at a rolling reduction of larger than 12%, there is a case where the cast piece is finally rolled while the dislocation of austenite before transformation remains unrecovered, transformation from austenite including the dislocation to ferrite occurs, and the development of a desired texture is impaired.

On the other hand, when the final rolling is performed at 850° C. or higher or performed at a rolling reduction of smaller than 6%, there is a case where the recovery of dislocation is excessively promoted, and thus the dislocation density in austenite becomes too low, and a desired texture cannot be obtained.

Therefore, the final rolling of the hot rolling is preferably performed in a temperature range of 800° C. or higher and lower than 850° C. at a rolling reduction of 6% to 12%.

It is preferable to start cooling after 2.5 seconds or longer elapses from the end of the hot rolling. When a time of 2.5 seconds or longer is ensured before the start of the cooling, phase transformation to ferrite or granular bainite is promoted, and a desired texture can be sufficiently developed. When the elapsed time is shorter than 2.5 seconds, there is a case where a desired texture cannot be obtained.

After 2.5 seconds or longer elapses from the completion of the hot rolling, when the average cooling rate in a temperature range from the hot rolling end temperature to 450° C. is set to slower than 10° C./s, phase transformation to ferrite or granular bainite is promoted, and a desired texture can be sufficiently developed. When the average cooling rate in the above-described temperature range is 10° C./s or faster, there is a case where a desired texture cannot be obtained.

The average cooling rate mentioned herein is defined as a value obtained by dividing a temperature difference between the start point and the end point of a set range by the elapsed time from the start point to the end point.

When the coiling temperature is higher than 700° C., there is a case where the recovery of dislocation is excessively promoted and a desired texture does not develop. Therefore, the coiling temperature is preferably set to 700° C. or lower.

The steel sheet for hot stamping is obtained by the above method.

It is preferable to perform decarburization annealing on the steel sheet for hot stamping obtained by the above method. Before the decarburization annealing, a heat treatment for the purpose of softening may be performed as necessary, and furthermore, cold rolling may be performed at a cumulative rolling reduction (={1−(sheet thickness after cold rolling/sheet thickness before cold rolling)}×100) of 30% to 70%. Plating may be performed in a decarburization annealing line or an annealing line for plating may be threaded again after the end of the decarburization annealing. As a plating layer that is imparted to the surface of the steel sheet for hot stamping, an aluminum plating layer, an aluminum-zinc plating layer, an aluminum-silicon plating layer, a hot-dip galvanized layer, an electrogalvanized layer, a hot-dip galvannealed layer, or the like is an exemplary example.

The decarburization annealing reduces the amount of C in the surface layer region of the steel sheet for hot stamping. As the conditions of the decarburization annealing, it is preferable that the atmosphere is set to a moist atmosphere containing hydrogen, nitrogen, or oxygen, the decarburization annealing temperature (the maximum attainment temperature of the steel sheet) is set to 700° C. to 950° C., and the residence time in the temperature range of 700° C. to 950° C. is set to 5 seconds to 1200 seconds. The residence time mentioned herein refer to a time from when the steel sheet temperature rises and reaches 700° C. to when the steel sheet temperature is held at 700° C. to 950° C., decreases and reaches 700° C.

When the maximum attainment temperature is lower than 700° C. and the residence time in the temperature range of 700° C. to 950° C. is shorter than 5 seconds, since the diffusion of C is not sufficiently promoted, there is a case where decarburization does not proceed and the texture of the surface layer region cannot be controlled. On the other hand, when the maximum attainment temperature is higher than 950° C. and the residence time in the temperature range of 700° C. to 950° C. is longer than 1200 seconds, there is a case where decarburization excessively proceeds and, in the texture of the surface layer region, the ratio between the pole density of the orientation group consisting of {001} <1-10> to {001} <–1-10> and the pole density of the orientation group consisting of {111} <1-10> to {111} <–1-12> cannot be controlled to less than 1.5.

Next, a preferable manufacturing method of the hot-stamping formed body according to the present embodiment using the steel sheet for hot stamping according to the present embodiment will be described. The hot-stamping formed body according to the present embodiment can be obtained by hot-stamping the steel sheet for hot stamping manufactured by the above-described method in a high temperature range.

First, it is preferable that the steel sheet for hot stamping is heated and held in a temperature range of 800° C. to 1000° C. for 60 to 600 seconds. An average heating rate during the heating may be set to 0.1° C./s or faster or 200° C./s or slower. The average heating rate mentioned here is a value that is obtained in a case where a temperature difference between the surface temperature of a steel sheet at the time of start of the heating and a holding temperature is divided by a time difference from the start of the heating to a time when a temperature reaches a holding temperature. In addition, during the holding, the temperature of a steel sheet may be fluctuated in the temperature range of 800° C. to 1000° C. or may be constant.

When the heating temperature is lower than 800° C. and the holding time is shorter than 60 seconds, there is a case where the dissolution of a carbide becomes impure and the remaining carbide acts as a starting point of cracking to degrade the bendability. When the heating temperature is higher than 1000° C. and the holding time is longer than 600 seconds, there is a case where the diffusion of C is excessively promoted and the ratio between the pole density of the orientation group consisting of {001} <1-10> to {001} <–1-10> and the pole density of the orientation group consisting of {111} <1-10> to {111} <–1-12> of the texture of the inside region cannot be set to less than 2.3.

Exemplary examples of a heating method to be performed before the hot stamping include heating using an electric furnace, a gas furnace, or the like, flame heating, energization heating, high-frequency heating, induction heating, and the like.

After the steel sheet is held in the above-described temperature range, hot stamping is performed. In the manufacturing method of the hot-stamping formed body according to the present embodiment, forming is preferably performed in a temperature range of 650° C. or higher and lower than 1000° C. After the hot stamping, it is preferable to cool the steel sheet to a temperature range of 300° C. or lower at an average cooling rate of 10° C./s or faster.

In the manufacturing method of the hot-stamping formed body according to the present embodiment, when the forming temperature is lower than 650° C., there is a case where it is not possible to set the total area ratio of bainite, tempered martensite, and martensite to 90% and it is not possible to obtain a desired load capacity. When the forming is performed at 1000° C. or higher, in the texture of the inside region, there is a case where grain diameters become too large and it is not possible to control the ratio between the pole density of the orientation group consisting of {001} <1-10> to {001} <–1-10> and the pole density of the orientation group consisting of {111} <1-10> to {111} <–1-12> to less than 2.3.

The hot-stamping formed body is obtained by the above method. After the hot stamping, a tempering treatment may be performed at 150° C. to 600° C. In addition, a part of the hot-stamping formed body may be tempered by laser irradiation or the like to partially provide a softened region.

EXAMPLES

Next, examples of the Element Technology E will be described. Conditions in the examples are examples of conditions adopted to confirm the feasibility and effect of the Element Technology E, and the Element Technology E is not limited to the examples of conditions. The Element Technology E is capable of adopting a variety of conditions as long as the object of the Element Technology E is achieved without departing from the gist of the Element Technology E.

Steel pieces manufactured by casting molten steel having a chemical composition shown in Table 23 and Table 24 were held in a temperature range of 1200° C. or higher for 20 minutes or longer, and then hot rolling, cold rolling, and decarburization annealing were performed under conditions shown in Table 25 to Table 30. A softening heat treatment was performed before the decarburization annealing as necessary. In addition, plating and plating annealing were performed as necessary. Therefore, steel sheets for hot stamping shown in Table 31 to Table 33 were obtained.

Hot stamping was performed on the obtained steel sheet for hot stamping under conditions shown in Table 34 to Table 36, thereby obtaining hot-stamping formed bodies. On some of the hot-stamping formed bodies, a tempering treatment was performed at 150° C. to 600° C. after the hot stamping. In addition, for some of the hot-stamping formed bodies, the hot-stamping formed bodies were partially irradiated with a laser, thereby forming partially softened regions. Table 37 to Table 39 show the microstructures and mechanical properties of the obtained hot-stamping formed bodies.

In addition, "pole density ratio in texture of surface layer region" in Table 37 to Table 39 indicates the ratio between the pole density of the orientation group consisting of {001} <1-10> to {001} <–1-10> and the pole density of the orientation group consisting of {111} <1-10> to {111} <–1-12> in the texture between the surface and the sheet thickness ¼ position from the surface, and "pole density ratio in texture of inside region" indicates the ratio between the pole density of the orientation group consisting of {001} <1-10> to {001} <–1-10> and the pole density of the orientation group consisting of {111} <1-10> to {111} <–1-12> in the texture between the sheet thickness ¼ position from the surface and the sheet thickness ½ position from the surface. "Increase amount (N/°)" in Table 37 to Table 39 indicates "the load increase amount per unit bending angle (N/°) in a region from immediately after the start of the test to a bending angle 20°)".

The metallographic structures and the textures of the steel sheet for hot stamping and the hot-stamping formed bodies were measured by the above-described measurement method. In addition, the mechanical properties of the hot-stamping formed body were evaluated by the following methods.

Tensile Strength and Uniform Elongation

The tensile (maximum) strength TS and uniform elongation uEl of the hot-stamping formed body were obtained by producing a No. 5 test piece from an arbitrary position of the hot-stamping formed body in accordance with JIS Z 2241: 2011 and performing a tensile test. The speed of a cross-head was set to 3 mm/min.

In a case where the tensile strength TS was 1500 MPa or more, the hot-stamping formed body was determined as acceptable for being excellent in terms of strength, and, in a case where the tensile strength TS was less than 1500 MPa, the hot-stamping formed body was determined as unacceptable for being poor in strength.

Bending Angle and Load Capacity

The bending angle was evaluated by the following method based on the VDA standard (VDA238-100) specified by Verband der Automobilindustrie. In the present examples, displacement under the maximum load that was obtained in a bending test was converted to an angle based on VDA, thereby obtaining the maximum bending angle α (°). In a case where the product (TS×α) of the tensile strength TS and the maximum bending angle α obtained by the above-described method was 75000 MPa·° or more, the hot-stamping formed body was determined as acceptable for being excellent in terms of bendability, and, in a case where the product was less than 75000 MPa·°, the hot-stamping formed body was determined as unacceptable for being poor in bendability.

The load capacity was evaluated with the load increase amount per unit bending angle in a region from immediately after the start of the test to a bending angle of 20° in a load stroke curve that is obtained in the bending test. In a case where the load increase amount per unit bending angle was 400 N/° or more, the hot-stamping formed body was determined as acceptable for being excellent in terms of the load capacity, and, in a case where the load increase amount per unit bending angle was less than 400 N/°, the hot-stamping formed body was determined as unacceptable for being poor in the load capacity.

The conditions in the bending test were as described below.

Dimensions of test piece: 60 mm (rolling direction)×30 mm (a direction parallel to a sheet width direction)

Test piece sheet thickness: 1.6 mm

Bending ridge: A direction parallel to a sheet width direction

Testing method: Supported by rolls and pressed by a punch

Roll diameter: φ 30 mm

Punch shape: Tip R=0.4 mm

Distance between rolls: 2.0×sheet thickness (mm)+0.5 mm

Pressing speed: 20 mm/min

Tester: SHIMADZU AUTOGRAPH 20 kN

TABLE 23

| Steel | Chemical composition (mass %), remainder: Fe and impurity | | | | | | | | | | | | | | | | |
|---|---|---|---|---|---|---|---|---|---|---|---|---|---|---|---|---|---|
| No. | C | Si | Mn | Al | P | S | N | Nb | Ti | V | Mo | Cr | Cu | Ni | B | Ca | REM |
| 1 | 0.12 | 0.200 | 1.60 | 0.026 | 0.010 | 0.0012 | 0.0056 | | | | | | | | | | |
| 2 | 0.21 | 0.130 | 1.20 | 0.026 | 0.012 | 0.0010 | 0.0081 | | | | | | | | | | |
| 3 | 0.31 | 0.300 | 1.30 | 0.031 | 0.009 | 0.0036 | 0.0030 | | | | | | | | | | |
| 4 | 0.36 | 0.200 | 1.40 | 0.030 | 0.015 | 0.0029 | 0.0047 | | | | | | | | | | |
| 5 | 0.45 | 0.120 | 1.60 | 0.031 | 0.015 | 0.0025 | 0.0059 | | | | | | | | | | |
| 6 | 0.51 | 0.210 | 1.70 | 0.040 | 0.013 | 0.0031 | 0.0086 | | | | | | | | | | |
| 7 | 0.18 | 0.0005 | 1.30 | 0.038 | 0.015 | 0.0026 | 0.0044 | | | | | | | | | | |
| 8 | 0.35 | 0.005 | 1.20 | 0.029 | 0.009 | 0.0011 | 0.0044 | | | | | | | | | | |
| 9 | 0.35 | 0.200 | 1.00 | 0.027 | 0.011 | 0.0037 | 0.0094 | | | | | | | | | | |
| 10 | 0.35 | 1.000 | 1.40 | 0.029 | 0.015 | 0.0019 | 0.0032 | | | | | | | | | | |
| 11 | 0.35 | 3.200 | 1.60 | 0.033 | 0.015 | 0.0018 | 0.0095 | | | | | | | | | | |
| 12 | 0.35 | 0.240 | 0.20 | 0.028 | 0.014 | 0.0015 | 0.0098 | | | | | | | | | | |
| 13 | 0.35 | 0.220 | 0.50 | 0.039 | 0.012 | 0.0015 | 0.0086 | | | | | | | | | | |
| 14 | 0.35 | 0.180 | 1.30 | 0.044 | 0.014 | 0.0008 | 0.0065 | | | | | | | | | | |
| 15 | 0.35 | 0.290 | 2.00 | 0.037 | 0.013 | 0.0026 | 0.0047 | | | | | | | | | | |
| 16 | 0.35 | 0.280 | 3.20 | 0.027 | 0.010 | 0.0014 | 0.0030 | | | | | | | | | | |
| 17 | 0.35 | 0.260 | 1.50 | 0.000 | 0.012 | 0.0030 | 0.0069 | | | | | | | | | | |
| 18 | 0.35 | 0.220 | 1.70 | 0.001 | 0.009 | 0.0040 | 0.0047 | | | | | | | | | | |
| 19 | 0.35 | 0.280 | 1.00 | 0.030 | 0.014 | 0.0040 | 0.0070 | | | | | | | | | | |
| 20 | 0.35 | 0.230 | 1.50 | 1.700 | 0.013 | 0.0023 | 0.0060 | | | | | | | | | | |
| 21 | 0.35 | 0.120 | 1.90 | 2.200 | 0.014 | 0.0007 | 0.0038 | | | | | | | | | | |
| 22 | 0.35 | 0.190 | 1.70 | 0.045 | 0.001 | 0.0018 | 0.0073 | | | | | | | | | | |

TABLE 24

| Steel | Chemical composition (mass %), remainder: Fe and impurity | | | | | | | | | | | | | | | | |
|---|---|---|---|---|---|---|---|---|---|---|---|---|---|---|---|---|---|
| No. | C | Si | Mn | Al | P | S | N | Nb | Ti | V | Mo | Cr | Cu | Ni | B | Ca | REM |
| 23 | 0.35 | 0.120 | 1.30 | 0.035 | 0.008 | 0.0020 | 0.0094 | | | | | | | | | | |
| 24 | 0.35 | 0.220 | 2.00 | 0.039 | 0.150 | 0.0035 | 0.0036 | | | | | | | | | | |
| 25 | 0.35 | 0.110 | 1.30 | 0.043 | 0.014 | 0.0003 | 0.0070 | | | | | | | | | | |
| 26 | 0.35 | 0.150 | 1.30 | 0.041 | 0.008 | 0.0030 | 0.0065 | | | | | | | | | | |
| 27 | 0.35 | 0.250 | 1.10 | 0.030 | 0.011 | 0.1500 | 0.0057 | | | | | | | | | | |
| 28 | 0.35 | 0.270 | 1.50 | 0.035 | 0.013 | 0.0013 | 0.0008 | | | | | | | | | | |
| 29 | 0.35 | 0.280 | 1.40 | 0.030 | 0.009 | 0.0016 | 0.0040 | | | | | | | | | | |
| 30 | 0.35 | 0.240 | 1.70 | 0.035 | 0.012 | 0.0032 | 0.1200 | | | | | | | | | | |
| 31 | 0.37 | 0.240 | 1.00 | 0.028 | 0.011 | 0.0038 | 0.0093 | 0.05 | | | | | | | | | |
| 32 | 0.37 | 0.110 | 2.00 | 0.036 | 0.009 | 0.0015 | 0.0072 | | 0.05 | | | | | | | | |
| 33 | 0.37 | 0.190 | 1.30 | 0.038 | 0.015 | 0.0034 | 0.0031 | | | 0.05 | | | | | | | |
| 34 | 0.37 | 0.220 | 1.20 | 0.025 | 0.009 | 0.0017 | 0.0076 | | | | 0.2 | | | | | | |

TABLE 24-continued

| Steel | Chemical composition (mass %), remainder: Fe and impurity | | | | | | | | | | | | | | | | |
|---|---|---|---|---|---|---|---|---|---|---|---|---|---|---|---|---|---|
| No. | C | Si | Mn | Al | P | S | N | Nb | Ti | V | Mo | Cr | Cu | Ni | B | Ca | REM |
| 35 | 0.37 | 0.140 | 1.20 | 0.030 | 0.015 | 0.0033 | 0.0083 | | | | | 0.4 | | | | | |
| 36 | 0.37 | 0.110 | 1.40 | 0.041 | 0.009 | 0.0020 | 0.0089 | | | | | | 0.3 | | | | |
| 37 | 0.37 | 0.270 | 1.30 | 0.045 | 0.012 | 0.0020 | 0.0082 | | | | | | | 0.4 | | | |
| 38 | 0.35 | 0.100 | 1.10 | 0.045 | 0.013 | 0.0033 | 0.0038 | | | | | | | | 0.0025 | | |
| 39 | 0.35 | 0.150 | 1.30 | 0.028 | 0.011 | 0.0026 | 0.0061 | | | | | | | | | 0.006 | |
| 40 | 0.35 | 0.170 | 1.40 | 0.028 | 0.012 | 0.0036 | 0.0067 | | | | | | | | | | 0.20 |
| 41 | 0.35 | 2.890 | 1.42 | 0.030 | 0.014 | 0.0022 | 0.0039 | | | | | | | | | | |
| 42 | 0.35 | 0.297 | 2.78 | 0.031 | 0.012 | 0.0024 | 0.0044 | | | | | | | | | | |
| 43 | 0.35 | 0.124 | 1.31 | 0.037 | 0.091 | 0.0025 | 0.0097 | | | | | | | | | | |
| 44 | 0.35 | 0.147 | 1.29 | 0.045 | 0.008 | 0.0870 | 0.0059 | | | | | | | | | | |

TABLE 25

| | | Hot rolling | | | | | | |
|---|---|---|---|---|---|---|---|---|
| Steel sheet No. | Steel No. | Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
| 1 | 1 | 856 | 23 | 831 | 10 | 4.2 | 7 | 691 |
| 2 | 2 | 858 | 19 | 807 | 8 | 2.5 | 5 | 675 |
| 3 | 3 | 857 | 21 | 807 | 6 | 3.6 | 8 | 686 |
| 4 | 4 | 873 | 17 | 819 | 12 | 4.0 | 9 | 682 |
| 5 | 5 | 875 | 17 | 825 | 6 | 3.6 | 9 | 634 |
| 6 | 6 | 867 | 17 | 813 | 6 | 4.3 | 9 | 609 |
| 7 | 7 | 872 | 18 | 824 | 10 | 3.3 | 8 | 604 |
| 8 | 8 | 875 | 22 | 835 | 10 | 4.4 | 5 | 614 |
| 9 | 9 | 853 | 23 | 819 | 6 | 3.0 | 6 | 682 |
| 10 | 10 | 860 | 18 | 805 | 11 | 3.3 | 6 | 694 |
| 11 | 11 | 876 | 20 | 832 | 9 | 4.4 | 6 | 614 |
| 12 | 12 | 867 | 22 | 810 | 12 | 4.3 | 6 | 680 |
| 13 | 13 | 855 | 17 | 807 | 8 | 4.5 | 7 | 658 |
| 14 | 14 | 870 | 22 | 820 | 6 | 4.0 | 9 | 647 |
| 15 | 15 | 862 | 21 | 831 | 10 | 3.1 | 8 | 609 |
| 16 | 16 | 854 | 23 | 828 | 6 | 3.6 | 7 | 633 |
| 17 | 17 | 875 | 19 | 808 | 10 | 4.1 | 6 | 623 |
| 18 | 18 | 872 | 23 | 825 | 10 | 4.2 | 6 | 680 |
| 19 | 19 | 858 | 18 | 807 | 8 | 2.9 | 9 | 642 |
| 20 | 20 | 862 | 18 | 810 | 12 | 4.1 | 6 | 651 |
| 21 | 21 | 860 | 20 | 824 | 9 | 3.7 | 5 | 645 |
| 22 | 22 | 852 | 23 | 812 | 10 | 3.2 | 6 | 699 |
| 23 | 23 | 872 | 21 | 818 | 7 | 3.0 | 5 | 646 |
| 24 | 24 | 875 | 19 | 831 | 12 | 3.9 | 5 | 622 |
| 25 | 25 | 864 | 22 | 811 | 9 | 2.8 | 5 | 625 |
| 26 | 26 | 869 | 19 | 820 | 10 | 4.1 | 7 | 695 |
| 27 | 27 | 866 | 22 | 810 | 7 | 3.9 | 9 | 603 |
| 28 | 28 | 857 | 22 | 808 | 12 | 4.5 | 6 | 641 |
| 29 | 29 | 862 | 23 | 824 | 11 | 4.5 | 5 | 699 |
| 30 | 30 | 868 | 23 | 829 | 10 | 3.6 | 6 | 696 |

TABLE 26

| | | Hot rolling | | | | | | |
|---|---|---|---|---|---|---|---|---|
| Steel sheet No. | Steel No. | Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
| 31 | 31 | 867 | 19 | 817 | 11 | 4.3 | 6 | 689 |
| 32 | 32 | 866 | 21 | 822 | 9 | 3.0 | 6 | 679 |
| 33 | 33 | 868 | 23 | 819 | 11 | 4.1 | 7 | 629 |
| 34 | 34 | 867 | 19 | 808 | 10 | 3.2 | 5 | 671 |
| 35 | 35 | 876 | 19 | 826 | 7 | 2.5 | 7 | 625 |

TABLE 26-continued

| Steel sheet No. | Steel No. | Hot rolling: Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
|---|---|---|---|---|---|---|---|---|
| 36 | 36 | 859 | 18 | 816 | 9 | 2.7 | 7 | 638 |
| 37 | 37 | 851 | 19 | 815 | 6 | 3.6 | 6 | 689 |
| 38 | 38 | 868 | 22 | 822 | 8 | 2.6 | 9 | 685 |
| 39 | 39 | 854 | 22 | 822 | 7 | 2.7 | 6 | 618 |
| 40 | 40 | 864 | 19 | 808 | 9 | 3.8 | 8 | 699 |
| 41 | 4 | 800 | 22 | 820 | 9 | 3.7 | 9 | 616 |
| 42 | 4 | 860 | 19 | 820 | 8 | 3.0 | 9 | 689 |
| 43 | 4 | 950 | 21 | 825 | 7 | 3.7 | 9 | 684 |
| 44 | 4 | 873 | 7 | 828 | 8 | 3.9 | 6 | 679 |
| 45 | 4 | 872 | 20 | 825 | 9 | 3.2 | 7 | 671 |
| 46 | 4 | 854 | 35 | 810 | 8 | 3.0 | 6 | 615 |
| 47 | 4 | 850 | 23 | 770 | 9 | 3.0 | 5 | 682 |
| 48 | 4 | 873 | 21 | 820 | 10 | 2.5 | 8 | 632 |
| 49 | 4 | 853 | 23 | 870 | 12 | 4.4 | 5 | 672 |
| 50 | 4 | 853 | 21 | 818 | 4 | 2.8 | 7 | 639 |
| 51 | 4 | 873 | 23 | 823 | 8 | 4.3 | 7 | 603 |
| 52 | 4 | 861 | 22 | 831 | 18 | 2.8 | 5 | 689 |
| 53 | 4 | 862 | 18 | 825 | 6 | 1.5 | 9 | 694 |
| 54 | 4 | 856 | 18 | 827 | 11 | 3.5 | 5 | 692 |
| 55 | 4 | 875 | 21 | 830 | 8 | 6.7 | 6 | 611 |
| 56 | 4 | 875 | 18 | 832 | 10 | 2.8 | 7 | 690 |
| 57 | 4 | 869 | 20 | 813 | 8 | 2.5 | 9 | 665 |
| 58 | 4 | 866 | 22 | 808 | 6 | 3.0 | 15 | 617 |
| 59 | 4 | 872 | 23 | 810 | 7 | 4.4 | 5 | 550 |
| 60 | 4 | 887 | 19 | 808 | 11 | 4.2 | 8 | 650 |

TABLE 27

| Steel sheet No. | Steel No. | Hot rolling: Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
|---|---|---|---|---|---|---|---|---|
| 61 | 4 | 866 | 20 | 823 | 7 | 2.5 | 9 | 750 |
| 62 | 4 | 856 | 21 | 834 | 10 | 2.5 | 5 | 630 |
| 63 | 4 | 860 | 20 | 834 | 8 | 4.5 | 9 | 681 |
| 64 | 4 | 855 | 20 | 817 | 9 | 4.1 | 7 | 603 |
| 65 | 4 | 850 | 17 | 812 | 11 | 2.9 | 7 | 685 |
| 66 | 4 | 856 | 23 | 832 | 11 | 4.5 | 6 | 699 |
| 67 | 4 | 870 | 23 | 832 | 8 | 4.4 | 6 | 685 |
| 68 | 4 | 855 | 21 | 821 | 12 | 4.4 | 6 | 676 |
| 69 | 4 | 867 | 23 | 814 | 9 | 3.6 | 6 | 638 |
| 70 | 4 | 867 | 22 | 831 | 7 | 4.4 | 8 | 657 |
| 71 | 4 | 875 | 18 | 832 | 8 | 4.1 | 9 | 663 |
| 72 | 4 | 864 | 17 | 805 | 11 | 3.0 | 7 | 653 |
| 73 | 4 | 866 | 21 | 809 | 12 | 3.0 | 9 | 628 |
| 74 | 4 | 871 | 22 | 812 | 7 | 3.6 | 5 | 636 |
| 75 | 4 | 857 | 22 | 807 | 8 | 4.0 | 9 | 602 |
| 76 | 4 | 873 | 18 | 822 | 8 | 3.8 | 5 | 691 |
| 77 | 4 | 873 | 22 | 830 | 9 | 3.1 | 8 | 674 |
| 78 | 4 | 866 | 21 | 822 | 11 | 3.3 | 6 | 660 |
| 79 | 4 | 865 | 19 | 826 | 6 | 4.2 | 8 | 693 |
| 80 | 4 | 865 | 17 | 811 | 12 | 3.0 | 8 | 631 |
| 81 | 4 | 858 | 21 | 811 | 7 | 3.2 | 9 | 642 |
| 82 | 4 | 854 | 22 | 820 | 11 | 3.8 | 7 | 668 |
| 83 | 4 | 868 | 20 | 827 | 8 | 4.2 | 9 | 686 |
| 84 | 4 | 875 | 19 | 833 | 9 | 3.2 | 7 | 669 |
| 85 | 4 | 860 | 22 | 821 | 6 | 3.0 | 7 | 686 |
| 86 | 4 | 859 | 19 | 821 | 9 | 4.4 | 6 | 616 |
| 87 | 41 | 856 | 18 | 811 | 10 | 2.9 | 6 | 698 |
| 88 | 42 | 855 | 23 | 821 | 11 | 2.7 | 8 | 609 |
| 89 | 43 | 875 | 22 | 814 | 8 | 3.4 | 4 | 651 |
| 90 | 44 | 879 | 20 | 828 | 9 | 4.2 | 7 | 697 |

TABLE 28

| Steel sheet No. | Steel No. | Presence or absence of softening heat treatment | Cold rolling Cumulative rolling reduction (%) | Decarburization annealing Maximum attainment temperature (° C.) | Decarburization annealing Residence time in temperature range of 700° C. to 950° C. (sec) | Plating Presence or absence of plating | Plating Plating annealing after decarburization annealing |
|---|---|---|---|---|---|---|---|
| 1 | 1 | Absent | 69 | 830 | 151 | | |
| 2 | 2 | Absent | 66 | 818 | 166 | | |
| 3 | 3 | Absent | 36 | 784 | 172 | | |
| 4 | 4 | Absent | 30 | 773 | 135 | | |
| 5 | 5 | Absent | 41 | 808 | 216 | | |
| 6 | 6 | Absent | 39 | 811 | 268 | | |
| 7 | 7 | Absent | 45 | 789 | 231 | | |
| 8 | 8 | Absent | 45 | 818 | 273 | | |
| 9 | 9 | Absent | 33 | 801 | 237 | | |
| 10 | 10 | Absent | 64 | 818 | 228 | | |
| 11 | 11 | Absent | 44 | 801 | 277 | | |
| 12 | 12 | Absent | 66 | 775 | 209 | | |
| 13 | 13 | Absent | 65 | 795 | 219 | | |
| 14 | 14 | Absent | 63 | 776 | 197 | | |
| 15 | 15 | Absent | 40 | 803 | 183 | | |
| 16 | 16 | Absent | 54 | 805 | 250 | | |
| 17 | 17 | Absent | 64 | 810 | 177 | | |
| 18 | 18 | Absent | 66 | 828 | 216 | | |
| 19 | 19 | Absent | 33 | 826 | 248 | | |
| 20 | 20 | Absent | 54 | 824 | 280 | | |
| 21 | 21 | Absent | 32 | 822 | 179 | | |
| 22 | 22 | Absent | 31 | 827 | 167 | | |
| 23 | 23 | Absent | 40 | 786 | 197 | | |
| 24 | 24 | Absent | 32 | 823 | 167 | | |
| 25 | 25 | Absent | 49 | 787 | 258 | | |
| 26 | 26 | Absent | 70 | 800 | 150 | | |
| 27 | 27 | Absent | 52 | 787 | 187 | | |
| 28 | 28 | Absent | 43 | 817 | 140 | | |
| 29 | 29 | Absent | 49 | 808 | 148 | | |
| 30 | 30 | Absent | 46 | 813 | 265 | | |

TABLE 29

| Steel sheet No. | Steel No. | Presence or absence of softening heat treatment | Cold rolling Cumulative rolling reduction (%) | Decarburization annealing Maximum attainment temperature (° C.) | Decarburization annealing Residence time in temperature range of 700° C. to 950° C. (sec) | Plating Presence or absence of plating | Plating Plating annealing after decarburization annealing |
|---|---|---|---|---|---|---|---|
| 31 | 31 | Absent | 51 | 808 | 209 | | |
| 32 | 32 | Absent | 55 | 778 | 270 | | |
| 33 | 33 | Absent | 46 | 792 | 167 | | |
| 34 | 34 | Absent | 57 | 819 | 246 | | |
| 35 | 35 | Absent | 54 | 815 | 267 | | |
| 36 | 36 | Absent | 69 | 774 | 275 | | |
| 37 | 37 | Absent | 43 | 804 | 240 | | |
| 38 | 38 | Absent | 65 | 822 | 238 | | |
| 39 | 39 | Absent | 56 | 784 | 209 | | |
| 40 | 40 | Absent | 58 | 824 | 130 | | |
| 41 | 4 | Absent | 41 | 775 | 251 | | |
| 42 | 4 | Absent | 39 | 828 | 151 | | |
| 43 | 4 | Absent | 61 | 814 | 241 | | |
| 44 | 4 | Absent | 37 | 828 | 173 | | |
| 45 | 4 | Absent | 62 | 789 | 166 | | |
| 46 | 4 | Absent | 48 | 775 | 211 | | |
| 47 | 4 | Absent | 40 | 806 | 265 | | |
| 48 | 4 | Absent | 70 | 817 | 165 | | |
| 49 | 4 | Absent | 45 | 798 | 130 | | |
| 50 | 4 | Absent | 44 | 811 | 232 | | |
| 51 | 4 | Absent | 37 | 775 | 225 | | |
| 52 | 4 | Absent | 42 | 812 | 262 | | |
| 53 | 4 | Absent | 33 | 817 | 255 | | |
| 54 | 4 | Absent | 48 | 814 | 275 | | |
| 55 | 4 | Absent | 61 | 792 | 137 | | |
| 56 | 4 | Absent | 58 | 800 | 273 | | |
| 57 | 4 | Absent | 62 | 792 | 197 | | |
| 58 | 4 | Absent | 52 | 814 | 149 | | |

TABLE 29-continued

| | | | Cold rolling | Decarburization annealing | | Plating | |
|---|---|---|---|---|---|---|---|
| Steel sheet No. | Steel No. | Presence or absence of softening heat treatment | Cumulative rolling reduction (%) | Maximum attainment temperature (° C.) | Residence time in temperature range of 700° C. to 950° C. (sec) | Presence or absence of plating | Plating annealing after decarburization annealing |
| 59 | 4 | Absent | 37 | 812 | 215 | | |
| 60 | 4 | Absent | 67 | 779 | 276 | | |

TABLE 30

| | | | Cold rolling | Decarburization annealing | | Plating | |
|---|---|---|---|---|---|---|---|
| Steel sheet No. | Steel No. | Presence or absence of softening heat treatment | Cumulative rolling reduction (%) | Maximum attainment temperature (° C.) | Residence time in temperature range of 700° C. to 950° C. (sec) | Presence or absence of plating | Plating annealing after decarburization annealing |
| 61 | 4 | Absent | 44 | 785 | 234 | | |
| 62 | 4 | Present | 59 | 809 | 267 | | |
| 63 | 4 | Absent | 40 | 814 | 272 | | |
| 64 | 4 | Absent | 55 | 660 | 155 | | |
| 65 | 4 | Absent | 31 | 720 | 269 | | |
| 66 | 4 | Absent | 64 | 800 | 263 | | |
| 67 | 4 | Absent | 61 | 900 | 247 | | |
| 68 | 4 | Absent | 50 | 970 | 263 | | |
| 69 | 4 | Absent | 56 | 806 | 3 | | |
| 70 | 4 | Absent | 62 | 770 | 60 | | |
| 71 | 4 | Absent | 54 | 770 | 180 | | |
| 72 | 4 | Absent | 45 | 812 | 900 | | |
| 73 | 4 | Absent | 54 | 793 | 1300 | | |
| 74 | 4 | Absent | 44 | 803 | 234 | Present | |
| 75 | 4 | Absent | 56 | 773 | 189 | | Present |
| 76 | 4 | Absent | 67 | 777 | 268 | | |
| 77 | 4 | Absent | 58 | 798 | 138 | | |
| 78 | 4 | Absent | 35 | 829 | 246 | | |
| 79 | 4 | Absent | 52 | 799 | 211 | | |
| 80 | 4 | Absent | 33 | 801 | 151 | | |
| 81 | 4 | Absent | 37 | 805 | 203 | | |
| 82 | 4 | Absent | 49 | 823 | 179 | | |
| 83 | 4 | Absent | 31 | 821 | 276 | | |
| 84 | 4 | Absent | 64 | 802 | 163 | | |
| 85 | 4 | Absent | 46 | 801 | 176 | | |
| 86 | 4 | Absent | 67 | 801 | 146 | | |
| 87 | 41 | Absent | 66 | 828 | 216 | | |
| 88 | 42 | Absent | 42 | 794 | 189 | | |
| 89 | 43 | Absent | 38 | 782 | 188 | | |
| 90 | 44 | Absent | 64 | 802 | 135 | | |

TABLE 31

| | | Steel sheet for hot stamping | | | | | |
|---|---|---|---|---|---|---|---|
| Steel sheet No. | Steel No. | Ferrite, granular bainite, bainite, and martensite (area %) | Pearlite and carbide (area %) | Ratio between pole density of orientation group consisting of {001} <1-10> to {001} <−1-10> and pole density of orientation group consisting of {111} <1-10> to {111} <−1-12> in texture of surface layer region | Ratio between pole density of orientation group consisting of {001} <1-10> to {001} <−1-10> and pole density of orientation group consisting of {111} <1-10> to {111} <−1-12> in texture of inside region | Decarbu-rization index | Sheet thickness (mm) |
| 1 | 1 | 28 | 72 | 1.3 | 1.9 | 0.174 | 1.6 |
| 2 | 2 | 52 | 48 | 1.2 | 1.6 | 0.198 | 1.6 |
| 3 | 3 | 74 | 26 | 1.3 | 1.8 | 0.244 | 1.6 |
| 4 | 4 | 22 | 78 | 1.3 | 1.7 | 0.270 | 1.6 |
| 5 | 5 | 37 | 63 | 1.2 | 1.7 | 0.320 | 1.6 |
| 6 | 6 | 68 | 32 | 1.3 | 1.9 | 0.376 | 1.6 |
| 7 | 7 | 22 | 78 | 1.3 | 1.7 | 0.283 | 1.6 |
| 8 | 8 | 43 | 57 | 1.3 | 1.6 | 0.267 | 1.6 |
| 9 | 9 | 41 | 59 | 1.2 | 1.7 | 0.250 | 1.6 |

TABLE 31-continued

| Steel sheet No. | Steel No. | Steel sheet for hot stamping | | | | | |
|---|---|---|---|---|---|---|---|
| | | Ferrite, granular bainite, bainite, and martensite (area %) | Pearlite and carbide (area %) | Ratio between pole density of orientation group consisting of {001} <1-10> to {001} <−1-10> and pole density of orientation group consisting of {111} <1-10> to {111} <−1-12> in texture of surface layer region | Ratio between pole density of orientation group consisting of {001} <1-10> to {001} <−1-10> and pole density of orientation group consisting of {111} <1-10> to {111} <−1-12> in texture of inside region | Decarbu-rization index | Sheet thickness (mm) |
| 10 | 10 | 56 | 44 | 1.2 | 1.8 | 0.236 | 1.6 |
| 11 | 11 | 60 | 40 | 1.2 | 1.9 | 0.243 | 1.6 |
| 12 | 12 | 43 | 57 | 1.3 | 1.8 | 0.241 | 1.6 |
| 13 | 13 | 60 | 40 | 1.3 | 1.6 | 0.266 | 1.6 |
| 14 | 14 | 77 | 23 | 1.2 | 1.8 | 0.285 | 1.6 |
| 15 | 15 | 30 | 70 | 1.2 | 1.8 | 0.279 | 1.6 |
| 16 | 16 | 50 | 50 | 1.2 | 1.6 | 0.279 | 1.6 |
| 17 | 17 | 21 | 79 | 1.3 | 1.7 | 0.261 | 1.6 |
| 18 | 18 | 31 | 69 | 1.3 | 1.9 | 0.280 | 1.6 |
| 19 | 19 | 51 | 49 | 1.3 | 1.8 | 0.279 | 1.6 |
| 20 | 20 | 34 | 66 | 1.2 | 1.9 | 0.277 | 1.6 |
| 21 | 21 | 60 | 40 | 1.2 | 1.6 | 0.248 | 1.6 |
| 22 | 22 | 28 | 72 | 1.3 | 1.6 | 0.268 | 1.6 |
| 23 | 23 | 66 | 34 | 1.2 | 1.7 | 0.280 | 1.6 |
| 24 | 24 | 25 | 75 | 1.2 | 1.7 | 0.257 | 1.6 |
| 25 | 25 | 54 | 46 | 1.2 | 1.7 | 0.260 | 1.6 |
| 26 | 26 | 75 | 25 | 1.2 | 1.6 | 0.261 | 1.6 |
| 27 | 27 | 52 | 48 | 1.2 | 1.8 | 0.273 | 1.6 |
| 28 | 28 | 39 | 61 | 1.3 | 1.8 | 0.261 | 1.6 |
| 29 | 29 | 55 | 45 | 1.3 | 1.7 | 0.260 | 1.6 |
| 30 | 30 | 71 | 29 | 1.2 | 1.7 | 0.236 | 1.6 |

TABLE 32

| Steel sheet No. | Steel No. | Steel sheet for hot stamping | | | | | |
|---|---|---|---|---|---|---|---|
| | | Ferrite, granular bainite, bainite, and martensite (area %) | Pearlite and carbide (area %) | Ratio between pole density of orientation group consisting of {001} <1-10> to {001} <−1-10> and pole density of orientation group consisting of {111} <1-10> to {111} <−1-12> in texture of surface layer region | Ratio between pole density of orientation group consisting of {001} <1-10> to {001} <−1-10> and pole density of orientation group consisting of {111} <1-10> to {111} <−1-12> in texture of inside region | Decarbu-rization index | Sheet thickness (mm) |
| 31 | 31 | 70 | 30 | 1.2 | 1.6 | 0.271 | 1.6 |
| 32 | 32 | 24 | 76 | 1.3 | 1.6 | 0.280 | 1.6 |
| 33 | 33 | 23 | 77 | 1.2 | 1.6 | 0.259 | 1.6 |
| 34 | 34 | 76 | 24 | 1.2 | 1.8 | 0.249 | 1.6 |
| 35 | 35 | 28 | 72 | 1.3 | 1.7 | 0.251 | 1.6 |
| 36 | 36 | 76 | 24 | 1.3 | 1.9 | 0.284 | 1.6 |
| 37 | 37 | 55 | 45 | 1.3 | 1.8 | 0.241 | 1.6 |
| 38 | 38 | 28 | 72 | 1.2 | 1.7 | 0.231 | 1.6 |
| 39 | 39 | 57 | 43 | 1.2 | 1.7 | 0.261 | 1.6 |
| 40 | 40 | 38 | 62 | 1.2 | 1.6 | 0.236 | 1.6 |
| 41 | 4 | 40 | 60 | 1.8 | 2.4 | 0.254 | 1.6 |
| 42 | 4 | 58 | 42 | 1.2 | 1.5 | 0.275 | 1.6 |
| 43 | 4 | 37 | 63 | 1.8 | 2.2 | 0.277 | 1.6 |
| 44 | 4 | 26 | 74 | 1.9 | 2.6 | 0.248 | 1.6 |
| 45 | 4 | 49 | 51 | 0.8 | 1.1 | 0.239 | 1.6 |
| 46 | 4 | 40 | 60 | 1.9 | 2.4 | 0.239 | 1.6 |
| 47 | 4 | 51 | 49 | 1.9 | 2.6 | 0.243 | 1.6 |
| 48 | 4 | 72 | 28 | 1.1 | 1.1 | 0.268 | 1.6 |
| 49 | 4 | 57 | 43 | 1.9 | 2.3 | 0.243 | 1.6 |
| 50 | 4 | 23 | 77 | 1.7 | 2.4 | 0.239 | 1.6 |
| 51 | 4 | 69 | 31 | 1.1 | 1.5 | 0.263 | 1.6 |
| 52 | 4 | 21 | 79 | 1.9 | 2.3 | 0.251 | 1.6 |
| 53 | 4 | 68 | 32 | 1.7 | 2.4 | 0.232 | 1.6 |
| 54 | 4 | 43 | 57 | 1.3 | 1.7 | 0.274 | 1.6 |
| 55 | 4 | 27 | 73 | 1.2 | 1.4 | 0.260 | 1.6 |
| 56 | 4 | 69 | 31 | 0.9 | 1.2 | 0.246 | 1.6 |
| 57 | 4 | 31 | 69 | 1.3 | 1.8 | 0.230 | 1.6 |
| 58 | 4 | 33 | 67 | 1.8 | 2.6 | 0.243 | 1.6 |
| 59 | 4 | 42 | 58 | 1.2 | 1.5 | 0.239 | 1.6 |
| 60 | 4 | 45 | 55 | 1.2 | 1.8 | 0.234 | 1.6 |

TABLE 33

| | | Steel sheet for hot stamping | | | | | |
|---|---|---|---|---|---|---|---|
| Steel sheet No. | Steel No. | Ferrite, granular bainite, bainite, and martensite (area %) | Pearlite and carbide (area %) | Ratio between pole density of orientation group consisting of {001} <1-10> to {001} <−1-10> and pole density of orientation group consisting of {111} <1-10> to {111} <−1-12> in texture of surface layer region | Ratio between pole density of orientation group consisting of {001} <1-10> to {001} <−1-10> and pole density of orientation group consisting of {111} <1-10> to {111} <−1-12> in texture of inside region | Decarbu-rization index | Sheet thickness (mm) |
| 61 | 4 | 69 | 31 | 1.9 | 2.2 | 0.271 | 1.6 |
| 62 | 4 | 26 | 74 | 1.2 | 1.6 | 0.260 | 1.6 |
| 63 | 4 | 71 | 29 | 1.2 | 1.7 | 0.270 | 1.6 |
| 64 | 4 | 55 | 45 | 1.7 | 1.9 | 0.078 | 1.6 |
| 65 | 4 | 25 | 75 | 1.2 | 1.7 | 0.159 | 1.6 |
| 66 | 4 | 57 | 43 | 0.9 | 1.2 | 0.221 | 1.6 |
| 67 | 4 | 80 | 20 | 1.2 | 1.7 | 0.342 | 1.6 |
| 68 | 4 | 35 | 65 | 1.9 | 1.6 | 0.520 | 1.6 |
| 69 | 4 | 64 | 36 | 1.8 | 1.7 | 0.016 | 1.6 |
| 70 | 4 | 72 | 28 | 1.3 | 1.8 | 0.097 | 1.6 |
| 71 | 4 | 36 | 64 | 0.9 | 1.3 | 0.261 | 1.6 |
| 72 | 4 | 75 | 25 | 1.3 | 1.7 | 0.423 | 1.6 |
| 73 | 4 | 72 | 28 | 1.6 | 1.8 | 0.514 | 1.6 |
| 74 | 4 | 28 | 72 | 1.2 | 1.8 | 0.244 | 1.6 |
| 75 | 4 | 77 | 23 | 1.3 | 1.8 | 0.289 | 1.6 |
| 76 | 4 | 70 | 30 | 1.2 | 1.6 | 0.273 | 1.6 |
| 77 | 4 | 24 | 76 | 1.2 | 1.9 | 0.265 | 1.6 |
| 78 | 4 | 74 | 26 | 1.2 | 1.6 | 0.264 | 1.6 |
| 79 | 4 | 21 | 79 | 1.3 | 1.8 | 0.275 | 1.6 |
| 80 | 4 | 43 | 57 | 1.2 | 1.6 | 0.281 | 1.6 |
| 81 | 4 | 21 | 79 | 1.2 | 1.8 | 0.271 | 1.6 |
| 82 | 4 | 47 | 53 | 1.3 | 1.8 | 0.247 | 1.6 |
| 83 | 4 | 50 | 50 | 1.2 | 1.8 | 0.246 | 1.6 |
| 84 | 4 | 59 | 41 | 1.3 | 1.9 | 0.282 | 1.6 |
| 85 | 4 | 39 | 61 | 1.3 | 1.6 | 0.246 | 1.6 |
| 86 | 4 | 76 | 24 | 1.2 | 1.8 | 0.235 | 1.6 |
| 87 | 41 | 55 | 40 | 1.2 | 1.7 | 0.275 | 1.6 |
| 88 | 42 | 29 | 66 | 1.1 | 1.7 | 0.291 | 1.6 |
| 89 | 43 | 64 | 36 | 1.1 | 1.6 | 0.254 | 1.6 |
| 90 | 44 | 75 | 28 | 1.1 | 1.5 | 0.270 | 1.6 |

TABLE 34

| | | | Hot stamping conditions | | | | | |
|---|---|---|---|---|---|---|---|---|
| Manufacturing No. | Steel sheet No. | Steel No. | Heating temperature (° C.) | Holding time (s) | Forming temperature (° C.) | Cooling rate to temperature range of 300° C. or lower (° C./s) | Tempering treatment | Partially softened region |
| 1 | 1 | 1 | 880 | 306 | 873 | 21 | | |
| 2 | 2 | 2 | 890 | 325 | 866 | 31 | | |
| 3 | 3 | 3 | 960 | 231 | 864 | 42 | | |
| 4 | 4 | 4 | 930 | 330 | 868 | 48 | Present | |
| 5 | 5 | 5 | 880 | 295 | 875 | 25 | | |
| 6 | 6 | 6 | 970 | 322 | 876 | 35 | | |
| 7 | 7 | 7 | 870 | 315 | 813 | 38 | | |
| 8 | 8 | 8 | 870 | 324 | 868 | 27 | | |
| 9 | 9 | 9 | 920 | 237 | 828 | 37 | | |
| 10 | 10 | 10 | 870 | 192 | 849 | 28 | | |
| 11 | 11 | 11 | 940 | 293 | 808 | 44 | | |
| 12 | 12 | 12 | 940 | 190 | 862 | 40 | | |
| 13 | 13 | 13 | 970 | 251 | 811 | 34 | | Present |
| 14 | 14 | 14 | 900 | 225 | 796 | 37 | | |
| 15 | 15 | 15 | 910 | 294 | 816 | 25 | | |
| 16 | 16 | 16 | 870 | 316 | 805 | 37 | | |
| 17 | 17 | 17 | 960 | 322 | 868 | 42 | | |
| 18 | 18 | 18 | 940 | 293 | 874 | 43 | | |
| 19 | 19 | 19 | 930 | 192 | 871 | 35 | Present | |
| 20 | 20 | 20 | 940 | 282 | 797 | 42 | | |
| 21 | 21 | 21 | 960 | 270 | 877 | 49 | | |
| 22 | 22 | 22 | 900 | 291 | 883 | 48 | | |
| 23 | 23 | 23 | 900 | 232 | 889 | 36 | | |
| 24 | 24 | 24 | 960 | 292 | 865 | 24 | | |
| 25 | 25 | 25 | 960 | 238 | 825 | 18 | | |
| 26 | 26 | 26 | 920 | 214 | 852 | 17 | | |
| 27 | 27 | 27 | 890 | 206 | 833 | 19 | | |

TABLE 34-continued

| Manufacturing No. | Steel sheet No. | Steel No. | Hot stamping conditions Heating temperature (° C.) | Holding time (s) | Forming temperature (° C.) | Cooling rate to temperature range of 300° C. or lower (° C./s) | Tempering treatment | Partially softened region |
|---|---|---|---|---|---|---|---|---|
| 28 | 28 | 28 | 920 | 243 | 824 | 21 | | |
| 29 | 29 | 29 | 900 | 193 | 791 | 32 | | |
| 30 | 30 | 30 | 920 | 263 | 850 | 47 | | |

TABLE 35

| Manufacturing No. | Steel sheet No. | Steel No. | Hot stamping conditions Heating temperature (° C.) | Holding time (s) | Forming temperature (° C.) | Cooling rate to temperature range of 300° C. or lower (° C./s) | Tempering treatment | Partially softened region |
|---|---|---|---|---|---|---|---|---|
| 31 | 31 | 31 | 910 | 311 | 853 | 22 | | |
| 32 | 32 | 32 | 940 | 307 | 856 | 35 | | |
| 33 | 33 | 33 | 890 | 301 | 852 | 26 | | |
| 34 | 34 | 34 | 950 | 338 | 876 | 45 | | |
| 35 | 35 | 35 | 970 | 233 | 882 | 16 | | |
| 36 | 36 | 36 | 890 | 313 | 885 | 49 | | |
| 37 | 37 | 37 | 930 | 251 | 830 | 30 | | |
| 38 | 38 | 38 | 920 | 301 | 877 | 32 | | |
| 39 | 39 | 39 | 890 | 329 | 843 | 36 | | |
| 40 | 40 | 40 | 880 | 324 | 877 | 38 | | |
| 41 | 41 | 4 | 910 | 291 | 820 | 34 | | |
| 42 | 42 | 4 | 970 | 330 | 812 | 29 | | |
| 43 | 43 | 4 | 950 | 280 | 853 | 17 | | |
| 44 | 44 | 4 | 920 | 323 | 802 | 46 | | |
| 45 | 45 | 4 | 900 | 221 | 847 | 49 | | |
| 46 | 46 | 4 | 890 | 339 | 865 | 23 | | |
| 47 | 47 | 4 | 920 | 228 | 853 | 20 | | |
| 48 | 48 | 4 | 870 | 227 | 816 | 35 | | |
| 49 | 49 | 4 | 940 | 258 | 872 | 27 | | |
| 50 | 50 | 4 | 960 | 204 | 834 | 34 | | |
| 51 | 51 | 4 | 920 | 253 | 890 | 20 | | |
| 52 | 52 | 4 | 870 | 262 | 877 | 30 | | |
| 53 | 53 | 4 | 870 | 299 | 794 | 28 | | |
| 54 | 54 | 4 | 920 | 192 | 812 | 15 | | |
| 55 | 55 | 4 | 930 | 339 | 829 | 19 | | |
| 56 | 56 | 4 | 960 | 302 | 887 | 50 | Present | |
| 57 | 57 | 4 | 920 | 273 | 811 | 48 | | |
| 58 | 58 | 4 | 900 | 259 | 821 | 21 | | |
| 59 | 59 | 4 | 920 | 227 | 790 | 20 | | |
| 60 | 60 | 4 | 920 | 309 | 850 | 30 | | |

TABLE 36

| Manufacturing No. | Steel sheet No. | Steel No. | Hot stamping conditions Heating temperature (° C.) | Holding time (s) | Forming temperature (° C.) | Cooling rate to temperature range of 300° C. or lower (° C./s) | Tempering treatment | Partially softened region |
|---|---|---|---|---|---|---|---|---|
| 61 | 61 | 4 | 960 | 312 | 858 | 28 | | |
| 62 | 62 | 4 | 880 | 249 | 811 | 26 | | |
| 63 | 63 | 4 | 940 | 237 | 802 | 41 | | |
| 64 | 64 | 4 | 960 | 197 | 798 | 34 | | |
| 65 | 65 | 4 | 960 | 304 | 812 | 23 | | |
| 66 | 66 | 4 | 910 | 322 | 836 | 19 | | |
| 67 | 67 | 4 | 890 | 336 | 799 | 20 | | |
| 68 | 68 | 4 | 920 | 308 | 800 | 39 | | |
| 69 | 69 | 4 | 940 | 227 | 840 | 21 | | |
| 70 | 70 | 4 | 960 | 240 | 866 | 15 | | |
| 71 | 71 | 4 | 960 | 280 | 829 | 35 | | Present |
| 72 | 72 | 4 | 910 | 225 | 820 | 27 | | |

TABLE 36-continued

| Manufacturing No. | Steel sheet No. | Steel No. | Hot stamping conditions: Heating temperature (° C.) | Holding time (s) | Forming temperature (° C.) | Cooling rate to temperature range of 300° C. or lower (° C./s) | Tempering treatment | Partially softened region |
|---|---|---|---|---|---|---|---|---|
| 73 | 73 | 4 | 970 | 207 | 889 | 47 | | |
| 74 | 74 | 4 | 900 | 331 | 843 | 43 | | |
| 75 | 75 | 4 | 920 | 261 | 868 | 34 | | |
| 76 | 76 | 4 | 770 | 303 | 829 | 40 | | |
| 77 | 77 | 4 | 920 | 238 | 807 | 21 | | |
| 78 | 78 | 4 | 1030 | 339 | 843 | 48 | | |
| 79 | 79 | 4 | 910 | 45 | 884 | 49 | | |
| 80 | 80 | 4 | 920 | 240 | 888 | 23 | | |
| 81 | 81 | 4 | 880 | 630 | 836 | 36 | | |
| 82 | 82 | 4 | 960 | 290 | 600 | 32 | | |
| 83 | 83 | 4 | 870 | 316 | 840 | 16 | | |
| 84 | 84 | 4 | 970 | 316 | 1030 | 47 | | |
| 85 | 85 | 4 | 890 | 212 | 855 | 22 | | |
| 86 | 86 | 4 | 880 | 331 | 875 | 20 | | |
| 87 | 87 | 41 | 870 | 192 | 849 | 28 | | |
| 88 | 88 | 42 | 910 | 294 | 816 | 25 | | |
| 89 | 89 | 43 | 900 | 232 | 889 | 36 | | |
| 90 | 90 | 44 | 920 | 214 | 852 | 17 | | |

TABLE 37

| Manufacturing No. | Steel sheet No. | Steel No. | Microstructures: Martensite, bainite, and tempered martensite (area %) | Microstructures: Ferrite and granular bainite (area %) | Textures: Ratio between pole density of orientation group consisting of {001} <1-10> to {001} <−1-10> and pole density of orientation group consisting of {111} <1-10> to {111} <−1-12> in texture of surface layer region | Textures: Ratio between pole density of orientation group consisting of {001} <1-10> to {001} <−1-10> and pole density of orientation group consisting of {111} <1-10> to {111} <−1-12> in texture of inside region |
|---|---|---|---|---|---|---|
| 1 | 1 | 1 | 100 | 0 | 1.6 | 2.0 |
| 2 | 2 | 2 | 98 | 2 | 1.5 | 2.1 |
| 3 | 3 | 3 | 97 | 3 | 1.7 | 1.9 |
| 4 | 4 | 4 | 98 | 2 | 1.7 | 2.2 |
| 5 | 5 | 5 | 98 | 2 | 1.5 | 2.2 |
| 6 | 6 | 6 | 98 | 2 | 1.5 | 2.2 |
| 7 | 7 | 7 | 96 | 4 | 1.6 | 2.2 |
| 8 | 8 | 8 | 100 | 0 | 1.6 | 1.9 |
| 9 | 9 | 9 | 100 | 0 | 1.6 | 2.2 |
| 10 | 10 | 10 | 97 | 3 | 1.7 | 2.1 |
| 11 | 11 | 11 | 99 | 1 | 1.6 | 2.0 |
| 12 | 12 | 12 | 100 | 0 | 1.7 | 2.1 |
| 13 | 13 | 13 | 95 | 5 | 1.7 | 2.2 |
| 14 | 14 | 14 | 97 | 3 | 1.7 | 2.2 |
| 15 | 15 | 15 | 97 | 3 | 1.7 | 2.2 |
| 16 | 16 | 16 | 99 | 1 | 1.7 | 1.9 |
| 17 | 17 | 17 | 99 | 1 | 1.7 | 2.0 |
| 18 | 18 | 18 | 99 | 1 | 1.7 | 2.2 |
| 19 | 19 | 19 | 100 | 0 | 1.6 | 2.0 |
| 20 | 20 | 20 | 96 | 4 | 1.7 | 1.9 |
| 21 | 21 | 21 | 100 | 0 | 1.7 | 2.2 |
| 22 | 22 | 22 | 98 | 2 | 1.7 | 2.2 |
| 23 | 23 | 23 | 95 | 5 | 1.6 | 2.0 |
| 24 | 24 | 24 | 99 | 1 | 1.6 | 1.9 |
| 25 | 25 | 25 | 98 | 2 | 1.6 | 2.1 |
| 26 | 26 | 26 | 98 | 2 | 1.7 | 2.2 |
| 27 | 27 | 27 | 95 | 5 | 1.7 | 2.2 |
| 28 | 28 | 28 | 96 | 4 | 1.6 | 2.2 |
| 29 | 29 | 29 | 98 | 2 | 1.6 | 2.2 |
| 30 | 30 | 30 | 95 | 5 | 1.8 | 1.9 |

TABLE 37-continued

| Manufacturing No. | Decarburization amount Decarburization index | Mechanical properties Tensile strength TS (MPa) | Maximum bending angle α (°) | TS × α (MPa · °) | Load increase amount per unit bending angle in region from immediately after start of test to bending angle 20° (N/°) |
|---|---|---|---|---|---|
| 1 | 0.194 | 1274 | 70 | 89180 | 354 |
| 2 | 0.228 | 1585 | 69 | 102465 | 438 |
| 3 | 0.274 | 1728 | 65 | 112320 | 585 |
| 4 | 0.300 | 1920 | 53 | 101760 | 594 |
| 5 | 0.340 | 2400 | 53 | 127200 | 643 |
| 6 | 0.396 | 2646 | 28 | 74088 | 605 |
| 7 | 0.313 | 1261 | 72 | 90792 | 384 |
| 8 | 0.297 | 2090 | 52 | 108680 | 585 |
| 9 | 0.270 | 2178 | 72 | 156816 | 610 |
| 10 | 0.266 | 2112 | 51 | 107712 | 590 |
| 11 | 0.263 | 1274 | 75 | 95550 | 377 |
| 12 | 0.271 | 1261 | 88 | 110968 | 395 |
| 13 | 0.296 | 2000 | 56 | 112000 | 570 |
| 14 | 0.305 | 2090 | 79 | 165110 | 600 |
| 15 | 0.299 | 1980 | 57 | 112860 | 574 |
| 16 | 0.309 | 1940 | 33 | 64020 | 616 |
| 17 | 0.281 | 1900 | 38 | 72200 | 600 |
| 18 | 0.300 | 1960 | 52 | 101920 | 574 |
| 19 | 0.299 | 1980 | 55 | 108900 | 580 |
| 20 | 0.307 | 1960 | 57 | 111720 | 584 |
| 21 | 0.278 | 1960 | 34 | 66640 | 614 |
| 22 | 0.288 | 1960 | 79 | 154840 | 622 |
| 23 | 0.310 | 1980 | 58 | 114840 | 574 |
| 24 | 0.277 | 2000 | 35 | 70000 | 560 |
| 25 | 0.290 | 1940 | 64 | 124160 | 611 |
| 26 | 0.281 | 1920 | 55 | 105600 | 577 |
| 27 | 0.303 | 1940 | 29 | 56260 | 580 |
| 28 | 0.281 | 1900 | 60 | 114000 | 619 |
| 29 | 0.280 | 1960 | 58 | 113680 | 572 |
| 30 | 0.266 | 2000 | 32 | 64000 | 587 |

TABLE 38

| Manufacturing No. | Steel sheet No. | Steel No. | Microstructures Martensite, bainite, and tempered martensite (area %) | Ferrite and granular bainite (area %) | Textures Ratio between pole density of orientation group consisting of {001} <1-10> to {001} <−1-10> and pole density of orientation group consisting of {111} <1-10> to {111} <−1-12> in texture of surface layer region | Ratio between pole density of orientation group consisting of {001} <1-10> to {001} <−1-10> and pole density of orientation group consisting of {111} <1-10> to {111} <−1-12> in texture of inside region |
|---|---|---|---|---|---|---|
| 31 | 31 | 31 | 95 | 5 | 1.5 | 2.0 |
| 32 | 32 | 32 | 99 | 1 | 1.6 | 2.2 |
| 33 | 33 | 33 | 97 | 3 | 1.7 | 1.9 |
| 34 | 34 | 34 | 100 | 0 | 1.5 | 2.0 |
| 35 | 35 | 35 | 97 | 3 | 1.6 | 1.9 |
| 36 | 36 | 36 | 96 | 4 | 1.6 | 2.2 |
| 37 | 37 | 37 | 95 | 5 | 1.7 | 2.1 |
| 38 | 38 | 38 | 95 | 5 | 1.5 | 1.9 |
| 39 | 39 | 39 | 98 | 2 | 1.7 | 2.0 |
| 40 | 40 | 40 | 97 | 3 | 1.7 | 2.1 |
| 41 | 41 | 4 | 97 | 3 | 2.1 | 2.7 |
| 42 | 42 | 4 | 99 | 1 | 1.4 | 1.4 |
| 43 | 43 | 4 | 100 | 0 | 2.1 | 2.7 |
| 44 | 44 | 4 | 100 | 0 | 2.0 | 2.7 |
| 45 | 45 | 4 | 100 | 0 | 0.9 | 1.7 |
| 46 | 46 | 1 | 100 | 0 | 2.2 | 2.9 |
| 47 | 47 | 4 | 97 | 3 | 2.1 | 2.6 |
| 48 | 48 | 4 | 95 | 5 | 1.4 | 1.7 |

TABLE 38-continued

| | | | | | | |
|---|---|---|---|---|---|---|
| 49 | 49 | 4 | 100 | 0 | 2.3 | 2.8 |
| 50 | 50 | 4 | 100 | 0 | 2.2 | 2.7 |
| 51 | 51 | 4 | 97 | 3 | 1.3 | 1.7 |
| 52 | 52 | 4 | 98 | 2 | 2.0 | 2.8 |
| 53 | 53 | 4 | 95 | 5 | 2.1 | 2.6 |
| 54 | 54 | 4 | 95 | 5 | 1.7 | 1.9 |
| 55 | 55 | 4 | 100 | 0 | 0.8 | 1.5 |
| 56 | 56 | 4 | 95 | 5 | 1.5 | 1.6 |
| 57 | 57 | 4 | 97 | 3 | 1.7 | 2.2 |
| 58 | 58 | 4 | 95 | 5 | 2.0 | 2.9 |
| 59 | 59 | 4 | 95 | 5 | 1.0 | 1.6 |
| 60 | 60 | 4 | 97 | 3 | 1.7 | 1.9 |

| | | Mechanical properties | | | |
|---|---|---|---|---|---|
| Manufacturing No. | Decarburization amount Decarburization index | Tensile strength TS (MPa) | Maximum bending angle α (°) | TS × α (MPa · °) | Load increase amount per unit bending angle in region from immediately after start of test to bending angle 20° (N/°) |
| 31 | 0.291 | 2208 | 68 | 150144 | 601 |
| 32 | 0.310 | 2208 | 75 | 165600 | 609 |
| 33 | 0.279 | 2254 | 73 | 164542 | 601 |
| 34 | 0.279 | 2231 | 80 | 178480 | 605 |
| 35 | 0.271 | 2208 | 72 | 158976 | 609 |
| 36 | 0.314 | 2254 | 71 | 160034 | 612 |
| 37 | 0.261 | 2231 | 65 | 145015 | 602 |
| 38 | 0.251 | 2090 | 51 | 106590 | 572 |
| 39 | 0.281 | 1940 | 70 | 135800 | 616 |
| 40 | 0.266 | 1900 | 67 | 127300 | 604 |
| 41 | 0.284 | 1980 | 33 | 65340 | 518 |
| 42 | 0.305 | 1960 | 60 | 117600 | 625 |
| 43 | 0.297 | 1960 | 34 | 66640 | 515 |
| 44 | 0.278 | 1920 | 38 | 72960 | 499 |
| 45 | 0.269 | 1900 | 64 | 121600 | 617 |
| 46 | 0.259 | 1920 | 32 | 61440 | 515 |
| 47 | 0.273 | 1980 | 33 | 65340 | 492 |
| 48 | 0.298 | 1920 | 75 | 144000 | 604 |
| 49 | 0.263 | 1900 | 34 | 64600 | 503 |
| 50 | 0.269 | 2000 | 32 | 64000 | 517 |
| 51 | 0.283 | 2000 | 79 | 158000 | 610 |
| 52 | 0.281 | 1980 | 35 | 69300 | 516 |
| 53 | 0.262 | 1940 | 31 | 60140 | 506 |
| 54 | 0.294 | 1980 | 51 | 100980 | 591 |
| 55 | 0.280 | 1960 | 76 | 148960 | 621 |
| 56 | 0.276 | 1960 | 78 | 152880 | 623 |
| 57 | 0.250 | 1920 | 57 | 109440 | 572 |
| 58 | 0.263 | 1920 | 35 | 67200 | 515 |
| 59 | 0.259 | 1920 | 68 | 130560 | 611 |
| 60 | 0.254 | 1940 | 51 | 98940 | 583 |

TABLE 39

| | | | Microstructures | | Textures | |
|---|---|---|---|---|---|---|
| Manufacturing No. | Steel sheet No. | Steel No. | Martensite, bainite, and tempered martensite (area %) | Ferrite and granular bainite (area %) | Ratio between pole density of orientation group consisting of {001} <1-10> to {001} <−1-10> and pole density of orientation group consisting of {111} <1-10> to {111} <−1-12> in texture of surface layer region | Ratio between pole density of orientation group consisting of {001} <1-10> to {001} <−1-10> and pole density of orientation group consisting of {111} <1-10> to {111} <−1-12> in texture of inside region |
| 61 | 61 | 4 | 100 | 0 | 2.2 | 2.9 |
| 62 | 62 | 4 | 98 | 2 | 1.5 | 2.1 |
| 63 | 63 | 4 | 100 | 0 | 1.5 | 2.0 |
| 64 | 64 | 4 | 98 | 2 | 2.0 | 2.1 |
| 65 | 65 | 4 | 100 | 0 | 1.5 | 2.1 |

TABLE 39-continued

| | | | | | | |
|---|---|---|---|---|---|---|
| 66 | 66 | 4 | 95 | 5 | 1.2 | 1.5 |
| 67 | 67 | 4 | 97 | 3 | 1.7 | 1.9 |
| 68 | 68 | 4 | 99 | 1 | 2.2 | 2.1 |
| 69 | 69 | 4 | 99 | 1 | 2.3 | 1.9 |
| 70 | 70 | 4 | 99 | 1 | 1.7 | 2.2 |
| 71 | 71 | 4 | 99 | 1 | 1.3 | 1.8 |
| 72 | 72 | 4 | 95 | 5 | 1.5 | 2.1 |
| 73 | 73 | 4 | 96 | 4 | 2.0 | 2.3 |
| 74 | 74 | 4 | 96 | 4 | 1.7 | 2.2 |
| 75 | 75 | 4 | 99 | 1 | 1.6 | 1.9 |
| 76 | 76 | 4 | 99 | 1 | 2.0 | 2.9 |
| 77 | 77 | 4 | 95 | 5 | 1.5 | 2.2 |
| 78 | 78 | 4 | 100 | 0 | 1.5 | 2.6 |
| 79 | 79 | 4 | 100 | 0 | 1.9 | 2.8 |
| 80 | 80 | 4 | 97 | 3 | 1.7 | 1.9 |
| 81 | 81 | 4 | 95 | 5 | 1.5 | 2.6 |
| 82 | 82 | 4 | 85 | 15 | 1.6 | 2.0 |
| 83 | 83 | 4 | 97 | 3 | 1.6 | 2.2 |
| 84 | 84 | 4 | 100 | 0 | 1.6 | 2.7 |
| 85 | 85 | 4 | 98 | 2 | 1.5 | 2.2 |
| 86 | 86 | 4 | 99 | 1 | 1.7 | 1.9 |
| 87 | 87 | 41 | 98 | 2 | 1.6 | 2.0 |
| 88 | 88 | 42 | 96 | 4 | 1.6 | 1.9 |
| 89 | 89 | 43 | 95 | 5 | 1.6 | 1.9 |
| 90 | 90 | 44 | 97 | 3 | 1.7 | 2.0 |

| | | Mechanical properties | | | |
|---|---|---|---|---|---|
| Manufacturing No. | Decarburization amount Decarburization index | Tensile strength TS (MPa) | Maximum bending angle α (°) | TS × α (MPa · °) | Load increase amount per unit bending angle in region from immediately after start of test to bending angle 20° (N/°) |
| 61 | 0.301 | 1940 | 33 | 64020 | 518 |
| 62 | 0.290 | 1920 | 55 | 105600 | 582 |
| 63 | 0.290 | 1940 | 55 | 106700 | 592 |
| 64 | 0.079 | 1900 | 38 | 72200 | 566 |
| 65 | 0.179 | 1940 | 56 | 108640 | 588 |
| 66 | 0.241 | 1960 | 74 | 145040 | 608 |
| 67 | 0.372 | 1900 | 51 | 96900 | 578 |
| 68 | 0.540 | 1992 | 37 | 74010 | 588 |
| 69 | 0.036 | 1980 | 33 | 65340 | 560 |
| 70 | 0.117 | 2000 | 55 | 110000 | 582 |
| 71 | 0.278 | 1980 | 77 | 152460 | 621 |
| 72 | 0.453 | 1900 | 52 | 98800 | 563 |
| 73 | 0.534 | 1998 | 37 | 74410 | 587 |
| 74 | 0.264 | 1960 | 53 | 103880 | 593 |
| 75 | 0.319 | 1980 | 57 | 112860 | 590 |
| 76 | 0.293 | 1980 | 35 | 69300 | 564 |
| 77 | 0.295 | 1900 | 52 | 98800 | 569 |
| 78 | 0.284 | 1980 | 37 | 73260 | 498 |
| 79 | 0.305 | 1960 | 29 | 56840 | 576 |
| 80 | 0.301 | 1940 | 54 | 104760 | 561 |
| 81 | 0.291 | 1980 | 36 | 71280 | 506 |
| 82 | 0.267 | 1960 | 54 | 105840 | 345 |
| 83 | 0.276 | 1980 | 57 | 112860 | 571 |
| 84 | 0.312 | 1920 | 57 | 109440 | 355 |
| 85 | 0.276 | 1920 | 55 | 105600 | 575 |
| 86 | 0.255 | 1960 | 51 | 99960 | 569 |
| 87 | 0.295 | 2042 | 51 | 104142 | 584 |
| 88 | 0.321 | 1972 | 56 | 110432 | 565 |
| 89 | 0.274 | 1972 | 55 | 108460 | 583 |
| 90 | 0.290 | 1916 | 53 | 101548 | 577 |

(Element Technology F)

Element technology F includes: a base steel sheet, in which the base steel sheet includes, as a chemical composition, by mass %, C: more than 0.40% and 0.70% or less, Si: less than 2.00%, Mn: 0.01% or more and less than 0.50%, P: 0.200% or less, S: 0.0200% or less, sol. Al: 0.001% to 1.000%, N: 0.0200% or less, Mo: 0.01% or more and less than 0.50%, B: 0.0002% to 0.0200%, Ti: 0% to 0.200%, Nb: 0% to 0.200%, V: 0% to 0.200%, Zr: 0% to 0.200%, Cr: 0% to 2.00%, W: 0% to 2.00%, Cu: 0% to 2.00%, Ni: 0% to 2.00%, Ca: 0% to 0.0100%, Mg: 0% to 0.0100%, REM: 0% to 0.1000%, Bi: 0% to 0.0500%, and a remainder: Fe and impurities, when a Mo content of the base steel sheet is measured by line analysis using an EPMA in a range of 0.05 mm in a sheet thickness direction, in which a ¼ depth position of a sheet thickness of the base steel sheet from a surface of the base steel sheet is a center, a maximum value of the Mo content, a minimum value of the Mo content, and an average value of the Mo content satisfy $([Mo]_{mMAX}-[Mo]_{mMIN})/[Mo]_{mAVE}<0.50$, wherein meaning of each symbol is, $[Mo]_{mMAX}$: the maximum value of the Mo content of the base steel sheet (mass %), $[Mo]_{mMIN}$: the minimum value of the Mo content of the base steel sheet (mass %), and $[Mo]_{mAVE}$: the average value of the Mo content of the base steel sheet (mass %), a metallographic microstructure of the base steel sheet contains 90.0% or more of martensite, a standard deviation of a Vickers hardness in a region of 0.3 mm in the sheet thickness direction and 0.6 mm in a direction perpendicular to the sheet thickness direction, in which the ¼ depth position of the sheet thickness of the base steel sheet from the surface of the base steel sheet is a center, is 20 (Hv) or less, and a tensile strength of the base steel sheet is 2,300 MPa or more.

According to the above aspects of the element technology F, it is possible to obtain a hot stamped product having excellent collision resistance and a tensile strength of 2,300 MPa or more.

The present inventors intensively studied a method for suppressing the occurrence of cracking during deformation due to a collision in a hot stamped product having a tensile strength of 2,300 MPa or more. In particular, the present inventors intensively studied a method for suppressing the occurrence of cracking during deformation of a hot stamped product due to a collision by controlling a chemical composition and a structure of a steel sheet for hot stamping used in the hot stamped product. As a result, the following findings were obtained.

(A) In a hot stamped product having a tensile strength of 2,300 MPa or more, a local fluctuation in hardness is likely to occur, and when the hot stamped product is deformed, stress concentrates on a portion having low hardness, resulting in the occurrence of cracking in an early stage of the deformation.

(B) By using a steel sheet with a small local fluctuation in Mo concentration as a steel sheet for hot stamping, the occurrence of cracking when the hot stamped product is deformed is suppressed.

The reason for this is not clear, but this is presumably due to the following reasons: (a) in a portion having a low Mo concentration, austenite becomes coarse in a process of heating the steel sheet in a step of performing hot stamping, and a hardness of the hot stamped product tends to be low, and (b) in a portion having a high Mo concentration, austenite is refined in the process of heating the steel sheet and the hardness of the hot stamped product tends to be high.

(C) By reducing a local fluctuation in hardness in the steel sheet for hot stamping, the occurrence of cracking when the hot stamped product is deformed is suppressed.

The reason for this is not clear, but this is presumably due to the following reasons: (a) the localization of soft ferrite in the steel sheet for hot stamping increases the fluctuation in hardness, (b) in a portion having a high ferrite fraction, austenite becomes coarse in the process of heating the steel sheet in the step of performing hot stamping, and the hardness of the hot stamped product tends to be low, and (c) in a portion having a low ferrite fraction, austenite is refined in the process of heating the steel sheet and the hardness of the hot stamped product tends to be high.

(D) By using a steel sheet manufactured without annealing after being subjected to cold rolling step (also referred to as a steel sheet as cold-rolled or full hard) as the steel sheet for hot stamping, the occurrence of cracking when the formed product is deformed is suppressed.

The reason for this is not clear, but this is presumably due to the following reasons: (a) since work strain during cold rolling is stored in the steel sheet as cold-rolled, austenite is refined in the process of heating the steel sheet in the step of performing hot stamping and the hardness of the hot stamped product increases, and (b) this effect is strong in the portion having a low Mo concentration and the portion having a high ferrite fraction, and by using the steel sheet as cold-rolled, a local fluctuation in hardness in the hot stamped product is reduced.

(E) In steps of manufacturing the steel sheet for hot stamping, by performing annealing (also referred to as first hot-rolled sheet annealing) in which the steel sheet after hot rolling is heated to higher than an $Ac_3$ point and is held for a long period of time, a local fluctuation in the Mo concentration of the steel sheet for hot stamping is reduced.

(F) In the steps of manufacturing the steel sheet for hot stamping, by performing annealing (also referred to as second hot-rolled sheet annealing) in which heating to higher than the $Ac_3$ point and holding for a short period of time are performed subsequent to the first hot-rolled sheet annealing, a local fluctuation in hardness of the steel sheet for hot stamping is reduced.

The reason for this is not clear, but this is presumably due to the following reasons: (a) in the first hot-rolled sheet annealing, austenite tends to coarsen during the annealing, and coarse ferrite is localized after the annealing, and (b) in the second hot-rolled sheet annealing, austenite is less likely to coarsen during the annealing and ferrite is uniformly and finely dispersed after the annealing.

Based on the above findings (A) to (F), the present inventors found that it is possible to manufacture a hot stamped product having a small local fluctuation in hardness, a tensile strength of 2,300 MPa or more, and excellent collision resistance by performing hot stamping using a steel sheet for hot stamping having a small local fluctuation in Mo concentration and further having a small local fluctuation in hardness.

Hereinafter, each requirement of a steel sheet for hot stamping according to an embodiment of the element technology F (steel sheet for hot stamping according to the present embodiment) will be described in detail.

<Chemical Composition of Steel Sheet for Hot Stamping>

The steel sheet for hot stamping according to the present embodiment has the following chemical composition. The reasons for limiting each element are as follows. In the following description, "%" regarding the amount of an element means "mass %". A numerical range expressed using "to" includes numerical values before and after "to". Numerical values expressed using "less than" or "more than" are not included in the range.

C: More than 0.40% and 0.70% or Less

C is an element having an effect of increasing a tensile strength of a steel sheet (a steel sheet provided in a hot stamped product) after hot stamping. When a C content is 0.40% or less, the tensile strength of the steel sheet after hot stamping becomes less than 2,300 MPa, and a strength of the hot stamped product is insufficient. Therefore, the C content is set to more than 0.40%. A preferable C content is more than 0.42%, more than 0.43%, more than 0.44%, or more than 0.45%.

On the other hand, when the C content is more than 0.70%, the strength of the hot stamped product becomes too high, and collision resistance cannot be secured. Therefore, the C content is set to 0.70% or less. A preferable C content is 0.65% or less, 0.60% or less, 0.55% or less, or 0.50% or less.

Si: Less Than 2.00%

Si is an element that is contained in steel as an impurity and embrittles the steel. When a Si content is 2.00% or more, an adverse effect thereof becomes particularly significant. Therefore, the Si content is set to less than 2.00%. A preferable Si content is less than 1.50%, less than 1.00%, less than 0.75%, or less than 0.50%.

A lower limit of the Si content is not particularly limited, but an excessive decrease in the Si content causes an increase in steelmaking cost. Therefore, the Si content is preferably set to 0.001% or more. In addition, Si has an action of enhancing the hardenability of steel and thus may be contained positively. From the viewpoint of improving the hardenability, the Si content is preferably set to 0.10% or more, 0.20% or more, or 0.30% or more.

Mn: 0.01% or More and Less than 0.50%

Mn is an element that deteriorates the collision resistance of the hot stamped product. In particular, when a Mn content is 0.50% or more, collision resistance significantly deteriorates, and the collision resistance of the hot stamped product cannot be secured even when a manufacturing method of a steel sheet for hot stamping described later is applied. Therefore, the Mn content is set to less than 0.50%. The Mn content is preferably less than 0.45%, less than 0.40%, less than 0.35%, or less than 0.30%.

On the other hand, Mn is an element that is bonded to S which is an impurity to form MnS and thus has an action of suppressing harmful influence due to S. In order to obtain this effect, the Mn content is set to 0.01% or more. The Mn content is preferably 0.05% or more or 0.10% or more. Mn is an element that improves the hardenability of steel. From the viewpoint of improving the hardenability, the Mn content is preferably 0.15% or more, 0.20% or more, or 0.25% or more.

P: 0.200% or Less

P is an element contained in steel as an impurity and embrittles the steel. When a P content is more than 0.200%, an adverse effect thereof becomes particularly significant, and weldability also significantly deteriorates. Therefore, the P content is set to 0.200% or less. A preferable P content is less than 0.100%, less than 0.050%, or less than 0.020%.

A lower limit of the P content is not particularly limited, but an excessive decrease in the P content causes an increase in steelmaking cost. Therefore, the P content may be set to 0.001% or more.

S: 0.0200% or Less

S is an element that is contained in steel as an impurity and embrittles the steel. When a S content is more than 0.0200%, an adverse effect thereof becomes particularly significant. Therefore, the S content is set to 0.0200% or less. A preferable S content is less than 0.0050%, less than 0.0020%, or less than 0.0010%.

A lower limit of the S content is not particularly limited, but an excessive decrease in the S content causes an increase in steelmaking cost. Therefore, the S content may be set to 0.0001% or more.

sol. Al: 0.001% to 1.000%

Al is an element having an action of deoxidizing molten steel. When a sol. Al content (acid-soluble Al content) is less than 0.001%, deoxidation is insufficient. Therefore, the sol. Al content is set to 0.001% or more. The sol. Al content is preferably 0.005% or more, 0.010% or more, or 0.020% or more.

On the other hand, when the sol. Al content is too large, a transformation point rises, and it becomes difficult to heat the steel sheet to a temperature of higher than an $Ac_3$ point in manufacturing steps of the steel sheet for hot stamping. Therefore, the sol. Al content is set to 1.000% or less. The sol. Al content is preferably less than 0.500%, less than 0.100%, less than 0.060%, or less than 0.040%.

N: 0.0200% or Less

N is an element that is contained in steel as an impurity and forms nitrides during continuous casting of the steel. Since these nitrides deteriorate ductility of the steel sheet after hot stamping, a N content is preferably low. When the N content is more than 0.0200%, an adverse effect thereof becomes particularly significant. Therefore, the N content is set to 0.0200% or less. The N content is preferably less than 0.0100%, less than 0.0080%, or less than 0.0050%.

A lower limit of the N content is not particularly limited, but an excessive decrease in the N content causes an increase in steelmaking cost. Therefore, the N content may be set to 0.0010% or more.

Mo: 0.01% or More and Less than 0.50%

Mo is an element that improves the hardenability of steel and is an effective element for forming a metallographic microstructure primarily including martensite in a step of performing hot stamping and securing the strength of the hot stamped product. In order to obtain this effect, a Mo content is set to 0.01% or more. A preferable Mo content is 0.05% or more, 0.10% or more, or 0.15% or more.

On the other hand, when the Mo content is 0.50% or more, a local fluctuation in Mo concentration cannot be suppressed in the steel sheet for hot stamping even if the manufacturing method of a steel sheet for hot stamping described later is applied, and the collision resistance of the hot stamped product cannot be sufficiently secured. Therefore, the Mo content is set to less than 0.50%. The Mo content is preferably less than 0.40%, less than 0.35%, or less than 0.30%.

B: 0.0002% to 0.0200%

B is an element that improves the hardenability of steel, and is an effective element for forming a metallographic microstructure primarily including martensite in the step of performing hot stamping and securing the strength of the hot stamped product. In order to obtain this effect, a B content is set to 0.0002% or more. A preferable B content is 0.0006% or more, 0.0010% or more, or 0.0015% or more.

On the other hand, in a case where the B content is more than 0.0200%, borocarbides are formed, and an effect of improving the hardenability by including B is impaired. Therefore, the B content is set to 0.0200% or less. A preferable B content is less than 0.0050%, less than 0.0040%, or less than 0.0030%.

The steel sheet for hot stamping according to the present embodiment may have a chemical composition containing the above-described chemical elements and a remainder of Fe and impurities. However, in order to improve properties and the like, the steel sheet for hot stamping according to the present embodiment may further contain one or more selected from Ti, Nb, V, Zr, Cr, W, Cu, Ni, Ca, Mg, REM, and Bi in the ranges shown below. These elements (optional elements) do not necessarily have to be contained. Therefore, lower limits thereof are 0%.

Here, the “impurities” mean elements that are incorporated from raw materials such as ore and scrap or due to various factors in the manufacturing steps when the steel sheet is industrially manufactured, and are acceptable in a range without adversely affecting the steel sheet for hot stamping according to the present embodiment.

Ti: 0% to 0.200%

Nb: 0% to 0.200%

V: 0% to 0.200%

Zr: 0% to 0.200%

Ti, Nb, V, and Zr are elements having an action of improving the collision resistance of the hot stamped product through the refinement of the metallographic microstructure. In order to obtain this effect, one or more selected from Ti, Nb, V, and Zr may be contained as necessary.

In a case where the above effect is desired, one or more selected from Ti, Nb, V, and Zr are each contained preferably in an amount of 0.001% or more, more preferably in an amount of 0.005% or more, and even more preferably in an amount of 0.010% or more.

On the other hand, in a case where the amounts of Ti, Nb, V, and Zr are each more than 0.200%, the effect is saturated and a manufacturing cost of the steel sheet increases. Therefore, in a case where the above elements are contained, the amounts of Ti, Nb, V, and Zr are each set to 0.200% or less.

Moreover, in a case where the amounts of Ti, Nb, V, and Zr are large, carbides of these elements precipitate in a large amount and the ductility of the steel sheet after hot stamping are impaired. From the viewpoint of securing the ductility, a preferable Ti content is less than 0.050% or less than 0.030%, a preferable Nb content is less than 0.050%, less than 0.030%, or less than 0.020%, a preferable V content is less than 0.100% or less than 0.050%, and a preferable Zr content is less than 0.100% or less than 0.050%.

Cr: 0% to 2.00%

W: 0% to 2.00%

Cu: 0% to 2.00%

Ni: 0% to 2.00%

Cr, W, Cu, and Ni are elements having an action of enhancing the hardenability of steel. Therefore, one or more selected from Cr, W, Cu, and Ni may be contained as necessary.

In a case where the above effect is desired, it is preferable that one or more selected from Cr, W, Cu, and Ni are each contained in an amount of 0.001% or more. A more preferable Cr content is 0.05% or more or 0.10% or more, a more preferable W content is 0.05% or more or 0.10% or more, a more preferable Cu content is 0.10% or more, and a more preferable Ni content is 0.10% or more.

On the other hand, when the amounts of Cr, W, Cu, and Ni are each more than 2.00%, the collision resistance of the hot stamped product deteriorates. Therefore, in a case where the above elements are contained, the amounts of Cr, W, Cu, and Ni are each set to 2.00% or less. A preferable Cr content is less than 0.50%, less than 0.40%, or less than 0.30%, a preferable W content is less than 0.50%, less than 0.40%, or less than 0.30%, a preferable Cu content is less than 1.00% or less than 0.50%, or a preferable Ni content is less than 1.00% or less than 0.50%.

Ca: 0% to 0.0100%

Mg: 0% to 0.0100%

REM: 0% to 0.1000%

Ca, Mg, and REM are elements having an action of improving the ductility of the steel sheet after hot stamping by controlling shapes of inclusions. Therefore, these elements may be contained as necessary. In a case where the above effect is desired, it is preferable that one or more selected from Ca, Mg, and REM are each contained in an amount of 0.0001% or more.

On the other hand, in a case where a Ca or Mg content is more than 0.0100%, or in a case where a REM content is more than 0.1000%, not only is the above effect saturated, but also an excessive cost is incurred. Therefore, in a case where the above elements are contained, the Ca and Mg contents are each set to 0.0100% or less, and the REM content is set to 0.1000% or less.

In the present embodiment, REM refers to a total of 17 elements of Sc, Y, and lanthanoids, and the REM content means the total amount of these elements. Lanthanoids are industrially added in the form of mischmetal.

Bi: 0% to 0.0500%

Bi is an element having an action of improving the collision resistance of the hot stamped product by refining a solidification structure. Therefore, Bi may be contained as necessary. In a case where the above effect is desired, a Bi content is preferably 0.0001% or more. A more preferable Bi content is 0.0003% or more, or 0.0005% or more.

On the other hand, in a case where the Bi content is more than 0.0500%, the above effect is saturated and an excessive cost is incurred. Therefore, in a case where Bi is contained, the Bi content is set to 0.0500% or less. A preferable Bi content is 0.0100% or less or 0.0050% or less.

As described above, the chemical composition of the steel sheet for hot stamping according to the present embodiment may contain essential elements and the remainder of Fe and impurities, or may contain essential elements, one or more optional elements, and the remainder of Fe and impurities.

<Mo Concentration Distribution of Steel Sheet for Hot Stamping>

A local distribution of alloying elements concentration of the steel sheet for hot stamping according to the present embodiment will be described. In the steel sheet for hot stamping according to the present embodiment, when the Mo content of the steel sheet is measured by line analysis in a range of 0.05 mm in a sheet thickness direction, in which a ¼ depth position of a sheet thickness of the steel sheet from a surface of the steel sheet is a center, a maximum value of the Mo content, a minimum value of the Mo content, and an average value of the Mo content in measurement results satisfy Expression (Fi).

$$([Mo]_{MAX} - [Mo]_{MIN})/[Mo]_{AVE} < 0.50 \quad \text{(Fi)}$$

Here, the meaning of each symbol in Expression (Fi) is as follows.

$[Mo]_{MAX}$: the maximum value of the Mo content (mass %)

$[Mo]_{MIN}$: the minimum value of the Mo content (mass %)

$[Mo]_{AVE}$: the average value of the Mo content (mass %)

When the Mo content of the steel sheet for hot stamping in the above range satisfies Expression (Fi), the collision resistance of the hot stamped product can be improved. A left side value in Expression (Fi) is preferably less than 0.40 or less than 0.30.

A lower limit of the left side value of Expression (Fi) is not limited. However, in order to significantly lower the left side value of Expression (Fi), in the manufacturing method of a steel sheet for hot stamping described later, it is necessary to excessively raise a soaking temperature or excessively lengthen a soaking time in first hot-rolled sheet annealing. In this case, not only is productivity of the steel sheet for hot stamping impaired, but also a local fluctuation in hardness of the steel sheet for hot stamping increases. Therefore, the left side value of Expression (Fi) may be 0.05 or more, 0.10 or more, or 0.15 or more.

In the present embodiment, a local Mo content (concentration) distribution is obtained as follows.

First, a test piece is collected from the steel sheet for hot stamping, and a longitudinal section of the steel sheet parallel to a rolling direction is polished with waterproof abrasive paper. Furthermore, buffing is performed using a diamond suspension, and line analysis is then performed on a range of 0.05 mm in the sheet thickness direction, in which the ¼ depth position of the sheet thickness of the steel sheet from the surface of the steel sheet in the sheet thickness direction of the steel sheet is a center, using a field emission electron probe micro-analyzer (FE-EPMA). The EPMA measurement is performed at intervals of 0.2 μm in the sheet thickness direction, and the Mo content at each measurement position is obtained from a five-point moving average value. Specifically, an average value of measurement values of Mo concentrations at five consecutive points is set as the Mo content at a third measurement position, and the Mo content at each measurement position in the above range is obtained. From a maximum value, a minimum value, and an average value (an average value of the Mo contents at all the measurement positions) of the Mo contents in the above range obtained as described above, a left side value of Expression (Fi) is obtained. However, this line analysis is performed at any 10 points on the steel sheet, and an average value of the left side values obtained at the 10 points is regarded as the left side value of Expression (Fi) in the steel sheet.

<Hardness Distribution of Steel Sheet for Hot Stamping>

In the steel sheet for hot stamping according to the present embodiment, a standard deviation of a Vickers hardness in a region of 0.18 $mm^2$ (a region of 0.3 mm in the sheet thickness direction and 0.6 mm in a direction perpendicular to the sheet thickness direction, in which the ¼ depth position of the steel sheet is a center) is 20 (Hv) or less (20 or less in the unit of Hv).

In a case where the standard deviation of the Vickers hardness in the above region is more than 20 (Hv), when the hot stamped product is deformed, cracking occurs in an early stage of the deformation, and the collision resistance significantly deteriorates. Therefore, the standard deviation of the hardness in the above region is set to 20 (Hv) or less. The standard deviation of the hardness is preferably set to 15 (Hv) or less or 10 (Hv) or less.

In addition, the steel sheet for hot stamping according to the present embodiment is a steel sheet as cold-rolled, and an average value of the hardness is an index of strain energy stored in the steel sheet. In order to increase the strain energy and improve the collision resistance of the hot stamped product, the average value of the hardness is preferably set to 280 (Hv) or more, 295 (Hv) or more, or 310 (Hv) or more.

The standard deviation of the hardness in the above region is preferably as small as possible. However, a significant decrease in the standard deviation of the hardness causes a decrease in the productivity of the steel sheet for hot stamping. Therefore, the standard deviation of the hardness may be more than 5 (Hv) or more than 10 (Hv). The average value of the hardness in the above region is preferably as large as possible. However, a significant increase in the average value of the hardness not only causes a decrease in the productivity of the steel sheet for hot stamping but also deteriorates cutability of the steel sheet for hot stamping. Therefore, the average value of the hardness may be 400 (Hv) or less or 370 (Hv) or less.

In the present embodiment, the hardness of the steel sheet for hot stamping is obtained as follows.

First, a test piece is collected from the steel sheet for hot stamping, a longitudinal section of the steel sheet parallel to the rolling direction is polished with waterproof abrasive paper and is further buffed using a diamond suspension, and a Vickers hardness is measured at the ¼ depth position of the steel sheet.

Figure 35:
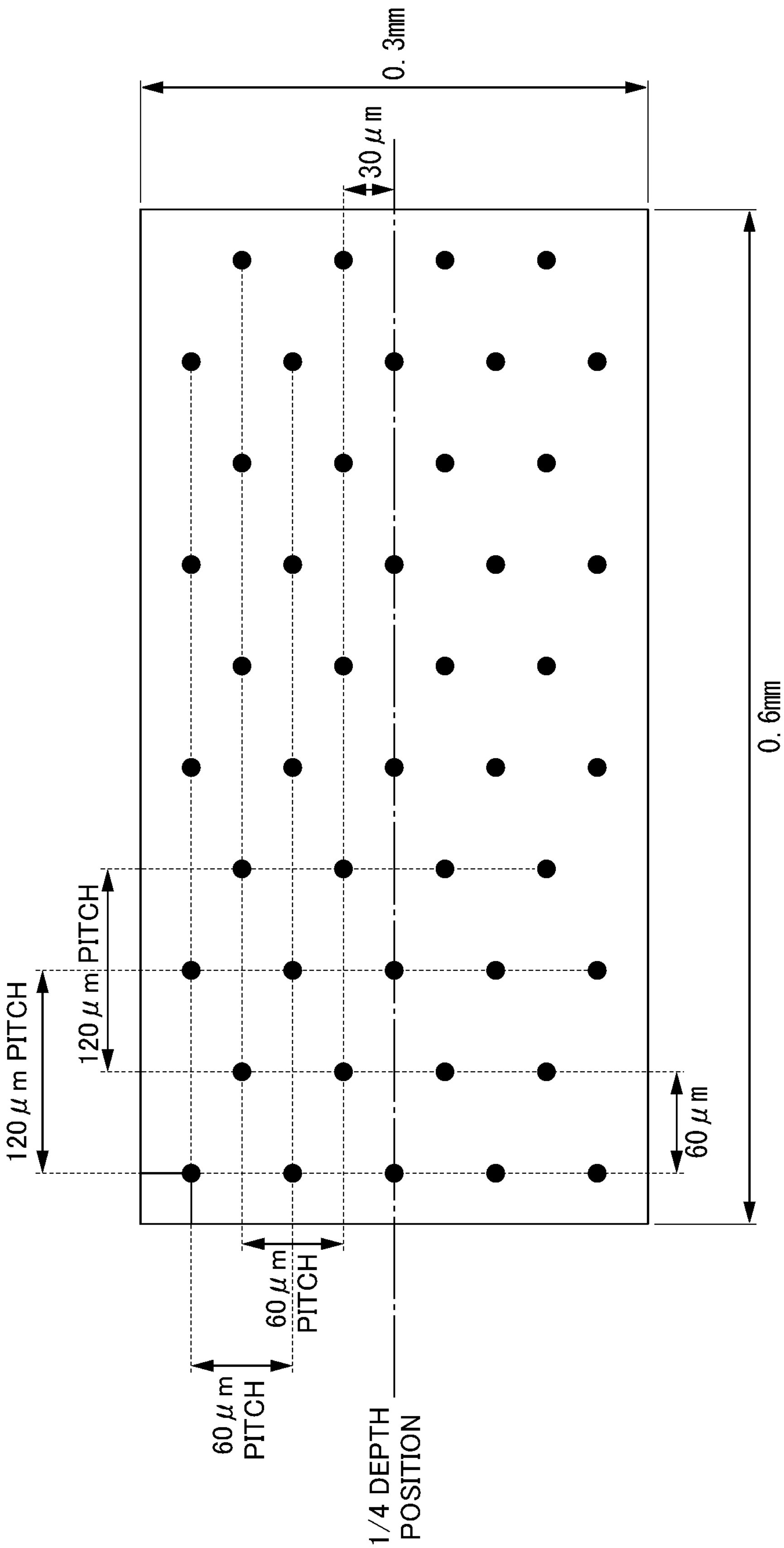
FIG. 35 is a schematic view showing a hardness measuring position of a steel sheet for hot stamping.

Specifically, as shown in FIG. 35, in a range of 0.3 mm in the sheet thickness direction and 0.6 mm in the direction perpendicular to the sheet thickness direction, in which the ¼ depth position of the steel sheet is a center, the Vickers hardness is measured at 45 points at predetermined intervals, and an arithmetic average value and a standard deviation are obtained from the obtained measurement values. A micro-Vickers hardness tester is used for the measurement of the hardness, and measurement conditions include a load of 0.49 N and a load holding time of 10 seconds. When the load is high, dimensions of an indentation become large, and a local hardness distribution that is closely related to the collision resistance of the hot stamped product cannot be evaluated. Therefore, the load is set to 0.49 N.

<Strength of Steel Sheet for Hot Stamping>

The steel sheet for hot stamping according to the present embodiment preferably has a tensile strength of 900 MPa or more in order to increase the strain energy and improve the collision resistance of the hot stamped product. A more preferable tensile strength is 950 MPa or more or 1,000 MPa or more.

<Metallographic Microstructure of Steel Sheet for Hot Stamping>

Since the steel sheet for hot stamping according to the present embodiment is manufactured without annealing after a cold rolling step, the steel sheet for hot stamping according to the present embodiment has a metallographic microstructure stretched in the rolling direction. With such a metallographic microstructure, the strain energy of the steel sheet for hot stamping is increased, and the collision resistance of the hot stamped product is improved. In a steel sheet that is annealed after cold rolling, the stored strain energy is not sufficient, and the collision resistance of the hot stamped product decreases.

When martensite (including tempered martensite) is contained in the metallographic microstructure, the steel sheet is significantly hardened, and it is difficult to cut the steel sheet. Therefore, it is preferable that the metallographic microstructure of the steel sheet for hot stamping primarily contains ferrite, pearlite, and/or bainite stretched in the rolling direction. A total volume percentage of ferrite stretched in the rolling direction, pearlite stretched in the rolling direction, and bainite stretched in the rolling direction is preferably more than 80.0%, more than 90.0%, or more than 95.0%.

In the metallographic microstructure, a remainder other than ferrite, pearlite, and bainite stretched in the rolling direction may include martensite and/or retained austenite, and may further include precipitates such as cementite. A volume percentage of the remainder is preferably 20.0% or less. A volume percentage of martensite is preferably less than 10.0% or less than 5.0%.

The volume percentage of each structure in the metallographic microstructure of the steel sheet for hot stamping is obtained as follows.

First, a test piece is collected from the steel sheet for hot stamping, a longitudinal section of the steel sheet parallel to the rolling direction is polished with waterproof abrasive paper and is further buffed using a diamond suspension, and structure observation is then performed at the ¼ depth position of the sheet thickness of the steel sheet from the surface of the steel sheet.

Specifically, the polished surface is subjected to nital etching or electrolytic polishing, structure observation is then performed using an optical microscope and a scanning electron microscope (SEM), and image analysis based on a difference in luminance or a difference in morphology of iron carbides present in phases is performed on the obtained structure photograph to obtain an area ratio of each of ferrite, pearlite, bainite, and tempered martensite. Thereafter, LePera corrosion is applied to the same observation position, structure observation is then performed using the optical microscope and the scanning electron microscope (SEM), and image analysis is performed on the obtained structure photograph to calculate a total area ratio of retained austenite and martensite.

In addition, the longitudinal section parallel to the rolling direction of the steel sheet is subjected to electrolytic polishing at the same observation position, and an area ratio of retained austenite is then measured based on a difference in crystal structure using a SEM provided with an electron backscatter diffraction pattern analyzer (EBSP).

Based on these results, the area ratio of each of ferrite, pearlite, bainite, tempered martensite, martensite, and retained austenite is obtained. Assuming that the area ratio is equal to the volume percentage, the measured area ratio is regarded as the volume percentage of each structure.

During the structure observation, tempered martensite can be distinguished from martensite by the presence of iron carbides inside, and can be distinguished from bainite by the fact that iron carbides present inside are stretched in a plurality of directions.

<Manufacturing Method of Steel Sheet for Hot Stamping>

Next, a preferred manufacturing method of the steel sheet for hot stamping according to the present embodiment will be described.

The steel sheet for hot stamping according to the present embodiment can be manufactured by a manufacturing method including the following steps:

(I) a hot rolling step of performing hot rolling on a slab having the above-described chemical composition and then coiling the slab into a hot-rolled steel sheet;

(II) a first hot-rolled sheet annealing step of performing first hot-rolled sheet annealing on the hot-rolled steel sheet to obtain a hot-rolled and annealed steel sheet;

(III) a second hot-rolled sheet annealing step of performing second hot-rolled sheet annealing on the hot-rolled and annealed steel sheet; and (IV) a cold rolling step of performing cold rolling on the hot-rolled and annealed steel sheet subjected to the second hot-rolled sheet annealing to obtain a cold-rolled steel sheet.

A manufacturing method of the slab provided for the manufacturing method of the steel sheet for hot stamping according to the present embodiment is not particularly limited. In a preferable manufacturing method of the slab exemplified, a steel having the above-described composition (chemical composition) is melted by a known method, thereafter made into a steel ingot by a continuous casting method, or made into a steel ingot by any casting method, and then made into a steel piece by a blooming method or the like. In a continuous casting step, in order to suppress the occurrence of surface defects due to inclusions, it is preferable to cause an external additional flow to occur in molten steel in a mold by electromagnetic stirring or the like. The steel ingot or steel piece may be reheated after being cooled once and subjected to hot rolling, or the steel ingot in a high temperature state after the continuous casting or the steel piece in a high temperature state after the blooming may be subjected to hot rolling as it is, after being kept hot, or after being subjected to auxiliary heating. In the present embodiment, the steel ingot and the steel piece are collectively referred to as a "slab" as a material of hot rolling.

[Hot Rolling Step]

A temperature of the slab to be subjected to the hot rolling (slab heating temperature) is set to preferably lower than 1,250° C., and more preferably 1,200° C. or lower in order to prevent coarsening of austenite. On the other hand, when the slab heating temperature is low, it is difficult to perform rolling. Therefore, the slab heating temperature may be set to 1,050° C. or higher.

The heated slab is hot-rolled, thereby obtaining a hot-rolled steel sheet. The hot rolling is preferably completed in a temperature range of an $Ar_3$ point or higher in order to refine a metallographic microstructure of the hot-rolled steel sheet by transforming austenite after completion of rolling.

In a case where the hot rolling includes rough rolling and finish rolling, a rough-rolled material may be heated between the rough rolling and the finish rolling in order to complete the finish rolling at the above temperature. At this time, it is desirable to suppress a temperature fluctuation over the entire length of the rough-rolled material at the start of the finish rolling to 140° C. or lower by performing heating such that a rear end of the rough-rolled material has a higher temperature than a front end thereof. This improves uniformity of product characteristics in the coil after the coiling step.

A heating method of the rough-rolled material may be performed using a known method. For example, a solenoid induction heating device may be provided between a roughing mill and a finishing mill, and an increase in the heating temperature may be controlled based on a temperature distribution and the like in a longitudinal direction of the rough-rolled material on an upstream side of the induction heating device.

In a case where the hot-rolled steel sheet after the hot rolling is coiled, a coiling temperature is preferably set to 660° C. or lower in order to suppress a local fluctuation in the Mo concentration. A more preferable coiling temperature is 640° C. or lower or 620° C. or lower.

On the other hand, when the coiling temperature becomes too low, there are cases where the steel sheet is significantly hardened, and cracking occurs in the steel sheet in the manufacturing steps of the steel sheet. Therefore, the coiling temperature is preferably set to higher than 500° C. or higher than 550° C.

[First Hot-Rolled Sheet Annealing Step]

The steel sheet that is hot-rolled and coiled is subjected to the first hot-rolled sheet annealing to obtain a hot-rolled and annealed steel sheet. In the present embodiment, annealing performed on a hot-rolled steel sheet is called hot-rolled sheet annealing, and a steel sheet after being subjected to the hot-rolled sheet annealing is called a hot-rolled and annealed steel sheet. Before the first hot-rolled sheet annealing, flattening by skin pass rolling or the like or descaling by pickling or the like may be performed.

In the first hot-rolled sheet annealing step, a soaking temperature is set to an $Ac_3$ point (° C.) or higher, and a soaking time (holding time at the soaking temperature) is set to longer than one hour. In addition, an average cooling rate from the soaking temperature to 500° C. is set to faster than 1° C./sec. This is to suppress a local fluctuation in the Mo concentration and to improve the collision resistance of the hot stamped product. A more preferable soaking temperature is ($Ac_3$ point+50° C.) or higher, a more preferable soaking time is 2 hours or longer or 6 hours or longer, and a more preferable average cooling rate to 500° C. is 2° C./sec or faster. In a case where the soaking temperature is too high or the soaking time is too long, austenite becomes excessively coarse, and a local fluctuation in the hardness of the steel sheet for hot stamping increases. Therefore, the soaking temperature is preferably set to be ($Ac_3$ points +200° C.) or lower or ($Ac_3$ point+100° C.) or lower, and the soaking time is preferably set to 12 hours or shorter or 10 hours or shorter.

The $Ac_3$ point is a temperature at which ferrite disappears in the metallographic microstructure when the steel sheet is heated, and is obtained from a change in thermal expansion when the steel sheet is heated at 8° C./see in the present embodiment.

[Second Hot-Rolled Sheet Annealing Step]

The second hot-rolled sheet annealing is performed on the steel sheet (hot-rolled and annealed steel sheet) subjected to the first hot-rolled sheet annealing. Annealing performed on a hot-rolled and annealed steel sheet is also called hot-rolled sheet annealing. Before the second hot-rolled sheet annealing, flattening by skin pass rolling or the like or descaling by pickling or the like may be performed.

In the second hot-rolled sheet annealing step, a soaking temperature is set to the $Ac_3$ point or higher and ($Ac_3$ point+50° C.) or lower, and a soaking time is set to 1 second or longer and shorter than 10 minutes. In addition, an average heating rate from 500° C. to the soaking temperature is set to faster than 1° C./sec, and an average cooling rate from the soaking temperature to 500° C. is set to faster than 1° C./sec. This is to suppress a local fluctuation in the hardness of the steel sheet for hot stamping and to improve the collision resistance of the hot stamped product. A more preferable soaking temperature is the $Ac_3$ point or higher and ($Ac_3$ point+25° C.) or lower, a more preferable soaking time is 10 seconds or longer and shorter than 5 minutes, and a more preferable average heating rate from 500° C. to the soaking temperature is 2° C./sec or faster. When the average cooling rate from the soaking temperature to 500° C. is too fast, the steel sheet is significantly hardened, and it is difficult to cut the steel sheet. Therefore, the cooling rate is preferably set to 15° C./sec or slower.

[Cold Rolling Step]

The steel sheet subjected to the second hot-rolled sheet annealing (hot-rolled and annealed steel sheet) is cold-rolled according to a normal method to obtain a cold-rolled steel sheet. In the cold rolling step, a cold rolling reduction (cumulative rolling reduction in cold rolling) is set to 10% or more. When the cold rolling reduction is less than 10%, the strain energy stored in the steel sheet is insufficient, a local fluctuation in the hardness in the steel sheet increases, and the collision resistance of the hot stamped product decreases. A preferable cold rolling reduction is 20% or more, 30% or more, or 40% or more. It is not necessary to particularly limit an upper limit of the cold rolling reduction. However, since an excessive increase in the cold rolling reduction increases a load on a rolling facility and causes a decrease in productivity, the cold rolling reduction is preferably set to less than 70%, less than 60%, or less than 50%.

In order to reduce a weight of the hot stamped product, a sheet thickness of the cold-rolled steel sheet is preferably 2.0 mm or less, more preferably 1.8 mm or less, and even more preferably 1.6 mm or less. Before the cold rolling, flattening by skin pass rolling or the like or descaling by pickling or the like may be performed according to known methods.

It is preferable that the cold-rolled steel sheet is not annealed. When the cold-rolled steel sheet is annealed, strain energy stored during cold rolling is released. In addition, there may be cases where a local fluctuation in the hardness of the steel sheet increases. In a case where such a steel sheet is used as a steel sheet for hot stamping, the collision resistance of the hot stamped product deteriorates. The cold-rolled steel sheet obtained in this manner may be subjected to a treatment such as degreasing and lubrication according to a normal method.

A hot stamped product can be obtained by hot-stamping the above-described steel sheet for hot stamping according to the present embodiment. The hot stamped product manufactured using the steel sheet for hot stamping according to the present embodiment (hereinafter, a hot stamped product according to the present embodiment) will be described.

The hot stamped product according to the present embodiment includes a base steel sheet (a steel sheet forming a hot stamped product obtained by hot-stamping a steel sheet for hot stamping). The hot stamped product according to the present embodiment may include only the base steel sheet.

<Chemical Composition of Base Steel Sheet of Hot Stamped Product>

Since the chemical composition is not substantially changed by hot stamping, a chemical composition of the base steel sheet of the hot stamped product (or the chemical composition of the hot stamped product in a case where the hot stamped product includes only the base steel sheet) is the same as the above-described steel sheet for hot stamping. In a case where the hot stamped product includes a portion having a tensile strength of 2,300 MPa or more and a portion having a tensile strength of less than 2,300 MPa, at least a portion of the base steel sheet having a tensile strength of 2,300 MPa or more may have the above-described chemical composition.

<Mo Concentration Distribution of Base Steel Sheet of Hot Stamped Product>

In the hot stamped product according to the present embodiment, when a Mo content is measured by line analysis in a range of 0.05 mm in a sheet thickness direction, in which a ¼ depth position of a sheet thickness of the base steel sheet from a surface of the base steel sheet (a steel sheet provided in a hot stamped product) is a center, a maximum value of the Mo content, a minimum value of the Mo content, and an average value of the Mo content in measurement results satisfy Expression (Fii).

$$([Mo]_{mMAX} - [Mo]_{mMIN})/[Mo]_{mAVE} < 0.50 \quad \text{(Fii)}$$

Here, the meaning of each symbol in Expression (Fii) is as follows.

$[Mo]_{mMAX}$: the maximum value of the Mo content of the base steel sheet (mass %)

$[MO]_{mMIN}$: the minimum value of the Mo content of the base steel sheet (mass %)

$[Mo]_{mAVE}$: the average value of the Mo content of the base steel sheet (mass %)

In a case where the hot stamped product includes a portion having a tensile strength of 2,300 MPa or more and a portion having a tensile strength of less than 2,300 MPa, at least a portion of the base steel sheet having a tensile strength of 2,300 MPa or more may satisfy Expression (Fii).

As a local fluctuation in the Mo concentration in the hot stamped product decreases, a stress concentration on a soft portion is relaxed when the hot stamped product is deformed, and the occurrence of cracking is suppressed. Therefore, a left side value of Expression (Fii) is preferably less than 0.50. The left side value of Expression (Fii) is more preferably less than 0.40 or less than 0.30.

A lower limit of the left side value of Expression (Fii) is not limited. However, a significant decrease in the left side value of Expression (Fii) causes a decrease in the productivity of the steel sheet for hot stamping. Therefore, the left side value of Expression (Fii) may be 0.05 or more, 0.10 or more, or 0.15 or more.

The local distribution in the Mo concentration in the hot stamped product can be obtained by collecting a test piece from the hot stamped product, buffing a longitudinal section of the steel sheet, and then performing concentration analysis at the ¼ depth position of the base steel sheet in the same method as in the case of the steel sheet for hot stamping. In a case where the hot stamped product has a portion having a tensile strength of 2,300 MPa or more and a portion having a tensile strength of less than 2,300 MPa, the test piece is collected from at least a portion of the base steel sheet having a tensile strength of 2,300 MPa or more to perform the concentration analysis.

<Metallographic Microstructure of Base Steel Sheet of Hot Stamped Product>

In the hot stamped product manufactured using the steel sheet for hot stamping according to the present embodiment, it is preferable that the base steel sheet has the following metallographic microstructure. In a case where the hot stamped product includes a portion having a tensile strength of 2,300 MPa or more and a portion having a tensile strength of less than 2,300 MPa, it is preferable that at least a portion of the base steel sheet having a tensile strength of 2,300 MPa or more has the following metallographic microstructure.

Martensite: More than 90.0%

Martensite is an important structure for increasing the tensile strength of the steel sheet after hot stamping. When a volume percentage of martensite is 90.0% or less, the tensile strength of the hot stamped product becomes less than 2,300 MPa, and the strength is insufficient. Therefore, the volume percentage of martensite is preferably set to more than 90.0%. A more preferable volume percentage of martensite is more than 91.0%, more than 93.0%, or more than 95.0%.

An upper limit of the volume percentage of martensite does not need to be particularly set %. However, in order to significantly increase the volume percentage of martensite, it is necessary to excessively increase a heating temperature of the steel sheet or excessively increase a cooling rate in the step of performing hot stamping, which significantly impairs productivity of the hot stamped product. Therefore, the volume percentage of martensite is preferably set to 99.0% or less, or 98.0% or less.

The martensite includes, in addition to fresh martensite that has not been tempered, tempered martensite that has been tempered and has iron carbides present therein.

A remainder of the metallographic microstructure may contain ferrite, pearlite, bainite, or retained austenite, and may further contain precipitates such as cementite. Since it is not necessary to contain ferrite, pearlite, bainite, retained austenite, and precipitates, lower limits of volume percentages of ferrite, pearlite, bainite, retained austenite, and precipitates are all 0%.

Since ferrite, pearlite, and bainite have an action of improving ductility of the steel sheet after hot stamping, in a case where this effect is obtained, it is preferable to include one or more selected from ferrite, pearlite, and bainite. The volume percentage of ferrite is preferably set to 0.5% or more or 1.0% or more, the volume percentage of each of pearlite and bainite is set to preferably 1.0% or more, and more preferably 2.0% or more.

On the other hand, when ferrite, pearlite, and bainite are excessively contained, the collision resistance of the hot stamped product deteriorates. Therefore, the volume percentage of ferrite is preferably set to less than 3.0% or less than 2.0%, and the volume percentage of each of pearlite and bainite is set to preferably less than 10.0%, and more preferably less than 5.0%.

Retained austenite has an action of improving the ductility of the steel sheet after hot stamping. In a case where this effect is obtained, the volume percentage of retained austenite is preferably set to 0.5% or more, 1.0% or more, or 2.0% or more.

On the other hand, in order to excessively increase the volume percentage of retained austenite, it is necessary to perform an austempering treatment at a high temperature after hot stamping, which significantly reduces the productivity of the hot stamped product. In addition, when retained austenite is excessively contained, there are cases where the collision resistance of the hot stamped product deteriorates. Therefore, the volume percentage of retained austenite is preferably set to less than 9.0%, less than 7.0%, less than 5.0%, or less than 4.0%.

The volume percentage of each structure in the metallographic microstructure of the hot stamped product can be obtained by collecting a test piece from the hot stamped product, buffing a longitudinal section of the steel sheet, and then performing structure observation at the ¼ depth position of the base steel sheet in the same method as in the case of the steel sheet for hot stamping. In a case where the hot stamped product has a portion having a tensile strength of 2,300 MPa or more and a portion having a tensile strength of less than 2,300 MPa, the test piece is collected from at least a portion of the base steel sheet having a tensile strength of 2,300 MPa or more to perform the structure observation.

<Strength of Base Steel Sheet of Hot Stamped Product>

The entirety or a part of the hot stamped product according to the present embodiment preferably has a tensile strength of 2,300 MPa or more. For this purpose, the tensile strength of the entirety or a part of the base steel sheet of the hot stamped product is 2,300 MPa or more. When the tensile strength of at least a part of the hot stamped product is not 2,300 MPa or more, the collision resistance of the hot stamped product cannot be secured. Therefore, the tensile strength of the entirety or a part of the hot stamped product is set to 2.300 MPa or more. Preferably, the tensile strength is 2,400 MPa or more, or 2,500 MPa or more in the entirety or a part of the hot stamped product. On the other hand, an excessive increase in the strength of the hot stamped product causes a decrease in the collision resistance. Therefore, the tensile strength of the base steel sheet of the hot stamped product is preferably set to less than 3,000 MPa or less than 2,800 MPa.

The entirety of the hot stamped product according to the present embodiment (the entire formed product) may have a tensile strength of 2,300 MPa or more. However, a portion having a tensile strength of 2,300 MPa or more and a portion having a tensile strength of less than 2,300 MPa may be mixed in the hot stamped product. By providing the portions having different strengths, it is possible to control the deformation state of the hot stamped product in a collision. The hot stamped product having portions with different strengths can be manufactured by a method of performing hot stamping after joining two or more types of steel sheets having different chemical compositions, a method of partially changing a heating temperature of a steel sheet or a cooling rate after hot stamping in a step of performing hot stamping, a method of partially reheating a hot stamped product, or the like.

<Hardness Distribution of Base Steel Sheet of Hot Stamped Product>

In the hot stamped product according to the present embodiment, a standard deviation of a Vickers hardness in a region of 0.18 $mm^2$ (a region of 0.3 mm in the sheet thickness direction and 0.6 mm in a direction perpendicular to the sheet thickness direction, in which the ¼ depth position of the base steel sheet is a center) is 20 (Hv) or less.

In a case where the standard deviation of the Vickers hardness in the above region is more than 20 (Hv), when the hot stamped product is deformed, cracking occurs in an early stage of the deformation, and the collision resistance significantly deteriorates. Therefore, the standard deviation of the hardness in the above region is set to 20 (Hv) or less. The standard deviation of the hardness is more preferably set to 15 (Hv) or less, or 10 (Hv) or less.

In a case where the hot stamped product includes a portion having a tensile strength of 2,300 MPa or more and a portion having a tensile strength of less than 2,300 MPa, at least a portion of the base steel sheet having a tensile strength of 2,300 MPa or more may have the above-described hardness distribution.

The standard deviation of hardness in the above region is preferably as small as possible. However, a significant decrease in the standard deviation of the hardness causes a decrease in the productivity of the hot stamped product. Therefore, the standard deviation of the hardness may be more than 5 (Hv) or more than 10 (Hv).

The hardness distribution of the base steel sheet in the hot stamped product can be obtained by collecting a test piece from the hot stamped product, buffing a longitudinal section of the steel sheet, and then measuring the hardness at the ¼ depth position of the base steel sheet in the same method as in the case of the steel sheet for hot stamping. In a case where the hot stamped product has a portion having a tensile strength of 2,300 MPa or more and a portion having a tensile strength of less than 2,300 MPa, the test piece is collected from at least a portion of the base steel sheet having a tensile strength of 2,300 MPa or more to measure the hardness.

<Manufacturing Method of Hot Stamped Product>

Next, a preferred manufacturing method of the hot stamped product according to the present embodiment will be described.

The hot stamped product according to the present embodiment is manufactured according to a manufacturing method including a heating step of heating the steel sheet for hot stamping according to the present embodiment, and a hot stamping step of performing hot stamping on the heated steel sheet for hot stamping to obtain a hot stamped product. In the hot stamping step, forming and cooling are performed using a die.

In the heating step, the steel sheet for hot stamping according to the present embodiment is heated before the hot stamping step. In the heating step of heating the steel sheet for hot stamping, a heating temperature is preferably set to a temperature of higher than the $Ac_3$ point. When the heating temperature is the $Ac_3$ point or lower, the volume percentage of martensite in the metallographic microstructure of the hot stamped product is insufficient, resulting in a decrease in the strength of the formed product and the deterioration of the collision resistance.

An upper limit of the heating temperature is not particularly limited. However, when the heating temperature is too high, scale is excessively generated in the hot stamped product, and the deposition of the scale in a die reduces the productivity of the formed product. Therefore, the heating temperature is preferably 1,200° C. or lower or 1,150° C. or lower.

It is not necessary to particularly limit a heating rate of the steel sheet. However, as the heating rate increases, strain energy stored in the steel sheet for hot stamping can be effectively used, and the collision resistance of the hot stamped product improves. Therefore, an average heating rate up to 700° C. is preferably set to faster than 10° C./sec, faster than 20° C./sec, faster than 30° C./sec, or faster than 50° C./sec. On the other hand, when the heating rate is too fast, the amount of coarse iron carbides produced in the metallographic microstructure of the hot stamped product becomes excessive, and the ductility of the steel sheet after hot stamping decreases. Therefore, the average heating rate is preferably slower than 150° C./sec, slower than 120° C./sec, or slower than 90° C./sec.

In the step of performing hot stamping on the heated steel sheet for hot stamping, it is preferable that the heated steel sheet is taken out of a heating furnace and subjected to air cooling in the air, and then hot stamping is started at a temperature of 700° C. or higher. When a hot stamping start temperature is lower than 700° C., the volume percentage of martensite in the metallographic microstructure of the hot stamped product is insufficient, resulting in a decrease in the strength of the formed product and the deterioration of the collision resistance.

After forming is performed by hot stamping, cooling is performed while holding the formed product in the die, and/or the formed product is taken out of the die and cooled by any method. When a cooling rate is slow, the volume percentage of martensite in the metallographic microstructure of the hot stamped product is insufficient, and the strength of the formed product decreases. Therefore, an average cooling rate from the hot stamping start temperature to 400° C. is preferably set to 30° C./sec or faster, 60° C./sec or faster, or 90° C./sec or faster. In addition, when a cooling stop temperature is high, similarly, the volume percentage of martensite in the metallographic microstructure of the hot stamped product is insufficient, and the strength of the formed product decreases. Therefore, the cooling stop temperature by the cooling is preferably set to lower than 90° C. or lower than 50° C.

The hot stamped product may be subjected to a reheating treatment. The reheating treatment reduces a local fluctuation in hardness in the hot stamped product and improves the collision resistance of the hot stamped product. In order to sufficiently obtain this effect, a reheating temperature is preferably set to 90° C. or higher. On the other hand, when the reheating temperature is too high, the steel sheet is softened and the strength of the formed product is insufficient. Therefore, the reheating temperature is preferably set to lower than 200° C. or lower than 150° C.

When a holding time at the heating temperature is short, the above effect cannot be sufficiently obtained. On the other hand, when the holding time is long, the strength of the formed product is insufficient. Therefore, a lower limit of the holding time is preferably 5 minutes or longer or 10 minutes or longer, and an upper limit of the holding time is preferably shorter than 30 minutes or shorter than 20 minutes.

EXAMPLES

Hereinafter, the element technology F will be described more specifically with reference to examples, but the element technology F is not limited the examples.

Molten steel was cast using a vacuum melting furnace to manufacture Steels A to U having the chemical composition shown in Table 40. The $Ac_3$ point in Table 40 was obtained from changes in thermal expansion when cold-rolled steel sheets of Steels A to U were heated at 8° C./sec. Steels A to U were heated to 1,200° C. and held for 60 minutes, and then subjected to hot rolling under the hot rolling conditions shown in Table 41.

TABLE 40

| Steel | Chemical composition (mass %) (remainder: Fe and impurities) C | Si | Mn | P | S | sol. Al | N | Mo | B | Cr | Ti | Nb | Others | $Ac_3$ point (° C.) |
|---|---|---|---|---|---|---|---|---|---|---|---|---|---|---|
| A | 0.43 | 0.39 | 0.39 | 0.011 | 0.0003 | 0.027 | 0.0019 | 0.20 | 0.0020 | — | 0.021 | 0.049 | — | 815 |
| B | 0.47 | 0.42 | 0.38 | 0.010 | 0.0017 | 0.049 | 0.0029 | 0.20 | 0.0018 | — | 0.020 | 0.051 | — | 813 |
| C | 0.46 | 0.004 | 0.48 | 0.010 | 0.0010 | 0.034 | 0.0022 | 0.05 | 0.0019 | 0.15 | 0.029 | 0.078 | — | 799 |
| D | 0.38 | 0.005 | 0.40 | 0.008 | 0.0004 | 0.045 | 0.0011 | 0.30 | 0.0018 | — | 0.020 | 0.050 | — | 811 |
| E | 0.72 | 0.005 | 0.45 | 0.008 | 0.0007 | 0.043 | 0.0018 | 0.05 | 0.0020 | — | — | — | — | 753 |
| F | 0.45 | 0.004 | 0.54 | 0.010 | 0.0018 | 0.045 | 0.0039 | 0.20 | 0.0018 | 0.62 | 0.020 | 0.047 | — | 790 |
| G | 0.51 | 0.38 | 0.29 | 0.008 | 0.0002 | 0.048 | 0.0021 | 0.20 | 0.0018 | 0.10 | 0.021 | — | — | 816 |
| H | 0.43 | 0.004 | 0.09 | 0.012 | 0.0003 | 0.055 | 0.0011 | 0.51 | 0.0018 | — | 0.021 | 0.049 | — | 819 |
| I | 0.43 | 0.03 | 0.38 | 0.011 | 0.0007 | 0.050 | 0.0019 | — | — | — | 0.020 | 0.050 | — | 811 |
| J | 0.44 | 0.03 | 0.39 | 0.010 | 0.0005 | 0.043 | 0.0025 | — | 0.0019 | 0.20 | 0.021 | 0.052 | — | 806 |
| K | 0.46 | 0.40 | 0.39 | 0.009 | 0.0006 | 0.047 | 0.0029 | 0.19 | 0.0018 | 0.33 | 0.021 | 0.019 | — | 808 |
| L | 0.46 | 0.60 | 0.39 | 0.010 | 0.0005 | 0.047 | 0.0034 | 0.19 | 0.0022 | 0.21 | 0.020 | 0.018 | — | 829 |
| M | 0.46 | 0.43 | 0.38 | 0.008 | 0.0008 | 0.049 | 0.0031 | 0.10 | 0.0018 | 0.33 | 0.021 | 0.019 | — | 806 |
| N | 0.46 | 0.42 | 0.39 | 0.010 | 0.0018 | 0.050 | 0.0031 | 0.19 | 0.0017 | — | 0.020 | — | — | 814 |
| O | 0.46 | 0.42 | 0.39 | 0.009 | 0.0017 | 0.048 | 0.0029 | 0.20 | 0.0018 | — | — | — | — | 804 |
| P | 0.46 | 0.40 | 0.39 | 0.008 | 0.0004 | 0.038 | 0.0020 | 0.19 | 0.0024 | — | — | — | V: 0.041<br>Zr: 0.017 | 798 |
| Q | 0.46 | 0.41 | 0.38 | 0.008 | 0.0006 | 0.038 | 0.0019 | 0.20 | 0.0019 | — | 0.022 | 0.028 | Cu: 0.30<br>Ni: 0.14 | 805 |
| R | 0.47 | 0.38 | 0.28 | 0.010 | 0.0006 | 0.039 | 0.0027 | 0.20 | 0.0020 | 0.28 | 0.021 | 0.028 | Ca: 0.0004<br>Mg: 0.0004<br>REM: 0.0005 | 810 |
| S | 0.47 | 0.39 | 0.18 | 0.010 | 0.0005 | 0.038 | 0.0030 | 0.19 | 0.0021 | 0.29 | 0.022 | 0.027 | Bi: 0.0021 | 816 |
| T | 0.46 | 0.41 | 0.38 | 0.010 | 0.0005 | 0.046 | 0.0030 | 0.10 | 0.0019 | 0.31 | 0.022 | 0.018 | W: 0.11 | 805 |
| U | 0.53 | 0.49 | 0.28 | 0.008 | 0.0002 | 0.049 | 0.0020 | 0.22 | 0.0020 | 0.31 | 0.020 | — | — | 803 |

Note)
1. The symbol "—" indicates no addition.
2. The $Ac_3$ point was obtained from a change in thermal expansion when the cold-rolled steel sheet was heated at 8° C./sec.

TABLE 41

| | | Hot rolling conditions | | First hot-rolled sheet annealing | | Second hot-rolled sheet annealing | | Cold rolling conditions | |
|---|---|---|---|---|---|---|---|---|---|
| Test No. | Steel | Sheet thickness after rolling (mm) | Coiling temperature (° C.) | Soaking temperature (° C.) | Soaking time (hour) | Soaking temperature (° C.) | Soaking time (hour) | Sheet thickness after rolling (mm) | Cold rolling reduction (%) |
| 1 | A | 3.2 | 640 | 900 | 3 | 850 | 30 | 1.4 | 56 |
| 2 | A | 3.2 | 640 | 900 | 3 | 850 | 30 | 1.4 | 56 |
| 3 | A | 3.2 | 640 | 900 | 3 | 850 | 30 | — | — |
| 4 | A | 3.2 | 640 | 900 | 3 | — | — | 1.4 | 56 |
| 5 | A | 3.2 | 640 | — | — | 850 | 30 | 1.4 | 56 |
| 6 | B | 2.6 | 660 | 900 | 3 | 850 | 60 | 1.4 | 46 |
| 7 | B | 2.6 | 660 | 900 | 3 | 850 | 60 | 1.4 | 46 |
| 8 | B | 2.6 | 660 | 900 | 3 | 850 | 60 | — | — |
| 9 | B | 2.6 | 660 | 900 | 3 | — | — | 1.4 | 46 |
| 10 | B | 2.6 | 660 | — | — | 850 | 60 | 1.4 | 46 |
| 11 | C | 2.6 | 660 | 900 | 2 | 820 | 30 | 1.4 | 46 |
| 12 | C | 2.6 | 660 | 900 | 2 | 900 | 3600 | 1.4 | 46 |
| 13 | D | 2.6 | 640 | 900 | 6 | 850 | 30 | 1.4 | 46 |
| 14 | E | 2.2 | 660 | 900 | 6 | 780 | 60 | 1.4 | 36 |
| 15 | F | 2.6 | 640 | 900 | 6 | 820 | 60 | 1.4 | 46 |
| 16 | G | 2.6 | 660 | 900 | 6 | 850 | 30 | 1.4 | 46 |
| 17 | H | 2.6 | 640 | 850 | 2 | 850 | 30 | 1.4 | 46 |
| 18 | I | 2.6 | 640 | 900 | 6 | 850 | 30 | 1.4 | 46 |
| 19 | J | 2.6 | 640 | 900 | 6 | 850 | 30 | 1.4 | 46 |
| 20 | K | 2.6 | 660 | 900 | 6 | 850 | 30 | 1.4 | 46 |
| 21 | K | 2.6 | 660 | 900 | 6 | 900 | 3600 | 1.4 | 46 |
| 22 | L | 2.2 | 660 | 900 | 3 | 850 | 30 | 1.4 | 36 |
| 23 | L | 2.2 | 660 | 850 | 0.1 | 850 | 30 | 1.4 | 36 |
| 24 | M | 2.6 | 660 | 900 | 3 | 850 | 30 | 1.4 | 46 |
| 25 | M | 2.6 | 660 | 900 | 3 | 850 | 3600 | 1.4 | 46 |
| 26 | N | 2.6 | 660 | 900 | 6 | 850 | 30 | 1.4 | 46 |
| 27 | O | 2.6 | 660 | 900 | 2 | 820 | 30 | 1.4 | 46 |
| 28 | O | 2.6 | 660 | 900 | 2 | 900 | 300 | 1.4 | 46 |
| 29 | P | 2.6 | 660 | 900 | 6 | 820 | 30 | 1.4 | 46 |
| 30 | Q | 2.6 | 660 | 900 | 6 | 850 | 30 | 1.4 | 46 |
| 31 | R | 2.6 | 660 | 900 | 3 | 850 | 30 | 1.4 | 46 |

TABLE 41-continued

| | | | | | | | | | |
|---|---|---|---|---|---|---|---|---|---|
| 32 | S | 2.6 | 660 | 900 | 3 | 850 | 30 | 1.4 | 46 |
| 33 | T | 2.6 | 660 | 900 | 3 | 850 | 30 | 1.4 | 46 |
| 34 | U | 2.6 | 640 | 900 | 6 | 820 | 30 | 1.4 | 46 |

| Test No. | Presence or absence of annealing after cold Soaking rolling | Mo concentration distribution of steel sheet for hot stamping Left side value of Expression (Fi) | Mechanical properties of steel sheet for hot stamping Tensile strength (MPa) | Average value of Vickers hardness (Hv) | Standard deviation of Vickers hardness (Hv) |
|---|---|---|---|---|---|
| 1 | Absent | 0.36 | 1087 | 337 | 13 |
| 2 | Present | 0.35 | 934 | 290 | 39 |
| 3 | Absent | 0.34 | 858 | 267 | 21 |
| 4 | Absent | 0.36 | 1162 | 360 | 30 |
| 5 | Absent | 0.52 | 1055 | 329 | 12 |
| 6 | Absent | 0.38 | 1058 | 328 | 14 |
| 7 | Present | 0.38 | 949 | 296 | 43 |
| 8 | Absent | 0.36 | 882 | 276 | 22 |
| 9 | Absent | 0.38 | 134 | 355 | 32 |
| 10 | Absent | 0.54 | 1027 | 320 | 14 |
| 11 | Absent | 0.22 | 1023 | 319 | 13 |
| 12 | Absent | 0.20 | 1116 | 345 | 24 |
| 13 | Absent | 0.39 | 945 | 292 | 13 |
| 14 | Absent | 0.20 | 1103 | 340 | 18 |
| 15 | Absent | 0.32 | 1062 | 329 | 14 |
| 16 | Absent | 0.33 | 1068 | 332 | 15 |
| 17 | Absent | 0.52 | 1060 | 328 | 14 |
| 18 | Absent | — | 1009 | 311 | 17 |
| 19 | Absent | — | 1028 | 318 | 15 |
| 20 | Absent | 0.29 | 1057 | 325 | 14 |
| 21 | Absent | 0.27 | 1145 | 353 | 31 |
| 22 | Absent | 0.37 | 1039 | 323 | 18 |
| 23 | Absent | 0.51 | 1022 | 315 | 16 |
| 24 | Absent | 0.25 | 1060 | 331 | 14 |
| 25 | Absent | 0.24 | 1122 | 348 | 28 |
| 26 | Absent | 0.30 | 1005 | 314 | 14 |
| 27 | Absent | 0.38 | 977 | 306 | 17 |
| 28 | Absent | 0.38 | 994 | 309 | 22 |
| 29 | Absent | 0.29 | 1033 | 320 | 16 |
| 30 | Absent | 0.29 | 1055 | 326 | 14 |
| 31 | Absent | 0.34 | 1062 | 330 | 15 |
| 32 | Absent | 0.31 | 1060 | 332 | 14 |
| 33 | Absent | 0.26 | 1052 | 327 | 13 |
| 34 | Absent | 0.35 | 1088 | 338 | 13 |

Note)

1. The column “Sheet thickness after cold rolling” in the field “Hot rolling conditions”: indicates the sheet thickness of the hot-rolled steel sheet.
2. The column “First hot-rolled sheet annealing”: the symbol “—” indicates that first hot-rolled sheet annealing was not performed.
3. The column “Second hot-rolled sheet annealing”: the symbol “—” indicates that second hot-rolled sheet annealing was not performed.
4. The column “Sheet thickness after cold rolling” in the field “Cold rolling conditions”: indicates the sheet thickness of the cold-rolled steel sheet.
The symbol “—” indicates that cold rolling was not performed.
5. The column “Presence or absence of annealing after cold rolling”: “Present” indicates that annealing was performed, and “Absent” indicates that annealing was not performed.
6. The column “Left side value of Expression (Fi)”: the symbol “—” indicates that calculation was not possible.

Specifically, Steels A to U were rolled in 10 passes in a temperature range of the $Ar_3$ point or higher into hot-rolled steel sheets having a thickness of 2.2 to 3.2 mm. After the hot rolling, the hot-rolled steel sheet was cooled to 640° C. to 660° C. with a water spray, a cooling finishing temperature was set to a coiling temperature, the hot-rolled steel sheet was loaded into an electric heating furnace held at the coiling temperature and held for 60 minutes, the hot-rolled steel sheet was then subjected to furnace cooling to room temperature at an average cooling rate of 20° C./hr, and thereby slow cooling after coiling was simulated.

The hot-rolled steel sheet was pickled and then subjected to first hot-rolled sheet annealing under the conditions shown in Table 41. Specifically, heating was performed from room temperature to a soaking temperature using an electric heating furnace at a heating rate of 100° C./hour, and soaking was performed for 0.1 to 6 hours. Subsequently, the steel sheet was taken out of the heating furnace and subjected to air cooling to room temperature. An average cooling rate from the soaking temperature to 500° C. was 9 to 10° C./sec. For some of the hot-rolled steel sheets, the first hot-rolled sheet annealing was skipped.

The hot-rolled and annealed steel sheet or the hot-rolled steel sheet was pickled, and then subjected to second hot-rolled sheet annealing under the conditions shown in Table 41. Specifically, heating was performed to a soaking temperature using an electric heating furnace at an average heating rate from 500° C. to the soaking temperature of 2 to 5° C./sec and soaking was performed for 30 seconds to 1 hour. Subsequently, the steel sheet was taken out of the heating furnace and subjected to air cooling to room temperature. An average cooling rate from the soaking temperature to 500° C. was 7 to 10° C./sec. For some of the hot-rolled and annealed steel sheets, the second hot-rolled sheet annealing was skipped.

The hot-rolled and annealed steel sheet was pickled and then cold-rolled under the conditions shown in Table 41 to obtain a cold-rolled steel sheet having a thickness of 1.4 mm.

Some of the hot-rolled and annealed steel sheets were not cold-rolled and were mechanically ground to obtain ground sheets having a thickness of 1.4 mm.

In addition, some of the cold-rolled steel sheets were heated from room temperature to 780° C. at a heating rate of 10° C./sec using a continuous annealing simulator and soaked for 120 seconds. Subsequently, cooling to room temperature was performed at an average cooling rate of 15° C./sec to obtain an annealed steel sheet.

A test piece for EPMA measurement was collected from the cold-rolled steel sheets, the ground sheets, and the annealed steel sheets (these steel sheets are collectively referred to as a steel sheet for hot stamping) obtained as described above, a longitudinal section of the test piece parallel to the rolling direction of the steel sheet was polished, a Mo concentration distribution (maximum value, minimum value, and average value) was then measured by the above-described method at a ¼ depth position of a sheet thickness (¼ depth position) of the steel sheet from a surface of the steel sheet in a sheet thickness direction of the steel sheet, and a left side value of Expression (Di) was obtained. Specifically, JXA-8530F manufactured by JEOL Ltd. was used for the EPMA measurement, and line analysis was performed in the sheet thickness direction at measurement intervals of 0.20 μm with an acceleration voltage of 15.0 kV and an irradiation current of $5.0\times10^{-8}$ A. The maximum value, the minimum value, and the average value of the Mo contents were obtained from a five-point moving average value of the obtained measurement data. Using these values, the left side value of Expression (Di) was calculated.

Furthermore, a JIS No. 13B tensile test piece was collected from the steel sheet for hot stamping along a direction perpendicular to the rolling direction, and a tensile test was conducted at a tensile speed of 10 mm/min to obtain a tensile strength.

In addition, a test piece for hardness measurement was collected from the steel sheet for hot stamping, a longitudinal section of the test piece parallel to the rolling direction of the steel sheet was polished, Vickers hardnesses were then measured at the ¼ depth position of the steel sheet by the above-described method with a load of 0.49 N according to JIS Z 2244:2009, and an average value and a standard deviation of the Vickers hardness were obtained.

In addition, a test piece for structure observation was collected from the steel sheet for hot stamping, a longitudinal section of the test piece parallel to the rolling direction of the steel sheet was polished, and a metallographic microstructure at the ¼ depth position of the steel sheet was then observed by the above-described method. Table 41 shows examination results of the Mo concentration distribution of the steel sheet for hot stamping and examination results of mechanical properties of the steel sheet for hot stamping.

Figure 36:
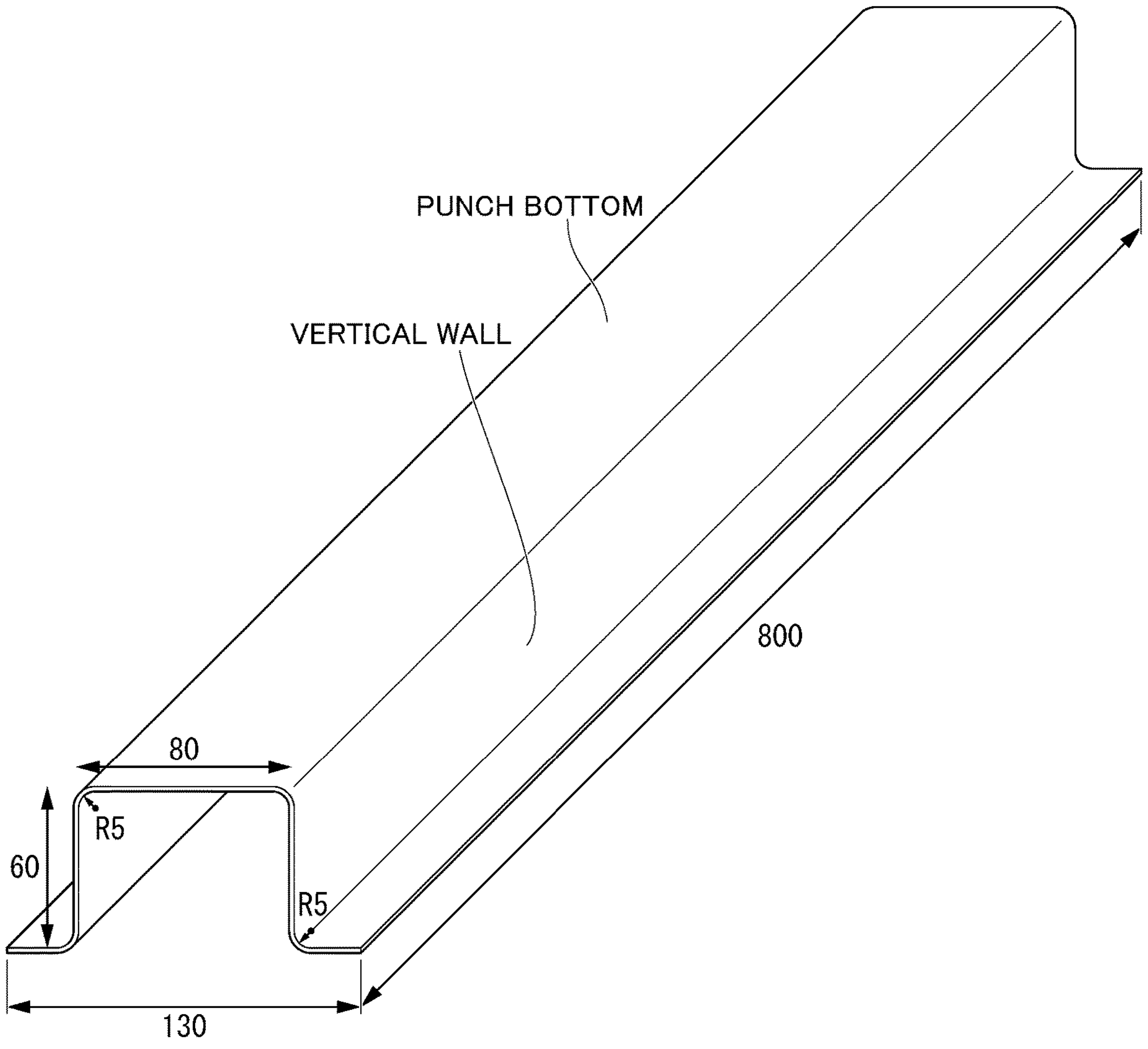
FIG. 36 is a schematic view showing an example of a shape of a hot stamped product.

An element sheet for hot stamping having a width of 240 mm and a length of 800 mm was collected from the steel sheet for hot stamping, and a hat member having the shape shown in FIG. 36 was manufactured by hot stamping. In a hot stamping step, a gas heating furnace was used to heat the element sheet (steel sheet for hot stamping) to 950° C. at an average heating rate up to 700° C. of 11° C./s, and held at the temperature for 1 minute. Thereafter, the element sheet was taken out of the heating furnace, was subjected to air cooling to 800° C., was sandwiched between dies provided with a cooling apparatus to form a hat, and was subsequently cooled to room temperature (25° C.) in the dies. In Test No. 34 using Steel U, the hat member after cooling was subjected to a reheating treatment of holding at 140° C. for 10 minutes using an electric heating furnace.

A test piece for structure observation was collected from a standing wall portion of the obtained hat member (hot stamped product), a longitudinal section of this test piece was polished, a metallographic microstructure was then observed at the ¼ depth position of the steel sheet by the above-described method, and volume percentages of martensite, retained austenite, and the others (one or more of ferrite, pearlite, bainite, and precipitates) were obtained.

In addition, a test piece for EPMA measurement was collected from the standing wall portion of the hat member (hot stamped product), a longitudinal section of the test piece was polished, a Mo concentration distribution was then measured at the ¼ depth position of the steel sheet by the above-described method, and a left side value of Expression (Fii) was obtained.

Furthermore, a JIS No. 13B tensile test piece was collected from the standing wall portion of the hat member along a longitudinal direction of the member, and a tensile test was conducted at a tensile speed of 10 mm/min to obtain a tensile strength.

In addition, a test piece for hardness measurement was collected from the standing wall portion of the hat member, a longitudinal section of the test piece was polished, Vickers hardnesses were then measured at the ¼ depth position of the steel sheet by the above-described method with a load of 0.49 N according to JIS Z 2244:2009, and a standard deviation of the Vickers hardness was obtained.

Figure 37:
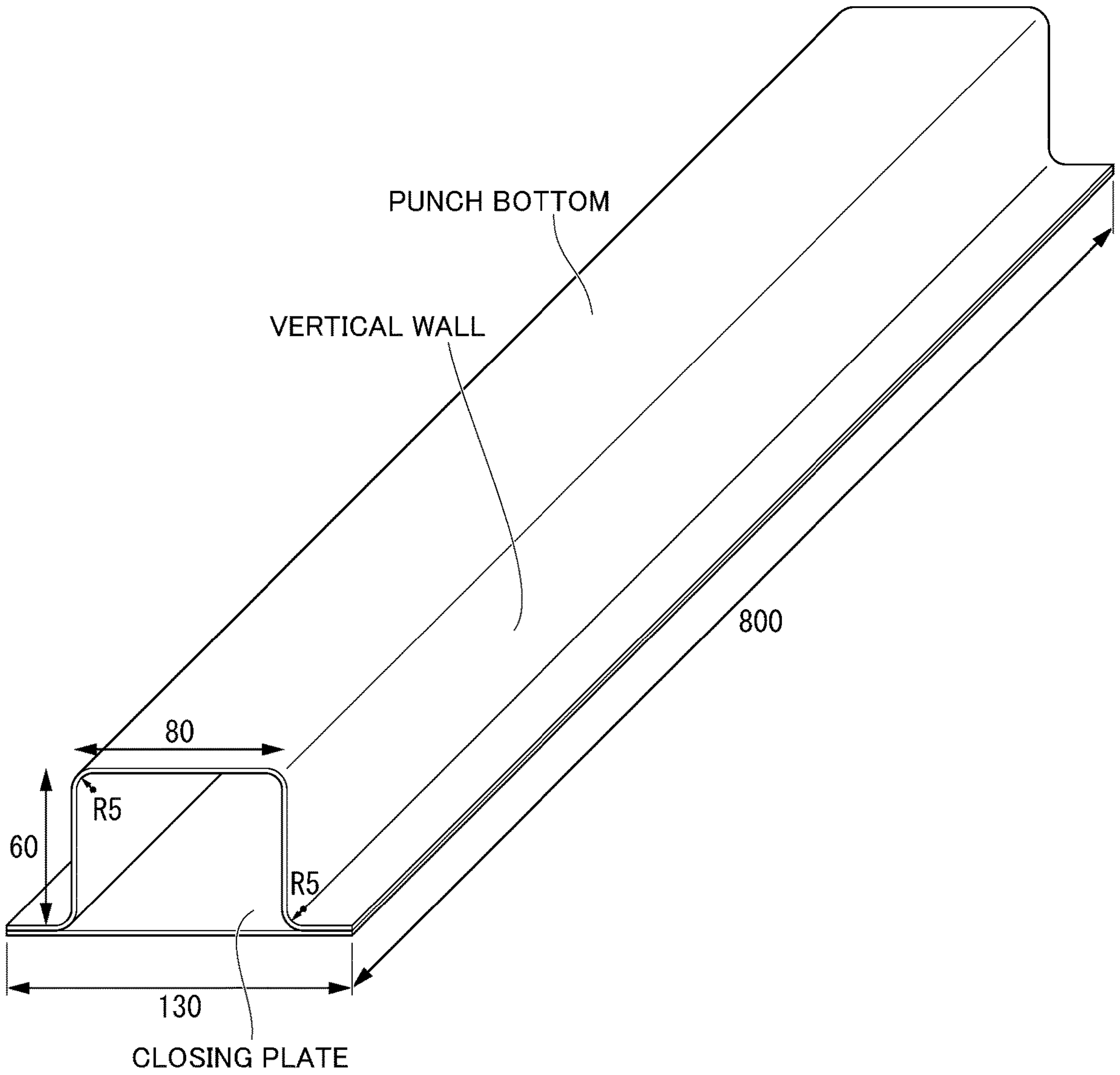
FIG. 37 is a schematic view showing a shape of a test body for a three-point bending test.

In addition, as shown in FIG. 37, a closing plate having a thickness of 1.4 mm, a width of 130 mm, and a length of 800 mm was welded to the hat member to manufacture a test body for a three-point bending test. A steel sheet having a tensile strength of 1,553 MPa was used as the closing plate.

Figure 38:
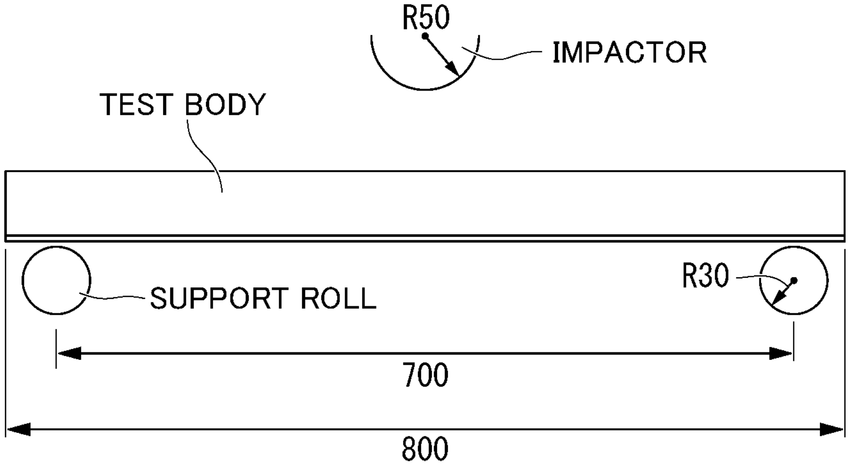
FIG. 38 is a schematic view showing an arrangement of the tester and a test body in the three-point bending test.

As shown in FIG. 38, the test body having a length of 800 mm was placed on two support rolls disposed at a roll interval of 700 mm so that the closing plate is a lower side, a three-point bending test was conducted at a test speed of 2 m/sec, and a maximum load, a displacement from a point of contact between the test body and an impactor until cracking began to occur in the test body, and an energy absorbed until cracking began to occur were obtained. When the maximum load was 23.0 kN or more, the cracking occurrence displacement was 35 mm or more, and the absorbed energy was 0.80 kJ or more, it was determined that the collision resistance was good.

Table 42 shows examination results of the Mo concentration distribution of the hat member, observation results of the metallographic microstructure of the hat member, evaluation results of the mechanical properties of the hat member, and evaluation results of the collision resistance of the hat member.

TABLE 42

| Test No. | Steel | Mo concentration distribution of hot stamped product Left side value of Expression (ii) | Metallographic structure of hot stamped product Volume percentage of martensite (%) | Volume percentage of retained austenite (%) | Volume percentage of the others (%) | Mechanical properties of hot stamped product Tensile strength (MPa) | Standard deviation of Vickers hardness (Hv) | Collision resistance of hot stamped product Maximum load (kN) | Cracking occurrence displacement (mm) | Absorbed energy (kJ) |
|---|---|---|---|---|---|---|---|---|---|---|
| 1 | A | 0.35 | 95.9 | 3.1 | 1.0 | 2463 | 17 | 24.5 | 39 | 0.83 |
| 2 | A | 0.35 | 96.0 | 3.1 | 0.9 | 2458 | 27 | 24.3 | 26 | 0.54 |
| 3 | A | 0.34 | 96.1 | 2.9 | 1.0 | 2402 | 21 | 23.8 | 34 | 0.72 |
| 4 | A | 0.35 | 95.9 | 3.0 | 1.1 | 2460 | 24 | 24.3 | 30 | 0.63 |
| 5 | A | 0.51 | 96.0 | 2.7 | 1.3 | 2419 | 23 | 24.1 | 31 | 0.63 |
| 6 | B | 0.37 | 95.1 | 3.7 | 1.2 | 2717 | 18 | 26.1 | 35 | 0.85 |
| 7 | B | 0.38 | 95.2 | 3.8 | 1.0 | 2714 | 28 | 25.3 | 24 | 0.52 |
| 8 | B | 0.36 | 95.1 | 3.6 | 1.3 | 2665 | 22 | 25.7 | 31 | 0.70 |
| 9 | B | 0.37 | 95.1 | 3.6 | 1.3 | 2711 | 25 | 25.5 | 27 | 0.62 |
| 10 | B | 0.52 | 95.1 | 3.4 | 1.5 | 2682 | 23 | 25.3 | 29 | 0.63 |
| 11 | C | 0.22 | 95.0 | 3.2 | 1.7 | 2635 | 16 | 25.6 | 40 | 0.91 |
| 12 | C | 0.20 | 95.1 | 3.3 | 1.6 | 2626 | 22 | 25.1 | 33 | 0.73 |
| 13 | D | 0.37 | 96.1 | 2.2 | 1.7 | 2214 | 16 | 22.0 | 54 | 0.88 |
| 14 | E | 0.20 | 92.6 | 6.9 | 0.5 | — | 24 | 19.7 | 12 | 0.23 |
| 15 | F | 0.32 | 95.8 | 3.3 | 0.9 | 2543 | 21 | 22.9 | 20 | 0.35 |
| 16 | G | 0.32 | 93.9 | 4.4 | 1.7 | 2705 | 15 | 26.0 | 36 | 0.85 |
| 17 | H | 0.53 | 95.9 | 3.5 | 0.6 | 2485 | 25 | 24.1 | 25 | 0.50 |
| 18 | I | — | 59.0 | 2.5 | 38.5 | 1688 | 30 | 20.0 | 11 | 0.20 |
| 19 | J | — | 77.8 | 2.8 | 19.4 | 2229 | 27 | 20.4 | 10 | 0.19 |
| 20 | K | 0.29 | 95.7 | 3.8 | 0.5 | 2631 | 14 | 25.5 | 39 | 0.88 |
| 21 | K | 0.27 | 95.6 | 4.0 | 0.4 | 2619 | 24 | 25.0 | 30 | 0.64 |
| 22 | L | 0.36 | 94.9 | 4.3 | 0.6 | 2618 | 17 | 25.4 | 36 | 0.81 |
| 23 | L | 0.51 | 94.8 | 4.1 | 1.1 | 2607 | 23 | 25.3 | 30 | 0.65 |
| 24 | M | 0.25 | 95.8 | 3.3 | 0.9 | 2612 | 17 | 25.3 | 40 | 0.90 |
| 25 | M | 0.24 | 95.9 | 3.5 | 0.6 | 2604 | 25 | 25.2 | 30 | 0.68 |
| 26 | N | 0.30 | 95.9 | 3.6 | 0.5 | 2595 | 16 | 25.2 | 38 | 0.86 |
| 27 | O | 0.38 | 95.6 | 4.0 | 0.4 | 2633 | 17 | 25.6 | 37 | 0.83 |
| 28 | O | 0.37 | 95.5 | 4.0 | 0.5 | 2626 | 21 | 25.2 | 33 | 0.71 |
| 29 | P | 0.28 | 95.7 | 3.6 | 0.7 | 2620 | 17 | 25.2 | 38 | 0.85 |
| 30 | Q | 0.29 | 95.8 | 3.8 | 0.4 | 2637 | 18 | 25.7 | 39 | 0.87 |
| 31 | R | 0.33 | 96.1 | 3.2 | 0.7 | 2684 | 17 | 25.9 | 37 | 0.86 |
| 32 | S | 0.31 | 96.0 | 3.2 | 0.8 | 2691 | 18 | 25.8 | 37 | 0.86 |
| 33 | T | 0.26 | 95.6 | 3.8 | 0.6 | 2622 | 16 | 25.4 | 40 | 0.89 |
| 34 | U | 0.34 | 94.1 | 4.6 | 1.3 | 2698 | 8 | 25.9 | 45 | 0.97 |

Note)
1. The column "Left side value of Expression (Fii)": the symbol "—" indicates that calculation was not possible.
2. The column "Tensile strength" in the field "Mechanical properties of hot stamped product": the symbol "—" indicates that tensile strength could not be measured.
3. The column "Absorbed energy" in the field "Collision resistance of hot stamped product": indicates the energy absorbed until cracking began to occur.

(Element Technology G)

Element Technology G is a frame member formed by hot-stamping a steel sheet, in which the frame member has a closed cross section portion in which a cross section perpendicular to a longitudinal direction is a closed cross section, the closed cross section portion has at least two flat parts having a radius of curvature larger than a maximum external dimension of the cross section, and a recessed bead part formed between the two flat parts, the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section, a Vickers hardness of a thickness middle portion in the wall portion is 520 Hv or greater, a width of the wall portion is 0.5 times or greater and 2.5 times or less an effective width $W_e$ obtained from Karman's effective width formula, and a standard deviation ratio obtained by dividing a standard deviation of hardness frequency distribution in a surface layer portion in the wall portion by a standard deviation of hardness frequency distribution in the thickness middle portion in the wall portion is less than 1.0.

According to the Element Technology G, in a case where the width of the wall portion of the recessed bead part and the hardness standard deviation ratio are controlled within appropriate ranges, it is possible to prevent bending fracture while suppressing elastic buckling. Accordingly, a high degree of energy absorption performance can be obtained even in a case where a high-strength thin member is used. Accordingly, it is possible to exhibit excellent energy absorption efficiency.

The present inventors intensively studied the configuration of a frame member capable of exhibiting excellent energy absorption efficiency.

First, in order to exhibit excellent energy absorption efficiency, it is important that the frame member has a bending proof stress of a certain level or higher. By forming a bead along a longitudinal direction of the member, it is possible to improve the bending proof stress in a case where an input load in a bending direction is applied due to a collision. However, in a case where elastic buckling (deflection) occurs in a bead side surface in the initial stage of deformation, a required bending proof stress may not be obtained, and excellent energy absorption efficiency may not be exhibited.

In addition, in order to exhibit excellent energy absorption efficiency, it is also important that the frame member realizes deformation in a desired deformation mode immediately after a bending load is applied thereto due to a collision, in order to efficiently absorb impact energy. In particular, in a case where fracture occurs in a bent portion after the start of deformation, excellent energy absorption efficiency may not be exhibited.

Accordingly, it can be said that in a case where a cross section where elastic buckling hardly occurs in a surface with a bead formed thereon is designed and high bending performance can be imparted so that fracture hardly occurs, excellent energy absorption efficiency can be exhibited.

Here, in a case where the member is increased in strength and thinned as a method for realizing the weight reduction, the following problems occur.

Due to the thinning, elastic buckling is likely to occur, whereby it becomes difficult to obtain a necessary proof stress.

Due to the increase of the strength, the bending performance of the steel sheet is reduced, and fracture is likely to occur in a bent portion after the start of deformation. Therefore, it becomes difficult to efficiently absorb impact energy.

The present inventors paid attention to the fact that the above-described problems hinder a further increase of the strength and thinning of a high strength steel sheet.

The present inventors further conducted studies, and found that in a case where the width of a wall portion of a recessed bead and the hardness standard deviation ratio are controlled within appropriate ranges, it is possible to prevent bending fracture while suppressing elastic buckling. The present inventors found that thanks to such control, it is possible to solve the above-described problems which may occur in using a high strength steel sheet, and to exhibit excellent energy absorption efficiency, and completed the Element Technology G.

First Embodiment

Hereinafter, a frame member G1 according to a first embodiment of the Element Technology G will be described.

First, terms and phrases in the present specification will be described.

The "longitudinal direction" means a member axis direction of a frame member, that is, a direction in which the axis extends.

The "bending compressive assuming surface" means a part in the frame member, where it is assumed that a compressive stress in the longitudinal direction is generated in a case where the frame member receives a bending load due to a collision or the like.

The "flat part" means a linear part in a cross section perpendicular to the longitudinal direction of the frame member, specifically, a part having a radius of curvature larger than a maximum external dimension of the cross section. The maximum external dimension means the maximum straight line length between end portions at two arbitrary points in the cross section. Among parts constituting a recessed bead part, a linear part is not regarded as a flat part.

The "recessed bead part" means a part protruding from the bending compressive assuming surface toward the inside of a closed cross section portion in a cross section perpendicular to the longitudinal direction of the frame member.

The "corner part" means a non-linear part excluding the flat part and the recessed bead part in the cross section perpendicular to the longitudinal direction of the frame member.

The "width" means a line length along the circumferential direction of the closed cross section portion, and for example, the "width of the wall portion" means a line length between one end and the other end of the wall portion.

The "effective width" is an effective width $W_e$ obtained from Formula (G1) based on Karman's effective width theory, that is, Karman's effective width formula.

$$W_c = t\left(4\pi^2 E/12\left(1-v^2\right)\sigma_y\right)^{1/2} \quad \text{Formula (G1)}$$

Here, the meanings of the symbols are as follows.

$\sigma_y$: Yield stress (MPa) of wall portion

E: Young's modulus (MPa) of wall portion t: Sheet thickness (mm) of wall portion v: Poisson's ratio of wall portion In addition, in the steel sheet, as the Young's modulus of the wall portion and the Poisson's ratio of the wall portion, general physical property values may be used, and by replacing the yield stress of the wall portion with the Vickers hardness of the thickness middle portion, the effective width $W_e$ can be obtained from Expression $W_e=577\ t/\sqrt{h}$.

Here, the meanings of the symbols are as follows.

t: Sheet thickness (mm) of wall portion h: Vickers hardness (Hv) of thickness middle portion of wall portion In a case where it is difficult to obtain the effective width $W_e$ from Formula (G1), the effective width $W_e$ can be obtained from the above expression.

The "effective width ratio" is a ratio of a width $H_0$ of the wall portion of the recessed bead part to the effective width $W_e$, and is a value calculated by $H_0/W_e$. It can be said that the smaller the value of the effective width ratio, the more hardly the elastic buckling in the wall portion occurs in the cross-sectional shape.

The "surface layer portion" means a region between: a depth position where a distance from a surface of the steel sheet to the depth position separated therefrom in the sheet thickness direction is 1% of the sheet thickness of the steel sheet; and a depth position where a distance from the surface of the steel sheet to the depth position separated therefrom in the sheet thickness direction is 5% of the sheet thickness of the steel sheet.

The "thickness middle portion" means a depth position where a distance from the surface of the steel sheet to the depth position separated therefrom in the sheet thickness direction of the steel sheet is 3/8 of the sheet thickness.

The "surface of the steel sheet" set as the reference of the depth position means a surface of a base steel sheet. For example, in a case where the steel sheet is plated or painted, or rust or the like is formed thereon, the surface of the steel sheet in a state where the plating, painting, and rust have been removed is set as the reference of the depth position. In a case where a surface layer coating such as plating, painting, rust, or the like is formed on the surface of the base steel sheet, the boundary between the surface layer coating and the surface of the base steel sheet is easily identified by various known methods.

The "amount of energy absorbed" is an amount of energy absorbed calculated from the relationship between the impactor reaction force (load) and the stroke when a rigid flat impactor is allowed to collide with the bending compressive assuming surface in a state in which both ends of the frame member are completely restricted.

The "energy absorption efficiency" is an amount of energy absorbed per cross-section area of the frame member. In a case where the frame member does not have a uniform cross section in the longitudinal direction, the energy absorption efficiency is an amount of energy absorbed per cross-section area in a closed cross section where the cross-section area is minimum in a closed cross section perpendicular to the longitudinal direction of the member.

Figure 39:
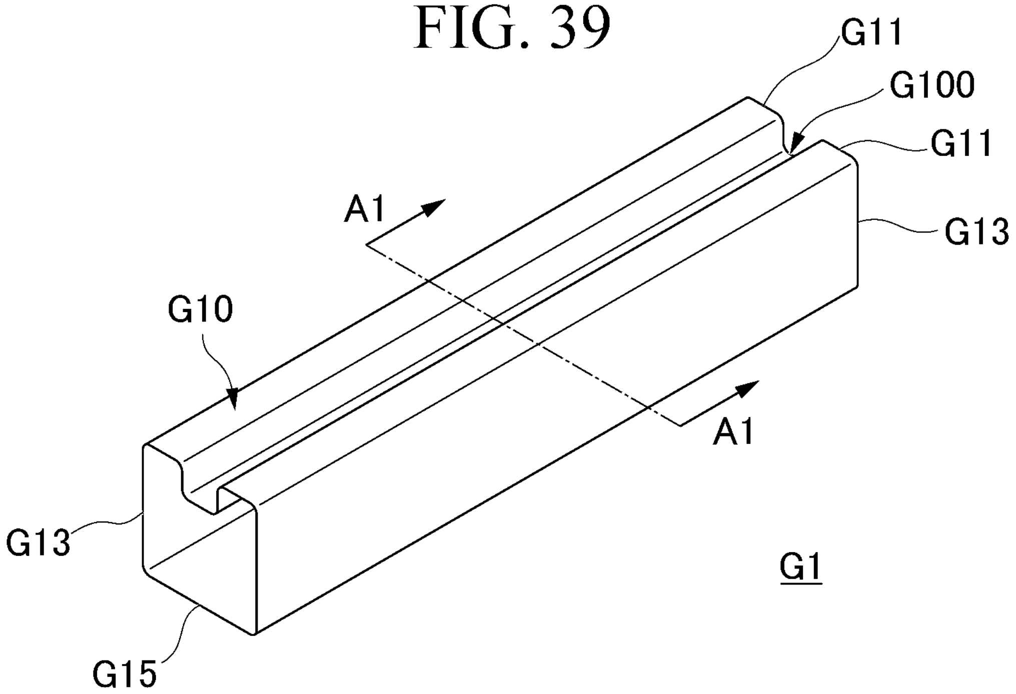
FIG. 39 is a perspective view showing a frame member according to one embodiment of the Element Technology G.
Figure 40:
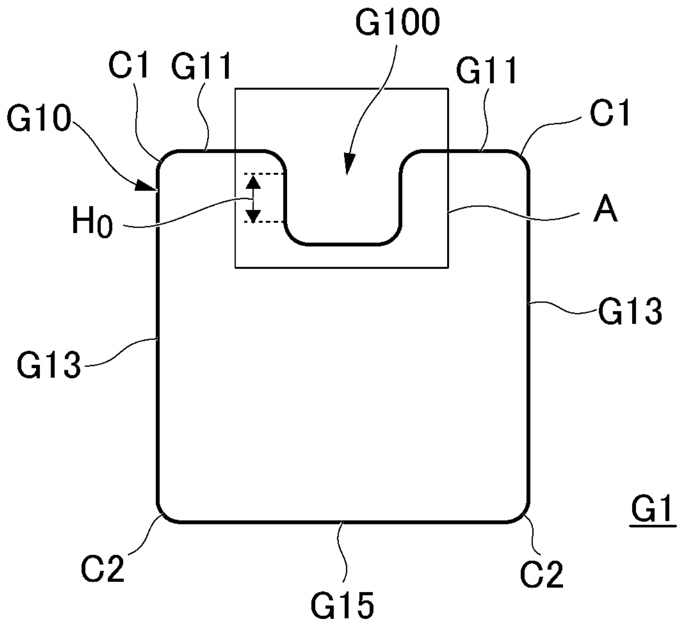
FIG. 40 is a cross-sectional view along the cutting-plane line A1-A1 of FIG. 39.
Figure 41:
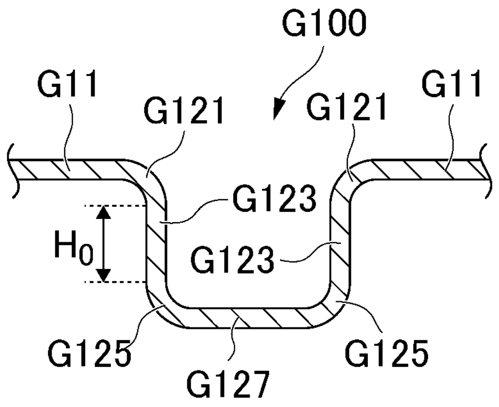
FIG. 41 is an enlarged view of a region surrounded by A of FIG. 40.

FIG. 39 is a perspective view of the frame member G1. FIG. 40 is a cross-sectional view along the cutting-plane line A1-A1 of FIG. 39, and is a cross-sectional view perpendicular to the longitudinal direction of the frame member G1. FIG. 41 is an enlarged view of a region surrounded by A of FIG. 40.

As shown in FIGS. 39 and 40, the frame member G1 is formed of a main body G10 having a hollow tube shape extending in the longitudinal direction. That is, the frame member G1 is a member in which a cross section perpendicular to the longitudinal direction is a closed cross section as a single unit.

In the frame member G1, the bending compressive assuming surface is disposed to face the outside of a vehicle body, whereby in a case where a collision is applied, a load capacity is exhibited against the compressive stress in the bending compressive assuming surface.

The bending compressive assuming surface is provided with a recessed bead part G100 interposed between two first flat parts G11, G11.

For example, in a case where the bending compressive assuming surface is formed only of flat parts, the load capacity may not be fully exhibited due to the deflection of the flat part in a case where a compressive load is applied. However, in a case where the recessed bead part G100 is disposed to be interposed between the two first flat parts G11, G11 as in the frame member G1, the load capacity improvement effect can be obtained.

First corner parts C1, C1 are formed at outer end portions of the first flat parts G11, G11. Two second flat parts G13, G13 whose surfaces face each other extend from end portions of the first corner parts C1, C1 on the sides opposite to the first flat parts G11, G11.

Furthermore, second corner parts C2, C2 bent in directions approaching each other are formed at end portions of the second flat parts G13, G13 on the sides opposite to the first corner parts C1, C1. End portions of the second corner parts C2, C2 on the sides opposite to the second flat parts G13 are connected to each other by a third flat part G15.

Accordingly, in the frame member G1 according to the present embodiment, the recessed bead part G100, the first flat parts G11, G11, the second flat parts G13, G13, the third flat part G15, the first corner parts C1, C1, and the second corner parts C2, C2 form a closed cross section portion.

As shown in FIG. 41, in the cross section of the frame member G1 perpendicular to the longitudinal direction, the recessed bead part G100 includes first bent portions G121, G121, wall portions G123, G123, second bent portions G125, G125, and a bottom portion G127.

The first bent portions G121, G121 are parts which are bent toward the inside of the closed cross section from end portions of the two first flat parts G11, G11 facing each other. Since a part having a radius of curvature of 50 mm or greater is regarded as a part of the wall portion, the radius of curvature of the first bent portion G121 is less than 50 mm. The radius of curvature of the first bent portion G121 may be, for example, 3 mm to 5 mm.

The wall portions G123, G123 are parts protruding toward the inside of the closed cross section portion via the first bent portions G121 and G121. The wall portions G123, G123 are linear parts having a radius of curvature of 50 mm or greater.

The second bent portions G125, G125 are parts which are bent in directions facing each other from end portions of the wall portions G123, G123 on the sides opposite to the first bent portions G121, G121. Since a part having a radius of curvature of 50 mm or greater is regarded as a part of the wall portion G123 or a part of the bottom portion G127, the radius of curvature of the second bent portion G125 is less than 50 mm. The radius of curvature of the second bent portion G125 may be, for example, 3 mm to 5 mm.

The bottom portion G127 is a part linearly connecting end portions of the second bent portions G125, G125 on the sides opposite to the wall portions G123, G123 to each other.

In a case where a width $H_0$ of the wall portion G123 of the recessed bead part G100 is too large, elastic buckling is likely to occur in the initial stage of deformation when the frame member G1 receives a bending load, whereby a necessary proof stress cannot be obtained. Therefore, it becomes difficult for the frame member G1 to exhibit excellent energy absorption efficiency. Accordingly, the width $H_0$ of the wall portion G123 is set to be 2.5 times or less the effective width $W_e$.

Meanwhile, in a case where the width $H_0$ of the wall portion G123 is too small, the bending proof stress improvement effect due to the recessed bead provided is reduced. Accordingly, the width $H_0$ is set to be 0.5 times or greater the effective width $W_e$.

The upper limit of the effective width $W_e$ is preferably 60 mm or less in order to obtain a required proof stress.

The sheet thickness of the recessed bead part G100 is preferably 1.2 mm or less from the viewpoint of weight reduction.

Meanwhile, in a case where the sheet thickness of the recessed bead part G100 is less than 0.4 mm, elastic buckling is likely to occur in the wall portion G123 of the recessed bead part G100, and thus the setting range of the width $H_0$ is greatly restricted. Accordingly, the sheet thickness of the recessed bead part G100 is preferably 0.4 mm or greater.

The frame member G1 is formed by: heating a steel sheet for hot stamping up to an austenite range; forming, in a state in which the steel sheet is held in a predetermined temperature range, the steel sheet into a predetermined shape through hot stamping for performing pressing while performing a quenching treatment by a press die and punch having a rapid cooling mechanism; and then joining end surfaces together. The frame member G1 formed as described above has a strength greater than 1.8 GPa in terms of tensile strength. In addition, since the frame member is formed as described above, the Vickers hardness of the thickness middle portion of the wall portion G123 of the recessed bead part G100 in the frame member G1 is 520 Hv or greater in a hardness test performed by the method described in JIS Z 2244: 2009 with a test load of 300 gf (2.9 N).

In the present application, since excellent energy absorption efficiency is exhibited by increasing the deformability on the premise of an increase of the strength, the hardness of the thickness middle portion in the wall portion G123 of the recessed bead part G100 is set to 520 Hv or greater in terms of Vickers hardness.

The upper limit of the hardness of the thickness middle portion is not particularly specified, but may be 850 Hv or less in terms of Vickers hardness.

A method of measuring the hardness of the thickness middle portion in the wall portion G123 of the recessed bead part G100 is as follows.

A sample having a cross section perpendicular to the sheet surface is collected from the wall portion G123 of the recessed bead part G100. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244: 2009.

After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water.

The measurement surface mirror-finished as described above is subjected to the hardness test by the method described in JIS Z 2244: 2009.

Hardness is measured using a micro-Vickers hardness tester at 30 points that are arranged at intervals of three times or more the indentation under a load of 300 gf in the position at a depth of ⅜ of the sheet thickness of the sample, and the average value of the measured values is defined as the hardness of the thickness middle portion.

As described above, in a case where the width $H_0$ of the wall portion G123 is 2.5 times or less the effective width $W_e$, elastic buckling can be suppressed in the wall portion G123. However, in a high-strength material, e.g., a hot-stamped material having a strength greater than 1.8 GPa, in a case where the bending performance is insufficient, fracture occurs during deformation due to a bending load even in a case where elastic buckling can be suppressed by controlling the effective width $W_e$, whereby excellent energy absorption efficiency cannot be obtained.

However, in the frame member G1 according to the present embodiment, the bending performance is increased by appropriately controlling the ratio between the standard deviation of hardness frequency distribution in the thickness middle portion and the standard deviation of hardness frequency distribution in the surface layer portion in the wall portion G123 of the recessed bead part G100.

Accordingly, in the frame member G1 according to the present embodiment, even in a case where a high-strength material is applied, fracture during deformation is suppressed, and it is possible to exhibit significantly excellent energy absorption efficiency compared to the related art.

Specifically, in the frame member G1 according to the present embodiment, in the wall portion G123 of the recessed bead part G100, the hardness standard deviation ratio which is a value obtained by dividing the standard deviation of hardness frequency distribution in the surface layer portion by the standard deviation of hardness frequency distribution in the thickness middle portion (depth position of ⅜ of the sheet thickness) is controlled to be less than 1.0.

The present inventors have found through experiments that in a case where the hardness standard deviation ratio is less than 1.0 in applying a hot-stamped material having a strength greater than 1.8 GPa, the maximum bending angle in a VDA bending test based on the VDA standard (VDA238-100) specified by the German Association of the Automotive Industry can be considerably improved.

Figure 42:
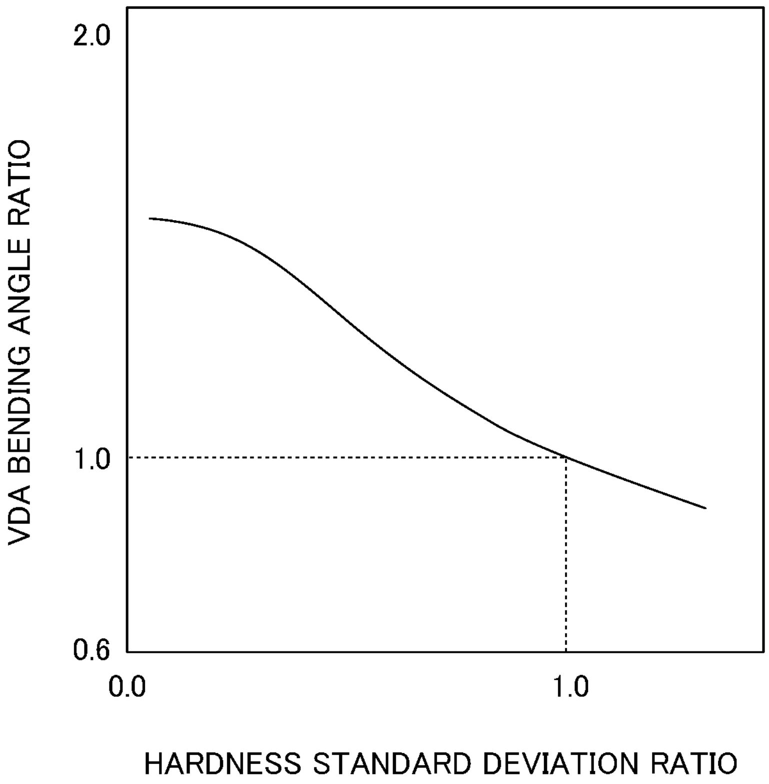
FIG. 42 is a graph showing a relationship between a hardness standard deviation ratio and a bending angle ratio in a VDA bending test with respect to a 2.0 GPa-grade material.

FIG. 42 is a graph showing the results of the VDA bending test using a steel sheet of a 2.0 GPa-grade material with a thickness of 1.4 mm. It is found that the less the hardness standard deviation ratio is than 1.0, the larger the maximum bending angle (°) in the VDA bending test and the higher the bending angle ratio. That is, in a case where the hardness standard deviation ratio is less than 1.0, fracture hardly occurs during deformation due to a load in an axial direction, and excellent energy absorption efficiency can be exhibited. The standard deviation ratio is more preferably less than 0.8.

Here, the hardness frequency distribution in the thickness middle portion and the hardness frequency distribution in the surface layer portion are acquired by a Vickers hardness test.

First, a sample having a cross section perpendicular to the sheet surface is cut out from an optional position including the wall portion G123 of the recessed bead part G100. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244: 2009.

After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water.

The measurement surface mirror-finished as described above is subjected to the hardness test by the method described in JIS Z 2244: 2009.

The hardness in the surface layer portion is measured using a micro-Vickers hardness tester.

Hardness is measured at 30 points that are arranged at intervals of three times or more the indentation under a load of 300 gf, and the hardness frequency distribution in the surface layer portion is obtained.

Similarly, in the thickness middle portion (depth position of ⅜ of the sheet thickness), hardness is measured at 30 points that are arranged at intervals of three times or more the indentation under a load of 300 gf, and the hardness frequency distribution in the thickness middle portion is obtained.

A known statistical method is used to obtain the standard deviations of the hardness frequency distribution in the surface layer portion and the hardness frequency distribution in the thickness middle portion, obtained as a result of the Vickers hardness test described above.

In a case where the metallographic structure is the same in a thickness middle portion and a surface layer portion of a steel sheet for hot stamping as in the related art, the hardness frequency distribution in the surface layer portion is the same as the hardness frequency distribution in the thickness middle portion, and the hardness standard deviation ratio is 1.0.

Meanwhile, in a case where the metallographic structure in only the surface layer portion and the vicinity thereof is modified, the hardness standard deviation ratio becomes a value different from 1.0.

In the frame member G1 formed of a steel sheet for hot stamping according to the present embodiment, in a case where the metallographic structure in only the surface layer portion and the vicinity thereof is modified, the distribution and unevenness of the hardness in the surface layer portion are suppressed, and the hardness standard deviation ratio between the surface layer portion and the thickness middle portion can be made less than 1.0.

Specifically, the hardness standard deviation ratio can be controlled by adjusting a highest heating temperature and a holding time in decarburization annealing of the steel sheet for hot stamping, which is a known technology. As for preferable conditions of the decarburization annealing, the decarburization annealing temperature (maximum attainment temperature of the steel sheet) is 700° C. to 950° C., and the residence time in a temperature range of 700° C. to 950° C. is 5 seconds to 1,200 seconds under a moist atmosphere containing hydrogen, nitrogen, or oxygen.

In addition, in a case where the annealing temperature is set to a higher temperature range and the residence temperature is narrowed to a longer time range within the above condition ranges, the hardness standard deviation ratio can be made less than 0.8.

At least one surface layer portion of the wall portion G123 may satisfy the above hardness standard deviation ratio condition. However, it is preferable that the surface layer portions on both sides of the wall portion G123 satisfy the above hardness standard deviation ratio condition.

According to the frame member G1 of the present embodiment, elastic buckling is suppressed by controlling the width $H_0$ of the wall portion G123 of the recessed bead part G100, and fracture during deformation can be suppressed by controlling the hardness standard deviation ratio.

Accordingly, the energy absorption efficiency can be significantly improved while the thickness middle portion of the wall portion G123 of the recessed bead part G100 has sufficient hardness of 520 Hv or greater in terms of Vickers hardness.

Second Embodiment

Hereinafter, a frame member G2 according to a second embodiment of the Element Technology G will be described.

The frame member G2 according to the second embodiment is different from the frame member G1 according to the first embodiment in that a cross section perpendicular to a longitudinal direction is formed as a closed cross section by two members. That is, in the frame member G2, a closed cross section portion is configured by two members joined to each other.

Duplicating description will be omitted as for constituent elements having substantially the same functional configuration as the functional configuration described in the first embodiment.

Figure 43:
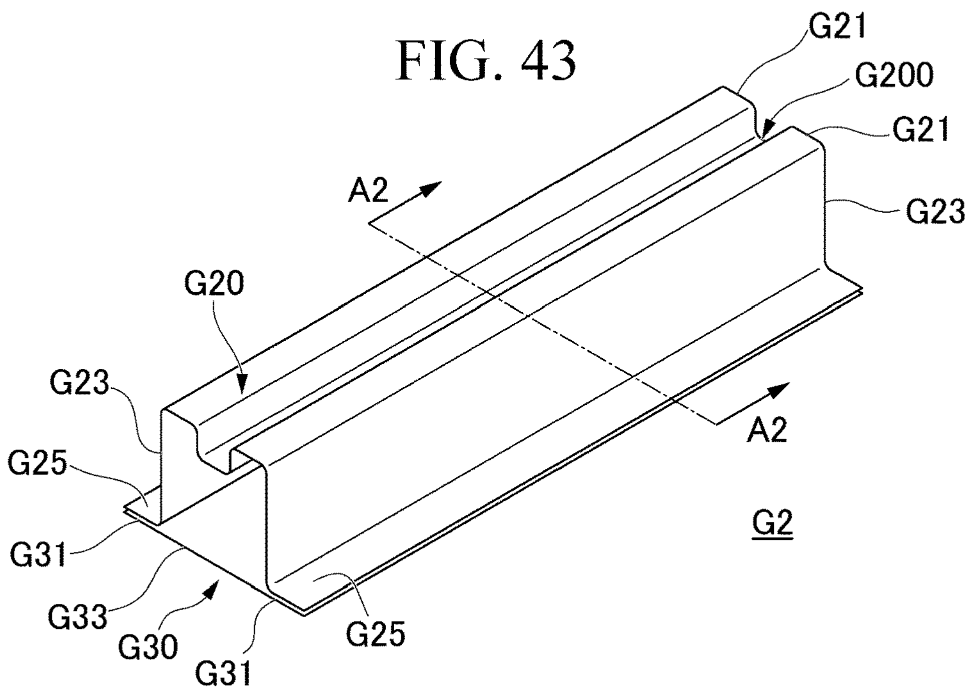
FIG. 43 is a perspective view showing a frame member according to a modification example.
Figure 44:
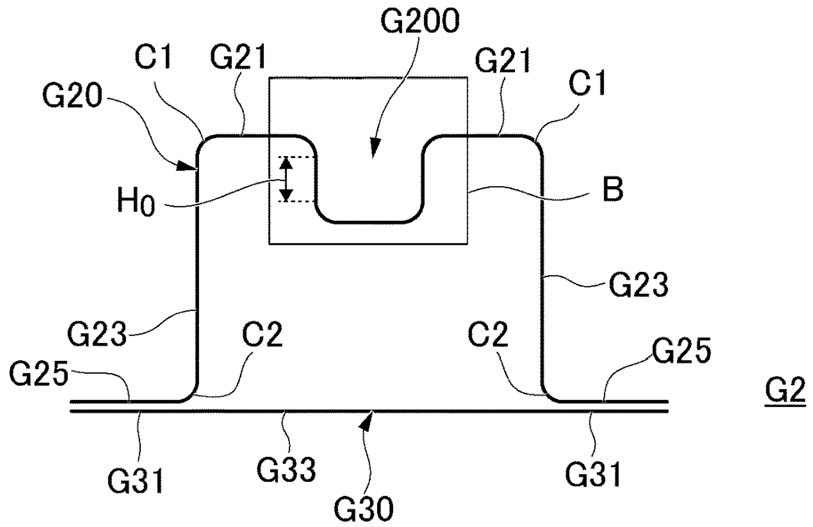
FIG. 44 is a cross-sectional view along the cutting-plane line A2-A2 of FIG. 43.
Figure 45:
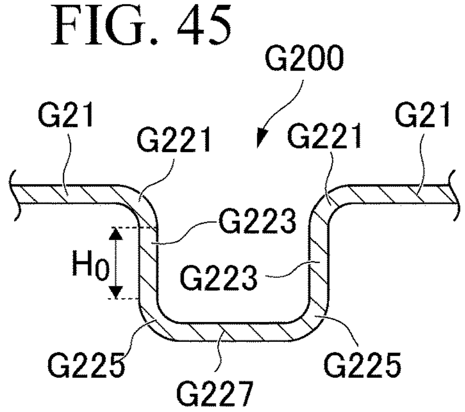
FIG. 45 is an enlarged view of a region surrounded by B of FIG. 43.

FIG. 43 is a perspective view of the frame member G2. FIG. 44 is a cross-sectional view along the cutting-plane line A2-A2 of FIG. 43, and is a cross-sectional view perpendicular to the longitudinal direction of the frame member G2. FIG. 45 is an enlarged view of a region surrounded by B of FIG. 44.

As shown in FIGS. 43 and 44, the frame member 2 has a closed cross section portion formed by joining a first frame member G20 to a second frame member G30. That is, the closed cross section portion is configured to include the first frame member G20 and the second frame member G30.

The first frame member G20 is a member having a hat-shaped cross section, and its top sheet surface functions as a bending compressive assuming surface.

In the bending compressive assuming surface, a recessed bead part G200 is interposed between two first flat parts G21, G21.

First corner parts C1, C1 are formed at outer end portions of the first flat parts G21, G21. Two second flat parts G23, G23 whose surfaces face each other extend from end portions of the first corner parts C1, C1 on the sides opposite to the first flat parts G21, G21.

Furthermore, second corner parts C2, C2 bent in directions away from each other are formed at end portions of the second flat parts G23, G23 on the sides opposite to the first corner parts C1, C1. Third flat parts G25, G25 extend in directions away from each other from end portions of the second corner parts C2, C2 on the sides opposite to the second flat parts G23.

The second frame member G30 is a flat plate-shaped steel sheet having: a pair of joint parts G31, G31 which are in surface contact with the third flat parts G25, G25 of the first frame member G20 and are joined by spot welding or the like; and a flat part G33 interposed between the pair of joint parts G31, G31.

Accordingly, in the frame member G2 according to the present embodiment, the recessed bead part G200, the first flat parts G21, G21, the second flat parts G23, G23, the first corner parts C1, C1, and the second corner parts C2, C2 in the first frame member G20, and the flat part G33 in the second frame member G30 form a closed cross section portion.

As shown in FIG. 45, in the cross section of the frame member G2 perpendicular to the longitudinal direction, the recessed bead part G200 includes first bent portions G221, G221, wall portions G223, G223, second bent portions G225, G225, and a bottom portion G227.

Since the configuration of the recessed bead part G200 is the same as that of the recessed bead part G100 described in the first embodiment, detailed description thereof will be omitted.

In the frame member G2 having a closed cross section portion configured by the two members joined to each other, elastic buckling is suppressed by controlling the width $H_0$ of the wall portion G223 of the recessed bead part G200, and fracture during deformation can be suppressed by controlling the hardness standard deviation ratio as in the frame member G1. The closed cross section portion may be formed of two or more members joined to each other.

Although the preferable embodiments of the Element Technology G have been described in detail with reference to the accompanying drawings, the Element Technology G is not limited to such examples.

It is apparent that a person having common knowledge in the technical field to which the Element Technology G belongs is able to devise various changes or modifications within the scope of the technical idea described in the claims, and it should be understood that such examples belong to the technical scope of the Element Technology G as a matter of course.

Figure 46:
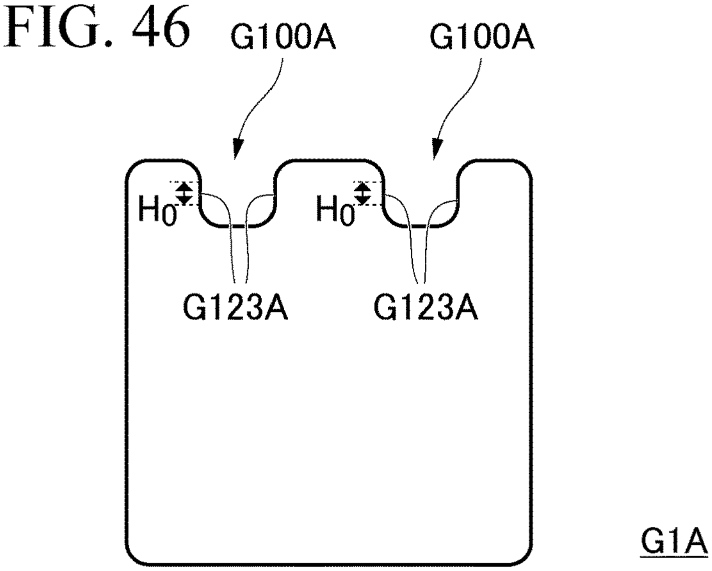
FIG. 46 is a cross-sectional view showing a modification example of the frame member.

For example, the frame member G1 according to the first embodiment has a configuration in which one recessed bead part is provided on the bending compressive assuming surface, but two or more recessed bead parts may be formed on the bending compressive assuming surface. That is, two recessed bead parts G100A, G100A may be formed on the bending compressive assuming surface as in a frame member G1A according to a first modification example shown in FIG. 46. In this case, it is possible to exhibit more excellent energy absorption efficiency by satisfying a condition in which a width $H_0$ of a wall portion G123A of the two recessed bead parts G100A, G100A is 0.5 times or greater and 2.5 times or less an effective width $W_e$ calculated from Karman's effective width formula.

In addition, the number of flat parts is not particularly limited, and there may be at least two flat parts connected to a bent portion of the recessed bead part.

Figure 47:
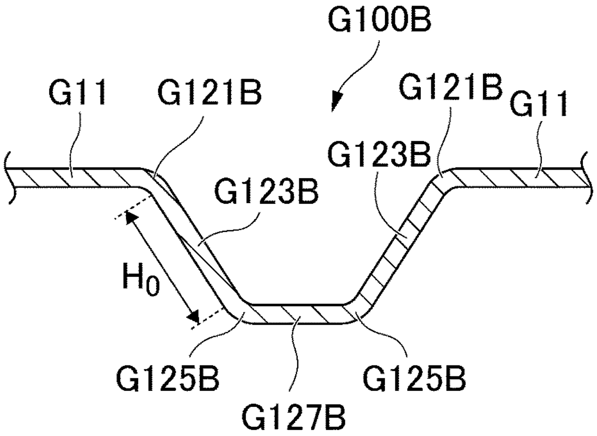
FIG. 47 is a schematic view showing a modification example of a recessed bead part.

In addition, for example, the above-described recessed bead part G100 has the pair of wall portions G123, G123 extending and facing each other, but may have a pair of wall portions G123B, G123B extending and inclining relative to each other as in a recessed bead part G100B according to a second modification example shown in FIG. 47.

More specifically, the recessed bead G001B according to this modification example includes first bent portions G121B, G121B bent toward the inside of a closed cross section, the wall portions G123B, G123B protruding and inclining relative to each other toward the inside of a closed cross section portion via the first bent portions G121B, G121B, second bent portions G125B, G125B bent in directions facing each other from end portions of the wall portions G123B, G123B on the sides opposite to the first bent portions G121B, G121B, and a bottom portion G127B linearly connecting end portions of the second bent portions G125B, G125B on the sides opposite to the wall portions G123B, G123B to each other.

Figure 48:
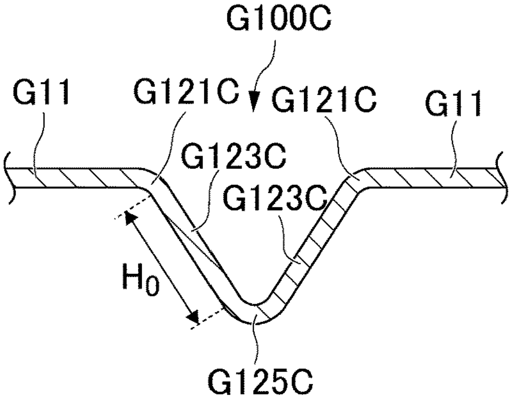
FIG. 48 is a schematic view showing another modification example of the recessed bead part.

In addition, for example, the above-described recessed bead part G100 has the pair of second bent portions G125, G125 and the bottom portion G127, but may have an aspect in which a pair of wall portions G123C, G123C extending and inclining relative to each other are connected to each other by a single second bent portion G125C as in a recessed bead part G100C according to a third modification example shown in FIG. 48.

More specifically, the recessed bead G100C according to this modification example includes first bent portions G121C, G121C bent toward the inside of a closed cross section, wall portions G123C, G123C protruding and inclining relative to each other toward the inside of a closed cross section portion via the first bent portions G121C, G121C, and the second bent portion G125C connecting end portions of the wall portions G123C, G123C on the sides opposite to the first bent portions G121C, G121C to each other. That is, the recessed bead G100C is not configured to include the linear bottom portion G27 shown in the first embodiment.

In addition, the frame members G1, G2 according to the embodiments have a uniform cross-sectional shape over the whole length, but may not have a uniform cross-sectional shape over the whole length, and the above-described closed cross section portion may be present in a part of the whole length in the longitudinal direction. The closed cross section portion is present in preferably 50% or greater, and more preferably 80% or greater of the whole length in the longitudinal direction.

Figure 49:
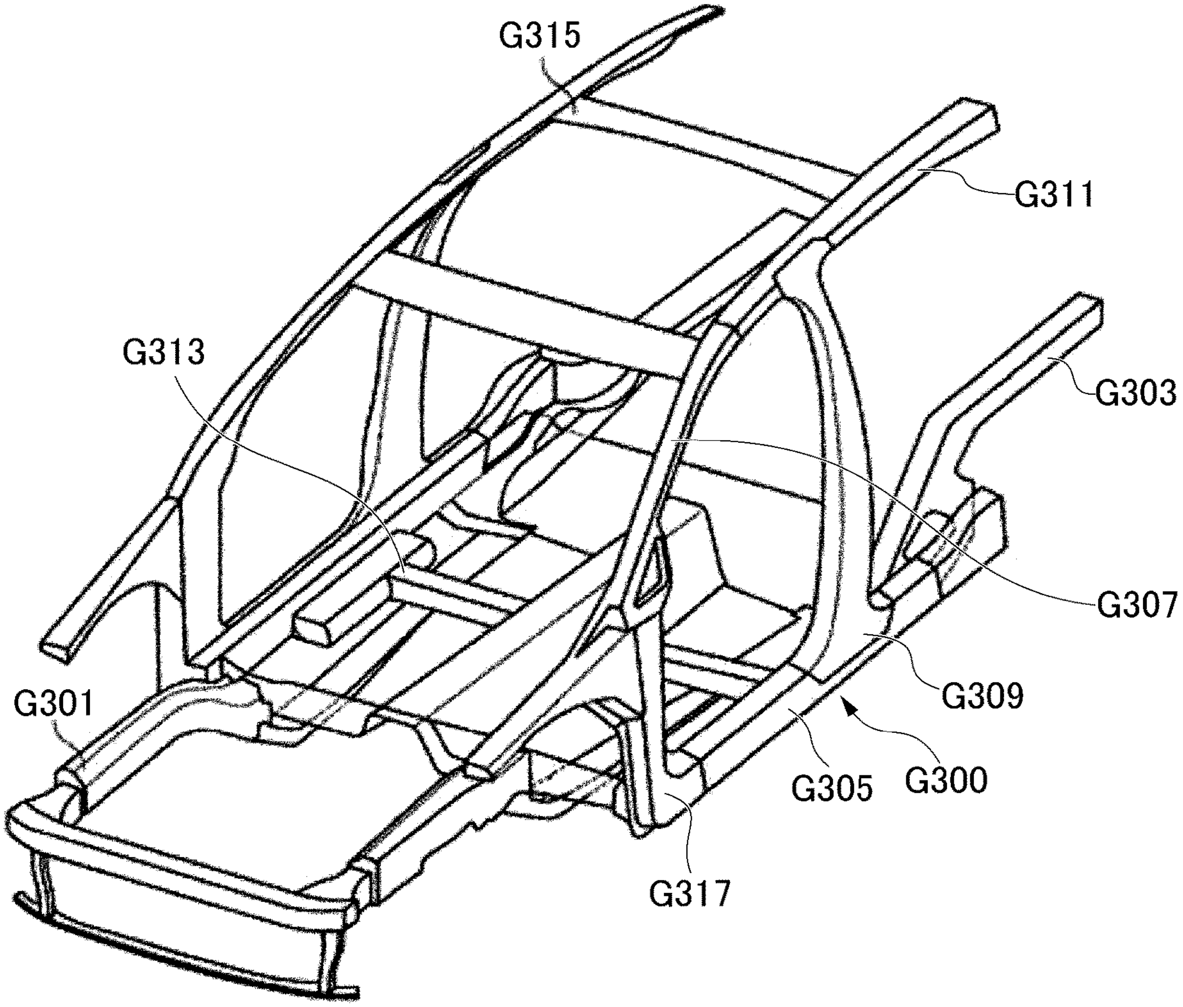
FIG. 49 is a perspective view showing a vehicle frame as an example to which the frame member is applied.

The frame members G1, G2 are applied to members to which a compression input is to be applied mainly in the axial direction at the time of the collision, among structural members of a vehicle body. FIG. 49 is a view showing a vehicle frame G300 as an example to which the frame members G1, G2 are applied.

Referring to FIG. 49, the frame members G1, G2 can be applied to a frontside member G301, a rearside member G303, a side sill G305, an A pillar G307, a B pillar G309, a roof rail G311, a floor cross G313, a roof cross G315, and an under reinforcement G317 among structural members of a vehicle body.

Hereinafter, the effects of the Element Technology G will be described in greater detail based on examples. However, the conditions in the examples are merely an example adopted to confirm the feasibility and the effects of the Element Technology G. The Element Technology G is not limited to these examples of the conditions. In the Element Technology G, various conditions can be adopted as long as the gist of the Element Technology G is not deviated and the object of the Element Technology G is achieved.

First Example

A steel sheet A and a steel sheet B having a sheet thickness of 0.5 mm were prepared.

Both the steel sheet A and the steel sheet B are steel sheets for hot stamping to be subjected to hot stamping.

In decarburization annealing of the steel sheet B, the decarburization annealing temperature (maximum attainment temperature of the steel sheet) was set to 750° C., and the residence time in a temperature range of 700° C. to 750° C. was set to 300 seconds under a moist atmosphere provided by mixing hydrogen and nitrogen, to modify the metallographic structure in only a surface layer portion and the vicinity thereof.

These steel sheets A and B were heated up to an austenite range, held in a temperature range of 900° C. to 950° C., and hot-stamped by a press die and punch having a rapid cooling mechanism. Then, end surfaces of the hot-stamped member were welded to each other, whereby a rectangular tube member having a length of 296 mm was obtained.

Figure 50:
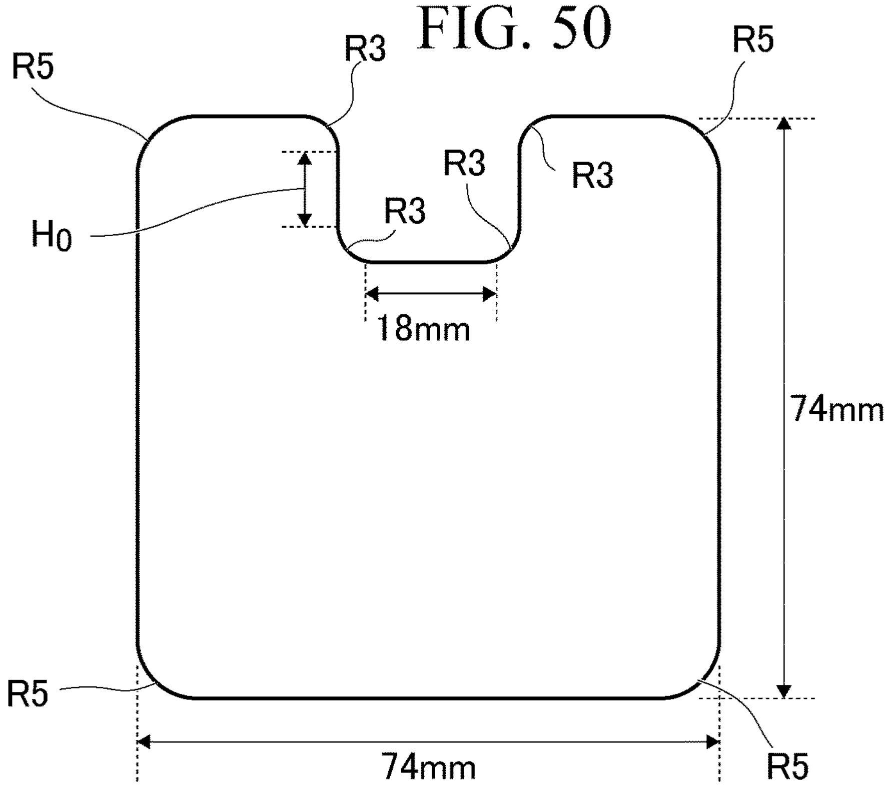
FIG. 50 is a schematic view for explaining a cross-sectional shape of a rectangular tube member used in First Example.

FIG. 50 is a schematic view for explaining a cross-sectional shape of a rectangular tube member in examples. As shown in FIG. 50, a substantially square cross section where the length of one side was 74 mm was designed as a basic design in all experimental examples.

In Experimental Example 1A and Experimental Example 1B, a rectangular tube member having the above basic design was adopted.

In Experimental Examples 2A to 7B, by changing the shape of the press die and punch used in the hot stamp forming, a recessed bead part having a predetermined width $H_0$ was provided on one side of the rectangular tube member having the basic design.

The radii of curvature of four corner parts C were all designed to be 5 mm, and the radii of curvature of bent portions in the recessed bead part were all set to 3 mm.

Table 43 shows material characteristics in the flat parts of the rectangular tube members after hot stamping.

TABLE 43

| Steel Sheet Used | Tensile Strength | Yield stress $\sigma_y$ (MPa) | Young's modulus E (MPa) | Poisson's ratio ν | Sheet Thickness (mm) | Hardness in Center in Sheet Thickness (Hv) | Hardness Standard Deviation in Thickness Middle Portion | Hardness Standard Deviation in Surface Layer Portion | Hardness Standard Deviation Ratio | Effective Width $W_e$ (mm) |
|---|---|---|---|---|---|---|---|---|---|---|
| Steel Sheet A (Material of Related Art) | 2500 MPa | 1873 | 205800 | 0.3 | 0.5 | 851 | 8.2 | 8.2 | 1.0 | 40 |
| Steel Sheet B (Modified Material) | 2500 MPa | 1873 | 205800 | 0.3 | 0.5 | 851 | 8.2 | 5.3 | 0.65 | 40 |

In the rectangular tube member in which the steel sheet A was used, the metallographic structure was the same in a thickness middle portion and a surface layer portion, and thus the hardness standard deviation ratio in the flat part was 1.0. That is, in Experimental Examples 2A, 3A, 4A, 5A, 6A, and 7A in which the recessed bead part was provided, the hardness standard deviation ratio in the wall portion of the recessed bead part was 1.0.

Meanwhile, in the rectangular tube member in which the steel sheet B was used, the hardness standard deviation ratio in the flat part was 0.65 since the metallographic structure of a thickness middle portion was not modified, but the metallographic structure of a surface layer portion was modified. That is, in Experimental Examples 2B, 3B, 4B, 5B, 6B, and 7B in which the recessed bead part was provided, the hardness standard deviation ratio in the wall portion of the recessed bead part was 0.65.

A rigid flat impactor was allowed to collide with the bending compressive assuming surface of each of the rectangular tube members at a speed of 80 km/h in a state in which both ends in the longitudinal direction were completely restricted. The deformation states at the time of the collision, the states in which fracture occurred, and the absorbed energy calculated from the impactor reaction force (load) and the stroke were compared.

Table 44 shows the setting conditions and the results for each experimental example.

TABLE 44

| Experiment No. | Steel Sheet Used | Width $H_0$ of Wall Portion (mm) | Effective Width Ratio | Cross Section Area ($mm^2$) | State of Fracture | Absorbed Energy (J) | Energy Absorption Efficiency ($J/mm^2$) |
|---|---|---|---|---|---|---|---|
| No. 1A | A | — | — | 144 | Crack Penetration | 120 | 0.84 |
| No. 1B | B | — | — | 144 | No Cracks | 166 | 1.16 |
| No. 2A | A | 0 | 0 | 147 | Crack Penetration | 162 | 1.10 |
| No. 2B | B | 0 | 0 | 147 | No Cracks | 189 | 1.28 |
| No. 3A | A | 5 | 0.5 | 152 | Crack Penetration | 202 | 1.33 |
| No. 3B | B | 5 | 0.5 | 152 | No Cracks | 258 | 1.70 |
| No. 4A | A | 7 | 0.7 | 155 | Crack Penetration | 190 | 1.23 |
| No. 4B | B | 7 | 0.7 | 155 | No Cracks | 281 | 1.81 |
| No. 5A | A | 10 | 1.1 | 157 | Crack Penetration | 221 | 1.40 |
| No. 5B | B | 10 | 1.1 | 157 | No Cracks | 273 | 1.74 |
| No. 6A | A | 20 | 2.1 | 167 | Crack Penetration | 221 | 1.32 |
| No. 6B | B | 20 | 2.1 | 167 | No Cracks | 319 | 1.91 |
| No. 7A | A | 30 | 3.2 | 177 | Crack Penetration | 203 | 1.14 |
| No. 7B | B | 30 | 3.2 | 177 | No Cracks | 278 | 1.51 |

Figure 51:
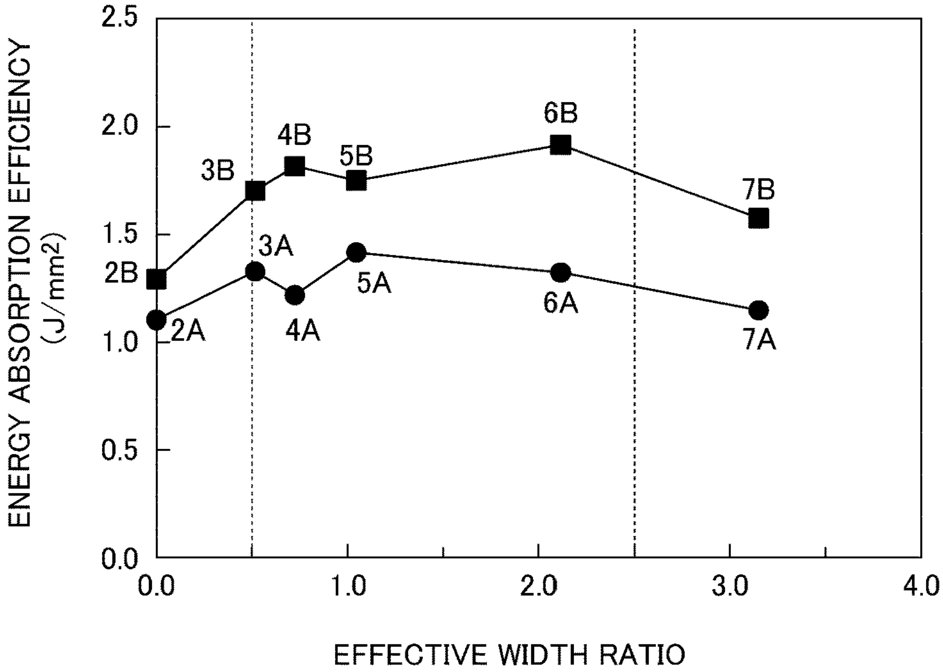
FIG. 51 is a graph in which a relationship between an effective width ratio and energy absorption efficiency in First Example is plotted.

FIG. 51 is a graph for comparison of the energy absorption efficiency relative to the effective width ratio based on the experimental results shown in Table 44. As shown in this graph, it is found that in a case where a bead shape in which the effective width ratio is in an appropriate range is formed and the hardness standard deviation ratio is appropriately controlled, the energy absorption efficiency is significantly improved.

Second Example

Furthermore, as Second Example, experiments for verifying that excellent energy absorption efficiency could be exhibited by providing a plurality of recessed bead parts were performed by using the same steel sheet A and steel sheet B as those in First Example.

Figure 52:
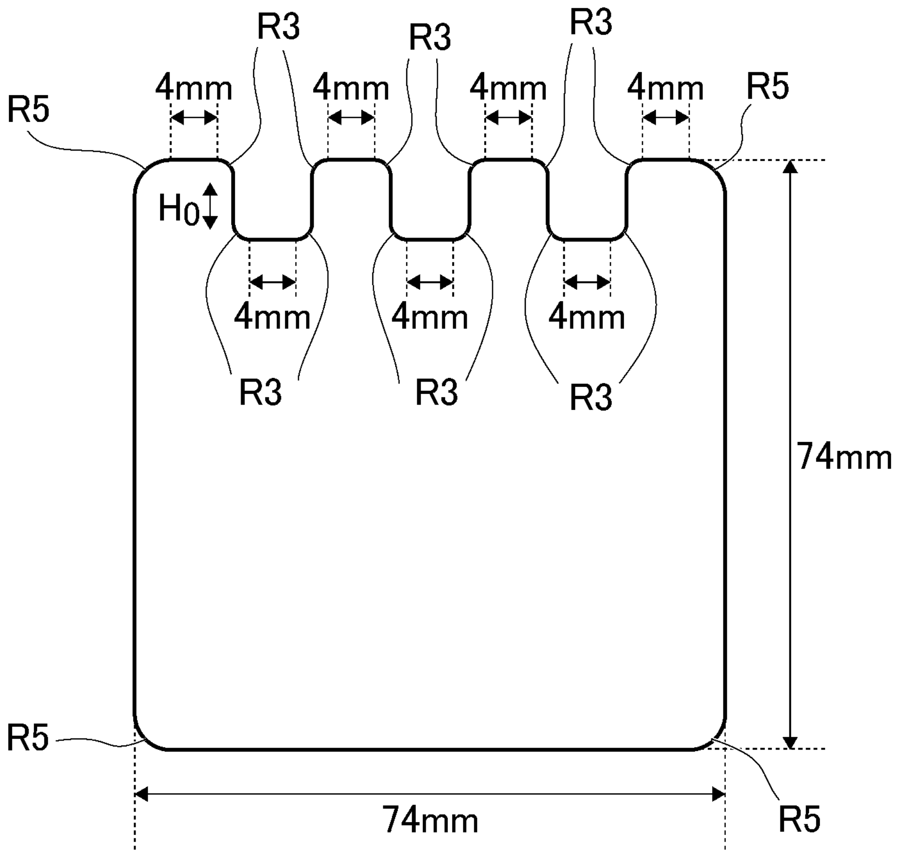
FIG. 52 is a schematic view for explaining a cross-sectional shape of a rectangular tube member used in Second Example.

In Experimental Examples 8A, 8B, 9A, and 9B, as shown in FIG. 52, a substantially square cross section of the rectangular tube member perpendicular to the longitudinal direction, where the length of one side was 74 mm and three recessed bead parts with a width $H_0$ were provided on one side, was designed as a basic design, and the width $H_0$ of the wall portion was changed for each experimental example.

The radii of curvature of four corner parts C were all designed to be 5 mm, and the radii of curvature of the recessed bead parts were all set to 3 mm.

A rigid flat impactor was allowed to collide with the bending compressive assuming surface of each of the rectangular tube members at a speed of 80 km/h in a state in which both ends in the longitudinal direction were completely restricted. The deformation states at the time of the collision, the states in which fracture occurred, and the absorbed energy calculated from the impactor reaction force (load) and the stroke were compared.

Table 45 shows the setting conditions and the results for each experimental example.

TABLE 45

| Experiment No. | Steel Sheet Used | Width $H_0$ of Wall Portion (mm) | Effective Width Ratio | Cross Section Area ($mm^2$) | State of Fracture | Absorbed Energy (J) | Energy Absorption Efficiency ($J/mm^2$) |
|---|---|---|---|---|---|---|---|
| No. 8A | A | 0 | 0 | 150 | Crack Penetration | 220 | 1.47 |
| No. 8B | B | 0 | 0 | 150 | No Cracks | 272 | 1.81 |
| No. 9A | A | 7 | 0.7 | 175 | Crack Penetration | 404 | 2.31 |
| No. 9B | B | 7 | 0.7 | 175 | No Cracks | 500 | 2.86 |

(Element Technology H)

An Element Technology H is a frame member obtained by joining a first steel sheet member and a second steel sheet member at a spot-welding portion by spot welding, in which a cross-sectional region in which a cross section perpendicular to a longitudinal direction of the frame member is a closed cross section is formed, the first steel sheet member has a tensile strength of 1,900 MPa or more, the spot-welding portion has a molten metal portion formed by the spot welding and a heat-affected portion adjacent to an outside of the molten metal portion, and in a cross section perpendicular to the longitudinal direction including a center point of the molten metal portion, in a case where a region corresponding to the molten metal portion is defined as a first region, a region corresponding to the heat-affected portion is defined as a second region, a region formed of a region from a boundary between the first region and the second region to a position 100 μm away from the boundary toward the first region and a region from the boundary to a position 100 μm away from the boundary toward the second region is defined as a third region, and Vickers hardness is measured at a pitch of 15 μm with a load of 10 gf along a virtual straight line extending from a center portion of the first region to the second region, average Vickers hardness $Hv_{Ave}$ at a measurement position corresponding to the first region on the virtual straight line and minimum Vickers hardness $Hv_{Min}$ at a measurement position corresponding to the third region on the virtual straight line satisfy $Hv_{Ave}-Hv_{Min}\leq 100$.

According to the Element Technology H, in a case where the hardness distribution in the vicinity of the boundary between a molten metal and a HAZ portion is optimized, fracture at a spot-welding portion at the time of the collision can be suppressed, and excellent energy absorption performance that matches high-strengthening can be exhibited.

The inventors have intensively studied a configuration of a frame member capable of exhibiting excellent energy absorption performance that matches high-strengthening.

The inventors have analyzed spot fracture occurring in a case where a hot stamping material of more than 2.0 GPa is applied as a material of a frame member, and focused on the fact that even with the same strength, the frequency of occurrence of spot fracture varies with changes in Mn content.

In addition, the inventors have investigated in detail the hardness distribution in the vicinity of a spot-welding portion of a frame member, obtained by overlapping and spot-welding two hot stamping materials of more than 2.0 GPa. As a result, the inventors have found that in a frame member in which spot fracture is likely to occur, there is a tendency that separately from a HAZ-softened portion, a part where the hardness is 100 Hv or more lower than the average hardness of the molten metal exists in the vicinity of a boundary between a molten metal and a HAZ portion.

In addition, the inventors have conducted further studies focusing on the fact that this tendency is remarkable in a case where a steel sheet material having a high Mn content is used. As a result, the inventors have found that the above tendency is caused due to the existence of a Mn-deficient layer formed in the vicinity of the boundary between the molten metal and the HAZ portion.

Based on these findings, the inventors have found that in a case where the hardness distribution in the vicinity of the boundary between the molten metal and the HAZ portion is optimized, spot fracture can be suppressed even in a frame member in which a hot stamping material of more than 2.0 GPa is applied, and excellent energy absorption performance that matches high-strengthening can be exhibited, and completed the Element Technology H.

Hereinafter, a frame member H1 according to one embodiment of the Element Technology H will be described.

In the present specification and the drawings, constituent elements having substantially the same functional configuration are designated by the same reference numerals to avoid duplicating description.

First, terms and phrases in the present specification will be described.

The "longitudinal direction Z" means a material axis direction of a frame member, that is, a direction in which the axis extends. The "width direction X" is a direction in which a joint surface between two steel sheet members spot-welded extends among directions perpendicular to the longitudinal direction Z. The "height direction Y" is a direction perpendicular to the longitudinal direction Z and the width direction X. The "molten metal portion" means a part where the overlapped steel sheet members are melted and integrated by spot welding heat. The molten metal portion may be referred to as a nugget.

The "heat-affected portion" is a part formed adjacent to the outside of the molten metal portion and having a structure different from that of a base metal portion due to the influence of spot welding heat. The heat-affected portion may be referred to as a heat affected zone (HAZ).

Usually, in an outer peripheral region in the heat-affected portion, a HAZ-softened portion which is more softened than the molten metal portion and the base metal portion due to the influence of spot welding heat exists.

FIG. 1 is a perspective view of the frame member H1. The frame member H1 is a long member having a hollow tubular shape and extending along the longitudinal direction Z. The frame member H1 is configured by joining a first steel sheet member H10 and a second steel sheet member H20 by a plurality of spot-welding portions H50.

The first steel sheet member H10 is a member obtained by press-forming a steel sheet into a hat-shaped cross-sectional shape. The sheet thickness of the first steel sheet member H10 (that is, the sheet thickness of the steel sheet before press forming) may be 0.4 mm or more and 4.2 mm or less.

Figure 53:
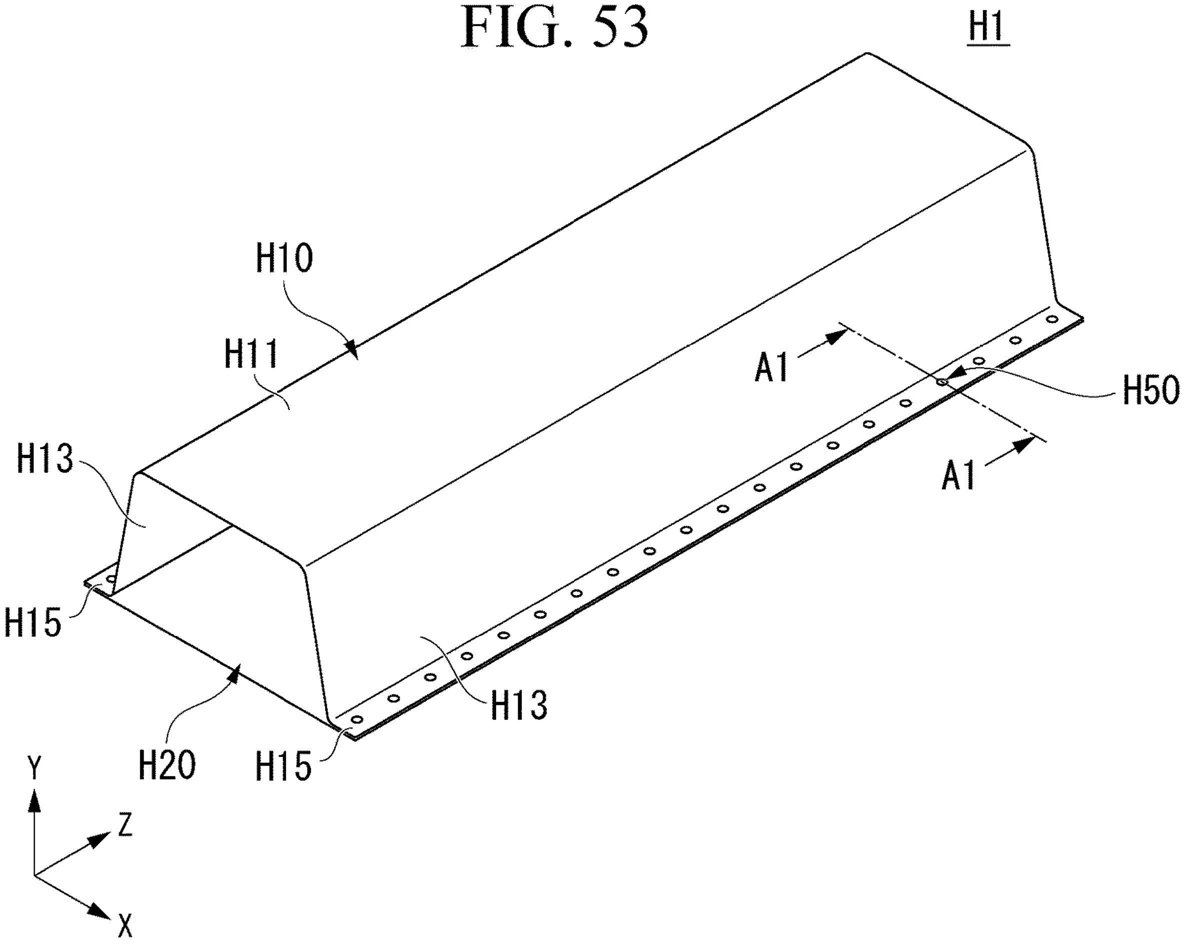
FIG. 53 is a perspective view showing a frame member according to one embodiment of the Element Technology H.

As shown in FIG. 53, the first steel sheet member H10 has a top sheet H11, a pair of side walls H13, H13, each of which is bent and extends from an end edge of the top sheet H11 in the width direction X, and a pair of flanges H15, H15, each of which is bent from an end edge on the opposite side to the top sheet H11 and extends outward in the width direction X in the pair of side walls H13, H13.

The first steel sheet member H10 has a tensile strength of 1,900 MPa or more. In a case where the first steel sheet member H10 has a tensile strength of 1,900 MPa or more, excellent energy absorption performance can be exhibited.

However, in a case where fracture occurs from the spot-welding portion H50 at the time of the impact deformation of the frame member H1 and the closed cross section collapses, the energy absorption performance due to the first steel sheet member H10 having a tensile strength of 1,900 MPa or more cannot be sufficiently exhibited. Accordingly, in the present application, as will be described later, it is important to suppress spot fracture while using a high-strength member by optimizing the hardness distribution in the vicinity of the spot-welding portion H50.

The first steel sheet member H10 can be manufactured by a method (hot stamping method) including heating a steel sheet to an austenite transformation temperature or higher and quenching the steel sheet while forming the steel sheet with a water cooling die.

The second steel sheet member H20 is a flat steel sheet. The sheet thickness of the second steel sheet member H20 may be 0.4 mm or more and 4.2 mm or less.

The tensile strength of the second steel sheet member H20 is not particularly limited. However, as in the case of the first steel sheet member H10, it is preferable that the tensile strength is 1,900 MPa or more since further excellent energy absorption performance can be exhibited.

The spot-welding portion H50 is formed by performing spot welding in a state in which the second steel sheet member H20 is overlapped on the pair of flanges H15, H15 of the first steel sheet member H10.

A plurality of the spot-welding portions H50 are formed at a pitch of about 15 mm to 50 mm along the longitudinal direction Z of the frame member H1.

The conditions of the spot welding are not particularly limited. For example, heat input conditions may be adopted so that the nugget diameter (that is, the diameter of the molten metal portion) is about 6 $\sqrt{t}$ (t is a smaller one of the sheet thickness of the first steel sheet member H10 and the sheet thickness of the second steel sheet member H20).

Figure 54:
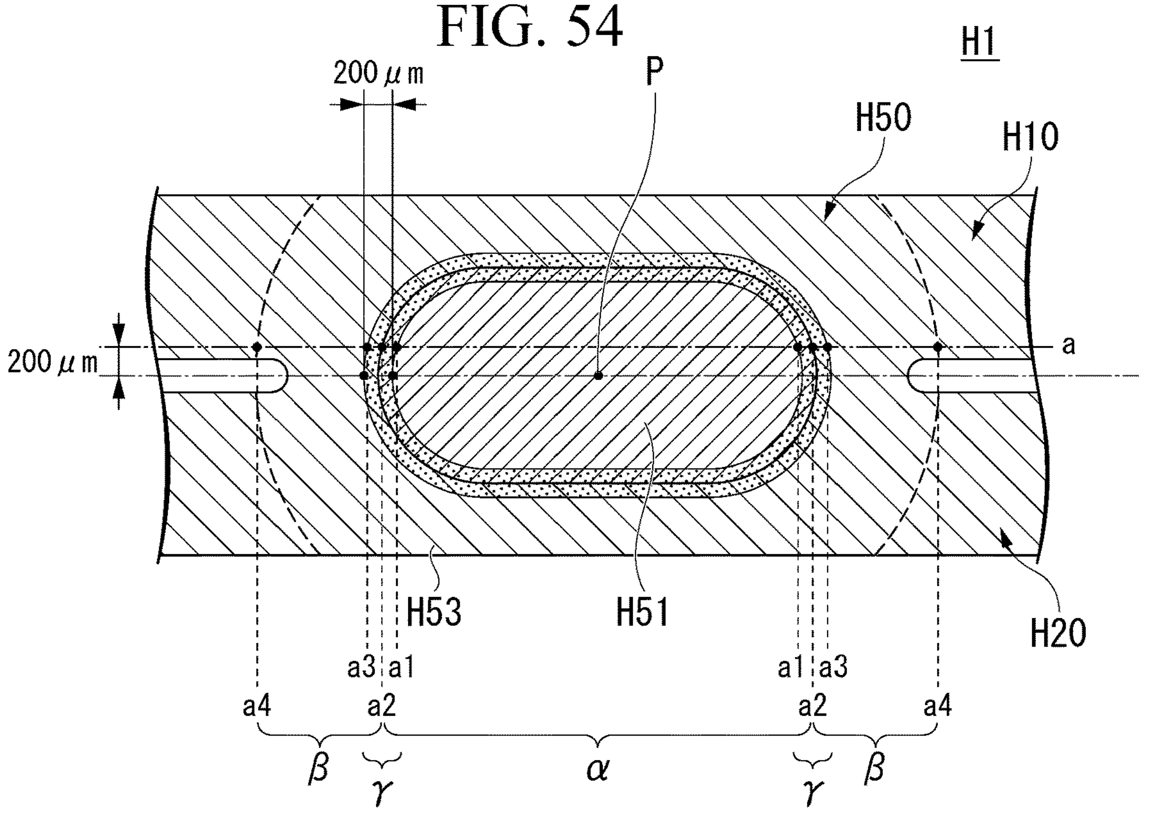
FIG. 54 is a schematic cross-sectional view showing the vicinity of a spot-welding portion of the frame member according to the embodiment.

FIG. 54 is a schematic view of a cross section taken along the line A1-A1 of FIG. 53. In other words, FIG. 54 is a schematic view showing a cross section perpendicular to the longitudinal direction Z, including a center point P of the spot-welding portion H50.

As shown in FIG. 54, the spot-welding portion H50 is formed of a molten metal portion H51 and a heat-affected portion H53 formed adjacent to the outside of the molten metal portion H51.

Here, in the cross section perpendicular to the longitudinal direction Z including the center point P of the spot-welding portion H50, a region corresponding to the molten metal portion H51 is defined as a first region α, and a region corresponding to the heat-affected portion H53 is defined as a second region β.

Furthermore, a region formed of: a region from a melting boundary which is a boundary between the first region α and the second region β to a position 100 μm away from the boundary toward the first region α; and a region from the boundary to a position 100 μm away from the boundary toward the second region β is defined as a third region γ.

The third region γ overlaps a part of the first region α and a part of the second region β.

Figure 55:
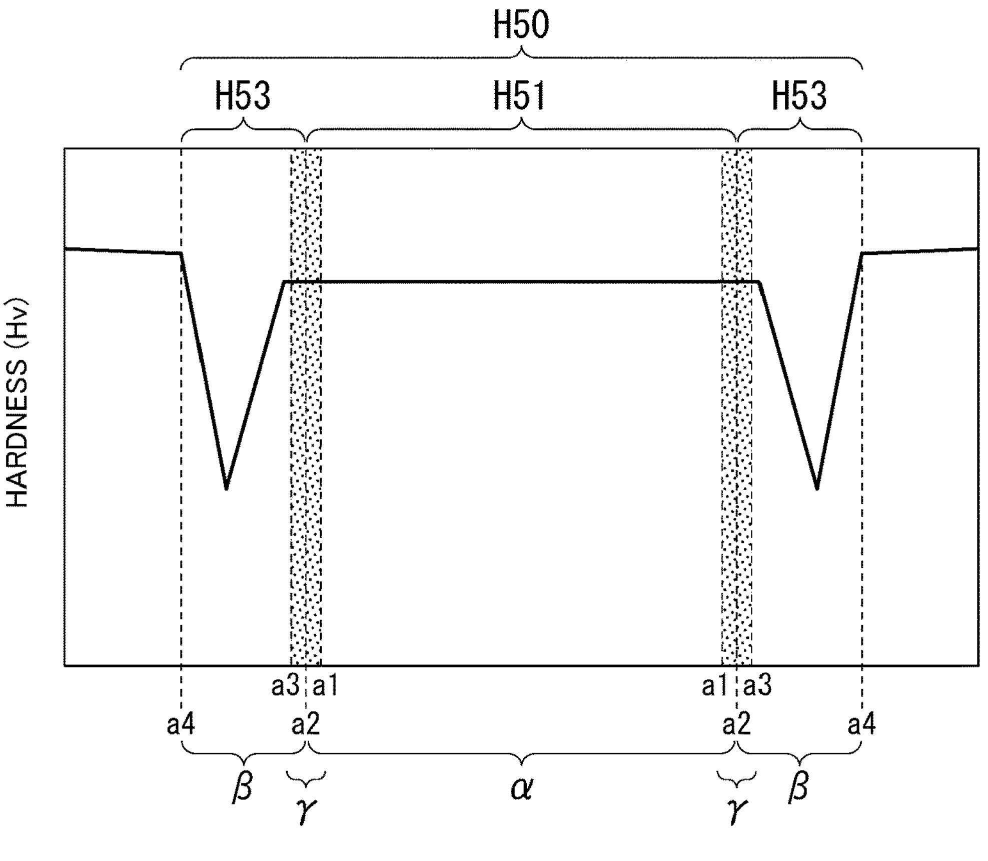
FIG. 55 is a graph showing hardness distribution along a virtual straight line a in FIG. 54.

FIG. 55 is a graph showing the hardness distribution of the spot-welding portion H50. In this graph, the horizontal axis corresponds to the position of a virtual straight line a shown by the two-dot chain line in FIG. 55, and the vertical axis corresponds to the Vickers hardness measured along the virtual straight line a.

The virtual straight line a extends from a center portion of the first region α to the second region β. More specifically, the virtual straight line a extends parallel to a joint surface (shown by the dashed line in FIG. 54) between the first steel sheet member H10 and the second steel sheet member H20 with a distance of 200 μm therebetween from the joint surface toward the first steel sheet member H10.

A pair of points a2 are points at which the virtual straight line a intersects the melting boundary which is a boundary between the first region a and the second region β.

A pair of points a1 existing inside the pair of points a2 are points at which the virtual straight line a intersects the inner edge of the third region γ.

A pair of points a3 existing outside the pair of points a2 are points at which the virtual straight line a intersects the outer edge of the third region γ.

A pair of points a4 existing outside the pair of points a3 are points at which the virtual straight line a intersects the outer edge of the second region β.

Accordingly, in the virtual straight line a,

- a line segment connecting the pair of points a2 corresponds to the first region α, two line segments connecting the point a2 and the point a4 correspond to the second region β, and
- two line segments connecting the point a1 and the point a3 correspond to the third region γ.

As shown in FIG. 55, in the frame member H1 according to this embodiment, the hardness is reduced in a region (between the point a3 and the point a4) outside the second region β due to the existence of the HAZ-softened portion, but is not reduced in the third region γ.

Accordingly, average (arithmetic average) Vickers hardness $Hv_{Ave}$ in the first region α and minimum Vickers hardness $Hv_{Min}$ in the third region γ satisfy $Hv_{Ave}-Hv_{Min}\leq 100$.

In this case, spot fracture during deformation of the frame member H1, caused by a local decrease in hardness in the third region γ, is suppressed, and the closed cross section is maintained. Accordingly, the frame member H1 can exhibit excellent energy absorption performance that matches high-strengthening.

Figure 56:
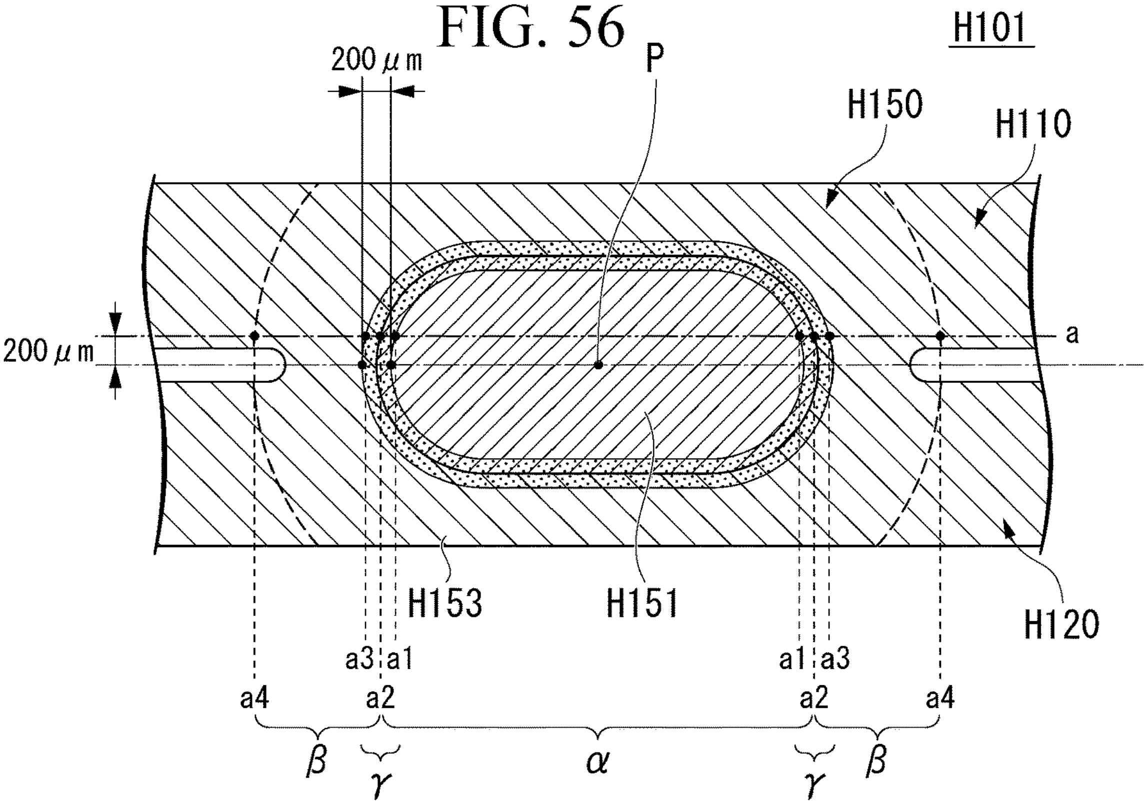
FIG. 56 is a schematic cross-sectional view showing the vicinity of a spot-welding portion of a frame member using a steel sheet member having an Mn content of 1.27% by mass.

Here, FIG. 56 is a schematic view showing a cross section perpendicular to the longitudinal direction Z including a center point P of a spot-welding portion H150 of a frame member H101 using, instead of the first steel sheet member H10 and the second steel sheet member H20 of the frame member H1 according to the present embodiment, a first steel sheet member H110 having a Mn content of 1.27% by mass and a tensile strength of 1,900 MPa or more and a second steel sheet member H120 having a Mn content of 1.27% by mass and a tensile strength of 1,900 MPa or more. As shown in FIG. 56, the spot-welding portion H150 includes a molten metal portion H151 and a heat-affected portion H153.

Figure 57:
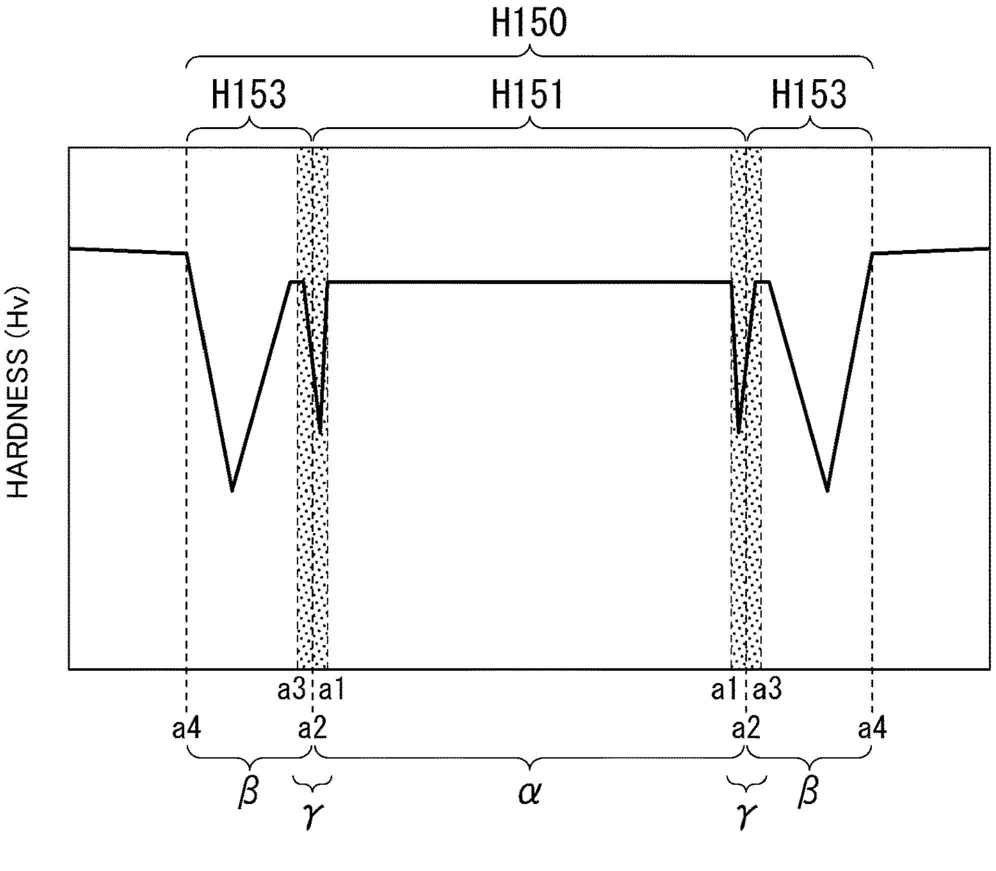
FIG. 57 is a graph showing hardness distribution along a virtual straight line a in FIG. 56.

In addition, FIG. 57 is a graph showing the hardness distribution of the spot-welding portion H150. In this graph, as in FIG. 55, the horizontal axis corresponds to the position of a virtual straight line a shown by the two-dot chain line in FIG. 56, and the vertical axis corresponds to the Vickers hardness measured along the virtual straight line a.

As shown in FIG. 57, in the frame member H101, separately from a HAZ-softened portion existing in a region (between a point a3 and a point a4) outside a second region β, a part where the hardness is rapidly reduced exists in a third region γ.

Accordingly, average Vickers hardness $Hv_{Ave}$ in a first region a and minimum Vickers hardness $Hv_{Min}$ the third region γ show $Hv_{Ave}-Hv_{Min}>100$.

According to the results of the studies by the inventors, this phenomenon is presumed to be due to a Mn-deficient layer formed in a case where a steel sheet having a high Mn content and a high strength is spot-welded.

In this frame member H101, since the softened portion exists in the third region γ, the closed cross section is not maintained due to spot fracture occurring during deformation, and excellent energy absorption performance that matches high-strengthening cannot be exhibited in some cases.

Meanwhile, according to the frame member H1 according to this embodiment, the average Vickers hardness $Hv_{Ave}$ at a measurement position corresponding to the first region α in the virtual straight line a and the minimum Vickers hardness $Hv_{Min}$ at a measurement position corresponding to the third region γ satisfy $Hv_{Ave}-Hv_{Min}\leq 100$, and thus spot fracture during deformation, occurring by a local reduction in hardness, is suppressed, and the closed cross section is maintained. Accordingly, the frame member H1 can exhibit excellent energy absorption performance that matches high-strengthening.

In order to more securely prevent spot fracture during deformation, $Hv_{Ave}-Hv_{Min}\leq 50$ is preferable, and $Hv_{Ave}-Hv_{Min}\leq 30$ is more preferable.

As a measure for obtaining hardness distribution satisfying $Hv_{Ave}-Hv_{Min}\leq 100$, for example, a steel sheet having a Mn content of 1.0% by mass or less, and preferably 0.50% by mass or less, is considered to be used as a material of the first steel sheet member H10. As above, in a case where the Mn content is reduced, it is possible to suppress the occurrence of Mn segregation in the third region γ, and thus it is possible to prevent the local formation of a softened portion in the third region γ. In addition, in a case where the amount of alloying elements other than Mn is adjusted, it is possible to prevent the local formation of a softened portion in the third region γ.

(Measurement Method)

The average Vickers hardness $Hv_{Ave}$ at a measurement position corresponding to the first region a in the virtual straight line a and the minimum Vickers hardness $Hv_{Min}$ at a measurement position corresponding to the third region γ can be measured as described below.

The Vickers hardness is continuously measured at a measurement pitch of 15 μm along the virtual straight line a with a load of 10 gf according to JIS Z 2244.

From the Vickers hardness values obtained by such measurement, the average Vickers hardness $Hv_{Ave}$ in the first region α and the minimum Vickers hardness $Hv_{Min}$ in the third region γ can be obtained.

In the present application, a reduction in hardness in the narrow third region γ of about 200 μm is suppressed to avoid spot fracture. Accordingly, a measurement pitch of 15 μm, which is narrower than usual, is adopted.

In other words, in a case where the measurement pitch is too large, the reduction in hardness cannot be detected even in a case where the hardness is locally reduced in the vicinity of the third region γ.

Here, the method in which the measurement is performed along the virtual straight line a which extends parallel to the joint surface with a distance of 200 μm therebetween has been shown. However, in a case where the measurement by the above method is difficult, the measurement may be performed at a pitch of 15 μm from the center of the molten portion toward the outside across the melting boundary.

The chemical compositions of the first steel sheet member H10 and the second steel sheet member H20 are not particularly limited. However, in a case where the Mn content is excessive in each of the first steel sheet member H10 and the second steel sheet member H20, Mn segregation is likely to occur. Therefore, the Mn content is preferably 1.0% by mass or less, and more preferably 0.5% by mass or less.

For each of the first steel sheet member H10 and the second steel sheet member H20, the Mn content is preferably 0.1% by mass or more from the viewpoint of securing hardenability.

In addition, in a case where the Mn content is reduced, the C (carbon) content may be 0.30% to 0.60% by mass in order to secure strength.

Although the preferable embodiments of the Element Technology H have been described in detail with reference to the accompanying drawings, the Element Technology H is not limited to such examples. It is apparent that a person having common knowledge in the technical field to which the Element Technology H belongs is able to devise various changes or modifications within the scope of the technical idea described in the claims, and it should be understood that such examples belong to the technical scope of the Element Technology H as a matter of course.

For example, although the frame member H1 according to the embodiment is configured by using the first steel sheet member H10 and the second steel sheet member H20, the frame member H1 may be configured by using a plurality of three or more steel sheet members.

In addition, in the frame member H1 according to the embodiment, the first steel sheet member H10 has a hat-shaped cross-sectional shape and the second steel sheet member H20 has a cross-sectional shape of a flat sheet. However, any cross-sectional shape is adoptable as long as a closed cross section is formed. For example, the first steel sheet member H10 may have a flat sheet-like cross-sectional shape, and the second steel sheet member H20 may have a hat-shaped cross-sectional shape. Otherwise, both the first steel sheet member H10 and the second steel sheet member H20 may have a hat-shaped cross-sectional shape.

In addition, in the frame member H1 according to the embodiment, the pair of side walls H13, H13 have the same height, but may have different heights.

It is preferable that a cross-sectional region in which a ratio h1/w of a height h1 of the first steel sheet member H10 along the sheet thickness direction of a part where the spot-welding portion H50 is formed in the first steel sheet member H10 in the cross section perpendicular to the longitudinal direction Z of the frame member H1 to a width w of the frame member H1 along the direction perpendicular to the sheet thickness direction of the part where the spot-welding portion H50 is formed in the first steel sheet member H10 is 0.6 or less is formed.

According to such a configuration, in a case where a steel sheet in which the strength of the spot-welding portion H50 is increased is used to provide a member in which an aspect ratio of a cross section of the member is optimized, it is possible to suppress fracture of the spot-welding portion H50. This makes it possible to exhibit further excellent energy absorption performance.

In a case of a hat-shaped cross-sectional shape in which the pair of side walls H13 have different heights, an average of the heights of the side walls H13, H13 on both sides is defined as the height h1.

In the frame member H1 according to the present embodiment, since the second steel sheet member H20 has a flat sheet shape, a height h2 is 0 mm. In a case where the second steel sheet member H20 does not have a flat sheet shape, it is preferable that a cross-sectional region in which a ratio h2/w of the height h2 to a width w of the frame member H1 is 0.6 or less is formed.

The frame member H1 according to this embodiment has a uniform cross-sectional shape over the whole length, but may not have a uniform cross-sectional shape over the whole length.

The cross-sectional region in which the ratio h1/w is 0.6 or less preferably exists in 50% or more, and preferably 80% or more of the total length of the frame member H1 in the longitudinal direction Z.

In addition, similarly, the cross-sectional region in which the ratio h2/w is 0.6 or less preferably exists in 50% or more, and preferably 80% or more of the total length of the frame member H1 in the longitudinal direction Z.

According to such a configuration, it is possible to more securely suppress fracture from the spot-welding portion at the time of the collision, and it is possible to exhibit more excellent energy absorption performance.

Example

The effects of one aspect of the Element Technology H will be described in greater detail with examples. However, the conditions in the examples are merely an example adopted to confirm the feasibility and the effects of the Element Technology H. The Element Technology H is not limited to this example. In the Element Technology H, various conditions can be adopted as long as the gist of the Element Technology H is not deviated and the object of the Element Technology H is achieved.

Figure 59:
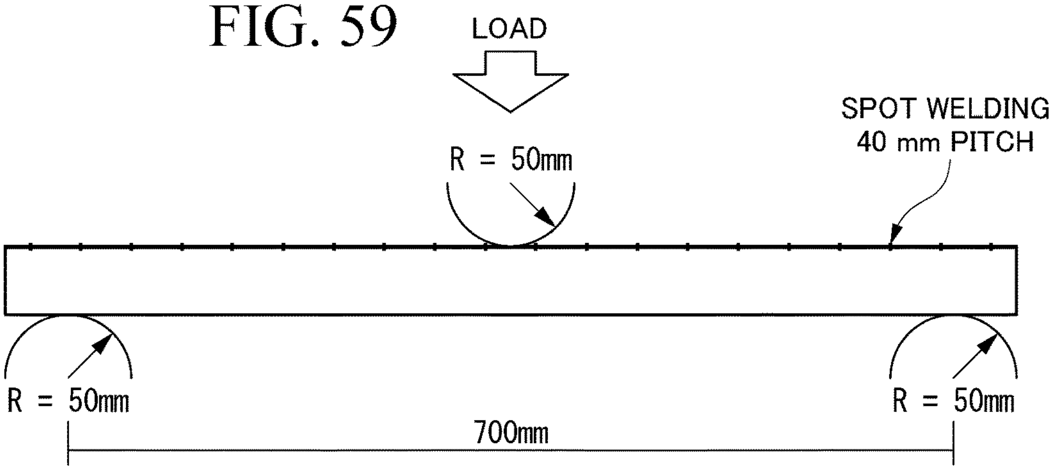
FIG. 59 is a schematic view for explaining conditions of a three-point bending test in experimental examples.

A three-point bending test shown in FIG. 59 was reproduced with a numerical analysis model, and the number of spot fractures was evaluated. A spot-welding portion was modeled with a nugget diameter of $6\sqrt{t}$ (t=1.4 mm). As a strength of the spot-welding portion, a result of a shear type joint welding test was used. As material properties, a result of a tensile test was used.

First, steel sheets to be used in evaluation were specified as shown in Table 46.

TABLE 46

| Steel Sheet | Sheet Thickness | Mn Content | YP | TS | U.El |
|---|---|---|---|---|---|
| Steel Sheet A | 1.4 mm | 0.39% by mass | 1436 MPa | 2010 MPa | 5% |
| Steel Sheet B | 1.4 mm | 0.80% by mass | 1458 MPa | 2040 MPa | 5% |

TABLE 46-continued

| Steel Sheet | Sheet Thickness | Mn Content | YP | TS | U.El |
|---|---|---|---|---|---|
| Steel Sheet C | 1.4 mm | 1.27% by mass | 1497 MPa | 2082 MPa | 5% |

In Experimental Examples 1 to 3 and 5 to 7, a frame member including: a hat-shaped steel sheet member consisting of a steel sheet A and having a predetermined member height h1; and a flat sheet-like steel sheet member (h2=0 mm) joined to a flange of the hat-shaped steel sheet member by spot welding and having equivalent characteristics to the steel sheet A was used. The pitch of the spot welding was 40 mm.

In Experimental Example 4, a frame member including: a hat-shaped steel sheet member consisting of a steel sheet B and having a predetermined member height h1; and a flat sheet-like steel sheet member (h2=0 mm) joined to a flange of the hat-shaped steel sheet member by spot welding and having equivalent characteristics to the steel sheet B was used. The pitch of the spot welding was 40 mm.

In Experimental Examples 8 to 13, a frame member including: a hat-shaped steel sheet member consisting of a steel sheet C and having a predetermined member height h1; and a flat sheet-like steel sheet member (h2=0 mm) joined to a flange of the hat-shaped steel sheet member by spot welding and having equivalent characteristics to the steel sheet C was used. The pitch of the spot welding was 40 mm.

Figure 58:
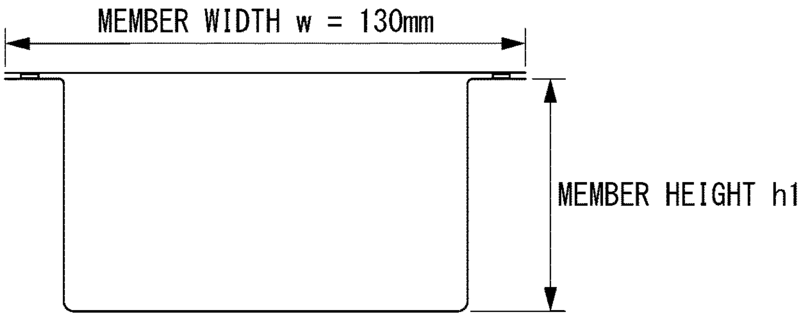
FIG. 58 is a schematic view for explaining a cross-sectional shape of a member used in examples.

Accordingly, as shown in FIG. 58, frame members with a cross-sectional shape having a member width w of 130 mm and a member height h1 as shown in Table 47 below were obtained. A structure having a constant cross-sectional shape over the whole length with a frame member length of 800 mm was adopted.

Next, as shown in FIG. 59, on a pair of dies (R 50 mm) placed at an interval of 700 mm, the frame member was placed so that a midpoint between the dies and a center of the frame member in the longitudinal direction overlap in the height direction. After that, a rigid semicircular (R 50 mm) impactor was made to collide with the center of the frame member in the longitudinal direction at a constant speed of 7.2 km/hr, and the number of spot fractures was evaluated from the deformed state at that time.

Figure 60:
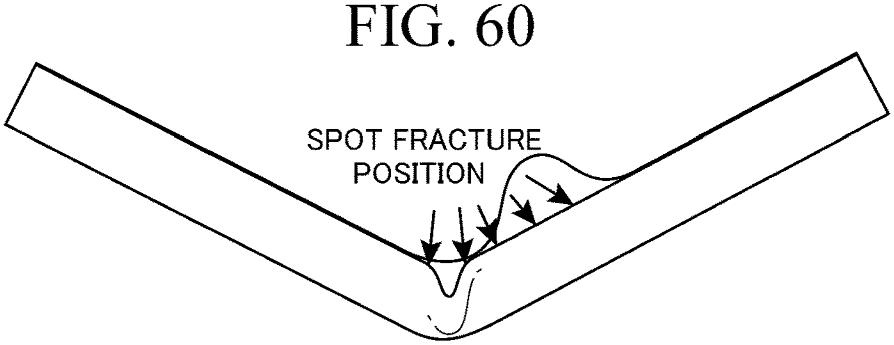
FIG. 60 is a schematic view showing a state in which spot fracture has occurred in the three-point bending test, and shows a state in which spot fracture has occurred at five positions on one side.

FIG. 60 is an example of a case where the number of spot fractures is 10 (5 on one side). In this example, the back sheet is turned up due to the occurrence of spot fracture, and the closed cross section is not maintained.

Figure 61:
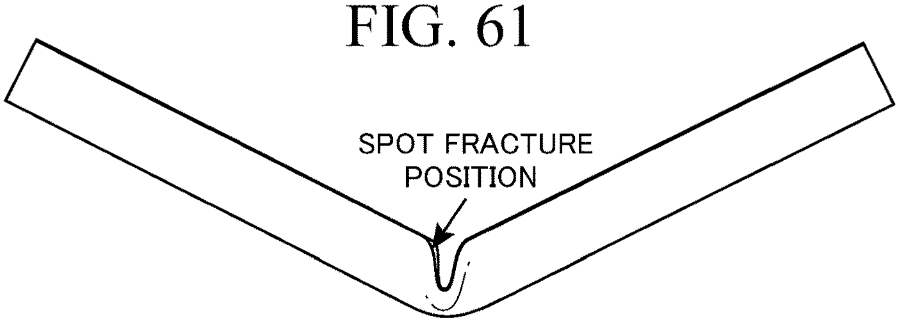
FIG. 61 is a schematic view showing a state in which spot fracture has occurred in the three-point bending test, and shows a state in which spot fracture has occurred at one position on one side.

FIG. 61 is an example of a case where the number of spot fractures is 2 (1 on one side). In this example, the back sheet enters the steel sheet member side due to the occurrence of spot fracture, but the closed cross section is maintained. In the examples, a case where the number of spot fractures was 4 or less was determined to be acceptable. The evaluation results are shown in Table 47.

In a spot-welding portion obtained by performing spot welding on two overlapping steel sheets A, it was assumed that the Vickers hardness was measured at a pitch of 15 μm with a load of 10 gf according to JIS Z 2244 along a virtual straight line extending parallel to a joint surface between the steel sheet members with a distance of 200 μm therebetween from the joint surface toward the hat-shaped steel sheet member.

From the Vickers hardness values assumed as above, setting was conducted so that a difference ($Hv_{Ave}-Hv_{Min}$)

between average Vickers hardness $Hv_{Ave}$ in the first region a and minimum Vickers hardness $Hv_{Min}$ in the third region γ was 45.

Similarly, the value of $Hv_{Ave}$–$Hv_{Min}$ was adjusted to 90 in a spot-welding portion obtained by performing spot welding on two overlapping steel sheets B.

Similarly, the value of $Hv_{Ave}$–$Hv_{Min}$ was adjusted to 140 in a spot-welding portion obtained by performing spot welding on two overlapping steel sheets C.

TABLE 47

| | Steel Sheet | $Hv_{Ave}$ – $Hv_{Min}$ | h1 | w | h1/w | Number of Fractures | Determination of Acceptance |
|---|---|---|---|---|---|---|---|
| Experimental Example 1 | A | 45 | 20 mm | 130 mm | 0.15 | 2 | Very Good |
| Experimental Example 2 | A | 45 | 40 mm | 130 mm | 0.31 | 2 | Very Good |
| Experimental Example 3 | A | 45 | 60 mm | 130 mm | 0.46 | 2 | Very Good |
| Experimental Example 4 | B | 90 | 60 mm | 130 mm | 0.46 | 4 | Good |
| Experimental Example 5 | A | 45 | 80 mm | 130 mm | 0.62 | 4 | Good |
| Experimental Example 6 | A | 45 | 100 mm | 130 mm | 0.77 | 4 | Good |
| Experimental Example 7 | A | 45 | 120 mm | 130 mm | 0.92 | 4 | Good |
| Experimental Example 8 | C | 140 | 20 mm | 130 mm | 0.15 | 8 | NG |
| Experimental Example 9 | C | 140 | 40 mm | 130 mm | 0.31 | 10 | NG |
| Experimental Example 10 | C | 140 | 60 mm | 130 mm | 0.46 | 12 | NG |
| Experimental Example 11 | C | 140 | 80 mm | 130 mm | 0.62 | 14 | NG |
| Experimental Example 12 | C | 140 | 100 mm | 130 mm | 0.77 | 14 | NG |
| Experimental Example 13 | C | 140 | 120 mm | 130 mm | 0.92 | 14 | NG |

(Element Technology I)

Element Technology I is a lateral surface member structure of a vehicle body, including: a tubular body extending in a front-rear direction of the vehicle body; and an impact absorbing member disposed inside the tubular body, in which the impact absorbing member includes a web extending along the front-rear direction and flat in a vehicle width direction, a vehicle outer flange joined to a vehicle outer end portion of the web and extending along the front-rear direction, and a vehicle inner flange joined to a vehicle inner end portion of the web and extending along the front-rear direction, and the vehicle outer flange and the vehicle inner flange include a rib disposed so as to sandwich the web from above and below and extending along the front-rear direction.

The lateral surface member structure of a vehicle body of Element Technology I can suppress local deformation while maintaining the impact absorption capacity.

First Embodiment

Figure 62:
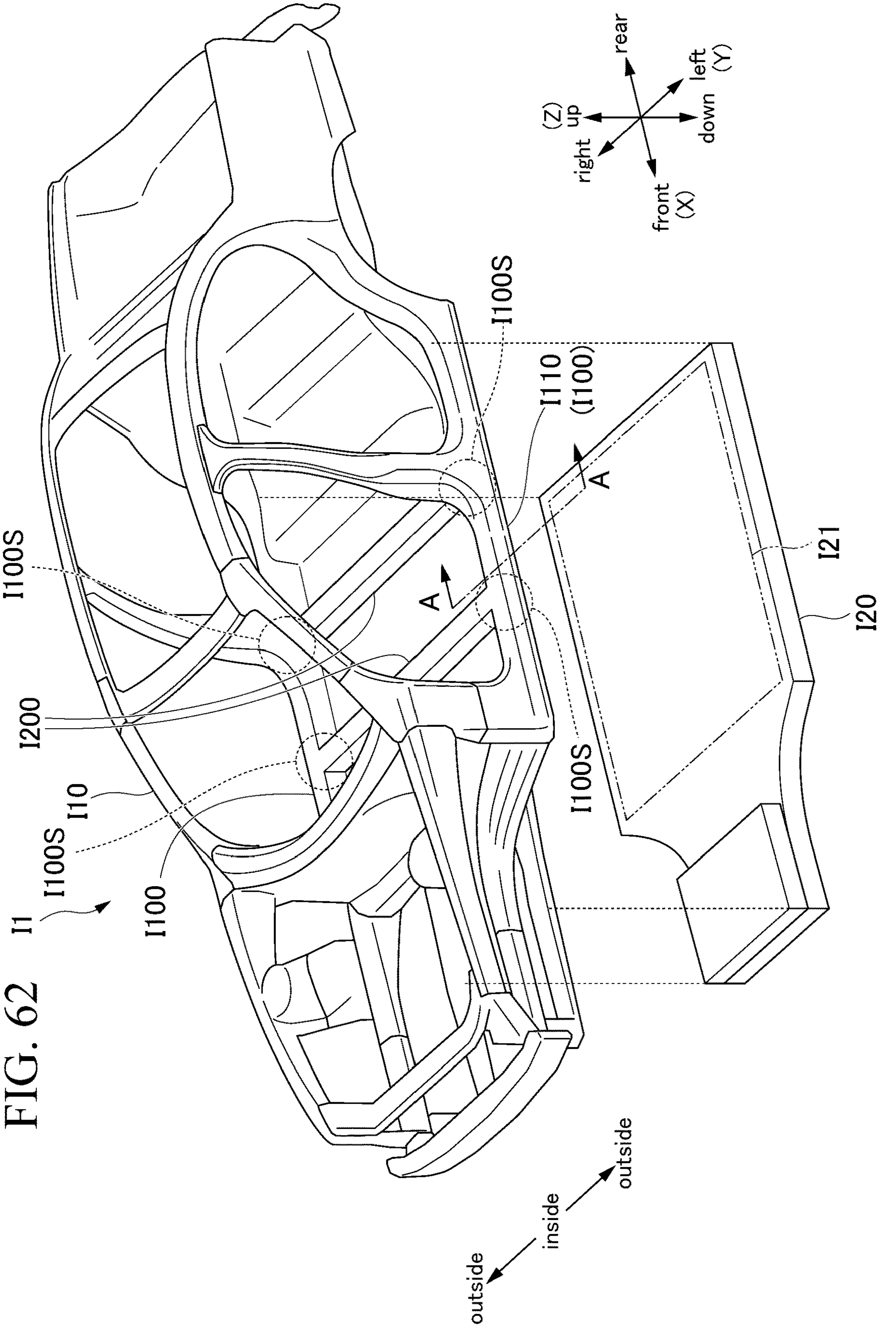
FIG. 62 is an exploded perspective view showing a part of an automobile body.
Figure 63:
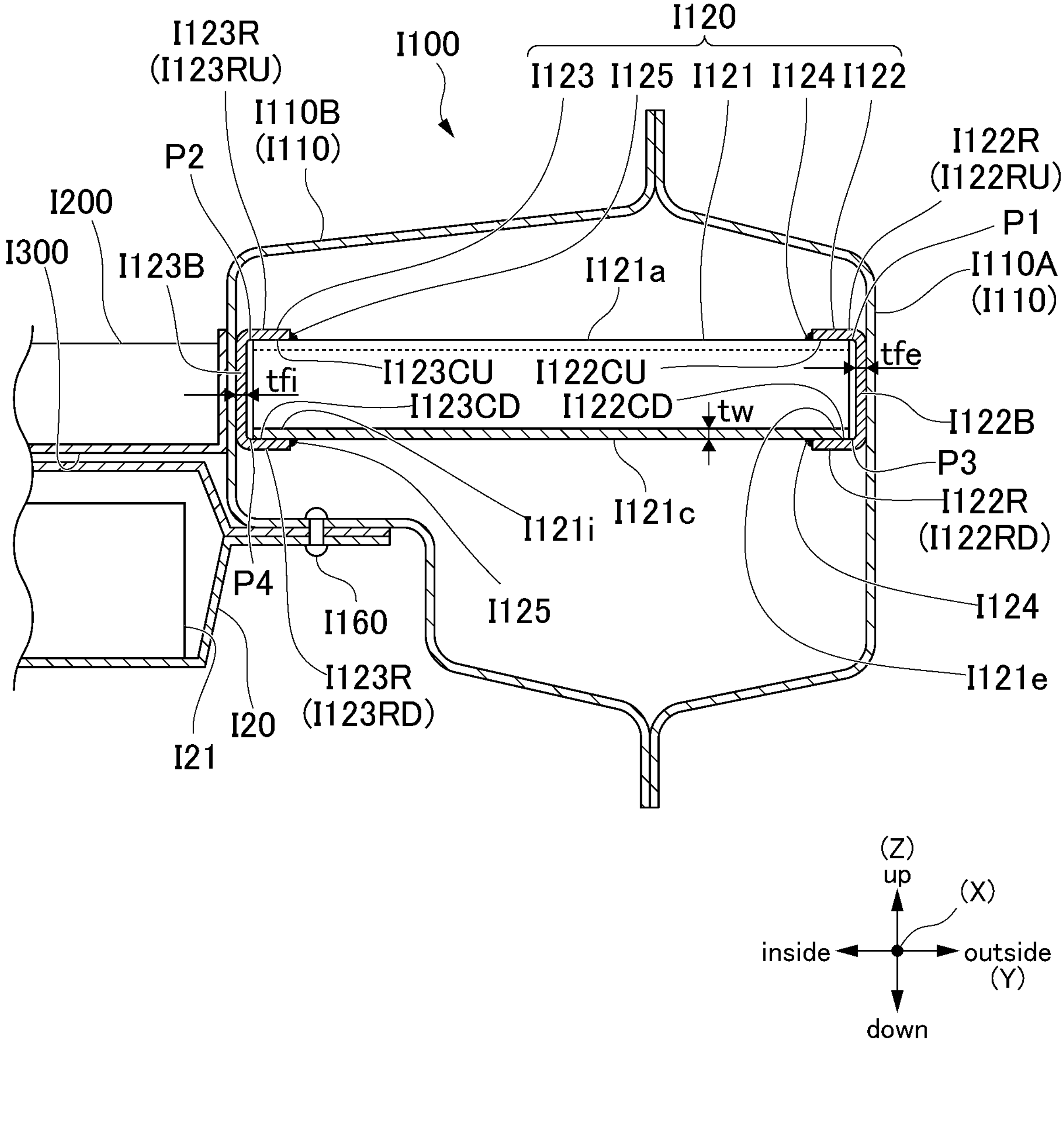
FIG. 63 is a cross-sectional view taken along line A in FIG. 62 showing a lateral surface member structure according to a first embodiment.

FIG. 62 is an exploded perspective view showing a part of a vehicle body I1 including a lateral surface member structure I100 according to a first embodiment. FIG. 63 is a cross-sectional view taken along line A in FIG. 62, showing the lateral surface member structure I100 according to the first embodiment. FIG. 63 shows a structure in which a battery case I20 and the lateral surface member structure I100 are integrated. Hereinafter, a direction along a traveling direction of a vehicle body (vehicle) may be referred to as a front-rear direction or the X direction, the traveling direction of the vehicle body may be referred to as a front, a side opposite to the front may be referred to as a rear, a direction along a gravity direction may be referred to as an up-down direction or a Z direction, a direction along a horizontal direction may be referred to as a vehicle width direction or a Y direction, a direction away from the center of the vehicle body in the vehicle width direction may be referred to as an outside of the vehicle, and a direction opposite to the outside of the vehicle may be referred to as an inside of the vehicle.

As shown in FIG. 62, the vehicle body I1 includes a frame I10 including the skeleton of the vehicle body I1 and a battery case I20 for accommodating a battery pack I21 such as a lithium ion battery. The vehicle body I1 is driven by a battery as a power source, such as an electric vehicle.

A frame I10 has a lateral surface member structure I100 (also referred to as "side sill") that extends along the front-rear direction of the vehicle body I1 and is located under a door of a lateral opening portion. Further, the frame I10 has an intersecting member I200 that extends along the vehicle width direction of the vehicle body I1 and is bridged between a pair of lateral surface member structures I100.

In the lateral surface member structure I100 of the vehicle body I1 according to the first embodiment, a longitudinal direction of the lateral surface member structure I100 is disposed toward the front-rear direction of the vehicle body I1 on the outside of the vehicle (right side in FIG. 63) from a position where the battery pack I21 is disposed in order to protect a battery pack I21 from a side collision (pole side collision) with a utility pole or the like and protect an occupant.

As shown in FIG. 63, the lateral surface member structure I100 is supported in the vehicle width direction (lateral direction) by the intersecting member I200. The intersecting member I200 supports a floor panel I300. The lateral surface member structure I100 is connected to the battery case I20 via a fastener I160.

In general, the pair of lateral surface member structures I100 is provided on right and left sides of the vehicle body I1 in the vehicle width direction. The lateral surface member structure I100 is supported in the vehicle width direction by the intersecting member I200 in a support portion I100S (refer to FIG. 62). That is, a tubular body I110 of the lateral surface member structure I100 has the support portion I100S that is supported in the vehicle width direction by the intersecting member I200 that intersects the vehicle body I1 in the vehicle width direction. As a result, it is possible to suppress the bending moment around the Z direction that acts on the lateral surface member structure I100 when an obstacle collides with the lateral surface of the lateral surface member structure I100 of the vehicle body I1. Therefore, it is possible to suppress a deformation amount of the lateral surface member structure I100 in the vehicle width direction, particularly inward of the vehicle.

The intersecting member I200 is bridged between the pair of lateral surface member structures I100. In the intersecting member I200, both end portions of the intersecting member I200 are joined to the support portions I100S of the lateral surface member structure I100. A plurality of the intersecting members I200 are appropriately provided.

Structures of the right and left lateral surface member structures I100 in the pair of lateral surface member structures I100 are symmetrical in the vehicle width direction. Hereinafter, the lateral surface member structure I100 on the left side when viewed in the traveling direction will be described as a representative.

Figure 64:
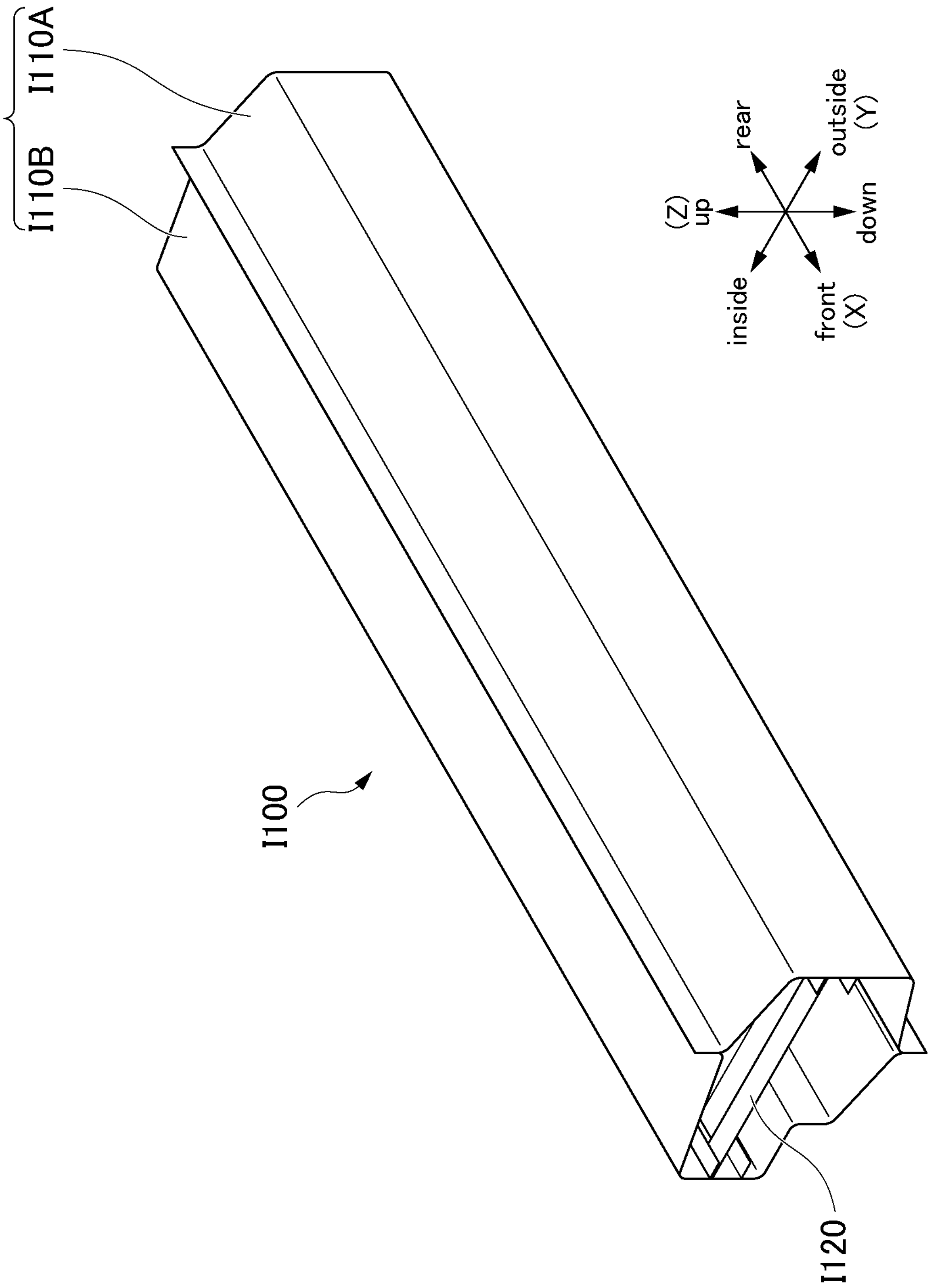
FIG. 64 is a cross-sectional perspective view showing a part of the lateral surface member structure according to the first embodiment.
Figure 65:
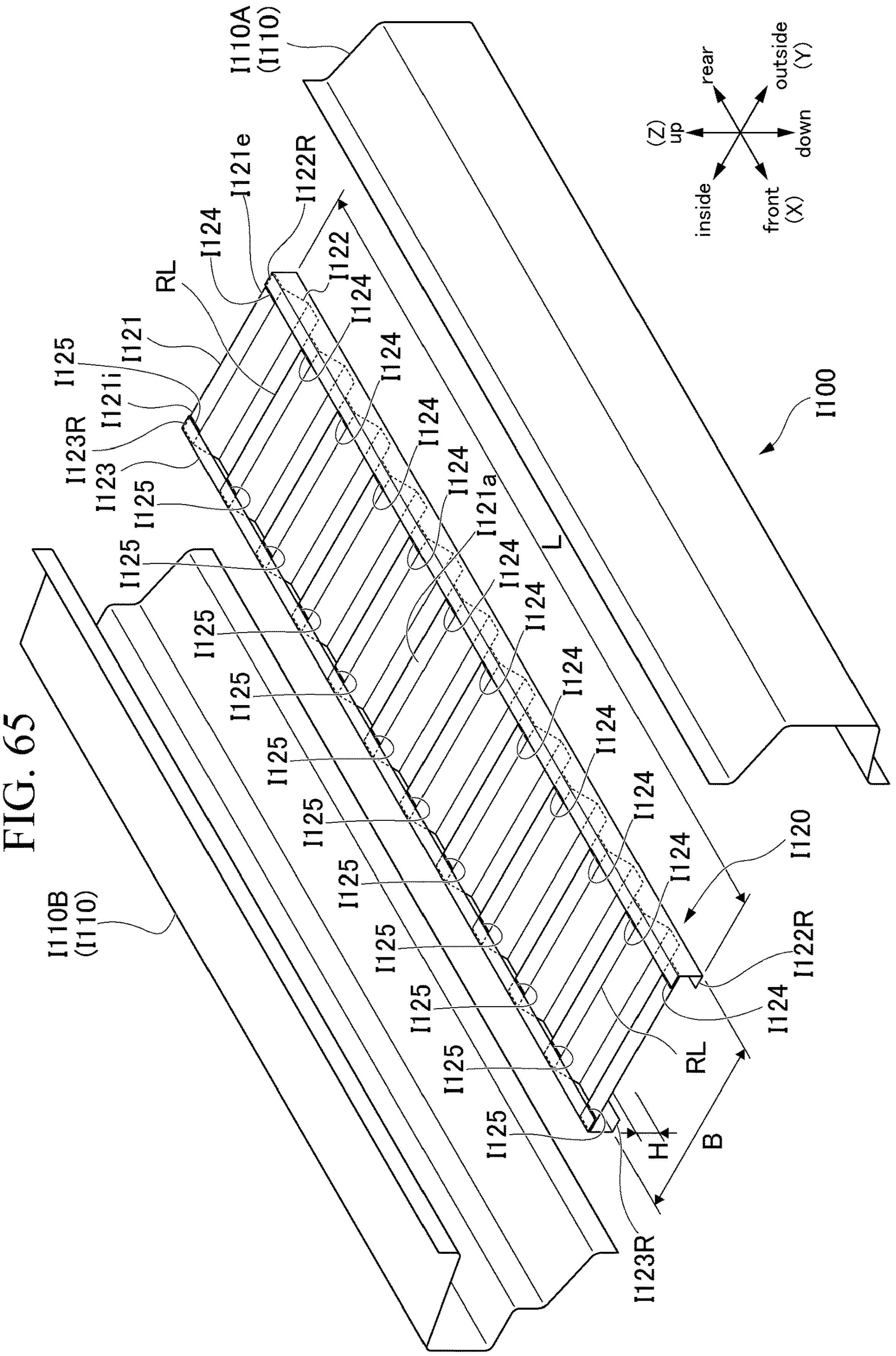
FIG. 65 is an exploded perspective view showing a part of the lateral surface member structure according to the first embodiment.
Figure 66:
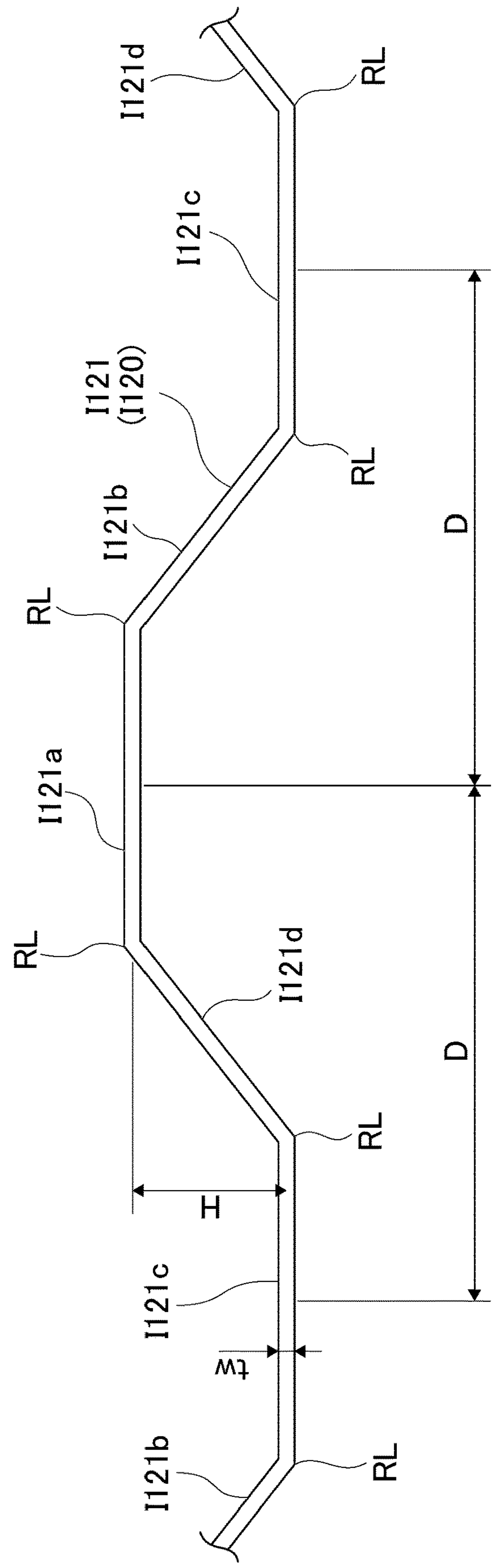
FIG. 66 is a side view showing a part of a web according to the first embodiment.

FIG. 64 is a cross-sectional perspective view showing a part of the lateral surface member structure I100 according to the first embodiment. FIG. 65 is an exploded perspective view showing a part of the lateral surface member structure I100 according to the first embodiment. FIG. 66 is a side view showing a part of a web I121 according to the first embodiment.

As shown in FIGS. 64 to 66, the lateral surface member structure I100 according to the first embodiment has a tubular body I110 (a hollow beam) extending in the front-rear direction of the vehicle body I1 and an impact absorbing member I120 disposed inside the tubular body I110.

(Tubular Body)

The tubular body I110 has a hollow elongated structure. In the tubular body I110, a longitudinal direction of the tubular body I110 is disposed along the front-rear direction of the vehicle body I1. The tubular body I110 is made of, for example, a high strength steel sheet having a tensile strength of 980 MPa, and has desired performance including bending rigidity around the Z direction, buckling proof stress in the vehicle width direction, and the like. The tubular body I110 is divided into two parts, and has a vehicle outer tubular body I110A on the outer side of the vehicle and a vehicle inner tubular body I110B on the inner side of the vehicle. Each of the vehicle outer tubular body I110A and the vehicle inner tubular body I110B has a hat-shaped cross section having flange portions on upper and lower sides. The vehicle outer tubular body I110A and the vehicle inner tubular body I110B are joined by appropriate joining methods such as welding and bolts in a state where the flange portions are butted against each other. The tubular body I110 may not be divided, is not limited to be divided into two parts, and may be divided into three or more parts.

(Impact Absorbing Member)

In the impact absorbing member I120, a longitudinal direction of the impact absorbing member I120 is disposed inside the tubular body I110 along the front-rear direction of the vehicle body I1. The impact absorbing member I120 is made of, for example, a high strength steel sheet. When the impact absorbing member I120 is made of a high strength steel sheet, the impact absorbing member I120 can absorb high energy with a low mass, has high mass efficiency, and is suitable for a vehicle member that requires weight reduction.

The impact absorbing member I120 includes a web I121 extending along the front-rear direction of the vehicle body I1 and flat in the vehicle width direction of the vehicle body I1, a vehicle outer flange I122 joined to a vehicle outer end portion I121*e* of the web I121 and extending along the front-rear direction, and a vehicle inner flange I123 joined to a vehicle inner end portion I121*i* of the web I121 and extending along the front-rear direction. The vehicle outer flange I122 and the vehicle inner flange I123 includes ribs I122R and I123R disposed so as to sandwich the web I121 from above and below and extending along the front-rear direction.

Since the impact absorbing member I120 has such a structure, the web I121 is buckled and deformed in the vehicle width direction toward the inside of the vehicle when an impact load is applied. As a result, the web I121 is crushed and deformed while suppressing a peak load (reaction force) generated when the impact load is applied and resisting with an average high load (reaction force), and thus, the web I121 can efficiently absorb impact energy.

Further, since the vehicle outer flange I122 and the vehicle inner flange I123 are joined to both end portions of the web I121 in the vehicle width direction, a deformation mode when the web I121 is buckled and deformed can be maintained in a higher-order mode having a short buckling wavelength. Since the vehicle outer flange I122 and the vehicle inner flange I123 are joined to both end portions of the web I121 in the vehicle width direction, even when an impact load is concentrated locally on the lateral surface member structure I100 due to the collision of obstacle, in a process in which the impact load is transmitted from the lateral surface member structure I100 to the web I121 via the vehicle outer flange I122, the impact load can be dispersed in the front-rear direction and the impact energy can be absorbed in a wide range in the front-rear direction. Therefore, it is possible to reduce a maximum value of the local deformation of the lateral surface member structure I100 to the inside of the vehicle due to the concentrated impact load. Since the vehicle outer flange I122 and the vehicle inner flange I123 can efficiently increase a second moment of area around the Z direction of the impact absorbing member I120, the impact absorbing member I120 can efficiently resist bending deformation (bending deformation around the Z direction) in the vehicle width direction toward the inside of the vehicle. Therefore, the deformation of the impact absorbing member I120 to the inside of the vehicle can be suppressed.

Further, since the vehicle outer flange I122 and the vehicle inner flange I123 each includes the ribs I122R and I123R which are disposed so as to sandwich the web I121 from above and below and extend along the front-rear direction, the second moment of area around the Y direction and the second moment of area around the X direction can increase. Therefore, it is difficult to bend and deform around the Y direction, that is, it is difficult to bend up and down, and it is difficult to twist around the X direction. Therefore, when the impact load is applied, the impact absorbing member I120 can be compactly deformed without causing a large deformation.

As described above, the impact absorbing member I120 can efficiently absorb the impact energy and suppress the deformation to the inside of the vehicle even when the impact load acts from the vehicle width direction. Therefore, the battery case I20 accommodating the battery pack I21 can be effectively protected.

Specifically, the vehicle outer flange I122 and the vehicle inner flange I123 are made of, for example, steel. It is desirable that each of the vehicle outer flange I122 and the vehicle inner flange I123 has a tensile strength of 590 MPa or more, preferably 780 MPa or more, more preferably 980 MPa or more, from the viewpoint of restraining the deformation of the web I121.

As shown in FIG. 63, the cross section of the vehicle outer flange I122 perpendicular to the front-rear direction is a substantially C shape including a base portion I122B which extends in the up-down direction and an upper rib I122RU and a lower rib I122RD which extend to the inside of the vehicle from both upper and lower end portions of the base portion I122B. The cross-sectional shape of the vehicle outer flange I122 may be uniform along the front-rear direction.

Similarly, the cross section of the vehicle inner flange I123 perpendicular to the front-rear direction is a substantially C shape including a base portion I123B which extends in the up-down direction and an upper rib I123RU and a lower rib I123RD which extend to the outside of the vehicle from both upper and lower end portions of the base portion I123B. The cross-sectional shape of the vehicle inner flange I123 may be uniform along the front-rear direction.

In both the vehicle outer flange I122 and the vehicle inner flange I123, the web I121 is sandwiched in an inside having a substantially C-shaped cross section. That is, since the web I121 is sandwiched between the upper rib I122RU and the lower rib I122RD of the vehicle outer flange I122 and the web I121 is sandwiched between the upper rib I123RU and the lower rib I123RD of the vehicle inner flange I123, the impact absorbing member I120, it is possible to more efficiently resist the bending deformation (bending deformation around the Z direction) in the vehicle width direction toward the inside of the vehicle, and it is possible to further suppress deformation toward the inside of the vehicle from the impact absorbing member I120.

Specifically, the vehicle outer flange I122 is joined to the vehicle outer end portion I121*e* of the web I121 by, for example, arc welding. Specifically, the impact absorbing member I120 forms a joint portion I124 at a boundary portion between the vehicle outer flange I122 and the web I121. The joint portion I124 may be formed only at the boundary portion between the rib I122R of the vehicle outer flange I122 and the web I121, for example, by fillet welding in order to obtain high weldability, that is, from the viewpoint of reducing welding man-hours and ensuring soundness of the welded part. That is, a first vertical plane portion I121*b* (refer to FIG. 66) and a second vertical plane portion I121*d* (refer to FIG. 66) of the web I121 and the vehicle outer flange I122 do not have to be directly joined to each other.

Similarly, the vehicle inner flange I123 is joined to the vehicle inner end portion I121*i* of the web I121, for example, by welding. Specifically, the impact absorbing member I120 forms a joint portion I125 at a boundary portion between the vehicle inner flange I123 and the web I121.

Here, even when the web I121 has a corrugated shape without a first horizontal plane portion I121*a* and a second horizontal plane portion I121*c* shown in FIG. 66, it suffices if the vehicle outer flange I122 can be sufficiently joined to the web I121 and the vehicle inner flange I123 can be sufficiently joined to the web I121. When the web I121 includes the first horizontal plane portion I121*a* and the second horizontal plane portion I121*c*, the first horizontal plane portion I121*a* can be joined to the upper rib I122RU and the upper rib I123RU more easily and more firmly, and the second horizontal plane portion I121*c* can be joined to the lower rib I122RD and the lower rib I123RD more easily and more firmly.

The web I121 and the rib I122R or the web I121 and the rib I123R are joined to each other. Thereby, a dimensional error of a positional relationship between the web I121 and the vehicle outer flange I122 or the vehicle inner flange I123 can be absorbed. Further, after assembling the web I121 and the rib I122R or the rib I123R, they can be joined to each other. Therefore, it is easy to manufacture. Further, a sectional stress can be continuously and reliably transmitted between the web I121 and the vehicle outer flange I122 or the vehicle inner flange I123 via the rib I122R or the rib I123R.

From the viewpoint of reducing the welding man-hours, the joint portion I125 may be formed only at the boundary portion between the rib I123R of the vehicle inner flange I123 and the web I121 by, for example, fillet welding.

A vehicle inner surface of the base portion I122B of the vehicle outer flange I122 and a vehicle outer end surface of the web I121 may be in contact with each other or may be separated from each other. When there is a gap between the vehicle inner surface of the base portion I122B of the vehicle outer flange I122 and the vehicle outer end surface of the web I121, a dimensional tolerance of the web I121 in the vehicle width direction can be absorbed by the gap, and a dimension of the impact absorbing member I120 in the vehicle width direction can be easily adjusted so as to match an internal dimension of the tubular body I110 in the vehicle width direction. Similarly, a vehicle outer surface of the base portion I123B of the vehicle inner flange I123 and a vehicle inner end surface of the web I121 may be in contact with each other or may be separated from each other.

Here, as shown in FIG. 63, in the upper rib I122RU of the vehicle outer flange I122 and the upper rib I123RU of the vehicle inner flange I123, it is preferable that lower surfaces I122CU and I123CU are provided along an upper end (here, upper surface of the first horizontal plane portion I121*a*) of the web I121 to restrain the deformation of the web I121 in the upward direction. That is, the lower surfaces I122CU and I123CU of the upper rib I122RU and the upper rib I123RU may be parallel to the upper surface of the first horizontal plane portion I121*a* without any gap.

Further, it is preferable that the lower surfaces I122CU and I123CU of the upper rib I122RU of the vehicle outer flange I122 and the upper rib I123RU of the vehicle inner flange I123 are in contact with the upper surface of the first horizontal plane portion I121*a*.

Further, it is preferable that the lower surface I122CU of the upper rib I122RU is in contact with at least a vehicle outermost end P1 of the first horizontal plane portion I121*a*, and the lower surface I123CU of the upper rib I123RU is in contact with at least a vehicle innermost end P2 of the first horizontal plane portion I121*a*.

Similarly, in the lower rib I122RD of the vehicle outer flange I122 and the lower rib I123RD of the vehicle inner flange I123, it is preferable that upper surfaces I122CD and I123CD are provided along a lower end (here, lower surface of the second horizontal plane portion I121*c*) of the web I121 to restrain the deformation of the web I121 in the downward direction. That is, the upper surfaces I122CD and I123CD of the lower rib I122RD and the lower rib I123RD may be parallel to the lower surface of the second horizontal plane portion I121*c* without any gap.

Further, it is preferable that the upper surfaces I122CD and I123CD of the lower rib I122RD of the vehicle outer flange I122 and the lower rib I123RD of the vehicle inner flange I123 are in contact with the lower surface of the second horizontal plane portion I121*c*.

Further, it is preferable that the upper surface I122CD of the lower rib I122RD is in contact with at least a vehicle outermost end P3 of the second horizontal plane portion I121*c*, and the upper surface I123CD of the lower rib I123RD is in contact with at least a vehicle innermost end P4 of the second horizontal plane portion I121*c*.

As a result, the vehicle outer flange I122 and the vehicle inner flange I123 appropriately restrain the deformation of both end portions of the web I121 in the vehicle width direction, and thus, a buckling load of the web I121 can increase.

As shown in FIG. 65, the web I121 of the impact absorbing member I120 is, for example, a wave-shaped sheet that repeatedly bends up and down alternately along the front-rear direction of the vehicle body I1. The web I121 is made of steel, for example. It is desirable that the web I121 has tensile strength of 590 MPa or more, preferably 780 MPa or more, more preferably 980 MPa or more, from the viewpoint of increasing buckling strength and obtaining high energy absorption performance while suppressing deformation. When the impact absorbing member I120 has a ridge line RL, a direction of the ridge line RL is substantially parallel to the vehicle width direction. The impact absorbing member I120 has a wavy shape as shown in FIG. 66 when viewed in the vehicle width direction, that is, in a side view, and has a rectangular shape that is long in the front-rear direction and has a predetermined width when viewed in the up-down direction as shown in (A) of FIG. 67, that is, in a plan view. As described above, since the impact absorbing member I120 is a wave-shaped sheet that repeatedly bends up and down alternately along the front-rear direction of the vehicle body I1, there is no unevenness in the front-rear direction and the bending rigidity (second moment of area) around the X direction is high. Therefore, in an elastic region, the impact absorbing member I120 can be made difficult to bend around the X direction, and the buckling proof stress in the vehicle width direction can be enhanced. Further, even when an impact load due to a pole side collision is input to any of local areas of the lateral surface member structure I100 in the front-rear direction, as the impact absorbing member I120 in the local area is crushed and deformed, the impact absorbing member I120 in front of and behind the local area is also deformed and crushed, and thus, the impact energy can be dispersed and absorbed in the front-rear direction of the impact absorbing member I120. Therefore, even when the impact such as the pole side collision is applied to any of the local areas in the front-rear direction, large local impact energy can be efficiently absorbed by the entire impact absorbing member I120 while suppressing the deformation of the entire impact absorbing member I120. Further, since the direction of the ridge line RL is substantially parallel to the vehicle width direction along the direction of the impact load, when the impact load is applied, the impact absorbing member I120 can be buckled in a lantern buckling mode as described later, which has a high energy absorption amount.

As shown in FIG. 66, the wave shape of the web I121 of the impact absorbing member I120 has a shape that repeats bending alternately up and down at a predetermined pitch 2D (twice length D, for example, 120 mm) and a predetermined height H (distance from a center of a sheet thickness tw at an upper end portion of the impact absorbing member I120 to a center of a sheet thickness tw at a lower end portion of the impact absorbing member I120, twice amplitude, for example, 30 mm) when viewed from the vehicle width direction.

Specifically, the web I121 has the first horizontal plane portion I121*a* extending in the front-rear direction (extending to the right and left when viewed in the vehicle width direction) with a predetermined length. Further, the web I121 has the first vertical plane portion I121*b* that bends downward (for example, at an angle of about 120°) and extends diagonally at a predetermined height H (for example, 30 mm) following the first horizontal plane portion I121*a*. Further, the web I121 has the second horizontal plane portion I121*c* that bends in the front-rear direction and extends in the front-rear direction with a predetermined length, following a lower portion of the first vertical plane portion I121*b*. Further, the web I121 has the second vertical plane portion I121*d* that bends upward (for example, at an angle of about 120°), extends diagonally at the predetermined height H, and continues to the next horizontal plane portion, following the second horizontal plane portion I121*c*.

The first horizontal plane portion I121*a*, the first vertical plane portion I121*b*, the second horizontal plane portion I121*c*, and the second vertical plane portion I121*d* are periodically repeated in the front-rear direction to form a wave shape. The bent portion may be formed so as to draw an arc with a predetermined radius of curvature (for example, 5 mm).

Here, under a condition that the joint portion of the web I121, and the vehicle outer flange I122 and the vehicle inner flange I123 is provided at 70% or more of a length of each of the first horizontal plane portion I121*a* and the second horizontal plane portion I121*c*, within the following numerical range regarding the dimensions of the impact absorbing member I120, a sufficient absorption amount of impact absorbed energy, which will be described later, can be secured.

Here, as the above-mentioned numerical range, the pitch 2D is within the range of 60 mm or more and 180 mm or less. The height H is 20 mm or more and 60 mm or less, preferably within the range of 20 mm or more and 50 mm or less. Each of the first horizontal plane portion I121*a* and the second horizontal plane portion I121*c* is 30 mm or more and 90 mm or less. An angle formed by the first horizontal plane portion I121*a* with the first vertical plane portion I121*b* or the second vertical plane portion I121*d* coincides with an angle formed by the second horizontal plane portion I121*c* with the first vertical plane portion I121*b* or the second vertical plane portion I121*d* within in the range of a difference of up to ±2.0°, and the angle is within the range of 450 or more and 1350 or less. An overall width of the impact absorbing member I120 is 120 mm or more and 180 mm or less.

The wave shape is not limited to the above. For example, under a condition that the joint portion of the web I121, and the vehicle outer flange I122 and the vehicle inner flange I123 can be secured at least 40% or more in terms of a line length ratio of the end portion of the web I121 on the vehicle outer flange I122 side and the vehicle inner flange I123 side, for example, when viewed in the vehicle width direction, the wave shape may be such that an upwardly convex arc and a downwardly convex arc are alternately repeated or may be a shape like a sine curve. The dimensions of the wave shape such as pitch 2D and height H do not have to be constant over the longitudinal direction. A D/H value and a D/tw value are set to appropriate values from the viewpoint of crushing in an appropriate buckling mode to obtain high absorbed energy.

The web I121 of the impact absorbing member I120 can be easily formed by pressing, using a wave-shaped press die, a flat sheet material having a predetermined sheet thickness tw (for example, 1.0 mm, 1.2 mm, 1.6 mm, 2.0 mm, 2.3 mm), a predetermined width B (100 mm or more and 200 mm or less depending on the dimensions of the vehicle body I1, for example, 150 mm), and a predetermined overall length L (1,500 mm or more and 3,000 mm or less depending on the dimensions of the vehicle body I1, for example, 2,000 mm), or repeating bending the flat sheet material up and down alternately. The sheet thickness tw of the web I121 is preferably 0.7 mm or more and 2.6 mm or less from the viewpoint of suppressing bending deformation around the Z direction while ensuring the amount of energy absorbed by crushing. The sheet thickness tw of the web I121 is preferably 1.2 mm or more and 2.6 mm or less. Further, the sheet thickness tw of the web I121 is preferably 1.0 mm or more and 2.3 mm or less from the viewpoint of energy absorption stability and advanced weight reduction. Further, the sheet thickness tw of the web I121 is preferably 1.2 mm or more and 2.0 mm or less from the viewpoint of further improving energy absorption stability and formability.

Further, from the viewpoint of suppressing the bending deformation around the Z direction while ensuring the amount of energy absorbed by crushing, it is preferable that the sheet thickness tw of the web I121 is equal to or less than a sheet thickness tf of each of the vehicle outer flange I122 and the vehicle inner flange I123.

Figure 67:
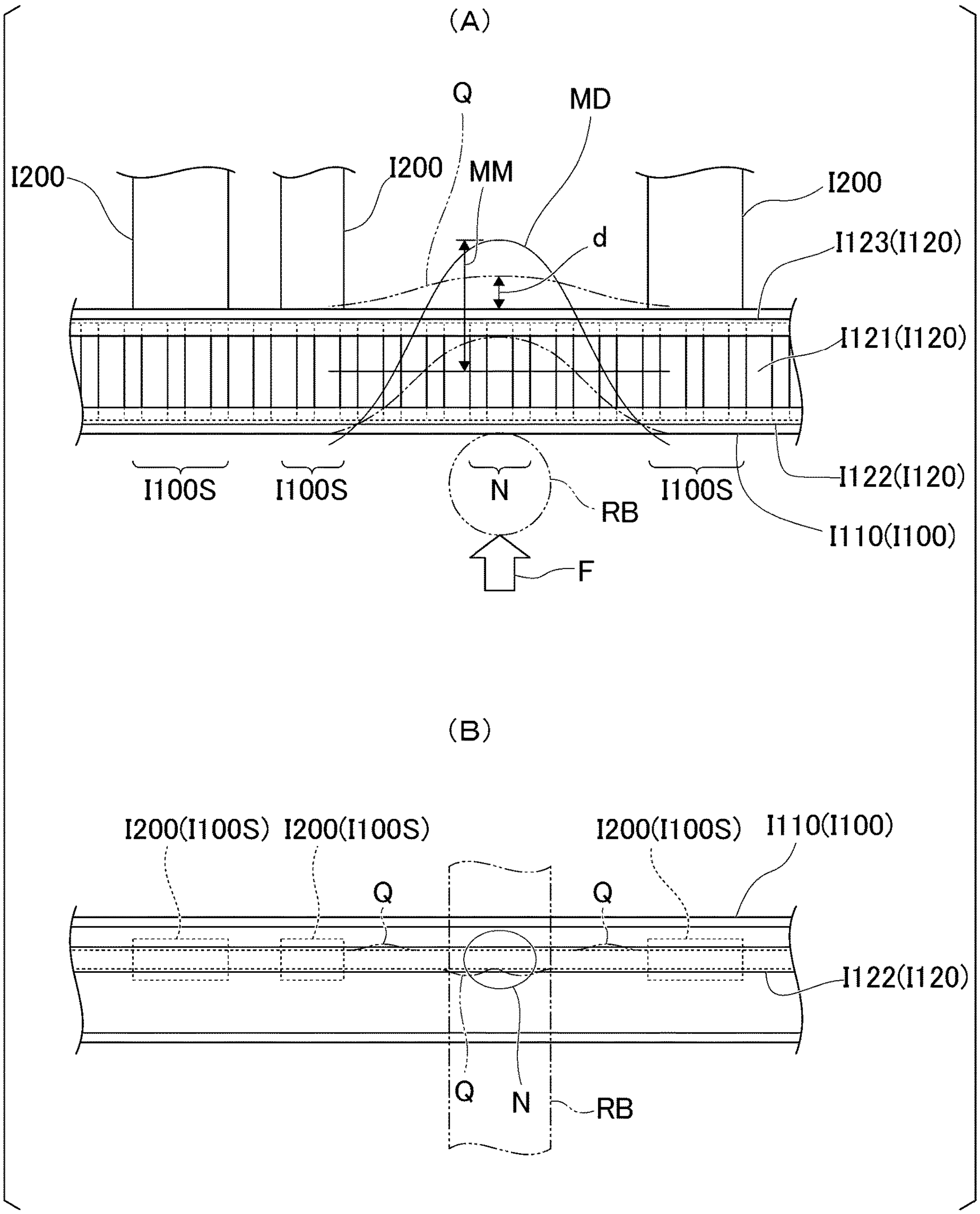
FIG. 67 is a view for describing a bending moment distribution acting on the lateral surface member structure and a deformation mode of the lateral surface member structure according to the first embodiment, (A) of FIG. 67 is a plan view, and (B) of FIG. 67 is a side view.

In particular, under a weight-equivalent structural condition that the structures of the web I121, the vehicle outer flange I122, and the vehicle inner flange I123 are the same except for the sheet thickness, and the weights per unit length along the longitudinal direction of the impact absorbing member I120 are equal to each other, when the input conditions such as the impact load on the lateral surface member structure I100 are the same, as the sheet thickness tf of each of the vehicle outer flange I122 and the vehicle inner flange I123 becomes thicker than the sheet thickness tw of the web I121, an intrusion amount d (refer to (A) of FIG. 67), which is a maximum deformation amount of the lateral surface member structure I100 into the inside of the vehicle becomes smaller.

Here, as shown in (A) and (B) of FIG. 67, an experiment was conducted, in which in the lateral surface member structure I100 including the impact absorbing member I120, the lateral surface member structure I100 was supported by the intersecting member I200, and in a state where a columnar rigid body RB imitating an obstacle was in contact with the lateral surface of the lateral surface member structure I100, deformation including the intrusion amount d was measured when a load F was applied to the rigid body RB in the vehicle width direction from the outside of the vehicle to the inside of the vehicle.

In the impact absorbing member I120, for example, the sheet thickness tw of the steel web I121 having a tensile strength of 980 MPa is 2.0 mm, and the sheet thickness tf of each of the steel vehicle outer flange I122 and vehicle inner flange I123 having a tensile strength of 980 MPa is 3.6 mm.

As a result of the experiment, the intrusion amount d was 57 mm. Further, for example, the same experiment as above was performed when the sheet thickness tw of the web I121 was 3.1 mm and the sheet thickness tf of each of the vehicle outer flange I122 and the vehicle inner flange I123 was 1.8 mm without changing other conditions, the intrusion amount d was 91 mm.

Therefore, from the viewpoint of reducing the intrusion amount d and protecting the battery case I20, the sheet thickness tf of each of the vehicle outer flange I122 and the vehicle inner flange I123 is preferably equal to or more than the sheet thickness tw of the web I121. Further, from the viewpoint of further ensuring the rigidity and further reducing the weight, it is desirable that tf is 3.0 mm or more and 4.5 mm or less under the condition of tf≥tw. Further, from the viewpoint of further improving the energy absorption stability, it is more desirable that tf is 3.3 mm or more and 4.2 mm or less.

Further, the web I121 has a shape in which bending is alternately repeated up and down at the predetermined pitch 2D and at the predetermined height H when viewed in the vehicle width direction. Therefore, the entire impact absorbing member I120 does not generate a buckling deformation (overall buckling mode) in which the entire impact absorbing member I120 is bent around the X direction at a local area in the vehicle width direction, and can generate a bellows-shaped, paper lantern-shaped, or intestinal filling structure (boudinage)-shaped buckling deformation (lantern buckling mode). Therefore, the buckling proof stress of the impact absorbing member I120 can be efficiently used in a wide range of the cross section perpendicular to the vehicle width direction, and when the load reaches the maximum load (peak load) as in the overall buckling mode, the load is not immediately reduced, the deformation does not proceed, and the buckling deformation can be performed while maintaining a high load. Therefore, the deformation amount can be suppressed while maintaining a large amount of energy absorption. The lantern buckling mode is a buckling deformation that continuously undulates in small steps without being biased in the front-rear direction and the up-down direction along the vehicle width direction and is expanded or contracted repeatedly in the direction perpendicular to the vehicle width direction.

The vehicle outer end portion I121*e* of the web I121 is joined to the vehicle outer flange I122. As a result, when an impact load is input from the vehicle outer side of the tubular body I110, the impact load is not locally biased from the tubular body I110 to the vehicle outer end portion I121*e* of the web I121 via the vehicle outer flange I122, and the impact load can be dispersed and uniformly transmitted to the cross section perpendicular to the vehicle width direction. Therefore, the lantern buckling mode can be stably generated for the impact absorbing member I120, and high absorbed energy can be obtained. Further, when an impact load acts on the impact absorbing member I120 in the vehicle width direction, the vehicle outer flange I122 on which the compressive stress mainly acts resists the bending moment. Further, the second moment of area around the Z direction of the impact absorbing member I120 efficiently increases. Therefore, the bending deformation of the impact absorbing member I120 around the Z direction can be suppressed.

The vehicle inner end portion I121*i* of the web I121 is joined to the vehicle inner flange I123. As a result, when an impact load is input to the tubular body I110 from the outside of the vehicle, the load transmitted from the tubular body I110 via the vehicle outer flange I122 and the web I121 is not locally biased, and the load can be distributed and uniformly transmitted in the front-rear direction as a tensile force acting on the cross section perpendicular to the front-rear direction of the vehicle inner flange I123. Therefore, when the impact load acts on the impact absorbing member I120 in the vehicle width direction, the vehicle inner flange I123 on which the tensile stress mainly acts resists the bending moment around the Z direction. Further, the second moment of area around the Z direction of the impact absorbing member I120 is efficiently increased. Therefore, the bending deformation of the impact absorbing member I120 around the Z direction can be suppressed.

The web I121 is compressed in the up-down direction in a state of being sandwiched from above and below by the rib I122R. Similarly, the web I121 is compressed in the up-down direction in a state of being sandwiched from above and below by the rib I123R. For example, by fitting the vehicle outer end portion I121*e* and the vehicle inner end portion I121*i* of the web I121 into the vehicle outer flange I122 and the vehicle inner flange I123, the web I121 can be compressed in the up-down direction in the state of being sandwiched by the ribs I122R and I123R from above and below.

In this way, since the web I121 is compressed in the up-down direction, the web I121, the vehicle outer flange I122, and the vehicle inner flange I123 are less likely to be displaced due to friction with each other, and can be easily joined to each other. Therefore, the impact absorbing member I120 can be easily assembled. Further, since the web I121 is compressed in the up-down direction, the buckling load in the vehicle width direction can be increased. Therefore, the impact energy can be efficiently absorbed.

The web I121 may have different tensile strength on the inside of the vehicle and on the outside of the vehicle. For example, the web I121 may have a higher tensile strength on the outside of the vehicle than on the inside of the vehicle. Alternatively, the web I121 may have a higher tensile strength on the inside of the vehicle than on the outside of the vehicle.

The end portion in the front-rear direction of the impact absorbing member I120 may be joined to the end portion in the front-rear direction of the tubular body I110. As a result, after the impact absorbing member I120 is inserted into the tubular body I110, the impact absorbing member I120 can be joined to the tubular body I110. In the impact absorbing member I120, the middle portion excluding the end portion in the front-rear direction is not joined to the tubular body I110, and only the end portion in the front-rear direction of the impact absorbing member I120 may be joined to the end portion in the front-rear direction of the tubular body I110. As a result, after the impact absorbing member I120 is inserted into the tubular body I110, only the end portion of the impact absorbing member I120 may be joined to the tubular body I110, and the middle portion may not be joined. Therefore, manufacturing efficiency can increase.

The sheet thickness tfe of the vehicle outer flange I122 and the sheet thickness tfi of the vehicle inner flange I123 may be uniform in the front-rear direction. The optimum dimensions of the sheet thickness tfe of the vehicle outer flange I122 and the sheet thickness tfi of the vehicle inner flange I123 may vary depending on design conditions. Under general design conditions, when the sheet thickness tfe of the vehicle outer flange I122 and the sheet thickness tfi of the vehicle inner flange I123 are 1.3 times or more and 3.8 times or less the sheet thickness of the web I121*tw*, preferably 1.6 times or more and 3.0 times or less, more preferably 2.0 times or more and 2.5 times or less, it is desirable because it is found that mass efficiency of the impact absorbed energy is improved.

(Action)

Next, action when the vehicle body I1 collides with a pole-shaped obstacle such as a utility pole installed on a ground surface and an impact load (impact energy) is input to the lateral surface member structure I100 from the outside of the vehicle will be described.

FIG. 67 is a view for describing a bending moment distribution MD acting on the lateral surface member structure I100 and a deformation mode Q of the impact absorbing member I120 according to the first embodiment, (A) of FIG. 67 is a plan view, and (B) of FIG. 67 is a side view. In FIG. 67, solid lines show the shape of the impact absorbing member I120 before the deformation. Two-dot chain lines show the shape of the deformed impact absorbing member I120 and the rigid body RB imitating an obstacle.

When the vehicle body I1 collides with a pole-shaped obstacle such as a utility pole installed on the ground surface, first, the pole-shaped obstacle comes into contact with the vehicle outside of the tubular body I110, and the tubular body I110 is pushed and locally deformed to the inside of the vehicle.

Then, following the deformation of the tubular body I110, the vehicle outer flange I122 of the impact absorbing member I120 is pushed to the inside of the vehicle, and bent and deformed around the Z direction. Then, following the deformation, the vehicle outer end portion I121*e* of the web I121 of the impact absorbing member I120 is deformed so as to be locally crushed. At this time, when the web I121 is deformed while resisting to a certain load, buckling occurs in the web I121 in the vehicle width direction. Here, the buckling mode is a higher-order mode, the buckling occurs uniformly in the cross section perpendicular to the vehicle width direction when viewed locally, and thus, the web I121 is further deformed in a state of being subjected to a high load.

As the deformation progresses, the buckling in the higher-order mode occurs continuously in the vehicle width direction, and the web I121 is locally crushed into a lantern-like shape that continuously undulates in small steps in the vehicle width direction. Then, a portion adjacent to the local area in the front-rear direction is also involved in the local deformation and crushed.

Here, as shown in FIG. 67, since the impact absorbing member I120 has a shape (deformation mode Q) as shown by the two-dot chain lines due to the impact energy, the impact absorbing member I120 is deformed so as to bend to the inside of the vehicle while being locally crushed. In this case, the deformation in the Z direction is suppressed by effects of the increase in the second moment of areas around the Y direction and around the Z direction and the second moment of area around the X direction in the impact absorbing member I120 due to the vehicle outer flange I122 and the vehicle inner flange I123. In this way, since the deformation in the Z direction can be suppressed, even when the impact absorbing member I120 is crushed in the vehicle width direction while effectively absorbing the impact energy, it is possible to maintain the bending rigidity around the Z direction and suppress deformation inward of the vehicle.

In this way, in the lateral surface member structure I100, by cooperating with the tubular body I110 and the impact absorbing member I120, it is possible to absorb the impact energy caused by the local pole side collision while suppressing the deformation of the lateral surface member structure I100 toward the inside of the vehicle. Therefore, the battery pack I21 disposed on the inside of the vehicle from the lateral surface member structure I100 can be effectively protected.

Here, the sheet thickness tfe of the vehicle outer flange I122 and the sheet thickness tfi of the vehicle inner flange I123 may have different portion in the front-rear direction according to the bending moment distribution MD (refer to FIG. 67) generated in the cross section of the tubular body I110 perpendicular to the front-rear direction when a load is applied to the middle portion of the tubular body I110 excluding the support portion I100S in the vehicle width direction. For example, when a load is applied to the middle portion of the tubular body I110 excluding the support portion I100S in the vehicle width direction, the sheet thickness tfe of the vehicle outer flange I122 and the sheet thickness tfi of the vehicle inner flange I123 of a portion N, in which the bending moment around the Z direction generated in the cross section perpendicular to the front-rear direction of the tubular body I110 becomes the maximum bending moment MM which is largest, may be relatively large. As a result, the maximum value of the bending deformation (deformation inward of the vehicle) of the impact absorbing member I120 around the Z direction can be efficiently suppressed. Therefore, the maximum value of the bending deformation of the lateral surface member structure I100 can be efficiently suppressed.

(Manufacturing Method)

Next, a method of manufacturing the lateral surface member structure I100 will be described.

(1) First, the tubular body I110 is prepared (tubular body preparation step). Specifically, the vehicle outer tubular body I110A and the vehicle inner tubular body 1110B are combined to form a tubular body I110 extending in the front-rear direction.

(2) Next, the impact absorbing member I120 is prepared (impact absorbing member preparation step). Specifically, the vehicle outer flange I122 and the vehicle inner flange I123 are provided at both end portions of the web I121. Then, the rib I123R of the vehicle outer flange I122 and the vehicle inner flange I123 and the web I121 are welded and joined by arc welding or the like.

(3) Next, the impact absorbing member I120 is inserted into the tubular body I110 from the end portion of the tubular body, which is at least one end portion of the tubular body I110 (insertion step).

(4) Finally, the end portion of the tubular body and the impact absorbing member end portion which is at least one end portion of the impact absorbing member I120 are joined (joining process).

In this way, it is not essential to join the middle portion of the tubular body I110 and the middle portion of the impact absorbing member I120, but only by joining the end portion of the tubular body I110 and the end portion of the impact absorbing member I120, the tubular body I110 and the impact absorbing member I120 can be assembled. Therefore, by inserting the impact absorbing member I120 after the tubular body I110 is completed, the lateral surface member structure I100 can be manufactured. Therefore, the lateral surface member structure I100 having a high impact absorbed energy absorption amount and high bending rigidity can be easily manufactured.

Second Embodiment

Next, a lateral surface member structure I500 according to a second embodiment will be described. The lateral surface member structure I500 according to the second embodiment is mainly different from the lateral surface member structure I100 according to the first embodiment in that a web I521 is formed by arranging a plurality of pipes I521*p* having a central axis along a vehicle width direction along a front-rear direction. Hereinafter, descriptions of the parts common to the first embodiment and the second embodiment may be omitted.

Figure 68:
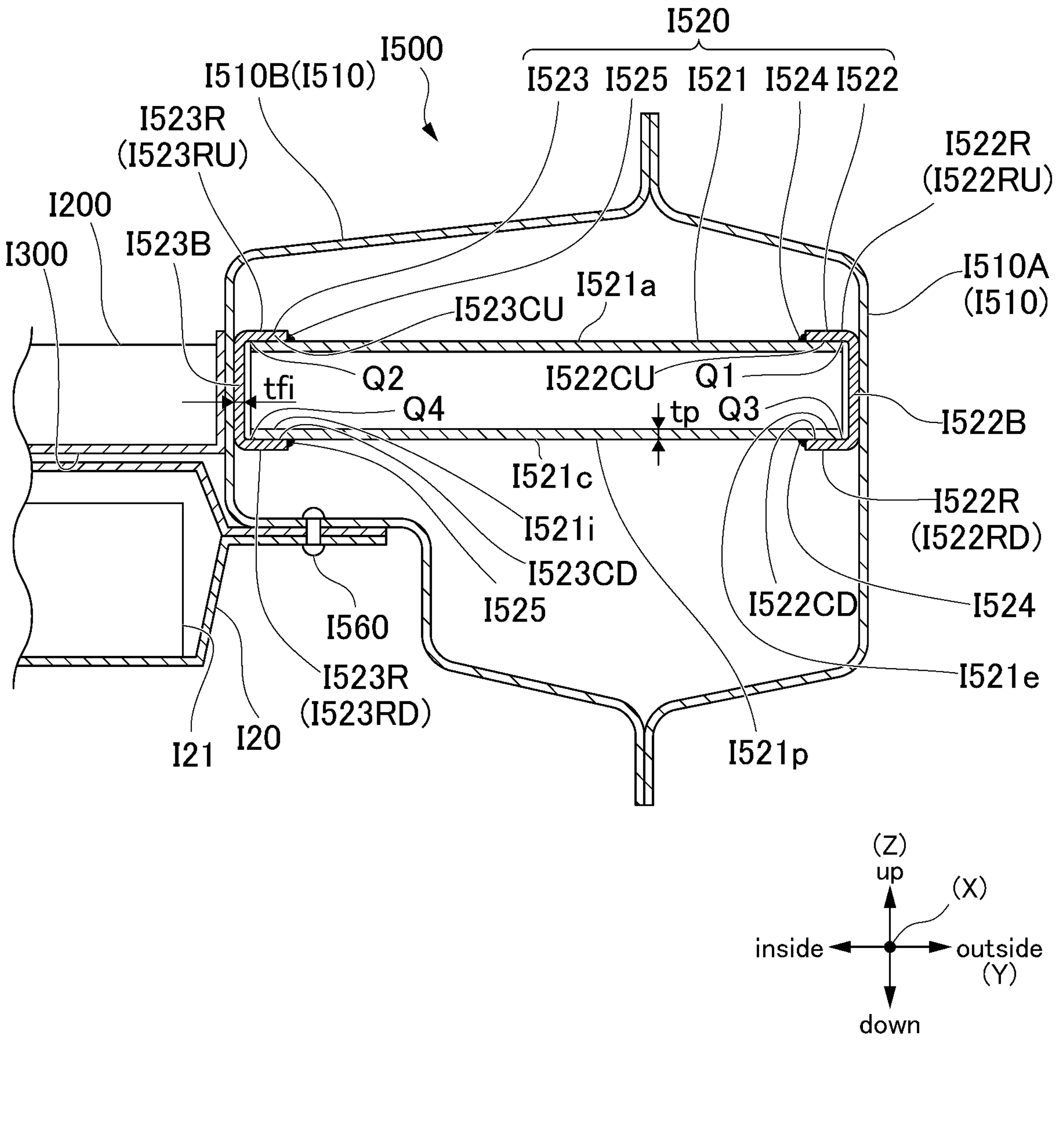
FIG. 68 is a cross-sectional view taken along line A in FIG. 62 showing a lateral surface member structure according to a second embodiment.
Figure 69:
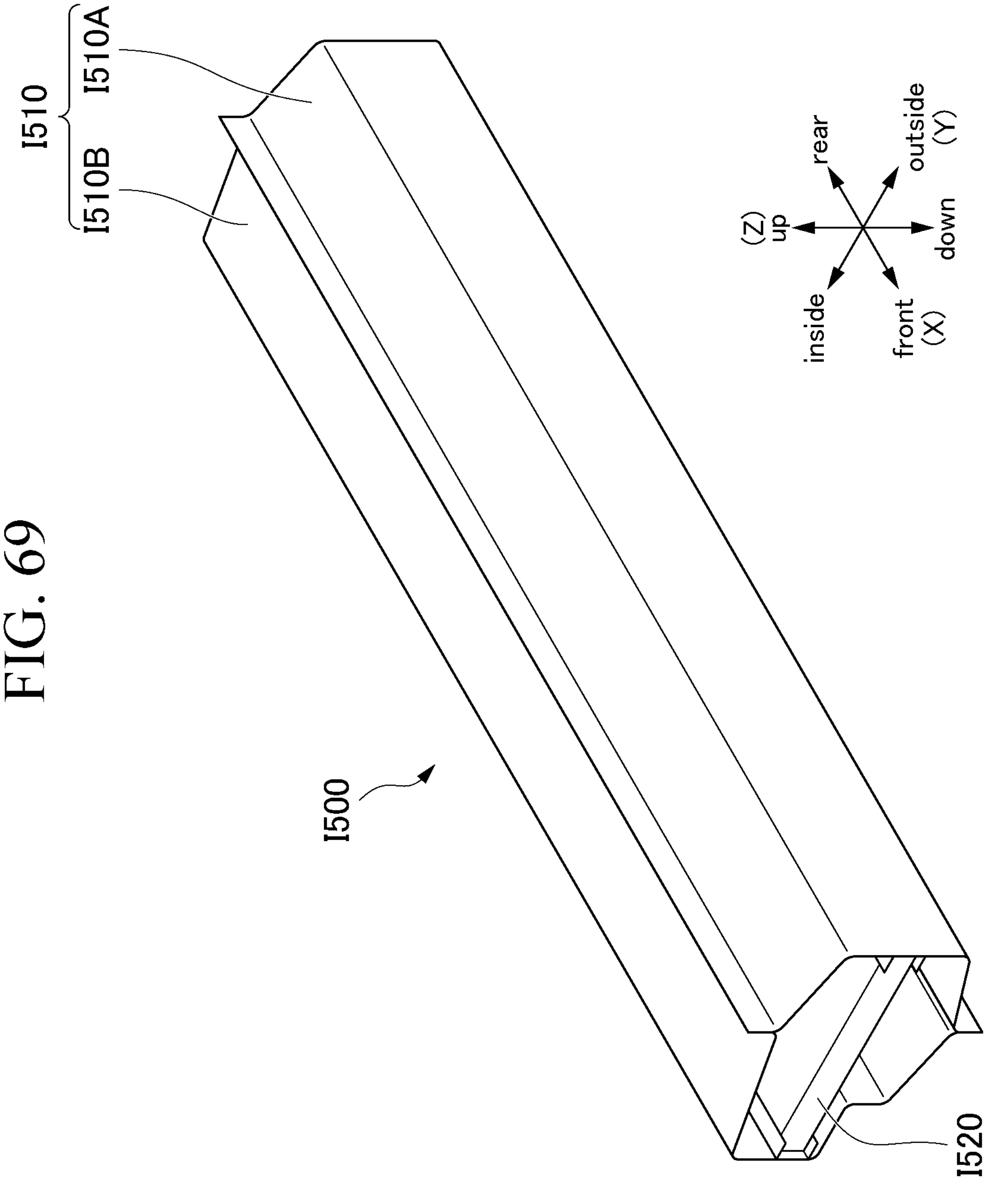
FIG. 69 is a cross-sectional perspective view showing a part of the lateral surface member structure according to the second embodiment.
Figure 70:
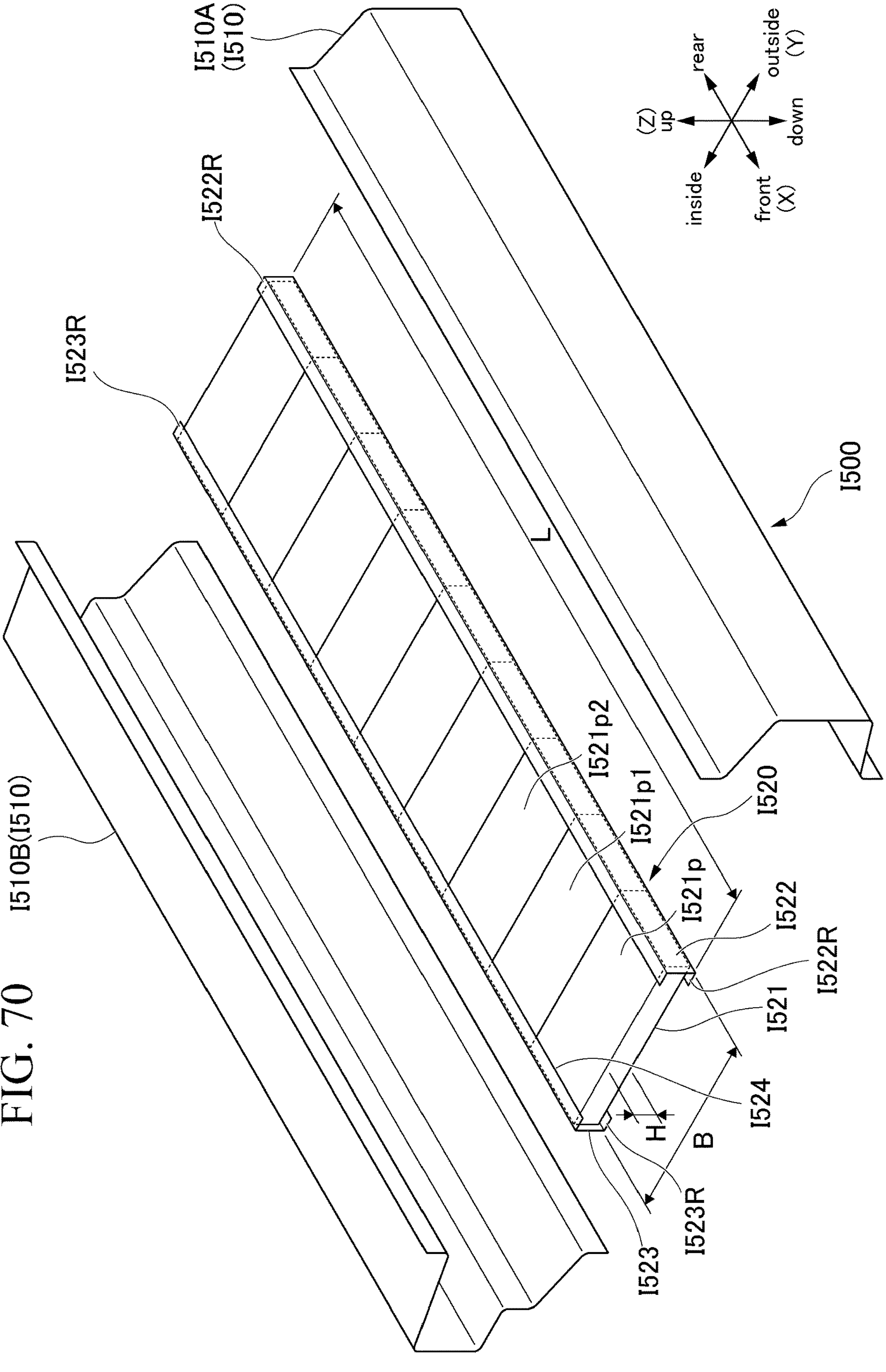
FIG. 70 is an exploded perspective view showing a part of the lateral surface member structure according to the second embodiment.
Figure 71:
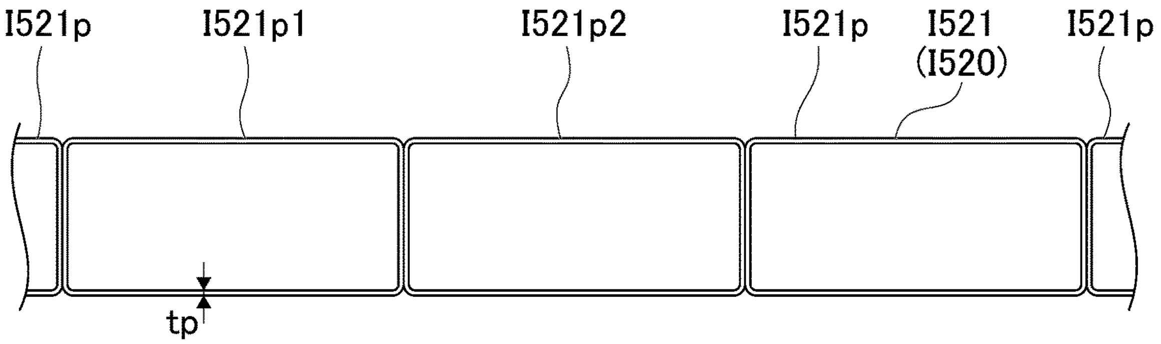
FIG. 71 is a side view showing a part of a web according to the second embodiment.

FIG. 68 is a cross-sectional view taken along line A in FIG. 62, showing the lateral surface member structure I500 according to the second embodiment. FIG. 69 is a cross-sectional perspective view showing a part of the lateral surface member structure I500 according to the second embodiment. FIG. 70 is an exploded perspective view showing a part of the lateral surface member structure I500 according to the second embodiment. FIG. 71 is a side view showing a part of the web I521 according to the second embodiment.

As shown in FIG. 68, the lateral surface member structure I500 is supported by the intersecting member I200 in the vehicle width direction (lateral direction). The intersecting member I200 supports a floor panel I300. The lateral surface member structure I500 is connected to a battery case I20 via a fastener I560.

As shown in FIGS. 69 to 71, the lateral surface member structure I500 according to the second embodiment includes a tubular body I510 extending in the front-rear direction of a vehicle body I1 and an impact absorbing member I520 disposed inside the tubular body I510.

(Tubular Body)

The tubular body I510 has a hollow elongated structure. In the tubular body I510, a longitudinal direction of the tubular body I510 is disposed along the front-rear direction of the vehicle body I1. The tubular body I510 is divided into two parts, and has a vehicle outer tubular body I510A on the outer side of the vehicle and a vehicle inner tubular body I510B on the inner side of the vehicle.

(Impact Absorbing Member)

In the impact absorbing member I520, a longitudinal direction of the impact absorbing member I520 is disposed inside the tubular body I510 along the front-rear direction of the vehicle body I1.

The impact absorbing member I520 includes a web I521 extending along the front-rear direction of the vehicle body I1 and flat in the vehicle width direction of the vehicle body I1, a vehicle outer flange I522 joined to a vehicle outer end portion I521*e* of the web I521 and extending along the front-rear direction, and a vehicle inner flange I523 joined to a vehicle inner end portion I521*i* of the web I521 and extending along the front-rear direction. The vehicle outer flange I522 and the vehicle inner flange I523 includes ribs I522R and I523R disposed so as to sandwich the web I521 from above and below and extending along the front-rear direction.

Specifically, as shown in FIG. 68, a cross section of the vehicle outer flange I522 perpendicular to the front-rear direction is a substantially C shape (groove shape) including a base portion I522B which extends in the up-down direction and an upper rib I522RU and a lower rib I522RD which extend to the inside of the vehicle from both upper and lower end portions of the base portion I522B. The cross-sectional shape of the vehicle outer flange I522 may be uniform along the front-rear direction.

Similarly, the cross section of the vehicle inner flange I523 perpendicular to the front-rear direction is a substantially C shape including a base portion I523B which extends in the up-down direction and an upper rib I523RU and a lower rib I523RD which extend to the outside of the vehicle from both upper and lower end portions of the base portion I523B. The cross-sectional shape of the vehicle inner flange I523 may be uniform along the front-rear direction.

The vehicle outer flange I522 is joined to a vehicle outer end portion I521*e* of the web I521, for example, by welding. Specifically, the impact absorbing member I520 forms a joint portion I524 at a boundary portion between the vehicle outer flange I522 and the web I521.

Similarly, the vehicle inner flange I523 is joined to a vehicle inner end portion I521*i* of the web I521, for example, by welding. Specifically, the impact absorbing member I520 forms a joint portion I525 at the boundary portion between the vehicle inner flange I523 and the web I521.

The web I521 and the rib I522R or the web I521 and the rib I523R are joined to each other. Thereby, a dimensional error of a positional relationship between the web I521 and the vehicle outer flange I522 or the vehicle inner flange I523 can be absorbed. Further, after assembling the web I521 and the rib I522R or the rib I523R, they can be joined to each other. Therefore, it is easy to manufacture. Further, a sectional stress can be continuously and reliably transmitted between the web I521 and the vehicle outer flange I522 or the vehicle inner flange I523 via the rib I522R or the rib I523R.

From the viewpoint of reducing the welding man-hours, the joint portion I525 may be formed only at the boundary portion between the rib I523R of the vehicle inner flange I523 and the web I521 by, for example, fillet welding.

A vehicle inner surface of the base portion I522B of the vehicle outer flange I522 and a vehicle outer end surface of the web I521 may be in contact with each other or may be separated from each other. When there is a gap between the vehicle inner surface of the base portion I522B of the vehicle outer flange I522 and the vehicle outer end surface of the web I521, a dimensional tolerance of the web I521 in the vehicle width direction can be absorbed by the gap, and a dimension of the impact absorbing member I520 in the vehicle width direction can be easily adjusted so as to match an internal dimension of the tubular body I510 in the vehicle width direction. Similarly, a vehicle outer surface of the base portion I523B of the vehicle inner flange I523 and a vehicle inner end surface of the web I521 may be in contact with each other or may be separated from each other.

Here, as shown in FIG. 68, in the upper rib I522RU of the vehicle outer flange I522 and the upper rib I523RU of the vehicle inner flange I523, it is preferable that the lower surfaces I522CU and I523CU are provided along an upper end (here, upper surface of the first horizontal plane portion I521*a*) of the web I521 to restrain the deformation of the web I521 in the upward direction. That is, the lower surfaces I522CU and I523CU of the upper rib I522RU and the upper rib I523RU may be parallel to the upper surface of the first horizontal plane portion I521*a* without any gap.

Further, it is preferable that the lower surfaces I522CU and I523CU of the upper rib I522RU of the vehicle outer flange I522 and the upper rib I523RU of the vehicle inner flange I523 are in contact with the upper surface of the first horizontal plane portion I521*a*.

Further, it is preferable that the lower surface I522CU of the upper rib I522RU is in contact with at least a vehicle outermost end Q1 of the first horizontal plane portion I521*a*, and the lower surface I523CU of the upper rib I523RU is in contact with at least a vehicle innermost end Q2 of the first horizontal plane portion I521*a*.

Similarly, in the lower rib I522RD of the vehicle outer flange I522 and the lower rib I523RD of the vehicle inner flange I523, it is preferable that upper surfaces I522CD and I523CD are provided along a lower end (here, lower surface of the second horizontal plane portion I521*c*) of the web I521 to restrain the deformation of the web I521 in the downward direction. That is, the upper surfaces I522CD and I523CD of the lower rib I522RD and the lower rib I523RD may be parallel to the lower surface of the second horizontal plane portion I521*c* without any gap.

Further, it is preferable that the upper surfaces I522CD and I523CD of the lower rib I522RD of the vehicle outer flange I522 and the lower rib I523RD of the vehicle inner flange I523 are in contact with the lower surface of the second horizontal plane portion I521*c*.

Further, it is preferable that the upper surface I522CD of the lower rib I522RD is in contact with at least a vehicle outermost end Q3 of the second horizontal plane portion I521*c*, and the upper surface I523CD of the lower rib I523RD is in contact with at least a vehicle innermost end Q4 of the second horizontal plane portion I521*c*.

As a result, the vehicle outer flange I522 and the vehicle inner flange I523 appropriately restrain the deformation of both end portions of the web I521 in the vehicle width direction, and thus, a buckling load of the web I521 can increase.

As shown in FIGS. 70 and 71, the web I521 of the impact absorbing member I520 is formed by arranging the plurality of pipes I521*p* having the central axis along the vehicle width direction in the front-rear direction.

Each pipe I521*p* has, for example, a rectangular cross section perpendicular to the central axis along the vehicle width direction. The cross section is a rectangular shape flat in the front-rear direction. Each pipe I521*p* has, for example, a sheet thickness tp of about 1 mm. Each pipe I521*p* is made of steel, for example, and has a tensile strength of 980 MPa.

As described above, since the web I521 of the impact absorbing member I520 is formed by arranging the plurality of pipes I521*p* having the central axis along the vehicle width direction along the front-rear direction, there is no unevenness in the front-rear direction and the bending rigidity (second moment of area) around the X direction is high. Therefore, in the elastic property region, the impact absorbing member I520 can be made difficult to bend around the X direction, and the buckling proof stress in the vehicle width direction can be enhanced. Further, since the central axis of the pipe I521*p* is substantially parallel to the vehicle width direction along the direction of the impact load, when the impact load is applied, the impact absorbing member I520 can be buckled in a buckling mode which has a high energy absorption amount.

The adjacent pipes I521*p* are joined to each other in a state where the flat surfaces of the pipes I521*p* are in contact with each other in the front-rear direction. That is, first pipe I521*p*1 and second pipe I521*p*2 adjacent to each other are joined to each other. As a result, even when an impact load due to a pole side collision is input to any of the local areas of the lateral surface member structure I500 in the front-rear direction, the adjacent first pipe I521*p*1 and the second pipe I521*p*2 are joined to each other. Accordingly, as a group of the pipes I521*p* in the local area is crushed and deformed, the group of the pipes I521*p* in front of and behind the local area is also deformed and crushed. Therefore, the impact energy can be dispersed and absorbed in the front-rear direction of the impact absorbing member I520. Therefore, even when the impact such as a pole side collision is applied to any of the regions in the front-rear direction, large local impact energy can be efficiently absorbed by the entire impact absorbing member I520 while suppressing the deformation of the entire impact absorbing member I520.

OTHER EMBODIMENTS

The form of the web in the impact absorbing member is not limited to the web I121 in the first embodiment or the web I521 in the second embodiment. The web in the impact absorbing member may be, for example, a porous body made of metal, preferably steel.

Further, in the above-mentioned first embodiment and the second embodiment, the case where the impact absorbing member I120 or the impact absorbing member I520 is used alone has been described. However, the present invention is not limited to this, and with respect to the single tubular body I110 or I510, a plurality of the impact absorbing members I120 may be used, a plurality of the impact absorbing members I520 may be used, and the plurality of impact absorbing members I120 and the plurality of impact absorbing members I520 may be used in combination. In these cases, the plurality of impact absorbing members I120 or the impact absorbing members I520 may be disposed up and down so as to be parallel to each other.

Example

Next, a result of a numerical analysis performed on the lateral surface member structure I100 of an example will be described. The lateral surface member structure I100 of the first embodiment as shown in FIGS. 62 to 67 was used as the example. Further, a lateral surface member structure that had the same mass as that of the impact absorbing member of the example, used an impact absorbing member including only web, and had the same other structures as those of the example was used as a comparative example. Numerical analysis was performed on structural models for the example and the comparative example.

Figure 72:
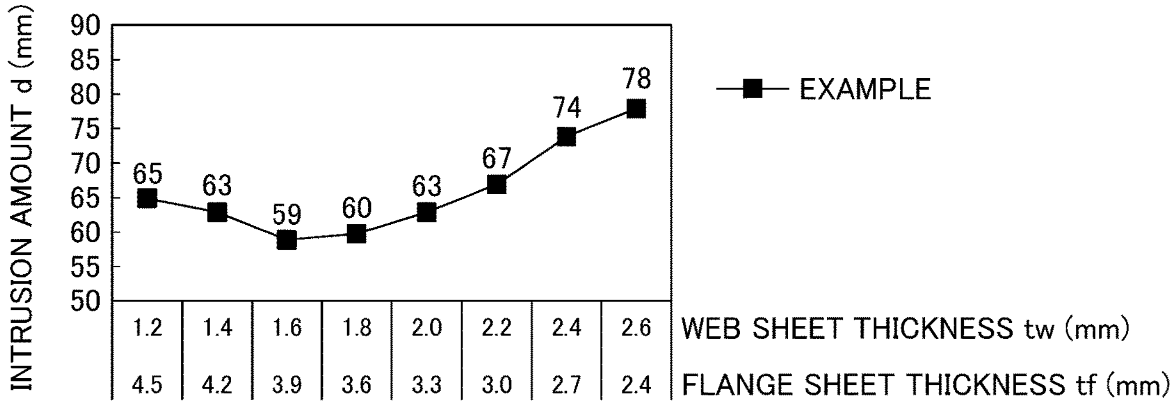
FIG. 72 is a diagram showing results of a numerical analysis of an intrusion amount.

FIG. 72 is a diagram showing a numerical analysis result of the intrusion amount d.

Specifically, as the example, as shown in FIGS. 62 to 67, a structural model of the lateral surface member structure I100 including the impact absorbing member I120, in which the web I121 having the sheet thickness tw and the vehicle outer flange I122 and the vehicle inner flange I123 each having the sheet thickness tf were assembled, was prepared.

The material of each of the web I121, the vehicle outer flange I122, and the vehicle inner flange I123 are all made of steel having a tensile strength of 980 MPa.

The sheet thickness tfe of the vehicle outer flange I122 and the sheet thickness tfi of the vehicle inner flange I123 were set to the same sheet thickness tf. The height H of the web I121 was set to 27 mm.

The overall width of the impact absorbing member I120 was set to 137 mm.

The upper surfaces of all the first horizontal plane portions I121*a* in the web I121 were fillet welded to the vehicle inner end surface of the upper rib I122RU of the vehicle outer flange I122 and the vehicle outer end surface of the upper rib I123RU of the vehicle inner flange I123.

The lower surfaces of all the second horizontal plane portions I121*c* in the web I121 were fillet welded to the vehicle inner end surface of the lower rib I122RD of the vehicle outer flange I122 and the vehicle outer end surface of the lower rib I123RD of the vehicle inner flange I123. A plurality of structural models including impact absorbing members I120 having different combinations of the sheet thickness tw and the sheet thickness tf as shown in FIG. 72 were prepared. The sheet thickness tw of the web I121 and the sheet thicknesses tf of the flanges I122 and I123 were combined so that the mass of the impact absorbing member I120 in which the vehicle outer flange I122, the vehicle inner flange I123, and the web I121 were combined was the same in all structural models.

The combination (tw, tf) of the sheet thickness tw of the web I121 and the sheet thicknesses tf of the flanges I122 and I123 was set to (1.2 mm, 4.5 mm), (1.4 mm, 4.2 mm), (1.6 mm, 3.9 mm), (1.8 mm, 3.6 mm), (2.0 mm, 3.3 mm), (2.2 mm, 3.0 mm), (2.4 mm, 2.7 mm), (2.6 mm, 2.4 mm).

Specifically, as the comparative example, a structural model of the lateral surface member structure including the impact absorbing member having the same structure as that of the example except that the vehicle inner flange I123 and the vehicle outer flange I122 were excluded and the web having the same overall width as that of the impact absorbing member I120 of the example was provided was prepared. That is, the shape of the impact absorbing member of the comparative example when viewed in the vehicle width direction is the same as the shape of the web I121 of the example. Then, a plurality of the comparative examples having different web sheet thicknesses tw were prepared, and the sheet thickness tw of the web of each comparative example was set to 1.2 mm, 1.4 mm, 1.6 mm, 1.8 mm, 2.0 mm, 2.2 mm, 2.4 mm, and 2.6 mm corresponding to the example.

Then, as shown (A) and (B) of FIG. 67, the numerical analysis was conducted, in which in the lateral surface member structure I100 of the example, in a state where the lateral surface member structure I100 was supported by the intersecting member I200 and in a state where a columnar rigid body RB imitating an obstacle was in contact with the lateral surface of the lateral surface member structure I100, reaction such as deformation including the intrusion amount d was calculated when a load F was applied to the rigid body RB in the vehicle width direction from the outside of the vehicle to the inside of the vehicle. Similarly, the numerical analysis was performed on the lateral surface member structure of the comparative example.

As a result, as shown in FIG. 72, the intrusion amount d in the example when (tw, tf) was (1.2 mm, 4.5 mm) was 65 mm. Similarly, the intrusion amount d was 63 mm when (tw, tf) was (1.4 mm, 4.2 mm), 59 mm when (tw, tf) was (1.6 mm, 3.9 mm), 60 mm when (tw, tf) was (1.8 mm, 3.6 mm), 67 mm when (tw, tf) was (2.0 mm, 3.3 mm), 63 mm when (tw, tf) was (2.2 mm, 3.0 mm), 74 mm when (tw, tf) was (2.4 mm, 2.7 mm), and 78 mm when (tw, tf) was (2.6 mm, 2.4 mm).

Meanwhile, the intrusion amount d in the comparative example was more than 90 mm in any of the sheet thicknesses tw of the web corresponding to the example, and was larger than the intrusion amount d in the example.

As described above, the lateral surface member structure I100 of the example has the vehicle outer flange joined to the vehicle outer end portion of the web I121 and the vehicle inner flange joined to the vehicle inner end portion of the web I121, the intrusion amount d can be surely reduced. Moreover, since the vehicle outer flange I122 and the vehicle inner flange I123 in the lateral surface member structure I100 of the example have ribs I122R and I123R disposed so as to sandwich the web I121 from above and below, the intrusion amount d can be surely reduced largely.

(Element Technology J)

Element Technology J is a tray manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion. The tray includes a bottom wall and a peripheral side wall erected from an outer periphery of the bottom wall, the tray including: a high-strength portion having a high tensile strength; and a low-strength portion having a tensile strength lower than that of the high-strength portion, in which the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

According to Element Technology J, it is possible to provide a rigid and lightweight tray.

A battery tray installed in a vehicle (vehicle body) is required to have high rigidity so as not to be excessively crushed in a vehicle width direction against an external force caused by side collisions of an obstacle or the like in order to protect a placed battery. In addition, the battery tray provided in the vehicle is preferably lightweight in order to improve fuel efficiency or electricity cost of the vehicle.

A tray of Element Technology J includes a bottom wall and a peripheral side wall erected from an outer periphery of the bottom wall. The tray includes a high-strength portion having a high tensile strength and a low-strength portion having a tensile strength lower than that of the high-strength portion. The low-strength portion includes a corner portion of the peripheral side wall having a first side wall surface of a first side wall and a second side wall surface of a second side wall forming a minor angle therebetween and a corner section of the bottom wall having a bottom wall surface having a minor angle to each of the first side wall surface and the second side wall surface in the corner portion. As a result, a region that mainly shares and receives an impact load acting on the tray from a vehicle width direction can be made into the high-strength portion, and a region that is difficult to press can be made into the low-strength portion. Therefore, the high-strength portion can prevent the tray from being plasticized at an early stage and greatly deformed, and can be made relatively lightweight. In addition, the low-strength portion makes it possible to easily manufacture the tray by pressing a steel sheet as a base metal. Therefore, a rigid and lightweight tray can be provided.

Hereinafter, embodiments of Element Technology J will be described.

Embodiment

Figure 73:
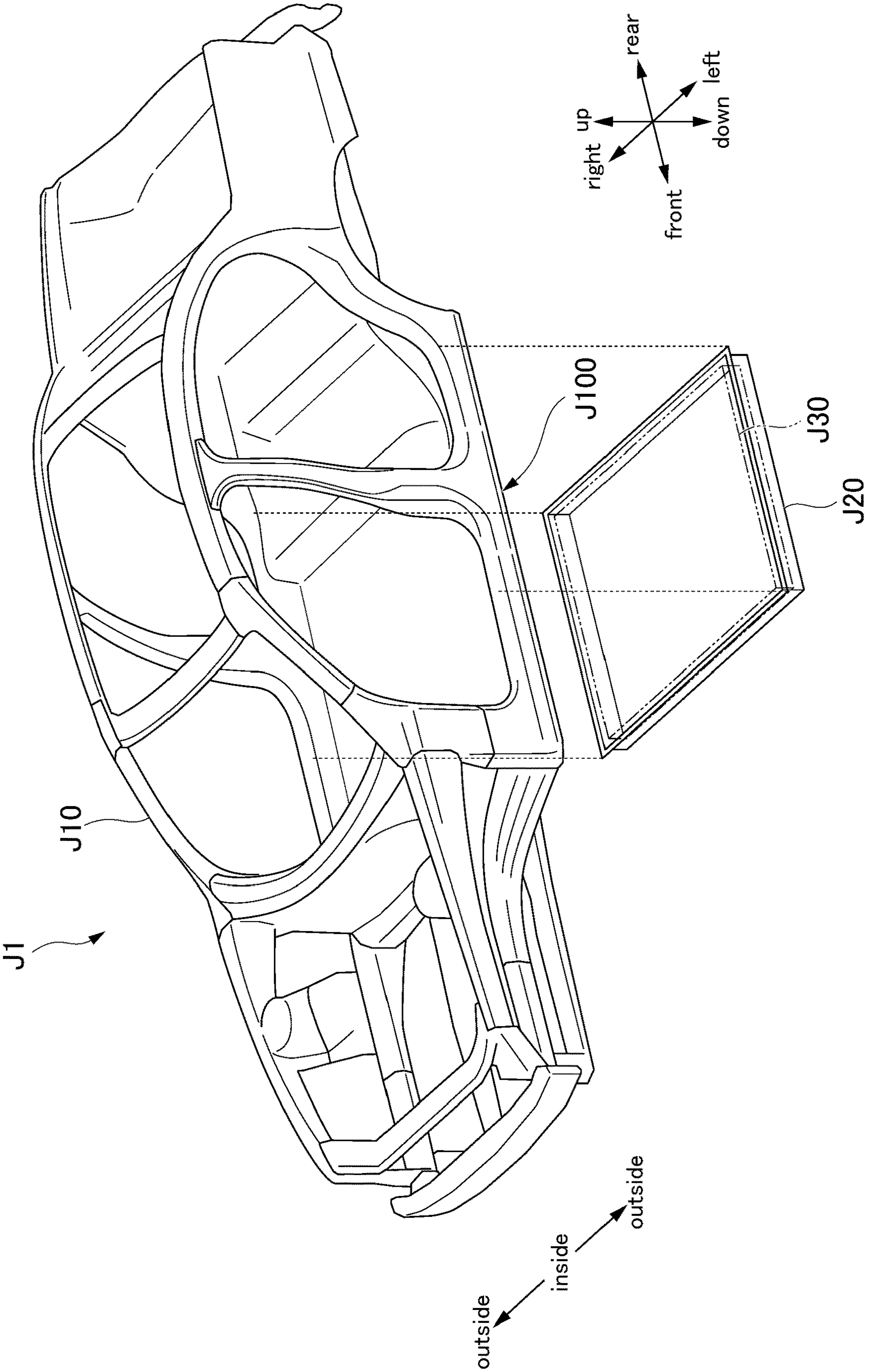
FIG. 73 is an explanatory drawing of a tray according to the present embodiment.
Figure 74:
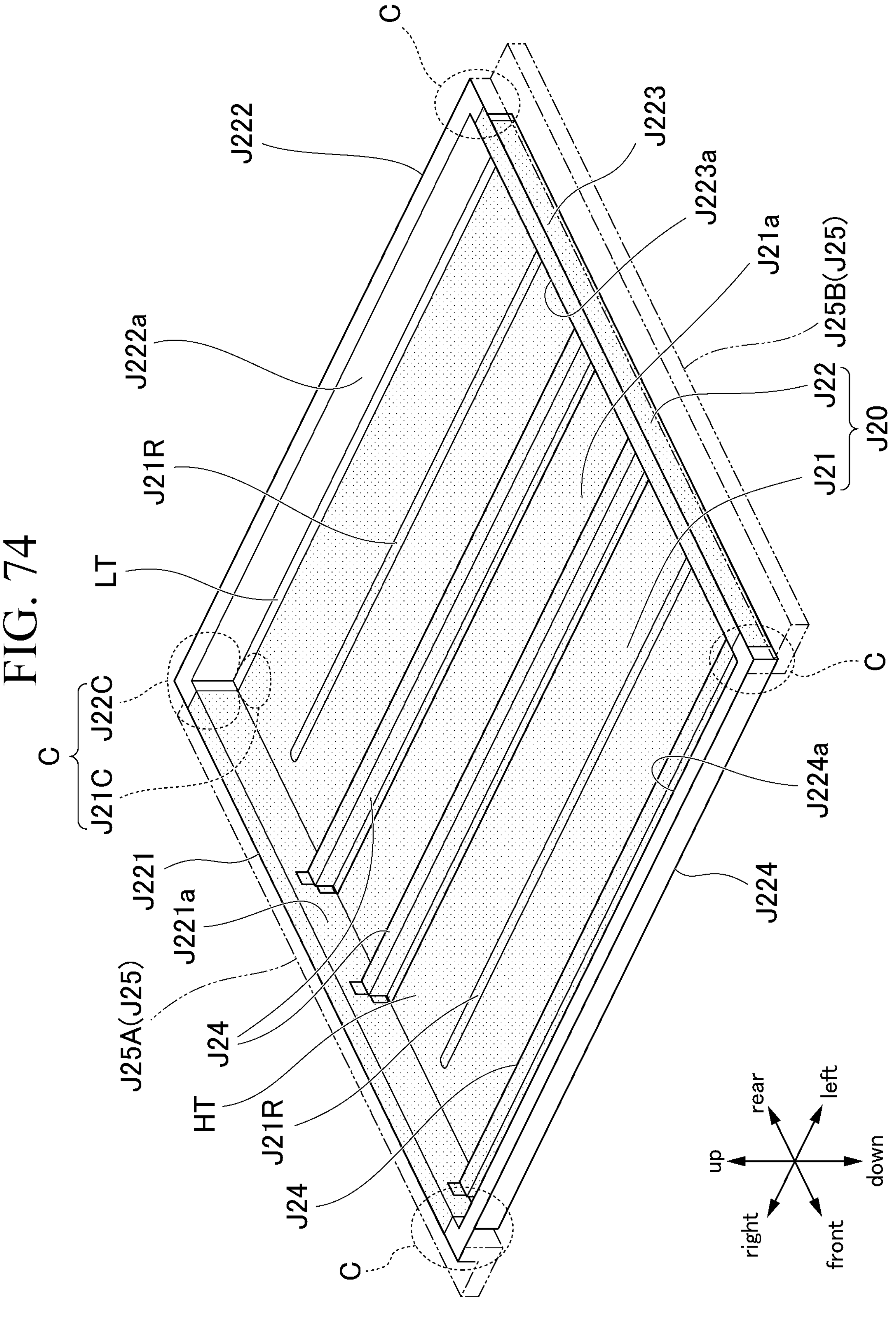
FIG. 74 is a perspective view of a tray according to the present embodiment.
Figure 75:
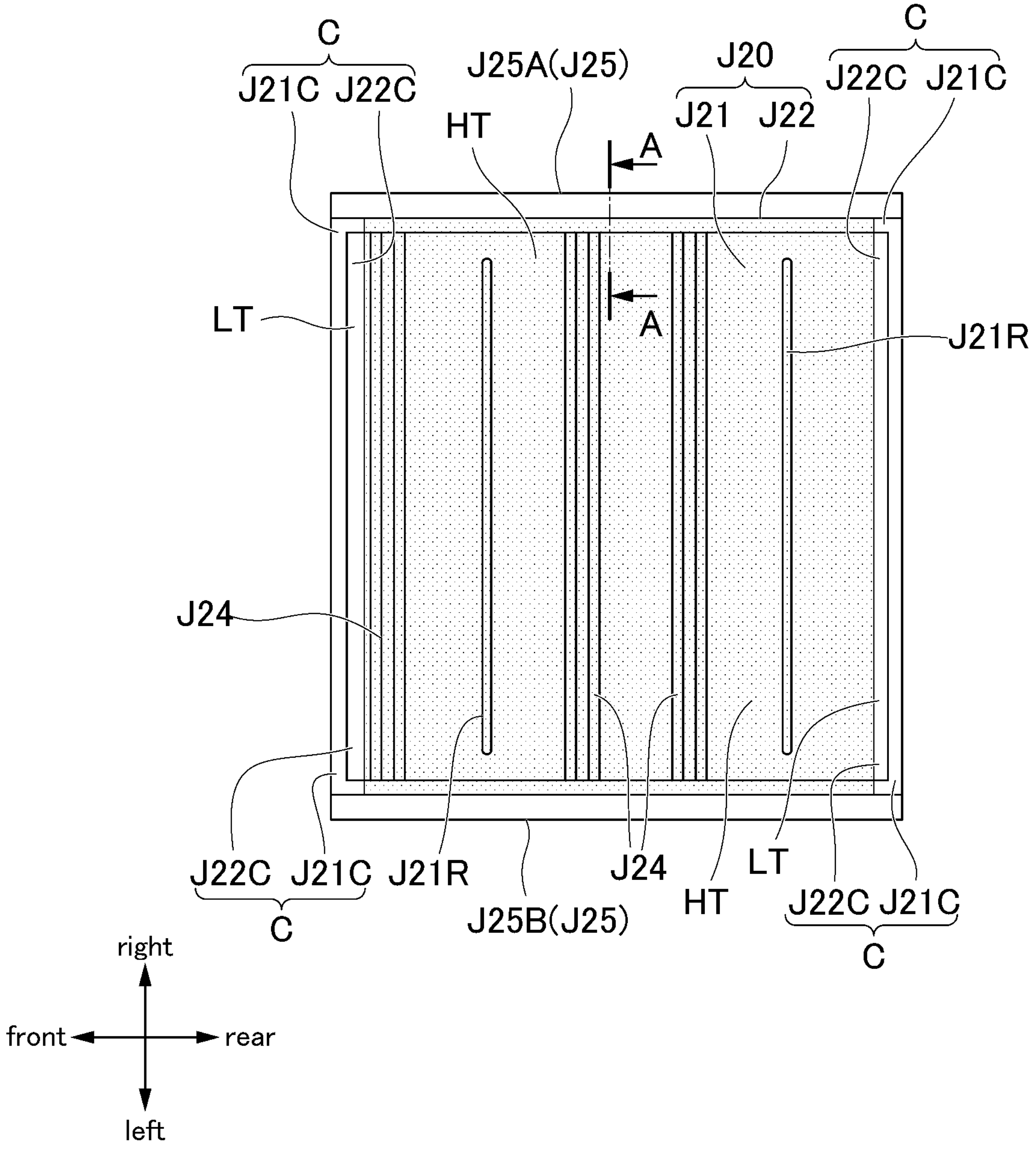
FIG. 75 is a plan view of a tray according to the present embodiment.
Figure 76:
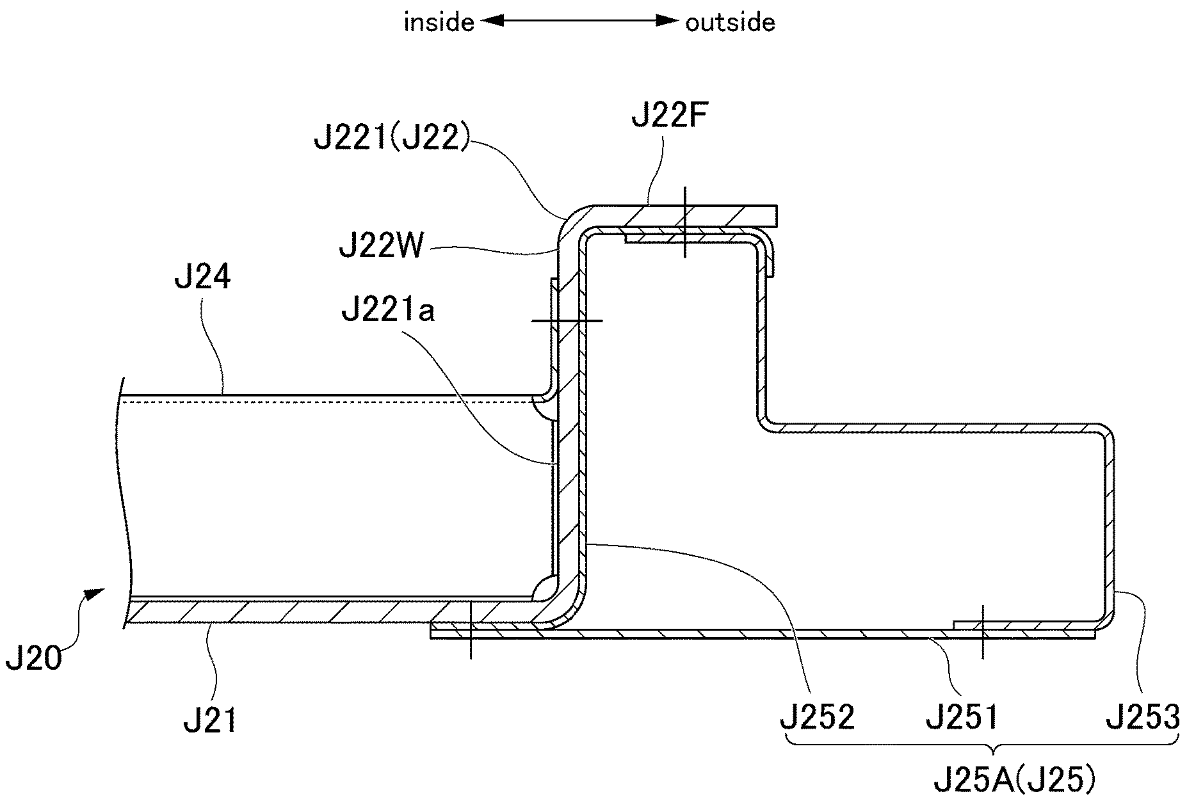
FIG. 76 is a sectional view from the arrow direction of the A in FIG. 75.

FIG. 73 is an explanatory diagram of a tray J20 according to an embodiment. FIG. 74 is a perspective view of the tray J20 according to the embodiment. FIG. 75 is a plan view of the tray J20 according to the embodiment. FIG. 76 is a cross-sectional view when viewed from an arrow A in FIG. 75. Unless otherwise specified, a direction along a traveling direction of a vehicle (vehicle body J1) is referred to as a front-rear direction, a horizontal direction when viewed in the front-rear direction is referred to as a vehicle width direction, and a direction perpendicular to the vehicle width direction or the direction of gravity (vertical direction) when viewed in the front-rear direction is referred to as an up-down direction.

As shown in FIG. 73, the vehicle body J1 includes a frame J10 constituting a skeleton of the vehicle body J1 and a tray J20 (also referred to as a case or a container) on which a battery J30 such as a lithium ion battery is placed. The vehicle body J1 is driven by a battery J30 as a power source, such as an electric vehicle.

By protecting the battery J30 from a side collision (pole side collision) with a utility pole or the like, it is possible to suppress harm to an occupant due to an explosion of the battery J30 or the like. Therefore, in order to protect the battery J30, the tray J20 is disposed inside the vehicle from the position of a side member structure J100 (also referred to as a side sill). The tray J20 is usually disposed between a pair of side member structures J100 provided on right and left sides of the vehicle body J1 in the vehicle width direction.

Specifically, as shown in FIG. 74, the tray J20 includes a bottom wall J21 and a peripheral side wall J22 erected from an outer periphery of the bottom wall J21.

The bottom wall J21 is a polygon of a triangle or more in a plan view. For example, the bottom wall J21 is a quadrangle in a plan view, as shown in FIG. 75. The bottom wall J21 has four corner sections J21C.

Each corner section J21C of the bottom wall J21 is disposed adjacent to each corner portion J22C of the peripheral side wall J22 which will be described later.

The bottom wall J21 has a flat plate shape. The bottom wall J21 is made of steel, for example. The bottom wall J21 has an upper surface J21*a* disposed along a horizontal plane. In-vehicle parts such as the battery J30 are appropriately placed on the upper surface J21*a*. The bottom wall J21 has a rigidity that allows the battery J30 to be placed and supported on the upper surface J21*a*. The upper surface J21*a* is a reinforcing portion J21R formed along the vehicle width direction as appropriate in order to increase the rigidity of the bottom wall J21 against distortion in the vehicle width direction caused by an impact load from an outside of the vehicle to an inside of the vehicle such as a side collision. The reinforcing portion J21R may be a ridge or a groove formed along the vehicle width direction.

The peripheral side wall J22 has a polygonal shape corresponding to the polygonal shape of a peripheral edge of the bottom wall J21. For example, as shown in FIG. 75, when the bottom wall J21 is a quadrangle, the peripheral side wall J22 is a quadrangle. Specifically, the peripheral side wall J22 has a first side wall J221, a second side wall J222 adjacent to the first side wall J221, a third side wall J223 adjacent to the second side wall J222, and a fourth side wall J224 adjacent to the third side wall J223. The fourth side wall J224 is adjacent to the first side wall J221. As described above, the side walls from the first side wall J221 to the fourth side wall J224 are disposed in a closed annular shape so as to surround the bottom wall J21 from the peripheral edge of the bottom wall J21. The number of side walls constituting the peripheral side wall J22 is not limited to four as in the present embodiment, but may be three or more depending on the polygonal shape of the peripheral edge of the bottom wall J21.

Each side wall of the peripheral side wall J22 has an inner surface facing a center surrounded by the peripheral side wall J22. That is, as shown in FIG. 74, the first side wall J221 has a first side wall inner surface J221*a*. Similarly, the second side wall J222 has a second side wall inner surface J222*a*. The third side wall J223 has a third side wall inner surface J223*a*. The fourth side wall J224 has a fourth side wall inner surface J224*a*.

As shown in FIG. 76, the peripheral side wall J22 includes a peripheral side wall web J22W extending upward from a vehicle outer end portion of the bottom wall J21 and a peripheral side wall flange J22F, and has a cross section perpendicular to a direction in which the peripheral side wall J22 extends. As a result, even when the tray J20 including the peripheral side wall J22 can be easily formed from a flat steel sheet by pressing, the tray J20 can reasonably secure rigidity capable of resisting a load such as a shearing force and a moment. The cross section of the peripheral side wall J22 may be uniform along the peripheral edge of the bottom wall J21.

As shown in FIGS. 74 and 75, the tray J20 includes a high-strength portion HT having a high tensile strength and a low-strength portion LT having a tensile strength lower than that of the high-strength portion HT. From the viewpoint of weight reduction, the high-strength portion HT preferably has the tensile strength of 980 MPa or more, and more preferably the tensile strength of 1470 MPa or more. From the viewpoint of ease of processing, the low-strength portion LT has a tensile strength of 270 MPa to 440 MPa. The low-strength portion LT has, for example, a tensile strength of 270 MPa, 440 MPa, or 590 MPa. For example, when a steel sheet having a tensile strength of 1470 MPa is used as the high-strength portion HT, a steel sheet having a tensile strength of 270 MPa is used as the low-strength portion LT having a tensile strength lower than that of the high-strength portion HT.

Here, the low-strength portion LT includes a recessed portion C having a corner portion J22C in the first side wall inner surface J221*a* of the first side wall J221 and the second side wall inner surface J222*a* of the second side wall J222 which are adjacent to each other at a minor angle and a corner section J21C on the upper surface J21*a* of the bottom wall J21 having a minor angle to each of the first side wall inner surface J221*a* and the second side wall inner surface J222*a* in the corner portion J22C. As described above, the low-strength portion LT of the tray J20 is disposed to have the recessed portion C (a portion in which three surfaces such as the first side wall inner surface J221*a*, the second side wall inner surface J222*a*, and the upper surface J21*a* are adjacent to each other) in which the corner portion J22C of the peripheral side wall J22 and the corner section J21C of the bottom wall J21 are adjacent to each other. The minor angle is the smaller angle of angles that share two sides with an apex.

Since the tray J20 has such a structure, the high-strength portion HT can be a region that mainly shares and receives the impact load acting on the tray J20 from the vehicle width direction. In addition, the recessed portion C that is difficult to press can be made into the low-strength portion LT. Therefore, the high-strength portion HT can prevent the tray J20 from being plasticized at an early stage and greatly deformed, and can be made relatively lightweight. In addition, the low-strength portion LT makes it possible to easily form the tray J20 having a box-shaped three-dimensional shape including the recessed portion C by pressing a steel sheet as a base metal. Therefore, a rigid and lightweight tray J20 can be provided.

Specifically, as shown in FIGS. 74 and 75, the tray J20 has the high-strength portion HT at a middle portion in the front-rear direction.

The high-strength portion HT is formed from the first side wall J221 to the third side wall J223 facing the first side wall J221 via the bottom wall J21. As a result, a range of a load transmission path when the impact load is applied can be set to the high-strength portion HT. Therefore, even when the sheet thickness of the tray J20 is reduced, the rigidity in the vehicle width direction can be increased, and thus, the weight can be efficiently reduced.

In the tray J20, a region including the recessed portions C having corner sections J21C disposed at two front positions and corner portions J22C corresponding to the corner sections J21C is the low-strength portion LT. Further, in the tray J20, a region including the recessed portions C having corner sections J21C disposed at two rear positions and corner portions J22C corresponding to the corner sections J21C is the low-strength portion LT. As described above, since the region including the recessed portion C having the corner section J21C and the corner portion J22C is the low-strength portion LT, the tray J20 can be easily manufactured by pressing the steel sheet as the base metal.

The tray J20 includes an inner reinforcing material J24 extending from the first side wall J221 to the third side wall J223 facing the first side wall J221 on the bottom wall J21. As a result, even when an impact load in the vehicle width direction acts on one of the first side wall J221 and the third side wall J223, a part of the impact load can be shared with the other of the first side wall J221 and the third side wall J223. Further, it is possible to increase the rigidity and buckling strength in the range of the load transmission path when the impact load acts in the vehicle width direction. Therefore, protection performance inside the tray J20 can be improved.

A plurality of the inner reinforcing material J24 may be provided. Further, the plurality of inner reinforcing material J24 may be provided side by side in the front-rear direction. As a result, when an impact load is applied to the first side wall J221 and the third side wall J223 in the vehicle width direction, the maximum bending moment around the vertical direction acting on a cross section perpendicular to the front-rear direction of the first side wall J221 and the third side wall J223 can be reduced, and displacement of the first side wall J221 and the third side wall J223 in the vehicle width direction can be suppressed. Further, the impact load in the vehicle width direction applied to one of the first side wall J221 and the third side wall J223 due to a side collision or the like can be dispersed to the plurality of inner reinforcing materials J24 and transmitted to the third side wall J223. Therefore, a cross section perpendicular to the longitudinal direction (vehicle width direction) of one inner reinforcing material J24 can be reduced and made compact. The inner reinforcing material J24 may be provided in a single number.

One end portion of the inner reinforcing material J24 is joined to the first side wall inner surface J221*a* of the first side wall J221 by welding or the like. The other end portion of the inner reinforcing material J24 is joined to the third side wall inner surface J223*a* of the third side wall J223 by welding or the like.

The inner reinforcing material J24 preferably overlaps with the high-strength portion HT. Accordingly, the effect of improving the rigidity by the inner reinforcing material J24 and the effect of improving the rigidity by the high-strength portion HT are combined, and thus, it is possible to effectively increase the rigidity in the range of the load transmission path when an impact load is applied in the vehicle width direction. Therefore, protection performance inside the tray J20 can be improved.

The first side wall J221 and the third side wall J223 include outer reinforcing materials J25 extending along the first side wall J221 and the third side wall J223. In general, the outer reinforcing material J25 includes a first outer reinforcing material J25A extending along the first side wall J221 and a second outer reinforcing material J25B extending along the third side wall J223. As a result, the impact load acting from the outside of the vehicle to the inside of the vehicle is dispersed in the front-rear direction of the outer reinforcing material J25, and then is transmitted to the bottom wall J21 via the first side wall J221 or the third side wall J223, and thus, the range of the load transmission path can be widened, and the load received by the tray J20 can be dispersed so as not to be concentrated locally. Therefore, protection performance inside the tray J20 can be improved.

Specifically, as shown in FIG. 76, the outer reinforcing material J25 (first outer reinforcing material J25A) has a hollow cross section to secure flexural rigidity and impact energy performance per unit mass with respect to an impact load acting from the outside of the vehicle toward the inside of the vehicle. Further, the outer reinforcing material J25 has a plurality of members extending along the front-rear direction, that is, a first member J251, a second member J252, and a third member J253. The cross section of the outer reinforcing material J25 has a closed annular shape by connecting the first member J251 to the second member J252 and the third member J253 to each other. The first member J251 and the second member J252 and the third member J253 are joined to each other by, for example, welding. For example, each of the first member J251, the second member J252, and the third member J253 is a flat steel sheet or a steel sheet bent and formed from a flat steel sheet. The outer reinforcing material J25 and the peripheral side wall J22 are joined to each other by welding or the like. The outer reinforcing material J25 is not limited to the portion formed of three members as in the present embodiment, but may be formed of a single member, may be formed of two members, or may be formed of a plurality of members such as four or more members.

(Manufacturing Method)

Next, a method of manufacturing the tray J20 will be described.

(1) First, a steel sheet serving as the high-strength portion HT having a high tensile strength and a steel sheet serving as the low-strength portion LT having a lower tensile strength than the high-strength portion HT are welded (welding step). Here, for example, a steel sheet having a tensile strength of 1470 MPa is used as the high-strength portion HT. Further, as the low-strength portion LT, a steel sheet having a tensile strength of 270 MPa is used. It is preferable that a sheet thickness of the steel sheet serving as the high-strength portion HT and a sheet thickness of the steel sheet serving as the low-strength portion LT are the same as each other.

(2) Next, the low-strength portion LT is pressed to include the recessed portion C having the corner portion J22C in the first side wall inner surface J221*a* of the first side wall J221 and the second side wall inner surface J222*a* of the second side wall J222 which are adjacent to each other at the minor angle and the corner section J21C on the upper surface J21*a* of the bottom wall J21 having the minor angle to each of the first side wall inner surface J221*a* and the second side wall inner surface J222*a* in the corner portion J22C (forming step). At the same time, the high-strength portion HT is pressed. Due to work hardening of the pressing, the tensile strength of the high-strength portion HT or the low-strength portion LT after the pressing can be increased higher than the tensile strength of the high-strength portion HT or the low-strength portion LT before the pressing.

According to the method for manufacturing the tray J20, even when the tray J20 has the high-strength portion HT, the recessed portion C, which is difficult to form by the pressing, is the low-strength portion LT. Accordingly, it is possible easily manufacture the tray J20 including the bottom wall J21 and the peripheral side wall J22 erected from the outer periphery of the bottom wall J21. Therefore, it is possible to provide a method for manufacturing the rigid and lightweight tray J20.

(Element Technology K)

Element technology K is a structural member for an automobile body. The structural member is formed extending in a predetermined direction. The structural member has a top portion, a ridge portion continuous to the top portion, and a vertical wall portion continuous to the ridge portion. The structural member has a cross-section crossing the predetermined direction that forms a substantially groove-shaped cross-section. The structural member is made of a press formed steel sheet. The structural member further has at least one groove portion formed at the top portion extending to the predetermined direction from an end portion in the predetermined direction, and an outward flange formed at least in the range of the ridge portion at the end portion. In the structural member, a depth (h) of the groove portion; a width (w) of the groove portion; and a sheet thickness (t) of the steel sheet satisfy relations of $$0.2\times H_0 \le h \le 3.0\times H_0, \text{ and}$$

$$H_0 = (0.037t - 0.25)\times w - 5.7t + 29.2.$$

Figure 77:
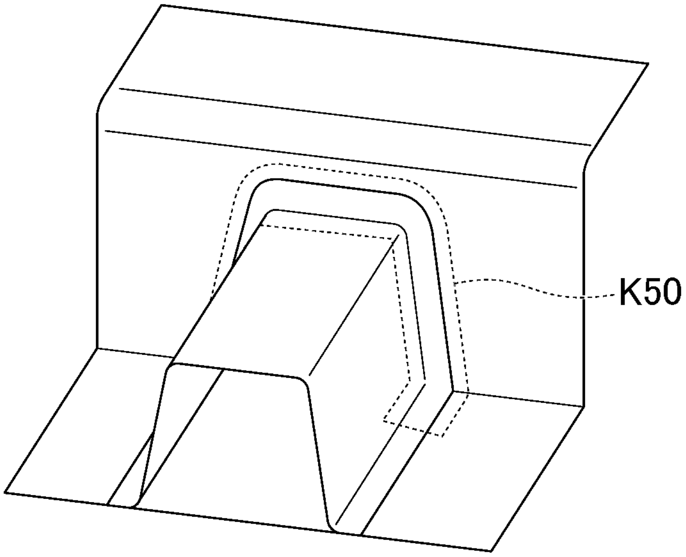
FIG. 77 is a view illustrating an example of a frame of a monocock structure of an automobile body according to the present embodiment and a cabin frame member.

FIG. 77 is a frame 20 of the monocock structure of the automobile body 100 according to the present embodiment, showing an example of a cabin frame member. As described in Japanese Patent No. 6075463, a frame member having a continuous flange K50 at the joint site of a sheet metal part effectively exerts an effect of improving collision energy absorption efficiency and has a feature that is superior in load transfer characteristics and stiffness. An example of a manufacturing process is described in Japanese Patent No. 5958644.

(Element Technology L)

Element technology L is a high strength frame member having an L-shape and T-shape.

More specifically, the high strength frame member having an L-shape and a T-shape is manufactured by a method of manufacturing a press part having an L-shaped hat cross-sectional shape by having a hat-shaped section composed of a top portion, two vertical walls connected to each of side of the top portion, and two flanges connected to each of the vertical wall and a curved portion extending longitudinally in a plane, or a press part having the L-shaped hat cross-sectional shape on a part thereof. In the method of manufacturing the press part or the press part having the L-shaped hat cross-sectional shape on a part thereof, a metal sheet is disposed between a punch and a blank holder, and a pad, a die, and a die for bending, a portion of the metal sheet that will be formed to the top portion is pressed against the punch with the pad and sandwiched, and a portion of the metal sheet that will be formed to an outer portion of the curved portion from the portion of the metal sheet that will be formed to the top portion is pressed against the die with the blank holder and sandwiched, and the die for bending is relatively moved in a direction in which the punch is arranged to process the metal sheet. With the described above process, the vertical wall at an inner peripherical side of the curved portion and the flange connected to the vertical wall are formed. After forming the vertical wall at an inner peripherical side of the curved portion and the flange connected to the vertical wall, while maintaining a state of pressing and sandwiching the metal sheet against the die with the blank holder, the die and the brank holder are relatively moved to the metal sheet in a direction in which the brank holder is arranged to process the metal sheet. With the described above process, the vertical wall at an outer peripherical side of the curved portion and the flange connected to the vertical wall are formed and the press part is manufactured.

Figure 78:
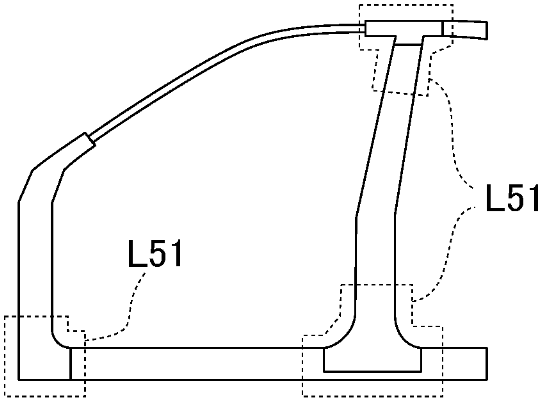
FIG. 78 is a view illustrating an example of a frame of a monocock structure of an automobile body according to the present embodiment and a cabin frame member and high strength frame members having L-shape and T-shape.

FIG. 78 is a diagram illustrating a frame 20 of the monocock structure of the automobile body 100 according to the present embodiment, which is an example of a high strength frame member L51 having L-shape and T-shape at a cabin frame member 24. By using the manufacturing method described in Japanese Patent No. 6020596, a cold rolled high tensile strength material of 1180 MPa or more can be used to produce a high strength frame member L51 having L-shape and T-shape. This makes it possible to further increase the strength and thickness of body parts. [Industrial applicability]

According to the present invention, an automobile body can be provided that can reduce the total greenhouse gas emissions generated during a series of life cycles, including the manufacture, use, and disposal of an automobile.

BRIEF DESCRIPTION OF THE REFERENCE SYMBOLS

1 Internal combustion engine
2 Electric motor
10 Exterior panel
12—Bonnet
14 Door
15 Floor
16 Roof
17 Bumper
18 Fender
19 Trunk lid
20 Frame
22 Shock absorbing frame member
24 Cabin frame member
26 Center pillar
30 Floor frame member
32 Side sill
100 Automobile body

What is claimed is:

1. An automobile body of a public road vehicle with superior collision safety, wherein the automobile body of the public road vehicle excludes batteries, tires, and liquids containing water or oil, the public road vehicle comprising at least a steel material containing a steel sheet with a tensile strength of 1180 MPa or higher, a non-ferrous metal material, and a resin material, wherein a ratio of a mass $m_h$ (kg) of the steel sheet having a tensile strength of 1180 MPa or higher to a mass m (kg) of the automobile body is 9% or higher, and a mass m (kg) of the automobile body and a projected area s ($m^2$) of the automobile body from an upper side satisfy a formula (1) and a formula (2)

$$6 < s < 11 \tag{1}$$

$$m < (272.37 \times s - 835) \times 0.98. \tag{2}$$

2. An automobile body of a public road vehicle with superior collision safety, wherein the automobile body of the public road vehicle excludes batteries, tires, and liquids containing water or oil, the public road vehicle comprising at least a steel material containing a steel sheet with a tensile strength of 1180 MPa or higher, a non-ferrous metal material, and a resin material, wherein a ratio of a mass $m_h$ (kg) of the steel sheet having a tensile strength of 1180 MPa or higher to a mass m (kg) of the automobile body is 9% or higher, and a total mass M of the $CO_2$ emission amount at the time of manufacturing, using, and disposing, calculated from a material composition of the automobile body, a projected area s ($m^2$) of the automobile body from an upper side, and a height h (m) of the automobile body satisfy a formula (3) and a formula (4)

$$9 < s \times h < 19 \tag{3}$$

$$M < (1925.1 \times s \times h - 1.4) \times 0.98. \tag{4}$$

3. The automobile body according to claim 1, wherein a ratio of a mass $m_s$ (kg) of the steel material to the mass m (kg) of the automobile body is 64% or more, and a ratio of a total mass $m_{hs}$ (kg) of a sheet metal part made of the steel sheet having a tensile strength of 1.9 GPa or higher to the mass m (kg) of the automobile body is 9% or more.

4. The automobile body according to claim 1, wherein a ratio of a total mass $m_{ht}$ (kg) of the sheet metal part made of the steel sheet having a tensile strength of 1180 MPa or higher to a body weight $m_b$ (kg) composing the automobile body is 24% or more.

5. The automobile body according to claim 1, wherein a ratio of a total mass $m_{SC}$ (kg) of a sheet metal part containing Cu: 0.013% or more, Ni: 0.018% or more, and Sn: 0.002% or more, to a total mass $m_{sp}$ (kg) of the sheet metal part of the automobile body is 20% or more.

6. The automobile body according to claim 3, comprising:

a hot-stamping formed body comprising, as a chemical composition, by mass %: C: 0.30% to 0.50%; Si: 0.50% to 3.00%; Mn: 0.50% to 3.00%; Al: 0.0002% to 2.000%; P: 0.100% or less; S: 0.1000% or less; N: 0.0100% or less; Nb: 0% to 0.150%; Ti: 0% to 0.150%; Co: 0% to 2.00%; Mo: 0% to 1.00%; Cr: 0% to 1.00%; Cu: 0% to 1.00%; V: 0% to 1.00%; W: 0% to 1.00%; Ni: 0% to 3.00%; Mg: 0% to 1.00%; Zr: 0% to 1.00%; Sb: 0% to 1.00%; Ca: 0% to 0.10%; REM: 0% to 0.30%; B: 0% to 0.0100%; and a remainder consisting of Fe and impurities; and microstructure which includes residual austenite of which an area ratio is 5% or more and less than 10%, bainite and tempered martensite of which a total area ratio exceeds 90% and is 95% or less, and a remainder in microstructure of which an area ratio is less than 5%, among grain boundaries of crystal grains of the bainite and the tempered martensite, a ratio of a length of a grain boundary having a rotation angle in a range of 55° to 75° to a total length of a grain boundary having a rotation angle in a range of 4° to 12°, a grain boundary having a rotation angle in a range of 49° to 54°, and the grain boundary having a rotation angle in a range of 55° to 75° to the <011> direction as a rotation axis is 30% or more, wherein a tensile strength of the hot-stamping formed body is 1500 MPa or more, a frame member formed by hot-stamping a steel sheet, wherein the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is less than 1.0, and a hot-stamping formed body comprising, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3.

7. The automobile body according to claim 3, comprising:

a hot-stamping formed body comprising, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3, and a frame member formed by hot-stamping a steel sheet, wherein the frame member has a closed cross section portion in which a cross section perpendicular to a longitudinal direction is a closed cross section, the closed cross section portion has at least two flat parts having a radius of curvature larger than a maximum external dimension of the cross section, and a recessed bead part formed between the two flat parts, the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section, a Vickers hardness of a thickness middle portion in the wall portion is 520 Hv or greater, a width of the wall portion is 0.5 times or greater and 2.5 times or less an effective width $W_e$ obtained from Karman's effective width formula, and a standard deviation ratio obtained by dividing a standard deviation of hardness frequency distribution in a surface layer portion in the wall portion by a standard deviation of hardness frequency distribution in the thickness middle portion in the wall portion is less than 1.0.

8. The automobile body according to claim 3, comprising a frame member formed by cold-pressing a steel sheet, wherein the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is greater than 1.0, a frame member formed by hot-stamping a steel sheet, wherein the frame member has a closed cross section portion in which a cross section perpendicular to a longitudinal direction is a closed cross section, the closed cross section portion has at least one flat part having a radius of curvature larger than a maximum external dimension of the cross section, and when a flat part among the at least one flat part, having such a width that a ratio of the width to an effective width obtained from Karman's effective width formula is maximum, is defined as a reference flat part, a Vickers hardness of a thickness middle portion in the reference flat part is 300 Hv or greater, a width of the reference flat part is 2.0 times or less the effective width, and a standard deviation ratio obtained by dividing a standard deviation of hardness frequency distribution in a surface layer portion in the reference flat part by a standard deviation of hardness frequency distribution in the thickness middle portion in the reference flat part is less than 1.0, and a frame member formed by hot-stamping a steel sheet, wherein the frame member has a closed cross section portion in which a cross section perpendicular to a longitudinal direction is a closed cross section, the closed cross section portion has at least two flat parts having a radius of curvature larger than a maximum external dimension of the cross section, and a recessed bead part formed between the two flat parts, the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section, a Vickers hardness of a thickness middle portion in the wall portion is 520 Hv or greater, a width of the wall portion is 0.5 times or greater and 2.5 times or less an effective width $W_e$ obtained from Karman's effective width formula, and a standard deviation ratio obtained by dividing a standard deviation of hardness frequency distribution in a surface layer portion in the wall portion by a standard deviation of hardness frequency distribution in the thickness middle portion in the wall portion is less than 1.0.

9. The automobile body according to claim 8, comprising a structural member for an automobile body, the structural member being formed extending in a predetermined direction, the structural member having a top portion, a ridge portion continuous to the top portion, and a vertical wall portion continuous to the ridge portion, the structural member having a cross-section crossing the predetermined direction that forms a substantially groove-shaped cross-section, and the structural member being made of a press formed steel sheet, the structural member further having at least one groove portion formed at the top portion extending to the predetermined direction from an end portion in the predetermined direction, and an outward flange formed at least in the range of the ridge portion at the end portion, wherein a depth (h) of the groove portion; a width (w) of the groove portion; and a sheet thickness (t) of the steel sheet satisfy relations of $$0.2\times H_0 \le h \le 3.0\times H_0, \text{ and}$$

$$H_0 = (0.037t - 0.25)\times w - 5.7t + 29.2,$$

and a high strength frame member having an L-shape and a T-shape.

10. The automobile body according to claim 3, comprising a hot-stamping formed body comprising, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <−1-10> and a pole density of an orientation group consisting of {111} <1-10> to {111} <−1-12> is less than 1.8, and in a texture between the sheet thickness ¼ position from the surface and a sheet thickness ½ position from the surface, a ratio between a pole density of an orientation group consisting of {001} <1-10> to {001} <−1-10> and a pole density of an orientation group consisting of {111} <1-10> to {111} <−1-12> is less than 2.3, and a frame member obtained by joining a first steel sheet member and a second steel sheet member at a spot-welding portion by spot welding, wherein a cross-sectional region in which a cross section perpendicular to a longitudinal direction of the frame member is a closed cross section is formed, the first steel sheet member has a tensile strength of 1,900 MPa or more, the spot-welding portion has a molten metal portion formed by the spot welding and a heat-affected portion adjacent to an outside of the molten metal portion, and in a cross section perpendicular to the longitudinal direction including a center point of the molten metal portion, in a case where a region corresponding to the molten metal portion is defined as a first region, a region corresponding to the heat-affected portion is defined as a second region, a region formed of a region from a boundary between the first region and the second region to a position 100 μm away from the boundary toward the first region and a region from the boundary to a position 100 μm away from the boundary toward the second region is defined as a third region, and Vickers hardness is measured at a pitch of 15 μm with a load of 10 gf along a virtual straight line extending from a center portion of the first region to the second region, average Vickers hardness $Hv_{Ave}$ at a measurement position corresponding to the first region on the virtual straight line and minimum Vickers hardness $Hv_{Min}$ at a measurement position corresponding to the third region on the virtual straight line satisfy $Hv_{Ave} - Hv_{Min} \le 100$.

11. The automobile body according to claim 10, comprising a structural member for an automobile body, the structural member being formed extending in a predetermined direction, the structural member having a top portion, a ridge portion continuous to the top portion, and a vertical wall portion continuous to the ridge portion, the structural member having a cross-section crossing the predetermined direction that forms a substantially groove-shaped cross-section, and the structural member being made of a press formed steel sheet, the structural member further having at least one groove portion formed at the top portion extending to the predetermined direction from an end portion in the predetermined direction, and an outward flange formed at least in the range of the ridge portion at the end portion, wherein a depth (h) of the groove portion; a width (w) of the groove portion; and a sheet thickness (t) of the steel sheet satisfy relations of $$0.2\times H_0 \le h \le 3.0\times H_0, \text{ and}$$

$$H_0 = (0.037t - 0.25)\times w - 5.7t + 29.2,$$

and a high strength frame member having an L-shape and a T-shape.

12. The automobile body according to claim 10, comprising:

a hot stamped product including a base steel sheet, wherein the base steel sheet includes, as a chemical composition, by mass %, C: more than 0.40% and 0.70% or less, Si: less than 2.00%, Mn: 0.01% or more and less than 0.50%, P: 0.200% or less, S: 0.0200% or less, sol. Al: 0.001% to 1.000%, N: 0.0200% or less, Mo: 0.01% or more and less than 0.50%, B: 0.0002% to 0.0200%, Ti: 0% to 0.200%, Nb: 0% to 0.200%, V: 0% to 0.200%, Zr: 0% to 0.200%, Cr: 0% to 2.00%, W: 0% to 2.00%, Cu: 0% to 2.00%, Ni: 0% to 2.00%, Ca: 0% to 0.0100%, Mg: 0% to 0.0100%, REM: 0% to 0.1000%, Bi: 0% to 0.0500%, and a remainder: Fe and impurities, when a Mo content of the base steel sheet is measured by line analysis using an EPMA in a range of 0.05 mm in a sheet thickness direction, in which a ¼ depth position of a sheet thickness of the base steel sheet from a surface of the base steel sheet is a center, a maximum value of the Mo content, a minimum value of the Mo content, and an average value of the Mo content satisfy $([Mo]_{mMAX}-[Mo]_{mMIN})/[Mo]_{mAVE}<0.50$, herein meaning of each symbol is, $[Mo]_{mMAX}$: the maximum value of the Mo content of the base steel sheet (mass %), $[Mo]_{mMIN}$: the minimum value of the Mo content of the base steel sheet (mass %), and $[Mo]_{mAVE}$: the average value of the Mo content of the base steel sheet (mass %), a metallographic microstructure of the base steel sheet contains 90.0% or more of martensite, a standard deviation of a Vickers hardness in a region of 0.3 mm in the sheet thickness direction and 0.6 mm in a direction perpendicular to the sheet thickness direction, in which the ¼ depth position of the sheet thickness of the base steel sheet from the surface of the base steel sheet is a center, is 20 (Hv) or less, and a tensile strength of the base steel sheet is 2,300 MPa or more.

13. The automobile body according to claim 11, comprising:

a hot stamped product including a base steel sheet, wherein the base steel sheet includes, as a chemical composition, by mass %, C: more than 0.40% and 0.70% or less, Si: less than 2.00%, Mn: 0.01% or more and less than 0.50%, P: 0.200% or less, S: 0.0200% or less, sol. Al: 0.001% to 1.000%, N: 0.0200% or less, Mo: 0.01% or more and less than 0.50%, B: 0.0002% to 0.0200%, Ti: 0% to 0.200%, Nb: 0% to 0.200%, V: 0% to 0.200%, Zr: 0% to 0.200%, Cr: 0% to 2.00%, W: 0% to 2.00%, Cu: 0% to 2.00%, Ni: 0% to 2.00%, Ca: 0% to 0.0100%, Mg: 0% to 0.0100%, REM: 0% to 0.1000%, Bi: 0% to 0.0500%, and a remainder: Fe and impurities, when a Mo content of the base steel sheet is measured by line analysis using an EPMA in a range of 0.05 mm in a sheet thickness direction, in which a ¼ depth position of a sheet thickness of the base steel sheet from a surface of the base steel sheet is a center, a maximum value of the Mo content, a minimum value of the Mo content, and an average value of the Mo content satisfy $([Mo]_{mMAX}-[Mo]_{mMIN})/[Mo]_{mAVE}<0.50$, herein meaning of each symbol is, $[Mo]_{mMAX}$: the maximum value of the Mo content of the base steel sheet (mass %), $[Mo]_{mMIN}$: the minimum value of the Mo content of the base steel sheet (mass %), and $[Mo]_{mAVE}$: the average value of the Mo content of the base steel sheet (mass %), a metallographic microstructure of the base steel sheet contains 90.0% or more of martensite, a standard deviation of a Vickers hardness in a region of 0.3 mm in the sheet thickness direction and 0.6 mm in a direction perpendicular to the sheet thickness direction, in which the ¼ depth position of the sheet thickness of the base steel sheet from the surface of the base steel sheet is a center, is 20 (Hv) or less, and a tensile strength of the base steel sheet is 2,300 MPa or more.

14. The automobile body according to claim 3, comprising:

a hot-stamping formed body comprising, as a chemical composition, by mass %: C: 0.15 to 0.50%; Si: 0.0010% to 3.000%; Mn: 0.30% to 3.00%; Al: 0.0002% to 2.000%; P: 0.100% or less; S: 0.1000% or less; N: 0.0100% or less; Nb: 0% to 0.15%; Ti: 0% to 0.15%; V: 0% to 0.15%; Mo: 0% to 1.0%; Cr: 0% to 1.0%; Cu: 0% to 1.0%; Ni: 0% to 1.0%; B: 0% to 0.0100%; Ca: 0% to 0.010%; REM: 0% to 0.30%; and a remainder consisting of Fe and an impurity, wherein the hot-stamping formed body has a metallographic structure containing, by area ratio, a total of 90% or more of martensite, bainite, and tempered martensite, in a texture between a surface and a sheet thickness ¼ position from the surface, a ratio between a pole density of an orientation group consisting of {001} <1-10> to {001} <–1-10> and a pole density of an orientation group consisting of {111} <1-10> to {111} <–1-12> is less than 1.8, and in a texture between the sheet thickness ¼ position from the surface and a sheet thickness ½ position from the surface, a ratio between a pole density of an orientation group consisting of {001} <1-10> to {001} <–1-10> and a pole density of an orientation group consisting of {111} <1-10> to {111} <–1-12> is less than 2.3, and a lateral surface member structure of a vehicle body comprising: a tubular body extending in a front-rear direction of the vehicle body; and an impact absorbing member disposed inside the tubular body, the impact absorbing member includes a web extending along the front-rear direction and flat in a vehicle width direction, a vehicle outer flange joined to a vehicle outer end portion of the web and extending along the front-rear direction, and a vehicle inner flange joined to a vehicle inner end portion of the web and extending along the front-rear direction, and the vehicle outer flange and the vehicle inner flange include a rib disposed so as to sandwich the web from above and below and extending along the front-rear direction.

15. The automobile body according to claim 14, comprising a structural member for an automobile body, the structural member being formed extending in a predetermined direction, the structural member having a top portion, a ridge portion continuous to the top portion, and a vertical wall portion continuous to the ridge portion, the structural member having a cross-section crossing the predetermined direction that forms a substantially groove-shaped cross-section, and the structural member being made of a press formed steel sheet, the structural member further having at least one groove portion formed at the top portion extending to the predetermined direction from an end portion in the predetermined direction, and an outward flange formed at least in the range of the ridge portion at the end portion, wherein a depth (h) of the groove portion; a width (w) of the groove portion; and a sheet thickness (t) of the steel sheet satisfy relations of $$0.2\times H_0\leq h\leq 3.0\times H_0,\text{ and}$$

$$H_0=(0.037t-0.25)\times w-5.7t+29.2,$$

and a high strength frame member having an L-shape and a T-shape.

16. The automobile body according to claim 14, comprising:

a coated steel member including a steel sheet substrate and a coating containing Al and Fe formed on a surface of the steel sheet substrate, wherein the steel sheet substrate contains, as a chemical composition, by mass %, C: 0.10% to 0.65%, Si: 0.10% to 2.00%, Mn: 0.30% to 3.00%, P: 0.050% or less, S: 0.0100% or less, N: 0.010% or less, O: 0.010% or less, Ti: 0% to 0.100%, B: 0% to 0.0100%, Cr: 0% to 1.00%, Mo: 0% to 1.00%, Ni: 0% to 1.00%, Nb: 0% to 0.10%, Cu: 0% to 1.00%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder including Fe and impurities, the steel sheet substrate comprises a decarburized layer formed on a side of the coating, the decarburized layer comprises an internal oxidized layer formed on the side of the coating, a depth of the decarburized layer from an interface between the steel sheet substrate and the coating is 30 μm or more, a depth of the internal oxidized layer from the interface is less than 20 μm, and no scale is included between the steel sheet substrate and the coating containing Al and Fe.

17. The automobile body according to claim 15, comprising:

a coated steel member including a steel sheet substrate and a coating containing Al and Fe formed on a surface of the steel sheet substrate, wherein the steel sheet substrate contains, as a chemical composition, by mass %, C: 0.10% to 0.65%, Si: 0.10% to 2.00%, Mn: 0.30% to 3.00%, P: 0.050% or less, S: 0.0100% or less, N: 0.010% or less, O: 0.010% or less, Ti: 0% to 0.100%, B: 0% to 0.0100%, Cr: 0% to 1.00%, Mo: 0% to 1.00%, Ni: 0% to 1.00%, Nb: 0% to 0.10%, Cu: 0% to 1.00%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder including Fe and impurities, the steel sheet substrate comprises a decarburized layer formed on a side of the coating, the decarburized layer comprises an internal oxidized layer formed on the side of the coating, a depth of the decarburized layer from an interface between the steel sheet substrate and the coating is 30 μm or more, a depth of the internal oxidized layer from the interface is less than 20 μm, and no scale is included between the steel sheet substrate and the coating containing Al and Fe.

18. The automobile body according to claim 14, comprising a tray, wherein the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray comprises a bottom wall and a peripheral side wall erected from an outer periphery of the bottom wall, the tray comprises a high-strength portion having a high tensile strength, and a low-strength portion having a tensile strength lower than that of the high-strength portion, the low-strength portion comprises a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

19. The automobile body according to claim 15, comprising a tray, wherein the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray comprises a bottom wall and a peripheral side wall erected from an outer periphery of the bottom wall, the tray comprises a high-strength portion having a high tensile strength, and a low-strength portion having a tensile strength lower than that of the high-strength portion, the low-strength portion comprises a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

20. The automobile body according to claim 16, comprising a tray, wherein the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray comprises a bottom wall and a peripheral side wall erected from an outer periphery of the bottom wall, the tray comprises a high-strength portion having a high tensile strength, and a low-strength portion having a tensile strength lower than that of the high-strength portion, the low-strength portion comprises a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

21. The automobile body according to claim 17, comprising a tray, wherein the tray is manufactured by a process including welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion, the tray comprises a bottom wall and a peripheral side wall erected from an outer periphery of the bottom wall, the tray comprises a high-strength portion having a high tensile strength, and a low-strength portion having a tensile strength lower than that of the high-strength portion, the low-strength portion comprises a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

* * * * *